(12) United States Patent
Minami et al.

(10) Patent No.: US 11,886,094 B2
(45) Date of Patent: Jan. 30, 2024

(54) OPTICAL ELEMENT, VARIFOCAL ELEMENT AND HEAD MOUNTED DISPLAY

(71) Applicant: Sharp Display Technology Corporation, Kameyama (JP)

(72) Inventors: Daisuke Minami, Kameyama (JP); Hiroaki Asagi, Kameyama (JP); Kiyoshi Minoura, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/110,810

(22) Filed: Feb. 16, 2023

(65) Prior Publication Data

US 2023/0280632 A1    Sep. 7, 2023

(30) Foreign Application Priority Data

Feb. 21, 2022  (JP) .................................. 2022-024729
Apr. 26, 2022  (JP) .................................. 2022-072441
Nov. 29, 2022  (JP) .................................. 2022-190148

(51) Int. Cl.
    *G02F 1/29*    (2006.01)
(52) U.S. Cl.
    CPC ................................... *G02F 1/294* (2021.01)
(58) Field of Classification Search
    None
    See application file for complete search history.

(56) References Cited

U.S. PATENT DOCUMENTS

| 4,906,073 | A | * | 3/1990 | Hunahata | ............ | G02F 1/13363 349/181 |
| 6,028,656 | A | * | 2/2000 | Buhrer | ................ | G02F 1/13471 349/196 |
| 10,379,419 | B1 | | 8/2019 | Lu et al. | | |
| 10,678,057 | B2 | | 6/2020 | Lu et al. | | |
| 2006/0291053 | A1 | | 12/2006 | Robinson et al. | | |
| 2009/0231517 | A1 | * | 9/2009 | Shiraogawa | ...... | G02F 1/133632 349/75 |

(Continued)

FOREIGN PATENT DOCUMENTS

| JP | 2009-524106 A | 6/2009 |
| JP | 2014-528597 A | 10/2014 |

(Continued)

*Primary Examiner* — Ryan Crockett
(74) *Attorney, Agent, or Firm* — ScienBiziP, P.C.

(57) ABSTRACT

Provided is an optical element including: a first liquid crystal cell including first liquid crystal molecules and a first electrode; and a second liquid crystal cell including second liquid crystal molecules and a second electrode, the first and second electrodes disposed to enable switching between a first state twist-aligning the second liquid crystal molecules and vertically aligning the first liquid crystal molecules and a second state twist-aligning the first liquid crystal molecules and vertically aligning the second liquid crystal molecules. Alignment directions of the second liquid crystal molecules near a third substrate and the second liquid crystal molecules near a fourth substrate in the first state are respectively at azimuthal angles resulting from a ¼ turn in the same direction of azimuthal angles of alignment directions of the first liquid crystal molecules near the first substrate and the first liquid crystal molecules near the second substrate in the second state.

20 Claims, 118 Drawing Sheets

(56) References Cited

U.S. PATENT DOCUMENTS

| | | | |
|---|---|---|---|
| 2010/0225876 A1 | 9/2010 | Escuti et al. | |
| 2012/0044431 A1* | 2/2012 | Osterman | H04N 13/341 349/15 |
| 2013/0027656 A1 | 1/2013 | Escuti et al. | |
| 2013/0077040 A1 | 3/2013 | Escuti et al. | |
| 2018/0335630 A1* | 11/2018 | Lu | G02F 1/13439 |
| 2019/0227375 A1 | 7/2019 | Oh et al. | |
| 2021/0318566 A1* | 10/2021 | Oh | G02F 1/133757 |
| 2022/0146888 A1 | 5/2022 | Oh et al. | |

FOREIGN PATENT DOCUMENTS

| | | |
|---|---|---|
| JP | 2021-501361 A | 1/2021 |
| JP | 2021-528683 A | 10/2021 |
| WO | 2018/213001 A1 | 11/2018 |
| WO | 2021/050183 A1 | 3/2021 |

* cited by examiner

Second liquid crystal cell in first state

First liquid crystal cell in second state

FIG.12
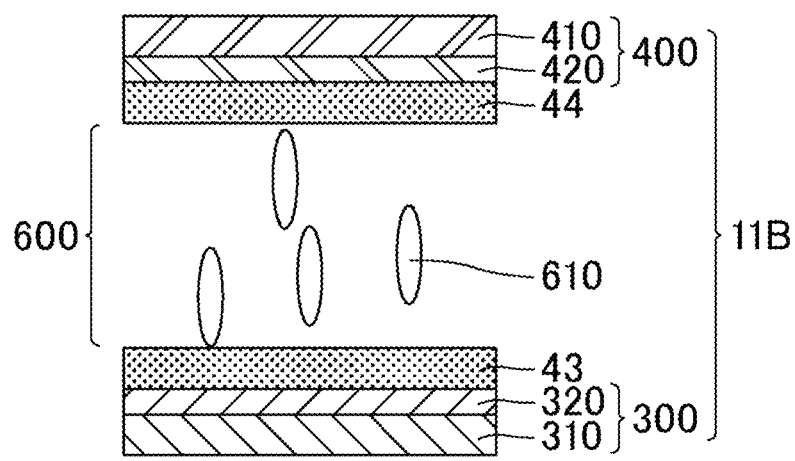
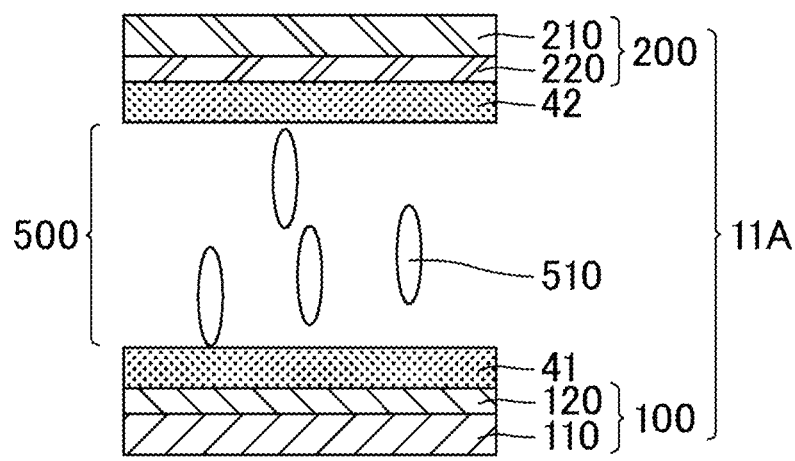

FIG.13
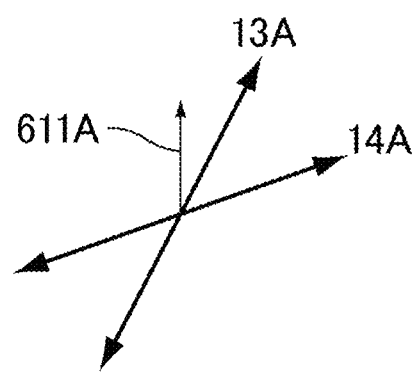
Second liquid crystal
cell in first state
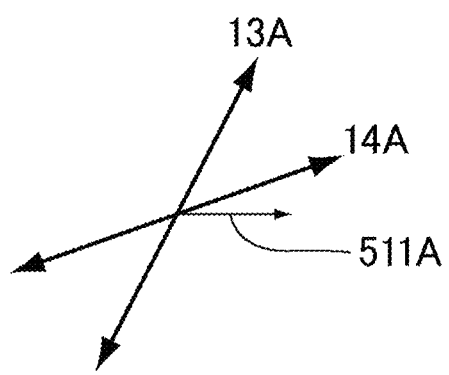
First liquid crystal
cell in second state
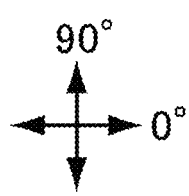

FIG.18
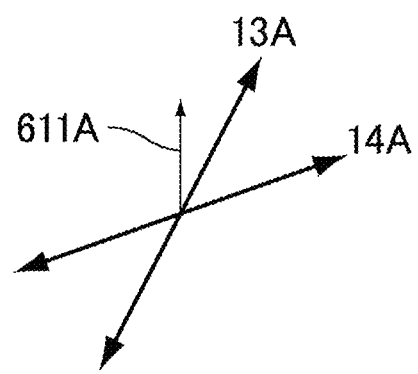
Second liquid crystal
cell in first state
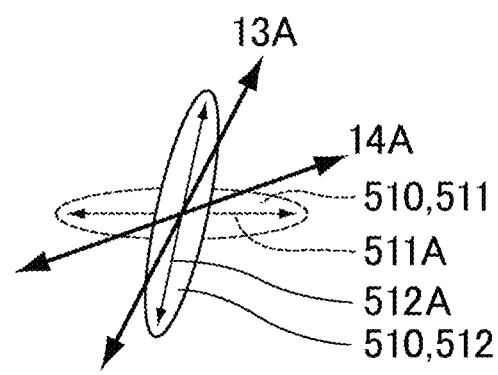
First liquid crystal
cell in second state
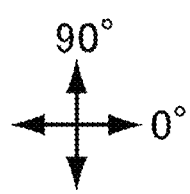

Second liquid crystal cell in first state

First liquid crystal cell in second state

FIG. 41

Twist angle of second liquid crystal molecules (°)

Twist angle of first liquid crystal molecules (°)

Pre-twist angle of second liquid crystal molecules (°)

Pre-twist angle of first liquid crystal molecules (°)

Azimuthal angle of slow axis of quarter-wave film
exhibiting reverse wavelength dispersion (°)

Azimuthal angle of slow axis of quarter-wave film
exhibiting reverse wavelength dispersion (°)

Phase difference of quarter-wave film exhibiting flat wavelength dispersion (nm)

Phase difference of quarter-wave film exhibiting flat wavelength dispersion (nm)

FIG. 56

| Input: S3=+1 | | Output:S3~+1 No modulation | | | Output:S3~-1 Modulation | | |
|---|---|---|---|---|---|---|---|
| No. | Structure | 450nm | 550nm | 650nm | 450nm | 550nm | 650nm |
| 1 | Comparative Example 1 | | | | | | |
| 2 | Example 1 | | | | | | |
| 3 | Example 2 | | | | | | |

1.0(Good)　0.8(Poor)　−1.0(Good)　−0.8(Poor)

FIG.69
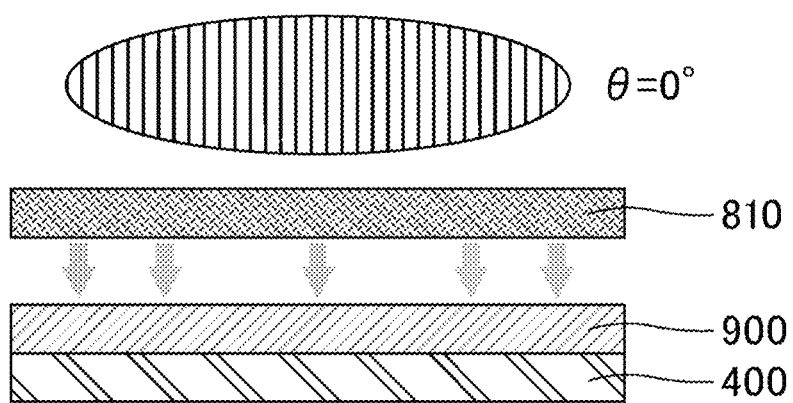
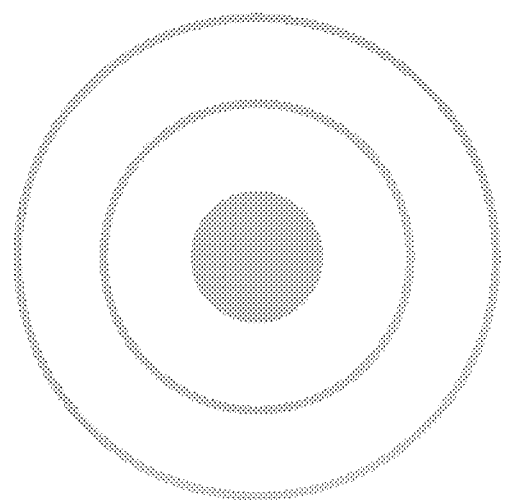

FIG.70
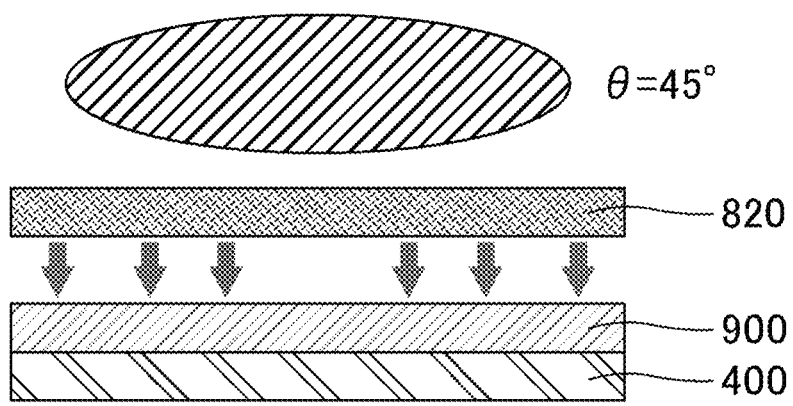
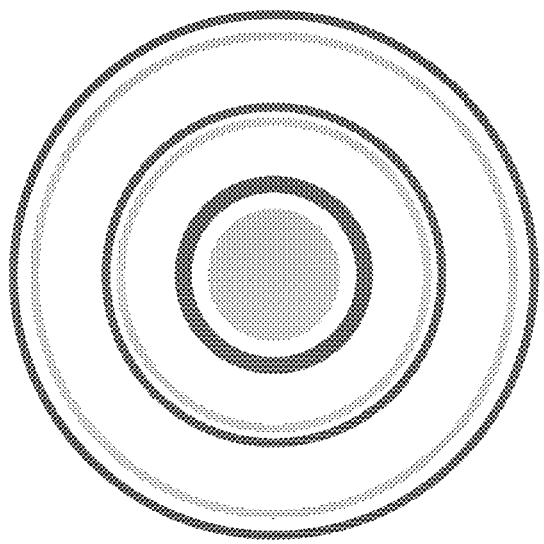

FIG.71
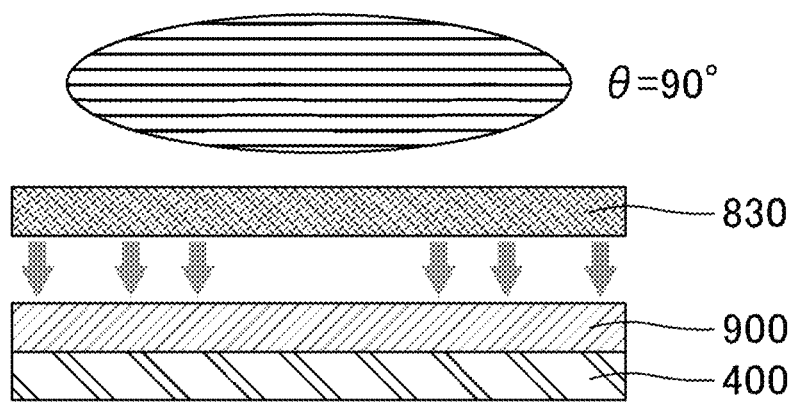
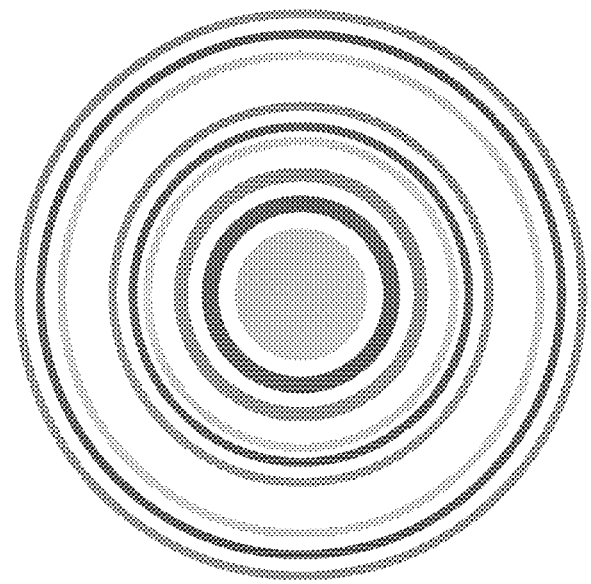

FIG. 72
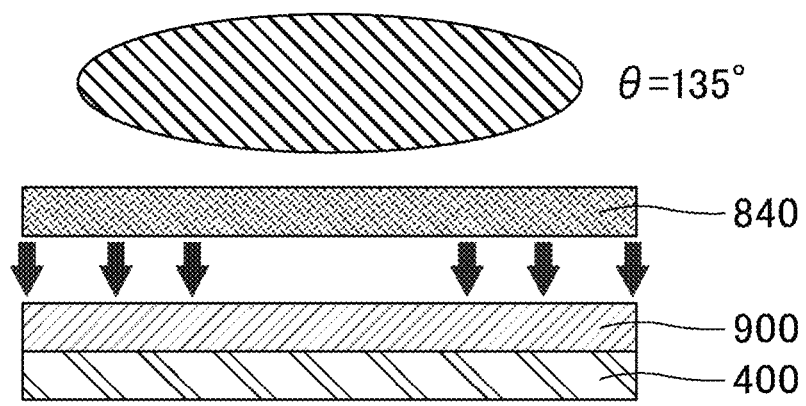
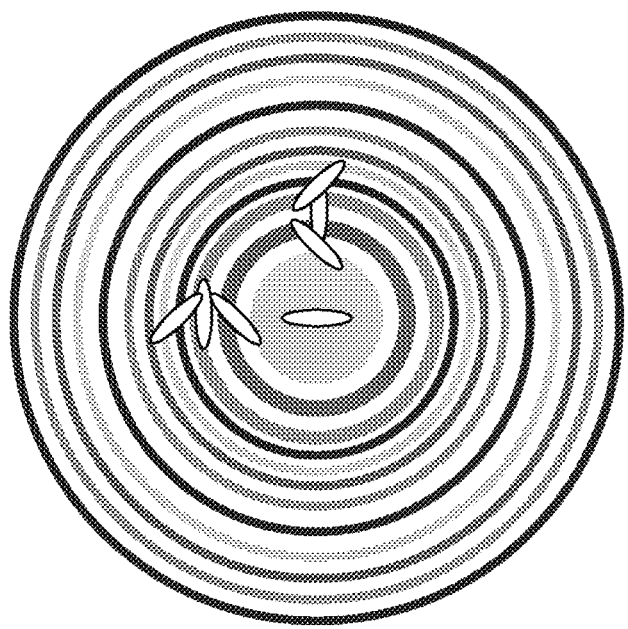

Second liquid crystal cell in first state

First liquid crystal cell in second state

Right-handed circularly polarized light

Left-handed circularly polarized light
(S3=-1)

OPTICAL ELEMENT, VARIFOCAL ELEMENT AND HEAD MOUNTED DISPLAY

CROSS-REFERENCE TO RELATED APPLICATIONS

The present application claims priority under 35 U.S.C. § 119 to Japanese Patent Application No. 2022-024729 filed on Feb. 21, 2022, Japanese Patent Application No. 2022-072441 filed on Apr. 26, 2022, and Japanese Patent Application No. 2022-190148 filed on Nov. 29, 2022, the contents of which are incorporated herein by reference in their entirety.

BACKGROUND OF THE INVENTION

Field of the Invention

The following disclosure relates to optical elements, varifocal elements including the optical element, and head mounted displays including the varifocal element.

Description of Related Art

There have been suggestions to use varifocal optical systems including a Pancharatnam-Berry (PB) lens in combination with other optical element(s) such as a switchable half wave plate (sHWP) for head mounted displays or other purposes. A sHWP can switch between left and right-handed circularly polarized lights using liquid crystals.

Techniques related to varifocal optical systems include, for example, a display device disclosed in JP 2021-501361 T which includes a waveguide and a broad bandwidth adaptive lens assembly. The waveguide is configured to guide light in a lateral direction parallel to an output surface of the waveguide, and is further configured to outcouple the guided light through the output surface. The broad bandwidth adaptive lens assembly is configured to incouple and to diffract therethrough the outcoupled light from the waveguide.

U.S. Ser. No. 10/379,419 B1 discloses a varifocal block including a sHWP and a plurality of liquid crystal lenses.

JP 2009-524106 T discloses an achromatic polarization switch that transforms linearly polarized light of an initial polarization orientation, including a first liquid crystal (LC) cell having a first axis of orientation relative to the initial polarization orientation; and a second LC cell having a second axis of orientation relative to the first axis of orientation.

JP 2014-528597 T discloses an optical element including first and second stacked birefringent layers having respective local optic axes that are rotated by respective twist angles over respective thicknesses of the first and second layers and are aligned along an interface between the first and second layers.

U.S. Ser. No. 10/678,057 B2 proposes an optical element including a stacked liquid crystal structure for rotating polarization of an incident circularly polarized light over a broad wavelength and incident angle for head-mounted displays' display application.

BRIEF SUMMARY OF THE INVENTION

None of JP 2021-501361 T, U.S. Ser. No. 10/379,419 B1, JP 2009-524106 T, JP 2014-528597 T, and U.S. Ser. No. 10/678,057 B2 seemingly can easily achieve a device structure that can switch between polarization modulation and no polarization modulation over a broad bandwidth and a wide viewing angle range. The polarization modulation is a state where the polarization state conversion between left and right-handed circularly polarized lights is performed. The no polarization modulation is a state where the polarization state conversion between left and right-handed circularly polarized lights is not performed.

In response to the above issues, an object of the present invention is to provide an optical element that can switch between polarization modulation and no polarization modulation over a broad bandwidth and a wide viewing angle range; a varifocal element including the optical element; and a head mounted display including the varifocal element.

(1) One embodiment of the present invention is directed to an optical element sequentially including: a first substrate; a first liquid crystal layer containing first liquid crystal molecules; a second substrate; a third substrate; a second liquid crystal layer containing second liquid crystal molecules; and a fourth substrate, the first substrate, the first liquid crystal layer, and the second substrate defining a first liquid crystal cell, the third substrate, the second liquid crystal layer, and the fourth substrate defining a second liquid crystal cell, the first liquid crystal cell including, as a first electrode for voltage application to the first liquid crystal layer, at least one of an electrode in the first substrate or an electrode in the second substrate, the second liquid crystal cell including, as a second electrode for voltage application to the second liquid crystal layer, at least one of an electrode in the third substrate or an electrode in the fourth substrate, the first electrode and the second electrode disposed to enable switching between a first state and a second state, the first state twist-aligning the second liquid crystal molecules and vertically aligning the first liquid crystal molecules, the second state twist-aligning the first liquid crystal molecules and vertically aligning the second liquid crystal molecules, an alignment direction of second liquid crystal molecules near the third substrate in the first state and an alignment direction of second liquid crystal molecules near the fourth substrate in the first state being respectively at azimuthal angles resulting from a ¼ turn in the same direction of an azimuthal angle of an alignment direction of first liquid crystal molecules near the first substrate in the second state and an azimuthal angle of an alignment direction of first liquid crystal molecules near the second substrate in the second state.

(2) In an embodiment of the present invention, the optical element includes the structure (1) and further includes a negative C plate between the first liquid crystal cell and the second liquid crystal cell.

(3) In an embodiment of the present invention, the optical element includes the structure (2), and a thickness direction retardation Rth introduced by the negative C plate is not less than −220 nm and not more than 0 nm.

(4) In an embodiment of the present invention, the optical element includes the structure (1), (2), or (3), a retardation introduced by the first liquid crystal layer at a wavelength of 550 nm in the second state is not less than 200 nm and not more than 260 nm, and a retardation introduced by the second liquid crystal layer at a wavelength of 550 nm in the first state is not less than 210 nm and not more than 260 nm.

(5) In an embodiment of the present invention, the optical element includes the structure (1), (2), (3), or (4), and the first liquid crystal cell does not have the same configuration as the second liquid crystal cell.

(6) In an embodiment of the present invention, the optical element includes the structure (1), (2), (3), (4), or (5), the first liquid crystal molecules in the second state are twist-aligned with a twist angle of not smaller than 61° and not greater than 75°, and the second liquid crystal molecules in the first state are twist-aligned with a twist angle of not smaller than 64° and not greater than 74°.

(7) In an embodiment of the present invention, the optical element includes the structure (1), (2), (3), (4), (5), or (6), the alignment direction of the first liquid crystal molecules near the first substrate in the second state is at an azimuthal angle of not smaller than −9° and not greater than 7°, and the alignment direction of the second liquid crystal molecules near the third substrate in the first state is at an azimuthal angle of not smaller than 85° and not greater than 96°.

(8) In an embodiment of the present invention, the optical element includes the structure (1), (2), (3), (4), (5), (6), or (7), and further includes a quarter-wave film facing the second liquid crystal cell across the first liquid crystal cell or facing the first liquid crystal cell across the second liquid crystal cell.

(9) In an embodiment of the present invention, the optical element includes the structure (8), and the quarter-wave film exhibits reverse wavelength dispersion.

(10) In an embodiment of the present invention, the optical element includes the structure (8) or (9), and an in-plane phase difference introduced by the quarter-wave film at a wavelength of 450 nm is not less than 0.7 times and not more than 1 times the in-plane phase difference introduced by the quarter-wave film at a wavelength of 550 nm.

(11) In an embodiment of the present invention, the optical element includes the structure (8), (9), or (10), and an in-plane phase difference introduced by the quarter-wave film at a wavelength of 650 nm is not less than 1 times and not more than 1.3 times the in-plane phase difference introduced by the quarter-wave film at a wavelength of 550 nm.

(12) In an embodiment of the present invention, the optical element includes the structure (8), (9), (10), or (11), and a slow axis of the quarter-wave film is at an azimuthal angle of not smaller than 52° and not greater than °.

(13) In an embodiment of the present invention, the optical element includes the structure (8), (9), (10), (11), or (12), and an in-plane phase difference introduced by the quarter-wave film at a wavelength of 550 nm is not less than nm and not more than 170 nm.

(14) In an embodiment of the present invention, the optical element includes the structure (8), (9), (10), (11), (12), or (13), the quarter-wave film is a first quarter-wave film, and the optical element further includes a second quarter-wave film facing the first liquid crystal cell and the second liquid crystal cell across the first quarter-wave film.

(15) In an embodiment of the present invention, the optical element includes the structure (14), and the second quarter-wave film exhibits flat wavelength dispersion.

(16) In an embodiment of the present invention, the optical element includes the structure (14) or (15), and a slow axis of the second quarter-wave film is at an azimuthal angle of not smaller than 8° and not greater than 18°.

(17) In an embodiment of the present invention, the optical element includes the structure (14), (15), or (16), and an in-plane phase difference introduced by the second quarter-wave film at a wavelength of 550 nm is not less than 120 nm and not more than 150 nm.

(18) Another embodiment of the present invention is directed to a varifocal element including: the optical element including the structure (1), (2), (3), (4), (5), (6), (7), (8), (9), (10), (11), (12), (13), (14), (15), (16), or (17); and a Pancharatnam-Berry lens.

(19) In an embodiment of the present invention, the varifocal element includes the structure (18), and the Pancharatnam-Berry lens is disposed in the optical element.

(20) Yet another embodiment of the present invention is directed to a head mounted display including the varifocal element including the structure (18) or (19).

The present invention can provide an optical element that can switch between polarization modulation and no polarization modulation over a broad bandwidth and a wide viewing angle; a varifocal element including the optical element; and a head mounted display including the varifocal element.

BRIEF DESCRIPTION OF THE DRAWINGS

FIG. 12 is a schematic cross-sectional view of a first liquid crystal cell and a second liquid crystal cell in the optical element of Embodiment 3.

FIG. 13 includes schematic views showing the alignments of liquid crystal molecules in the first state and the second state in the optical element of Embodiment 3.

FIG. 18 includes schematic views showing the alignments of liquid crystal molecules in the first state and the second state in the optical element of Embodiment 4.

FIG. 41 shows the simulation results of viewing angle characteristics during no modulation and during modulation of the optical elements of Example 1, Comparative Example 1, and Comparative Example 2.

FIG. 56 shows the simulation results of viewing angle characteristics during no modulation and during modulation of the optical elements of Example 1, Example 2, and Comparative Example 1.

FIG. 69 is a schematic view showing the first alignment treatment in production of the varifocal element of Example 5.

FIG. 70 is a schematic view showing the second alignment treatment in the production of the varifocal element of Example 5.

FIG. 71 is a schematic view showing the third alignment treatment in the production of the varifocal element of Example 5.

FIG. 72 is a schematic view showing the fourth alignment treatment in the production of the varifocal element of Example 5.

FIG. 120 is an example of a schematic cross-sectional view of an optical element having a tenth structure of Modified Example 2 of Embodiment 1.

FIG. 121 is an example of a schematic cross-sectional view of an optical element having the tenth structure of Modified Example 2 of Embodiment 1.

FIG. 122 is an example of a schematic cross-sectional view of an optical element having the tenth structure of Modified Example 2 of Embodiment 1.

FIG. 123 is an example of a schematic cross-sectional view of an optical element having the tenth structure of Modified Example 2 of Embodiment 1.

FIG. 124 is an example of a schematic cross-sectional view of an optical element having the tenth structure of Modified Example 2 of Embodiment 1.

FIG. 125 is an example of a schematic cross-sectional view of an optical element having the tenth structure of Modified Example 2 of Embodiment 1.

FIG. 126 is an example of a schematic cross-sectional view of an optical element having an eleventh structure of Modified Example 2 of Embodiment 1.

FIG. 127 is an example of a schematic cross-sectional view of an optical element having the eleventh structure of Modified Example 2 of Embodiment 1.

FIG. 128 is an example of a schematic cross-sectional view of an optical element having the eleventh structure of Modified Example 2 of Embodiment 1.

FIG. 129 is an example of a schematic cross-sectional view of an optical element having the eleventh structure of Modified Example 2 of Embodiment 1.

FIG. 130 is an example of a schematic cross-sectional view of an optical element having the eleventh structure of Modified Example 2 of Embodiment 1.

FIG. 131 is an example of a schematic cross-sectional view of an optical element having the eleventh structure of Modified Example 2 of Embodiment 1.

Figure 132:
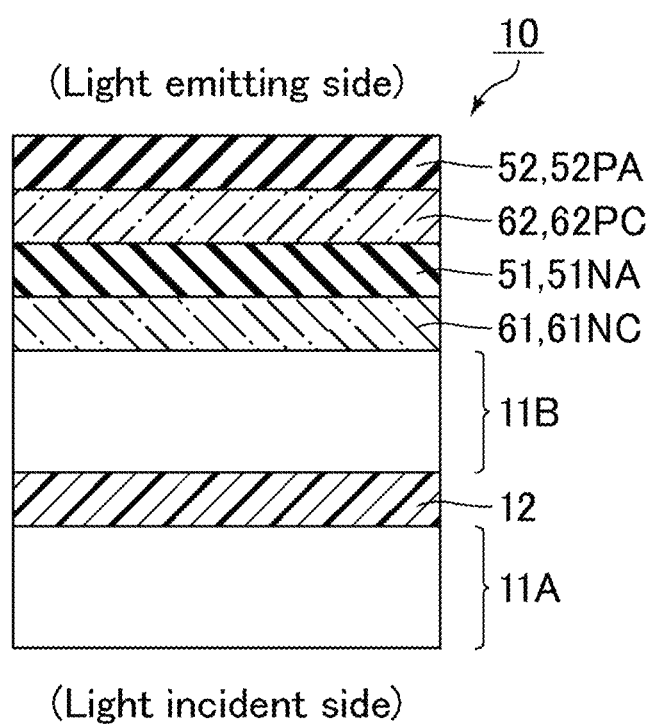

FIG. 132 is an example of a schematic cross-sectional view of an optical element having the eleventh structure of Modified Example 2 of Embodiment 1.

Figure 133:
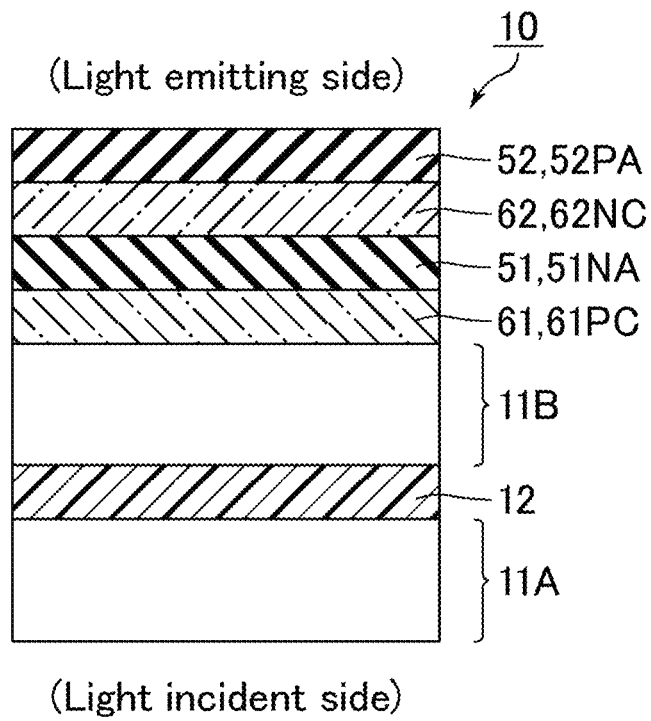

FIG. 133 is an example of a schematic cross-sectional view of an optical element having the eleventh structure of Modified Example 2 of Embodiment 1.

Figure 134:
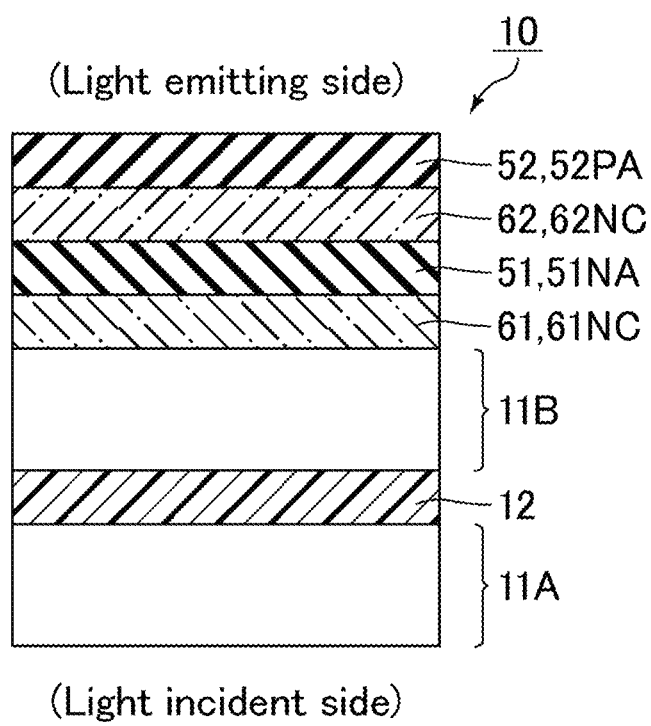

FIG. 134 is an example of a schematic cross-sectional view of an optical element having the eleventh structure of Modified Example 2 of Embodiment 1.

Figure 135:
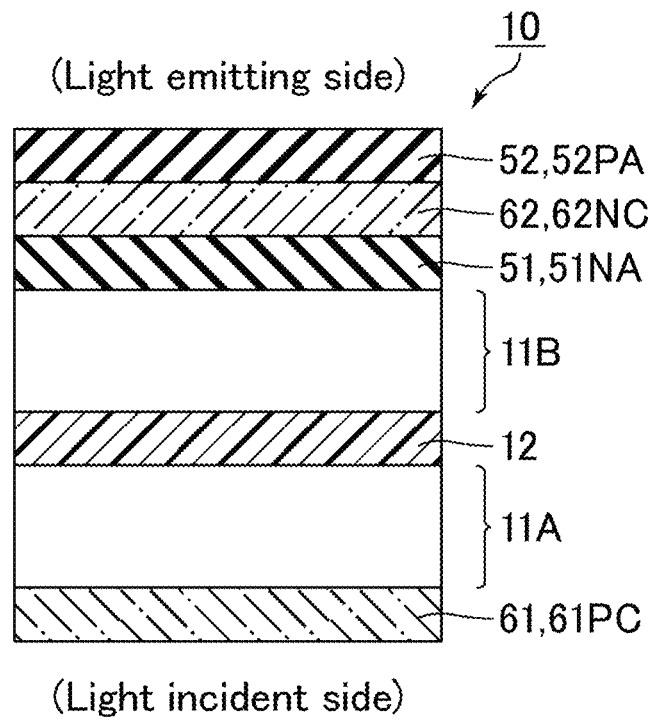

FIG. 135 is an example of a schematic cross-sectional view of an optical element having the eleventh structure of Modified Example 2 of Embodiment 1.

Figure 136:
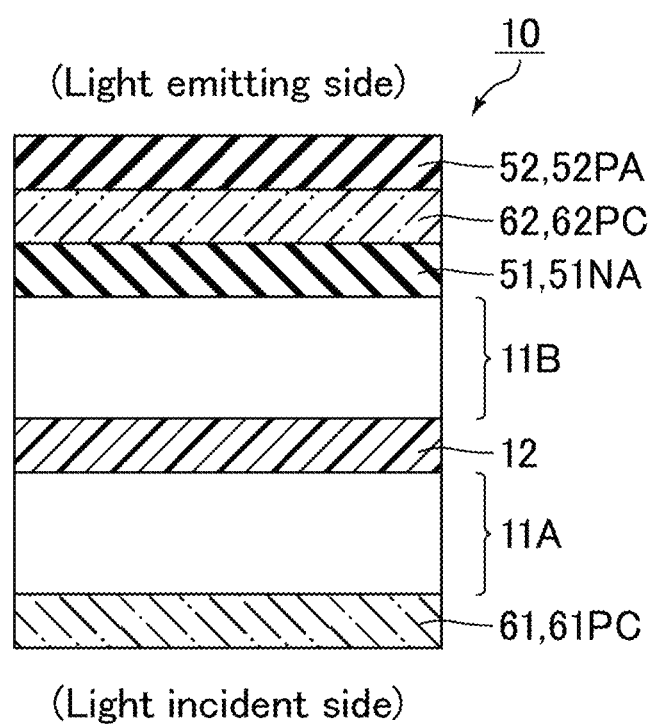

FIG. 136 is an example of a schematic cross-sectional view of an optical element having the eleventh structure of Modified Example 2 of Embodiment 1.

Figure 137:
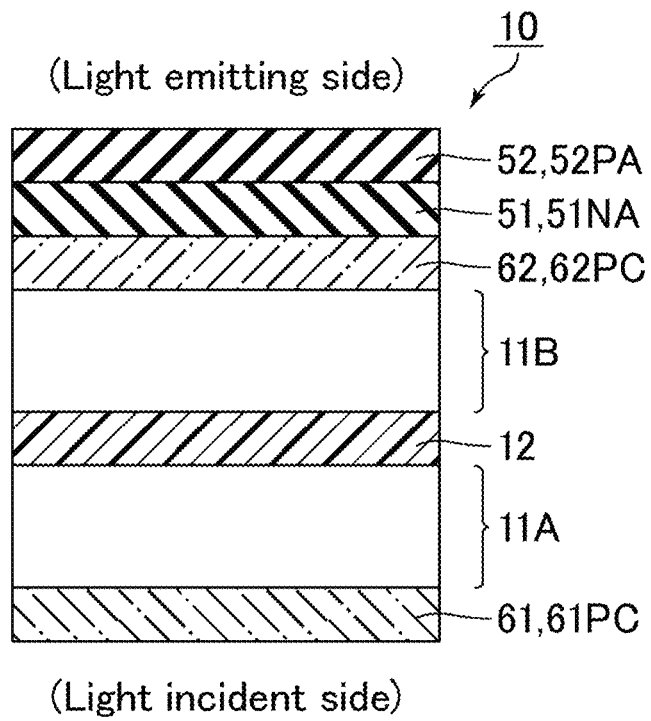

FIG. 137 is an example of a schematic cross-sectional view of an optical element having the eleventh structure of Modified Example 2 of Embodiment 1.

Figure 138:
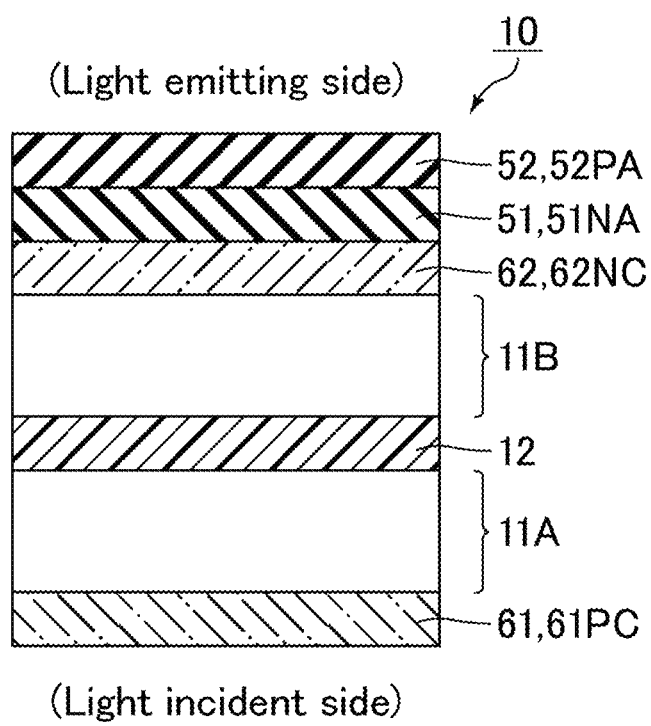

FIG. 138 is an example of a schematic cross-sectional view of an optical element having the eleventh structure of Modified Example 2 of Embodiment 1.

Figure 139:
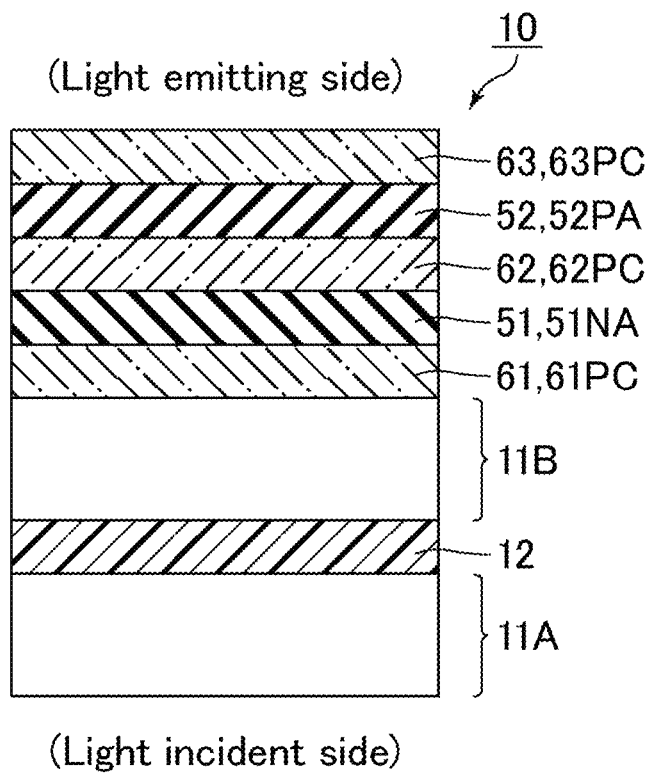

FIG. 139 is an example of a schematic cross-sectional view of an optical element having a twelfth structure of Modified Example 2 of Embodiment 1.

Figure 140:
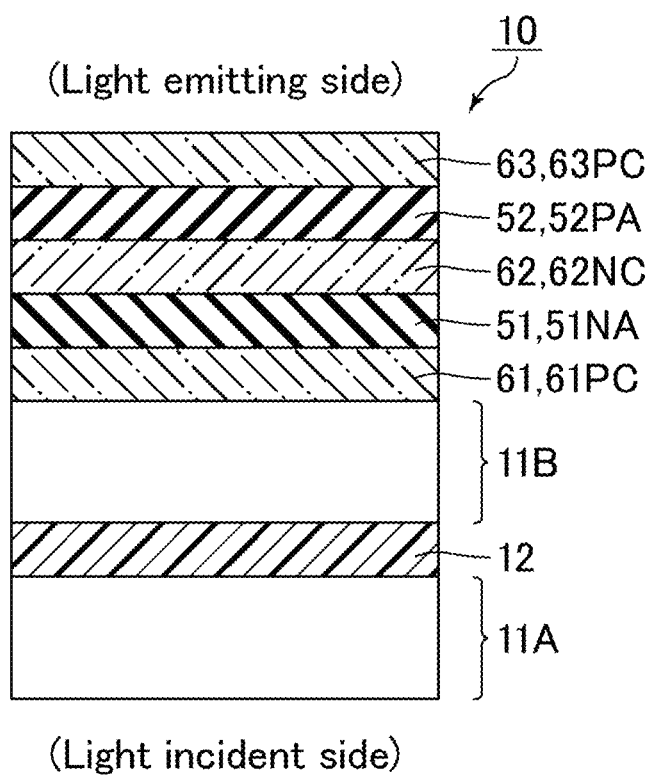

FIG. 140 is an example of a schematic cross-sectional view of an optical element having the twelfth structure of Modified Example 2 of Embodiment 1.

Figure 141:
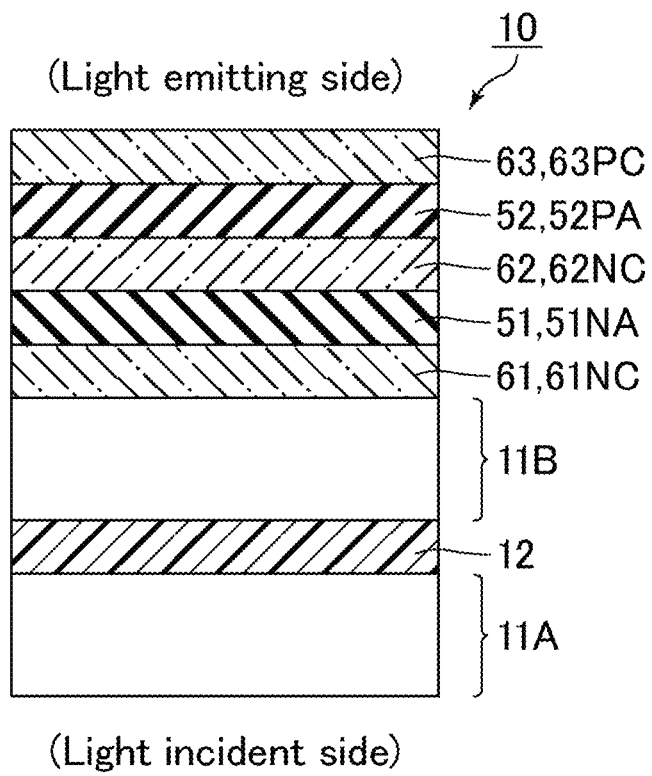

FIG. 141 is an example of a schematic cross-sectional view of an optical element having the twelfth structure of Modified Example 2 of Embodiment 1.

Figure 142:
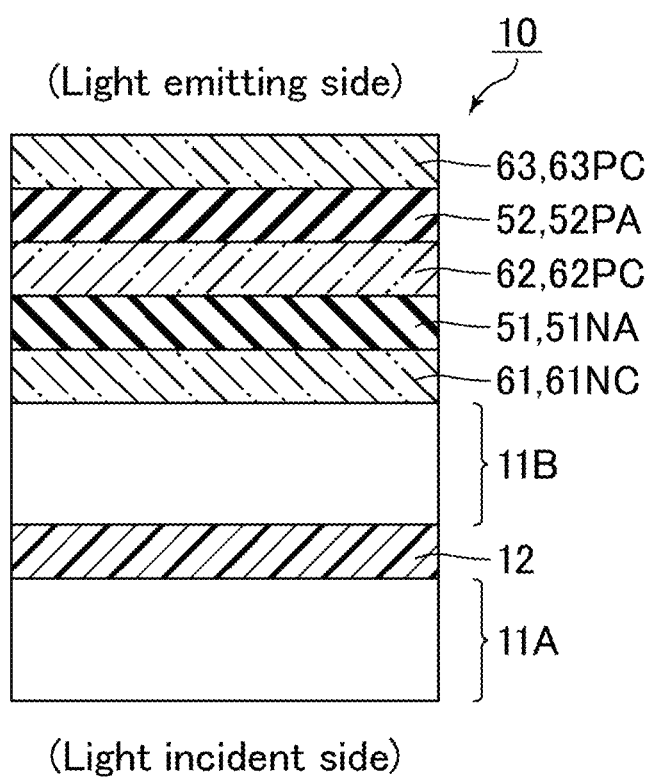

FIG. 142 is an example of a schematic cross-sectional view of an optical element having the twelfth structure of Modified Example 2 of Embodiment 1.

Figure 143:
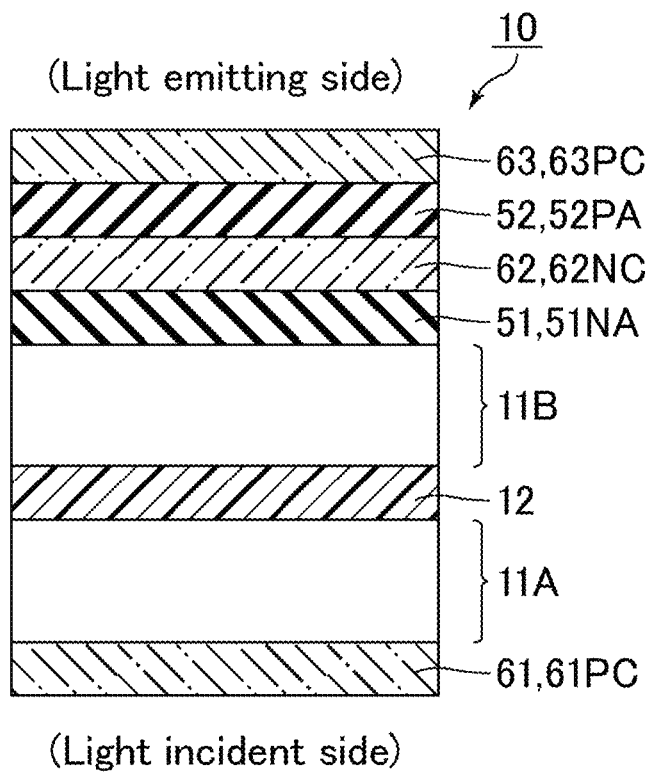

FIG. 143 is an example of a schematic cross-sectional view of an optical element having the twelfth structure of Modified Example 2 of Embodiment 1.

Figure 144:
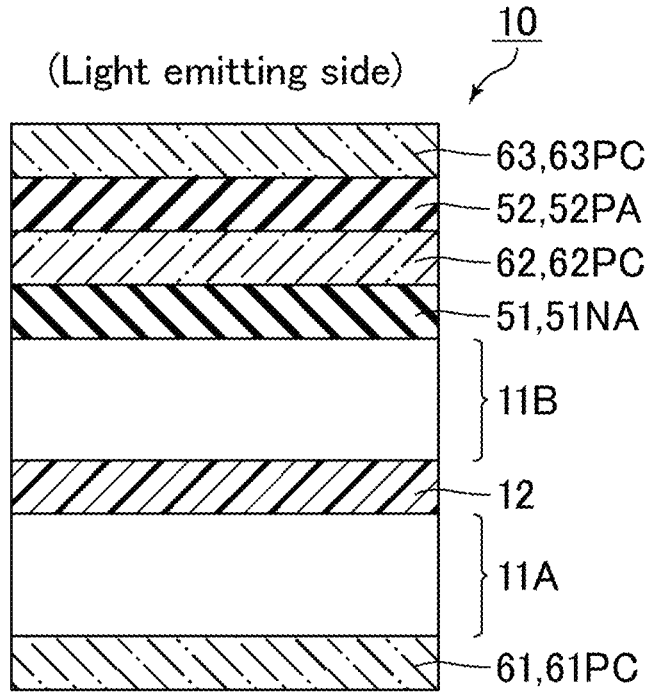

FIG. 144 is an example of a schematic cross-sectional view of an optical element having the twelfth structure of Modified Example 2 of Embodiment 1.

Figure 145:
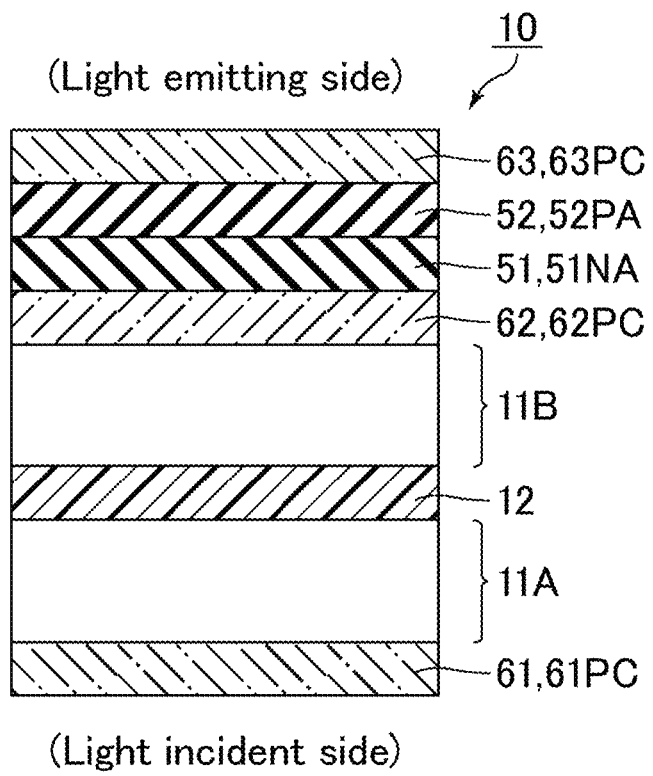

FIG. 145 is an example of a schematic cross-sectional view of an optical element having the twelfth structure of Modified Example 2 of Embodiment 1.

Figure 146:
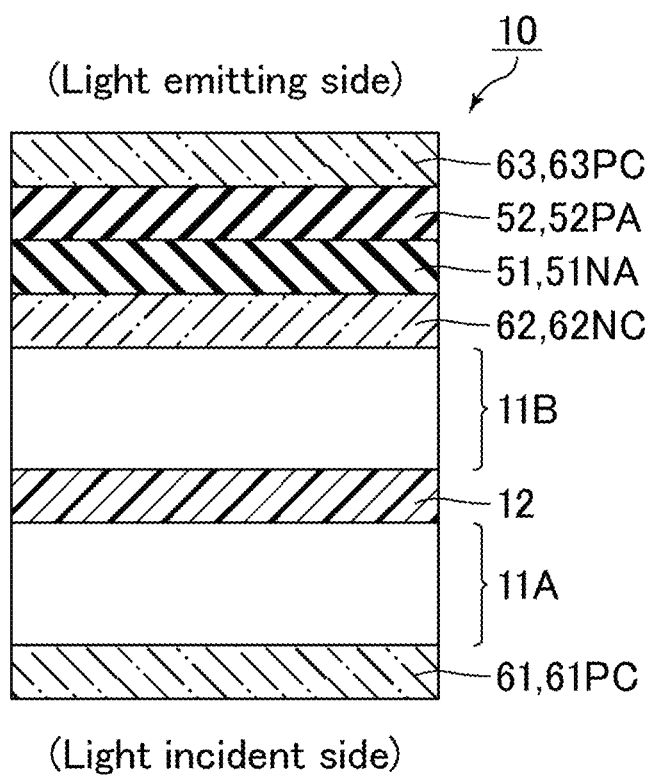

FIG. 146 is an example of a schematic cross-sectional view of an optical element having the twelfth structure of Modified Example 2 of Embodiment 1.

Figure 147:
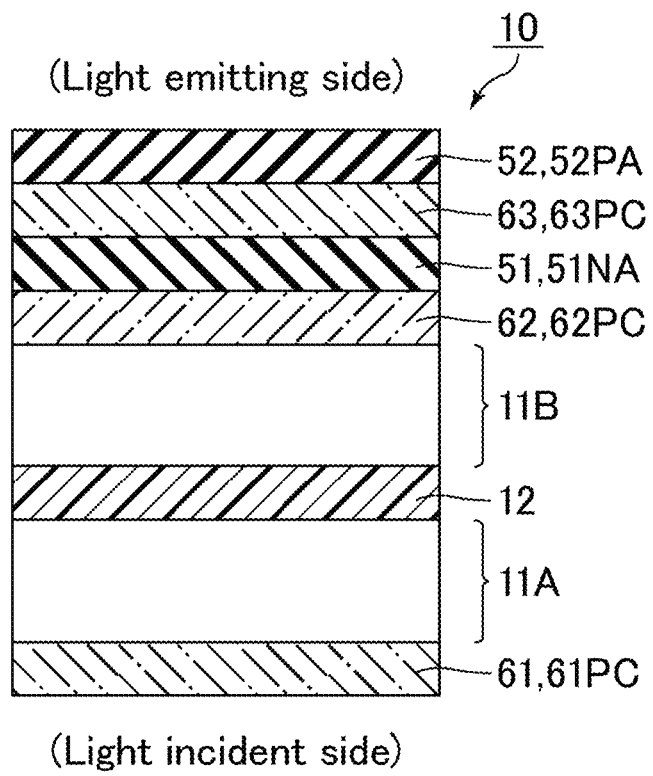

FIG. 147 is an example of a schematic cross-sectional view of an optical element having the twelfth structure of Modified Example 2 of Embodiment 1.

Figure 148:
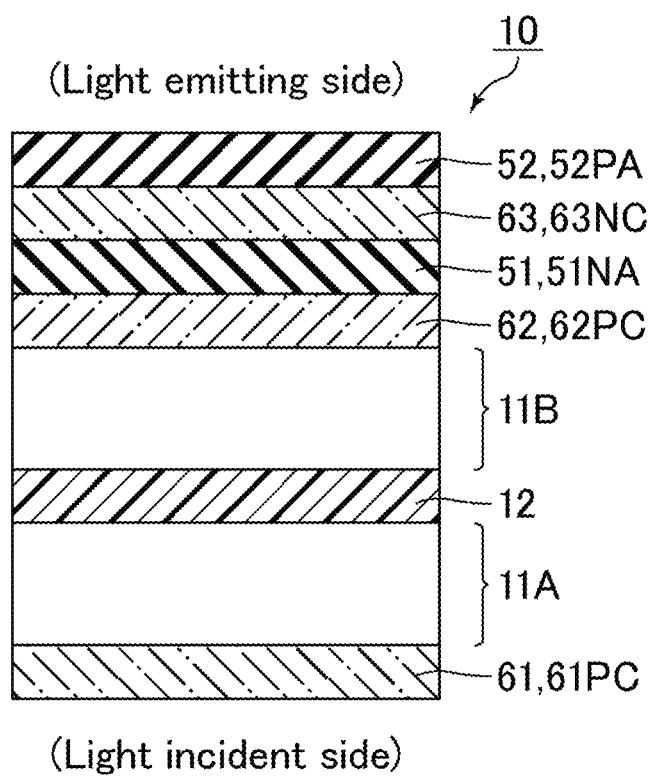

FIG. 148 is an example of a schematic cross-sectional view of an optical element having the twelfth structure of Modified Example 2 of Embodiment 1.

Figure 149:
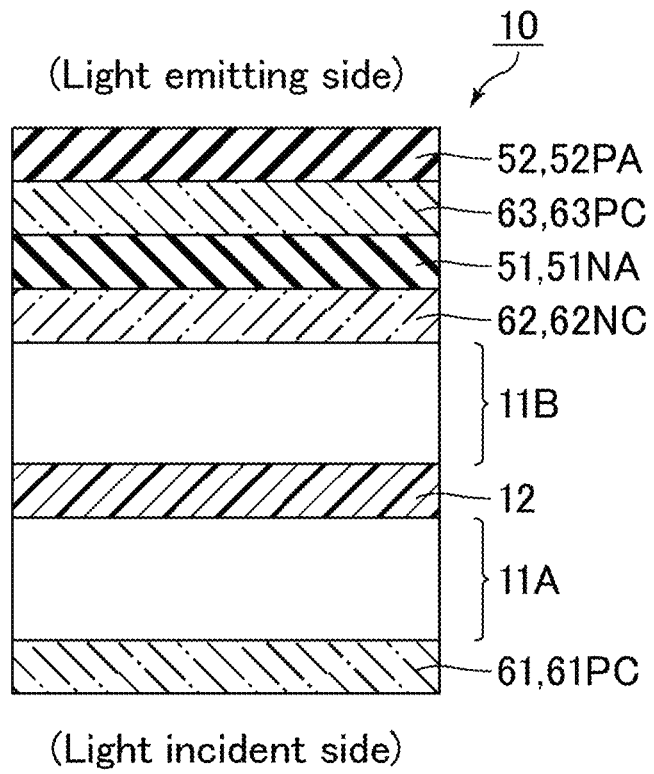

FIG. 149 is an example of a schematic cross-sectional view of an optical element having the twelfth structure of Modified Example 2 of Embodiment 1.

Figure 150:
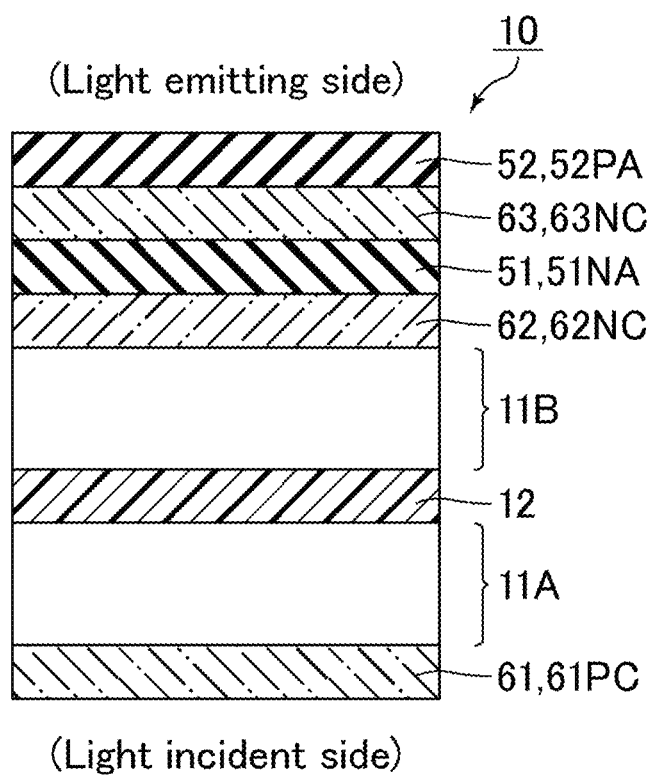

FIG. 150 is an example of a schematic cross-sectional view of an optical element having the twelfth structure of Modified Example 2 of Embodiment 1.

Figure 151:
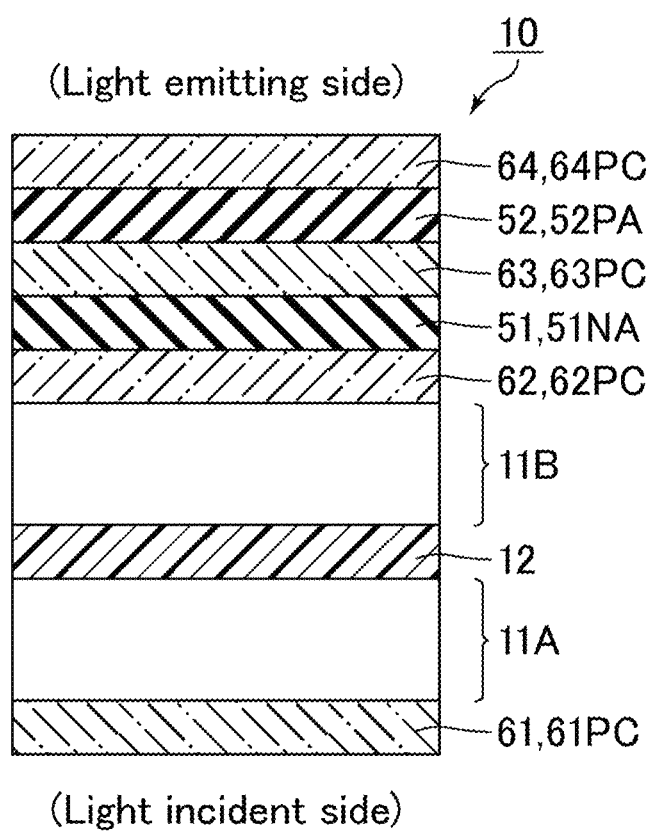

FIG. 151 is an example of a schematic cross-sectional view of an optical element having a thirteenth structure of Modified Example 2 of Embodiment 1.

Figure 152:
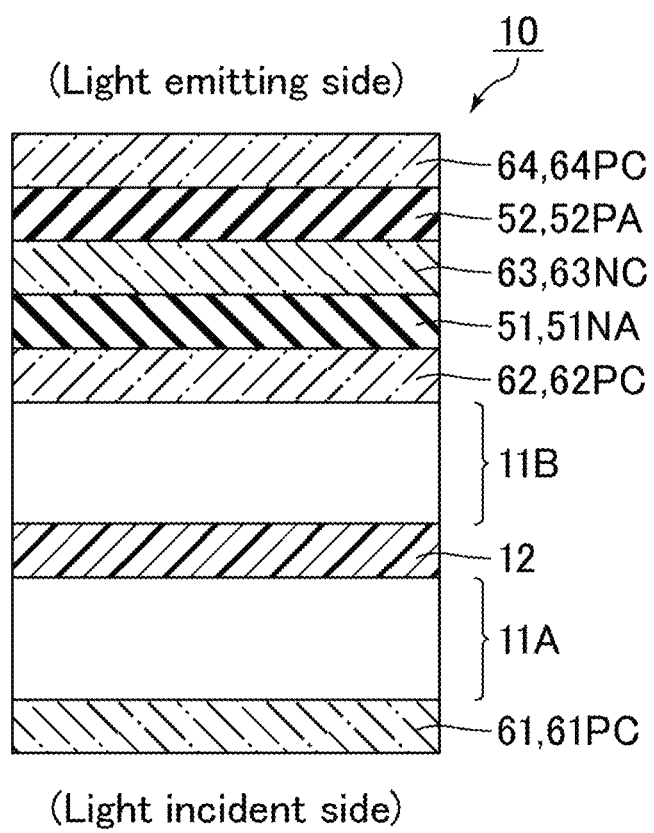

FIG. 152 is an example of a schematic cross-sectional view of an optical element having the thirteenth structure of Modified Example 2 of Embodiment 1.

Figure 153:
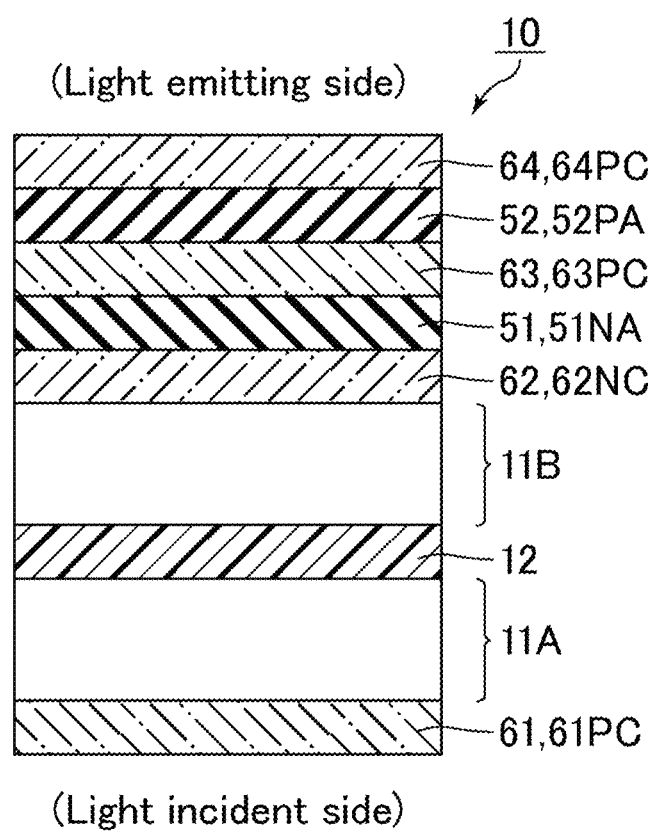

FIG. 153 is an example of a schematic cross-sectional view of an optical element having the thirteenth structure of Modified Example 2 of Embodiment 1.

Figure 154:
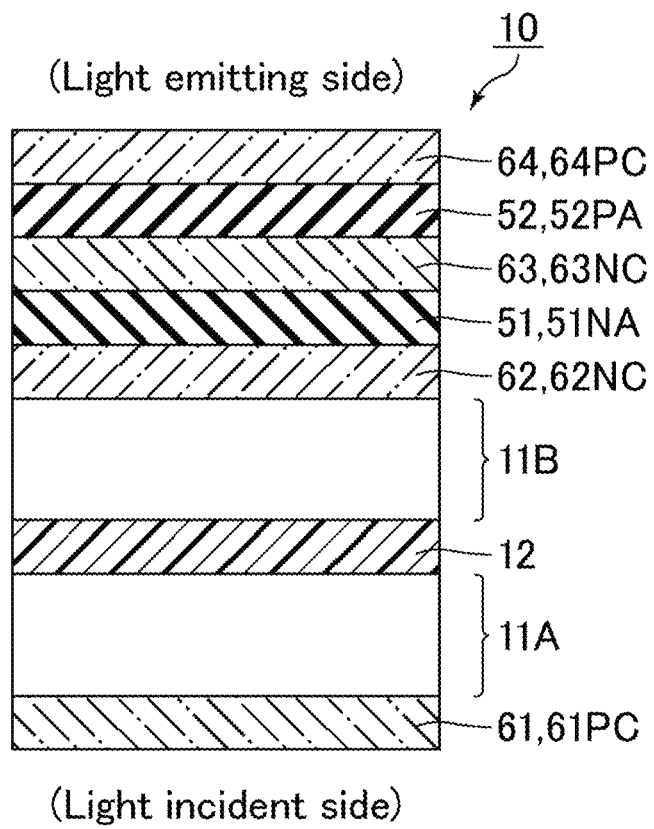

FIG. 154 is an example of a schematic cross-sectional view of an optical element having the thirteenth structure of Modified Example 2 of Embodiment 1.

Figure 155:
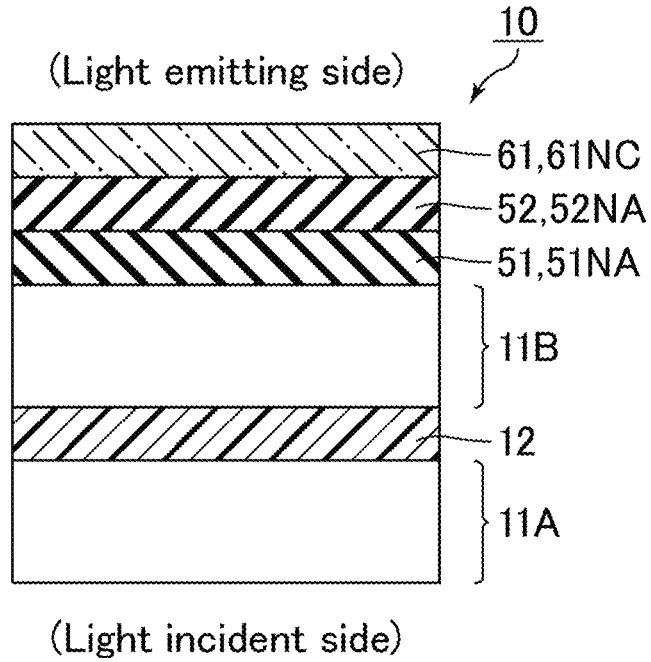

FIG. 155 is an example of a schematic cross-sectional view of an optical element having a fourteenth structure of Modified Example 2 of Embodiment 1.

Figure 156:
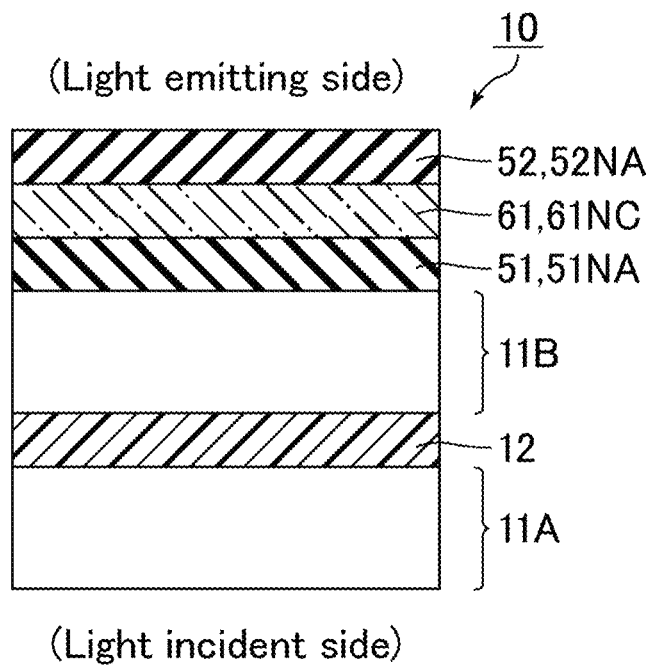

FIG. 156 is an example of a schematic cross-sectional view of an optical element having the fourteenth structure of Modified Example 2 of Embodiment 1.

Figure 157:
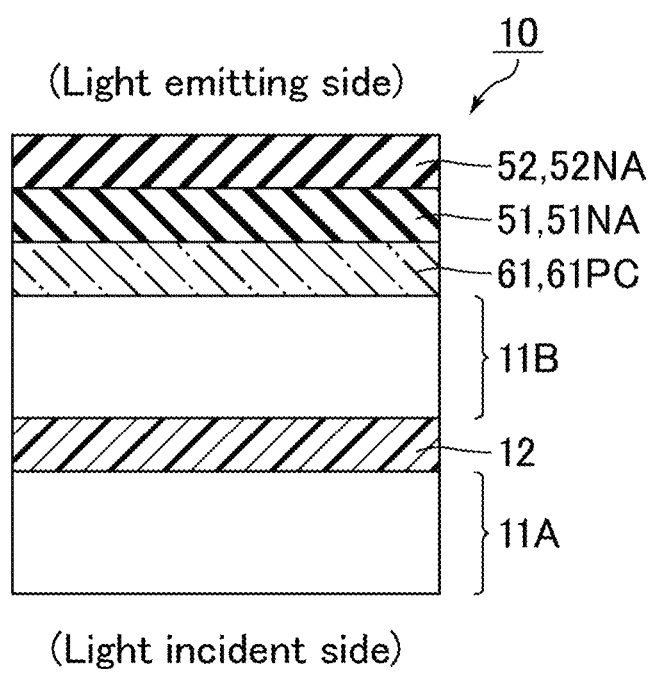

FIG. 157 is an example of a schematic cross-sectional view of an optical element having the fourteenth structure of Modified Example 2 of Embodiment 1.

Figure 158:
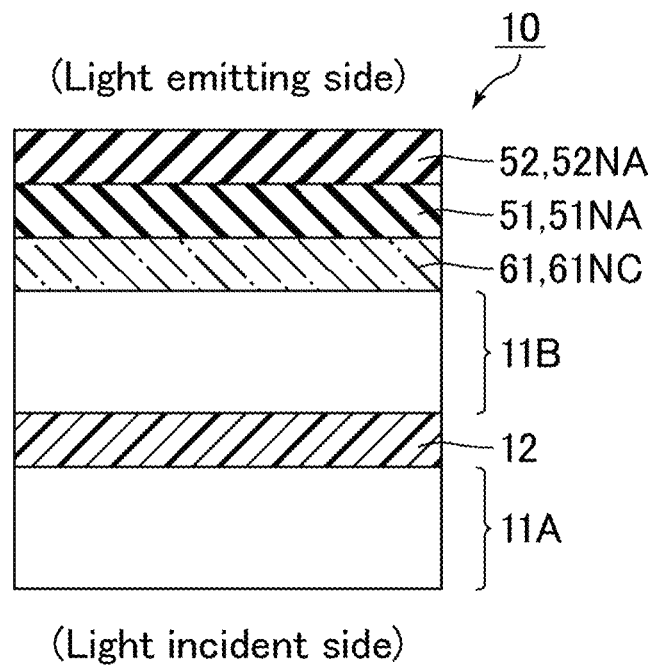

FIG. 158 is an example of a schematic cross-sectional view of an optical element having the fourteenth structure of Modified Example 2 of Embodiment 1.

Figure 159:
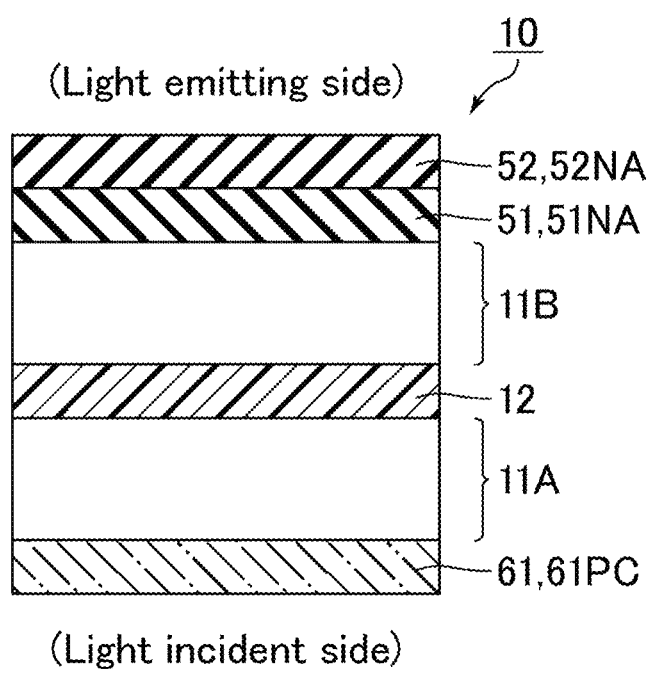

FIG. 159 is an example of a schematic cross-sectional view of an optical element having the fourteenth structure of Modified Example 2 of Embodiment 1.

Figure 160:
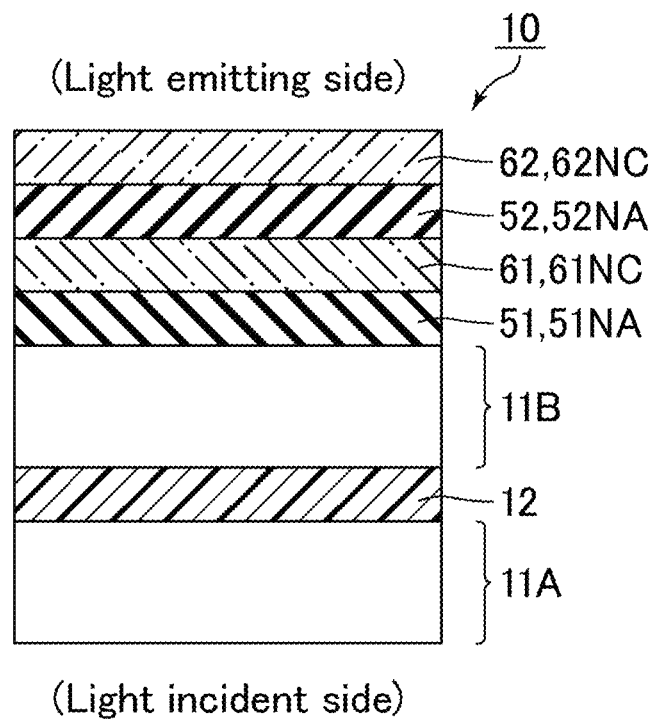

FIG. 160 is an example of a schematic cross-sectional view of an optical element having a fifteenth structure of Modified Example 2 of Embodiment 1.

Figure 161:
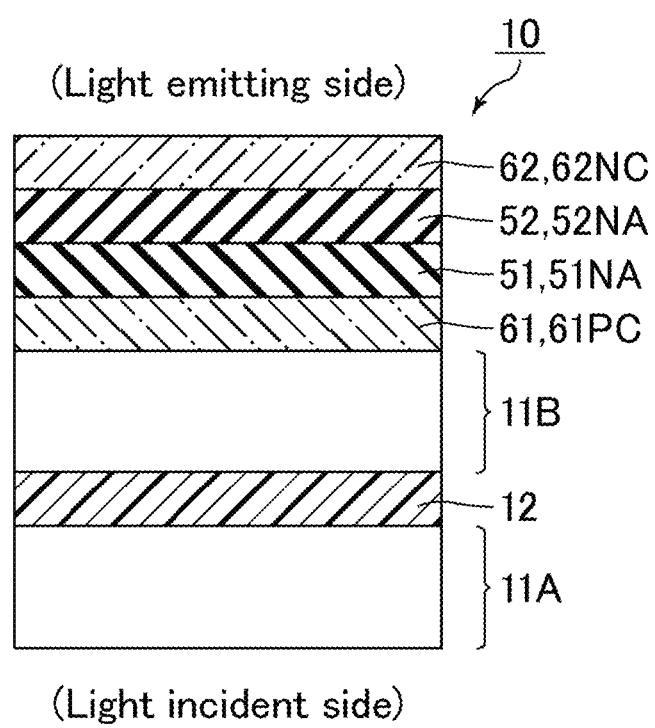

FIG. 161 is an example of a schematic cross-sectional view of an optical element having the fifteenth structure of Modified Example 2 of Embodiment 1.

Figure 162:
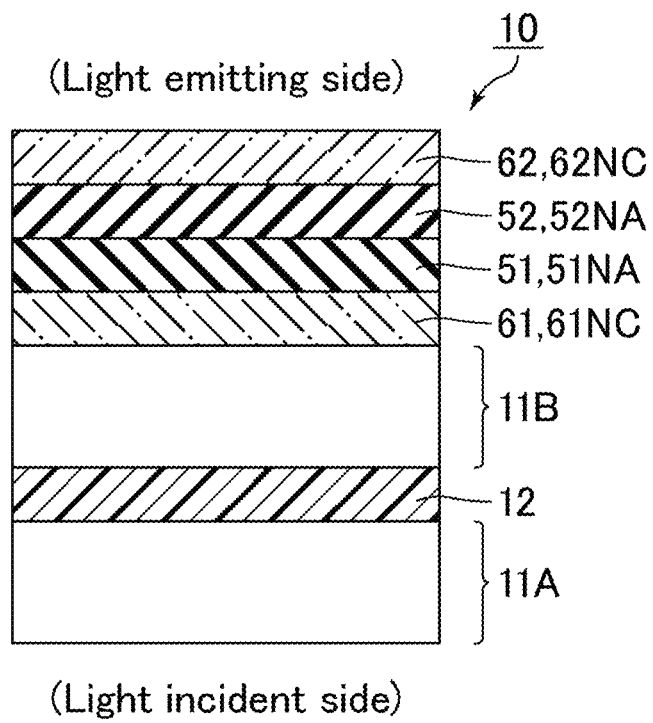

FIG. 162 is an example of a schematic cross-sectional view of an optical element having the fifteenth structure of Modified Example 2 of Embodiment 1.

Figure 163:
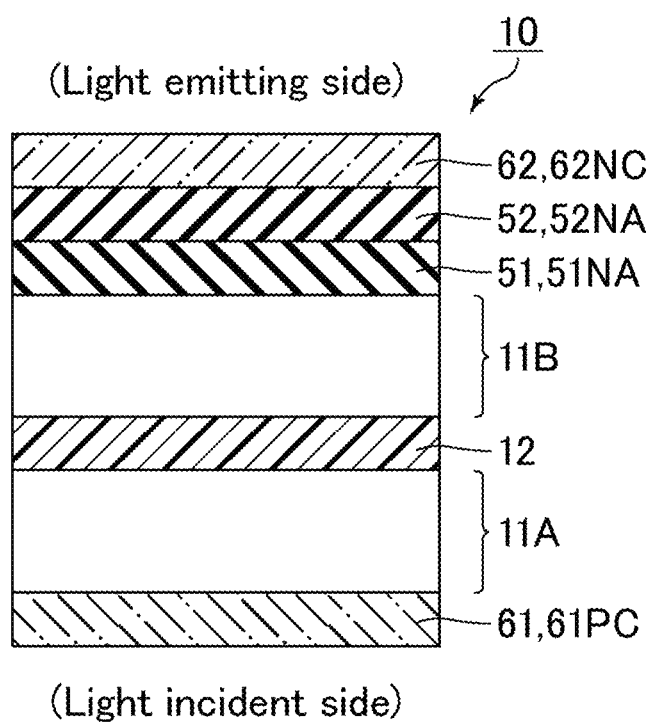

FIG. 163 is an example of a schematic cross-sectional view of an optical element having the fifteenth structure of Modified Example 2 of Embodiment 1.

Figure 164:
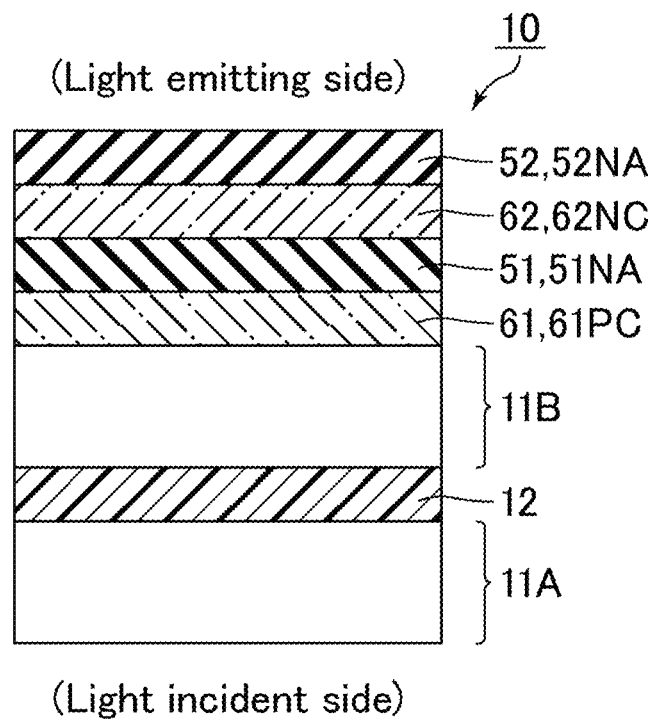

FIG. 164 is an example of a schematic cross-sectional view of an optical element having the fifteenth structure of Modified Example 2 of Embodiment 1.

Figure 165:
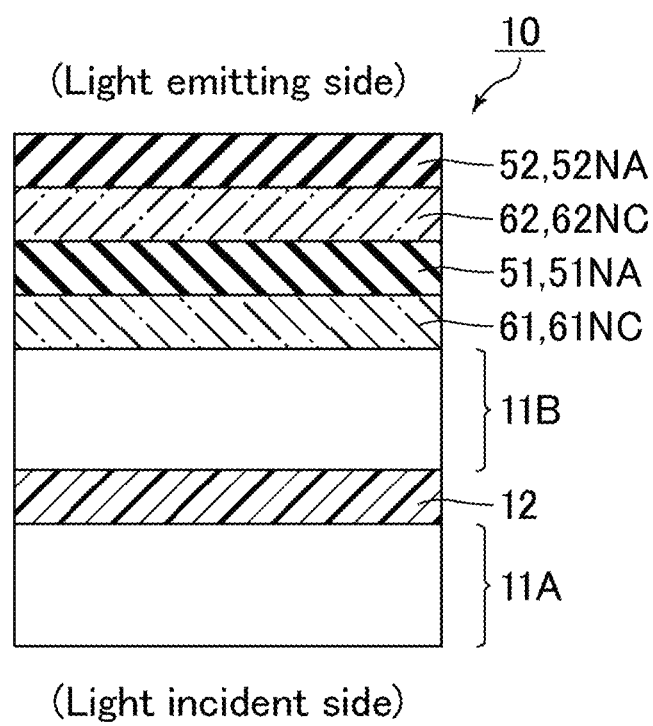

FIG. 165 is an example of a schematic cross-sectional view of an optical element having the fifteenth structure of Modified Example 2 of Embodiment 1.

Figure 166:
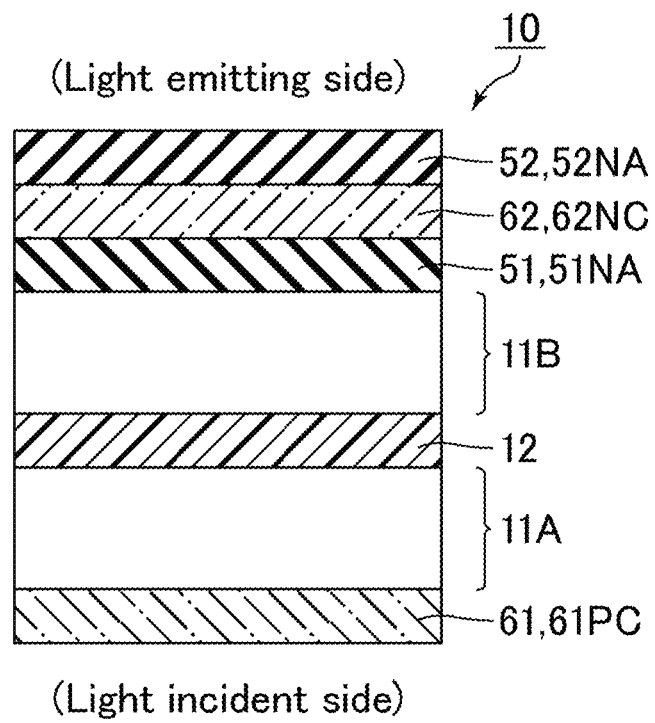

FIG. 166 is an example of a schematic cross-sectional view of an optical element having the fifteenth structure of Modified Example 2 of Embodiment 1.

Figure 167:
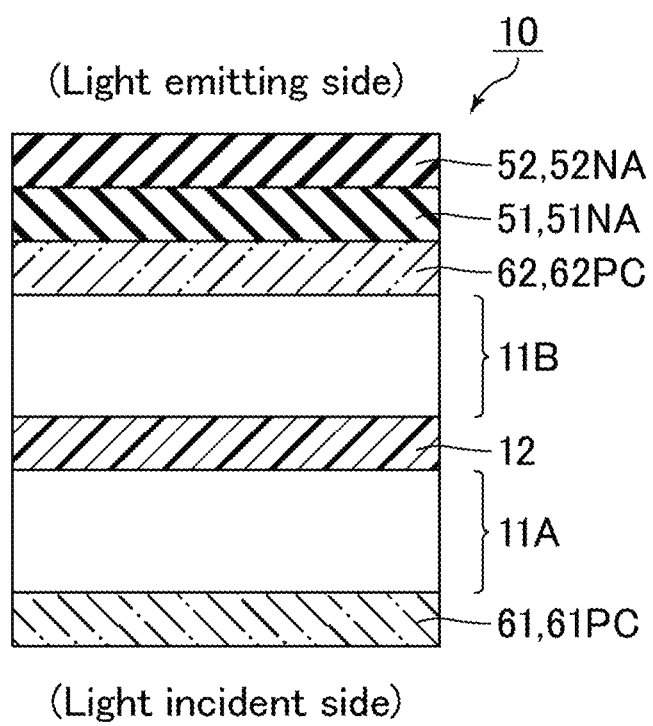

FIG. 167 is an example of a schematic cross-sectional view of an optical element having the fifteenth structure of Modified Example 2 of Embodiment 1.

Figure 168:
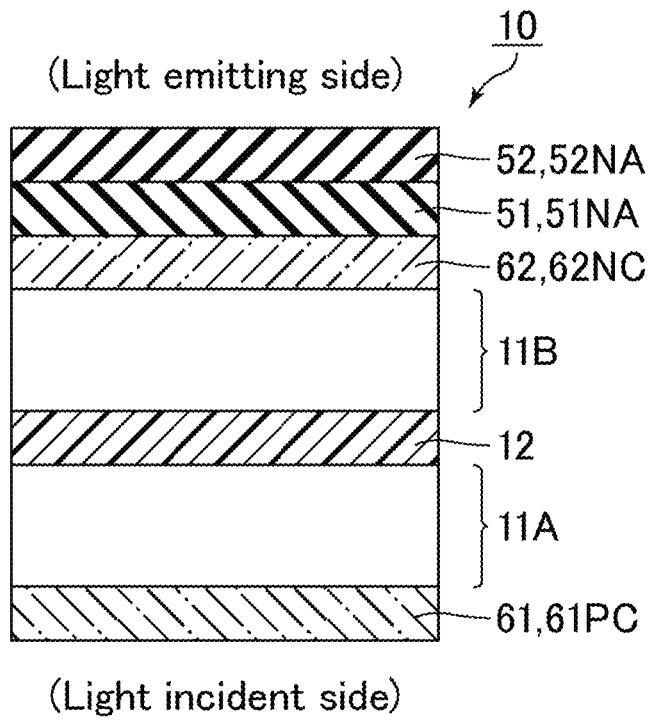

FIG. 168 is an example of a schematic cross-sectional view of an optical element having the fifteenth structure of Modified Example 2 of Embodiment 1.

Figure 169:
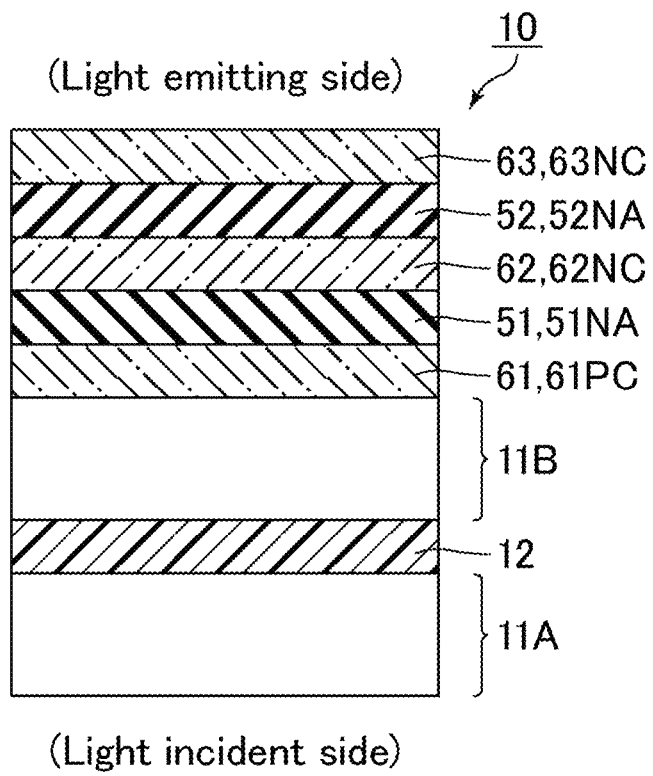

FIG. 169 is an example of a schematic cross-sectional view of an optical element having a sixteenth structure of Modified Example 2 of Embodiment 1.

Figure 170:
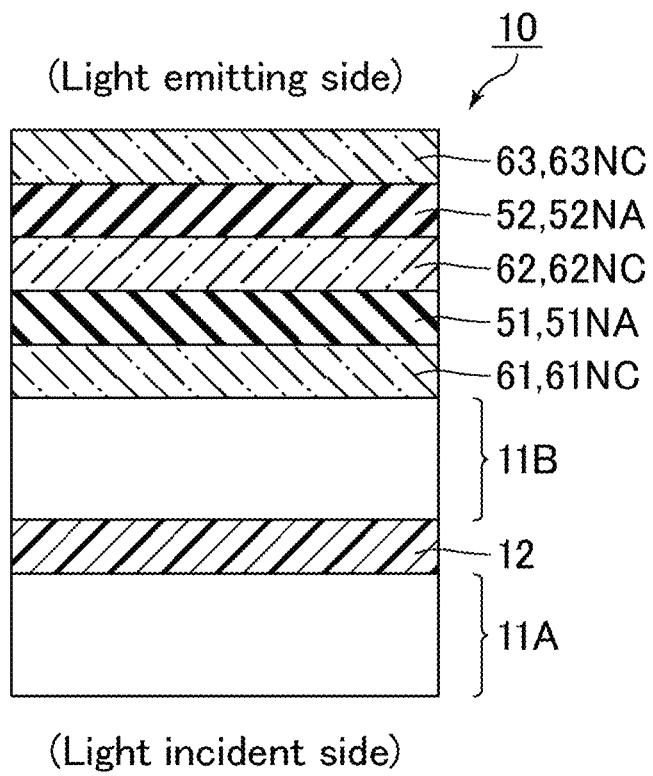

FIG. 170 is an example of a schematic cross-sectional view of an optical element having the sixteenth structure of Modified Example 2 of Embodiment 1.

Figure 171:
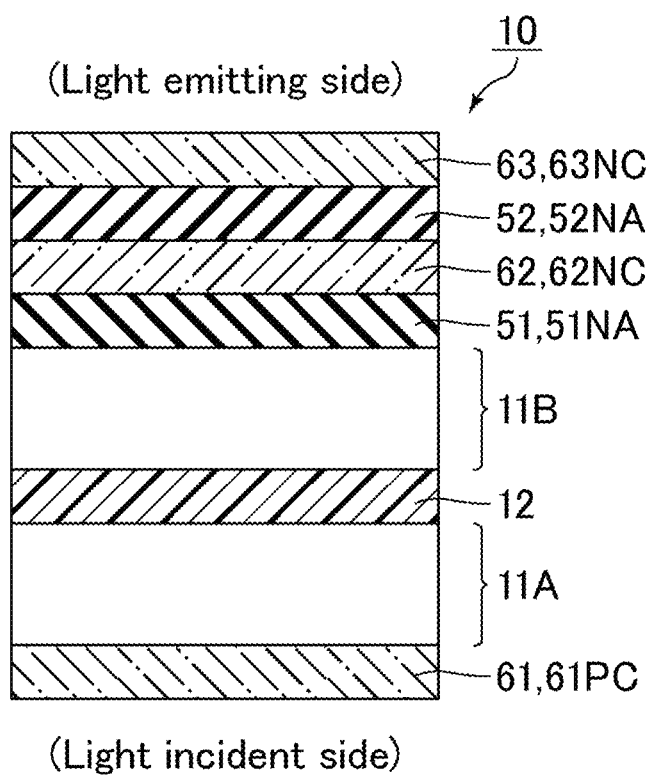

FIG. 171 is an example of a schematic cross-sectional view of an optical element having the sixteenth structure of Modified Example 2 of Embodiment 1.

Figure 172:
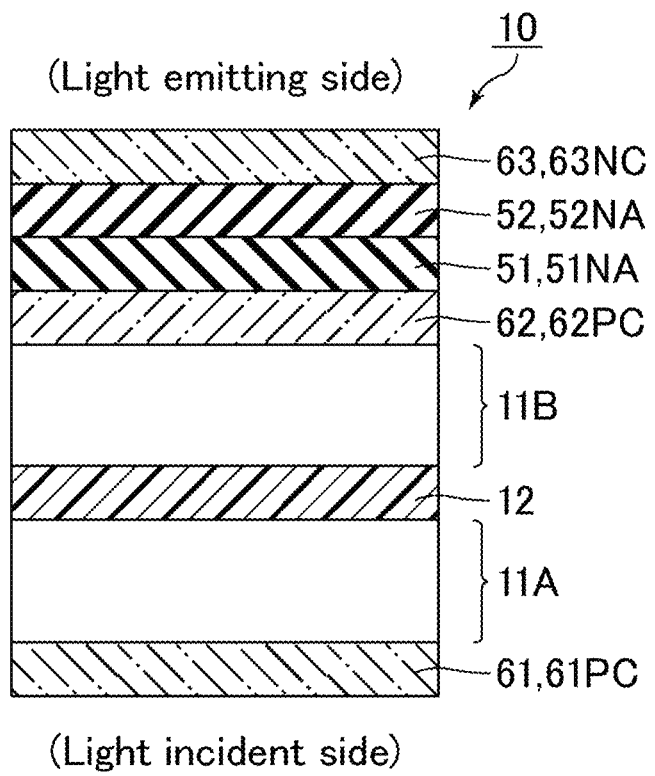

FIG. 172 is an example of a schematic cross-sectional view of an optical element having the sixteenth structure of Modified Example 2 of Embodiment 1.

Figure 173:
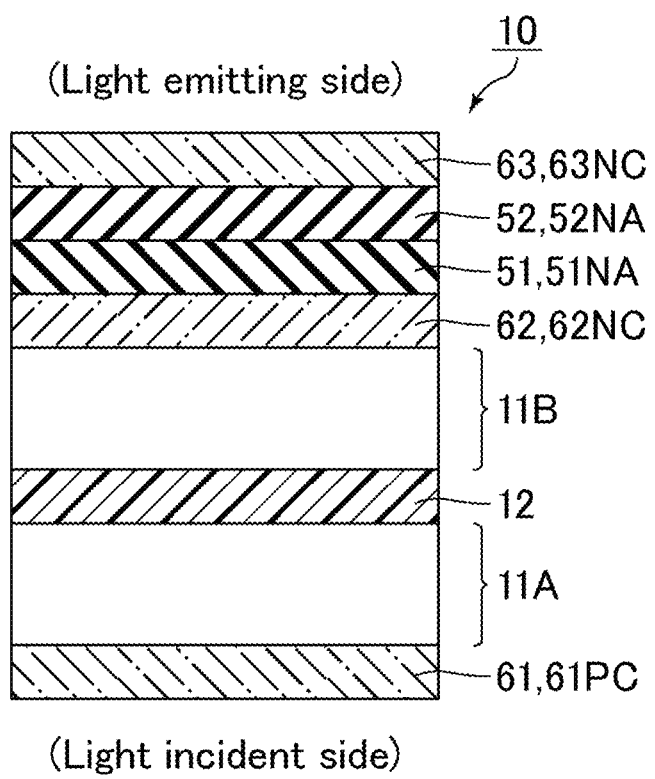

FIG. 173 is an example of a schematic cross-sectional view of an optical element having the sixteenth structure of Modified Example 2 of Embodiment 1.

Figure 174:
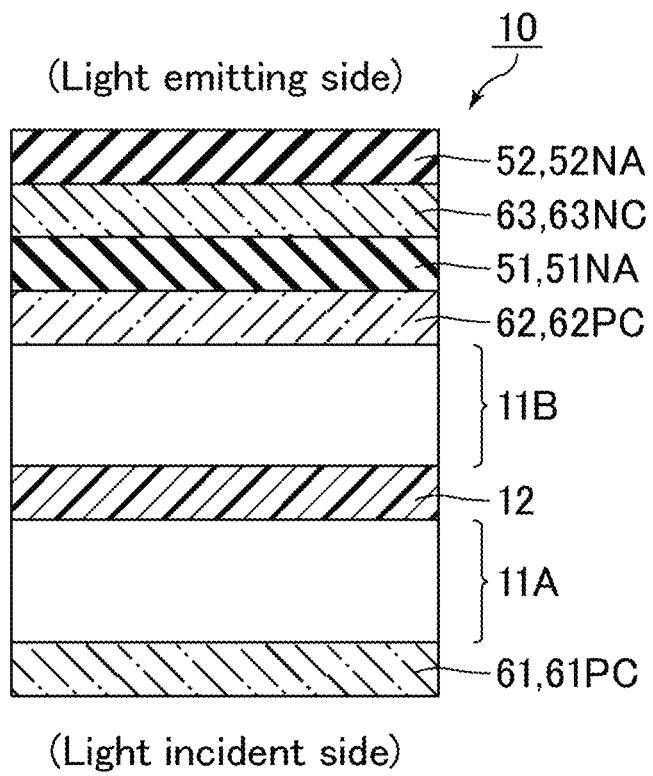

FIG. 174 is an example of a schematic cross-sectional view of an optical element having the sixteenth structure of Modified Example 2 of Embodiment 1.

Figure 175:
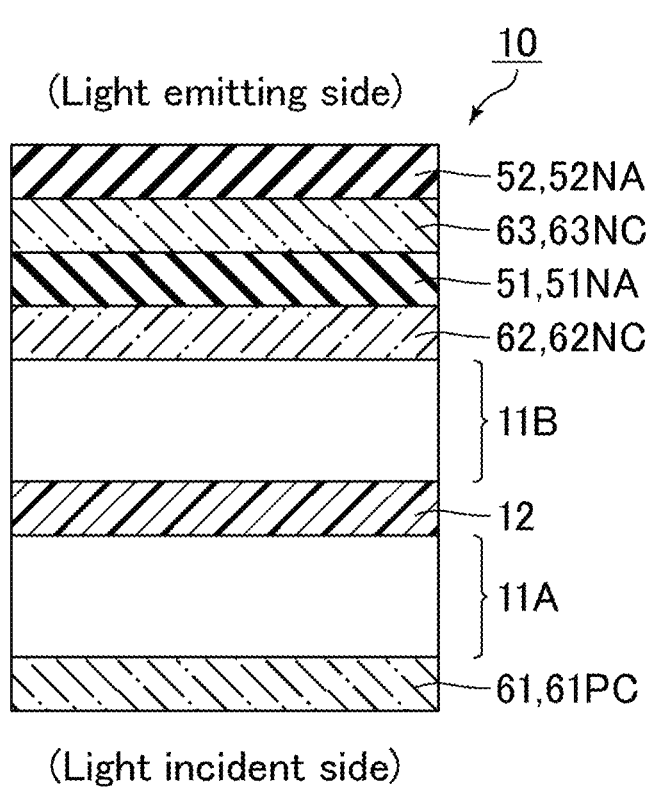

FIG. 175 is an example of a schematic cross-sectional view of an optical element having the sixteenth structure of Modified Example 2 of Embodiment 1.

Figure 176:
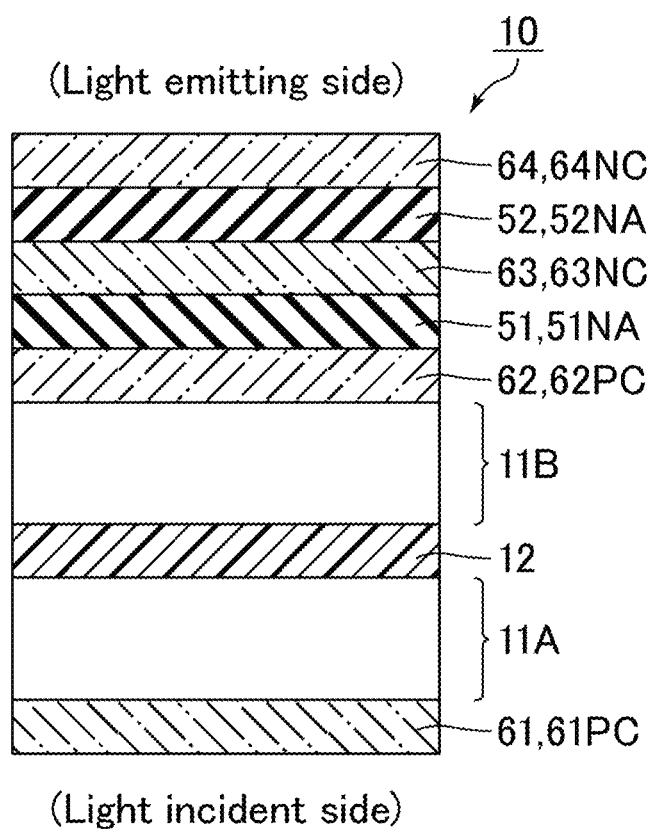

FIG. 176 is an example of a schematic cross-sectional view of an optical element having a seventeenth structure of Modified Example 2 of Embodiment 1.

Figure 177:
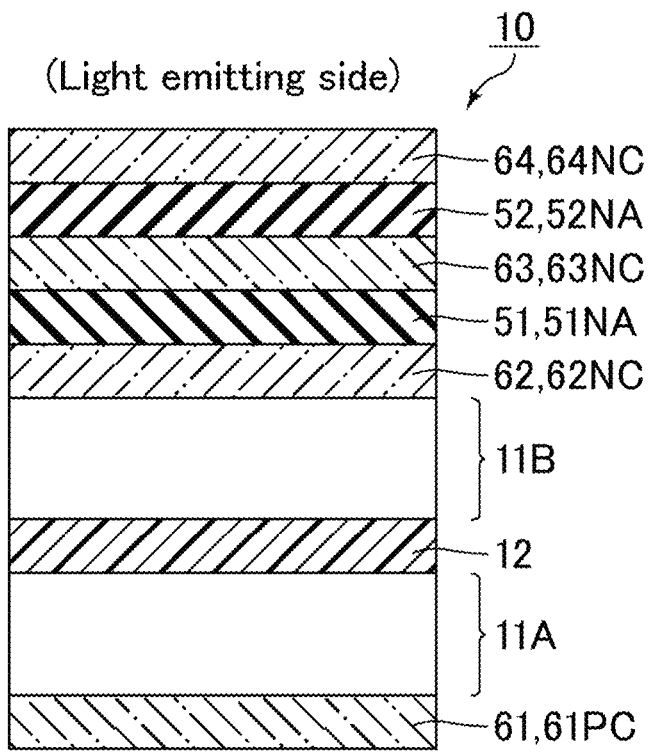

FIG. 177 is an example of a schematic cross-sectional view of an optical element having the seventeenth structure of Modified Example 2 of Embodiment 1.

Figure 178:
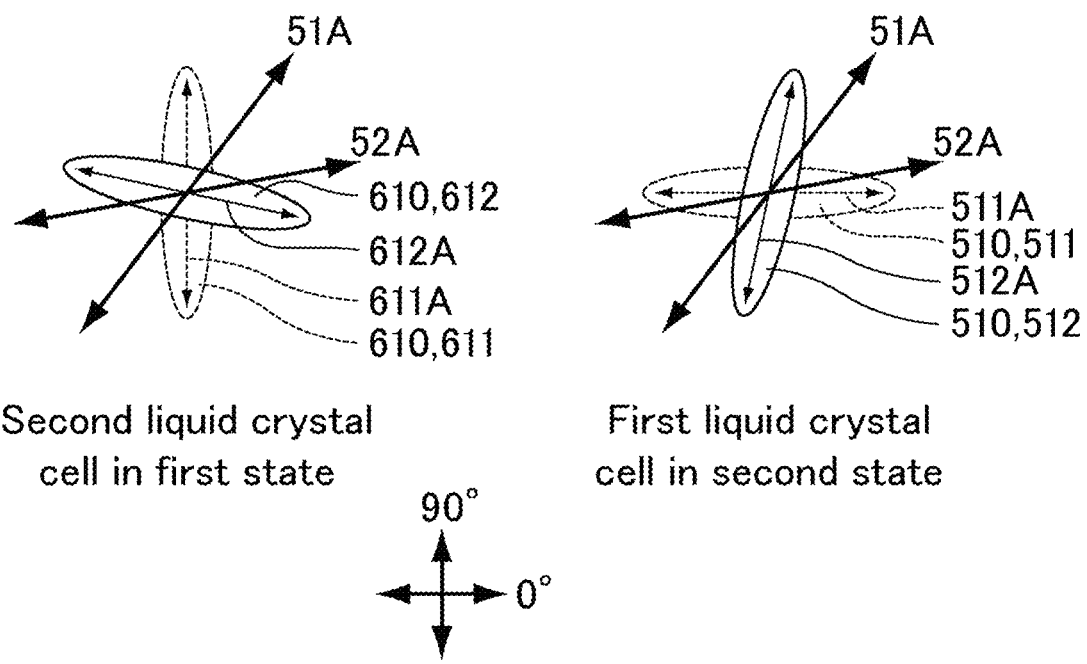

FIG. 178 includes schematic views showing the alignments of liquid crystal molecules in the first state and the second state in the optical element of Example 7.

Figure 179:
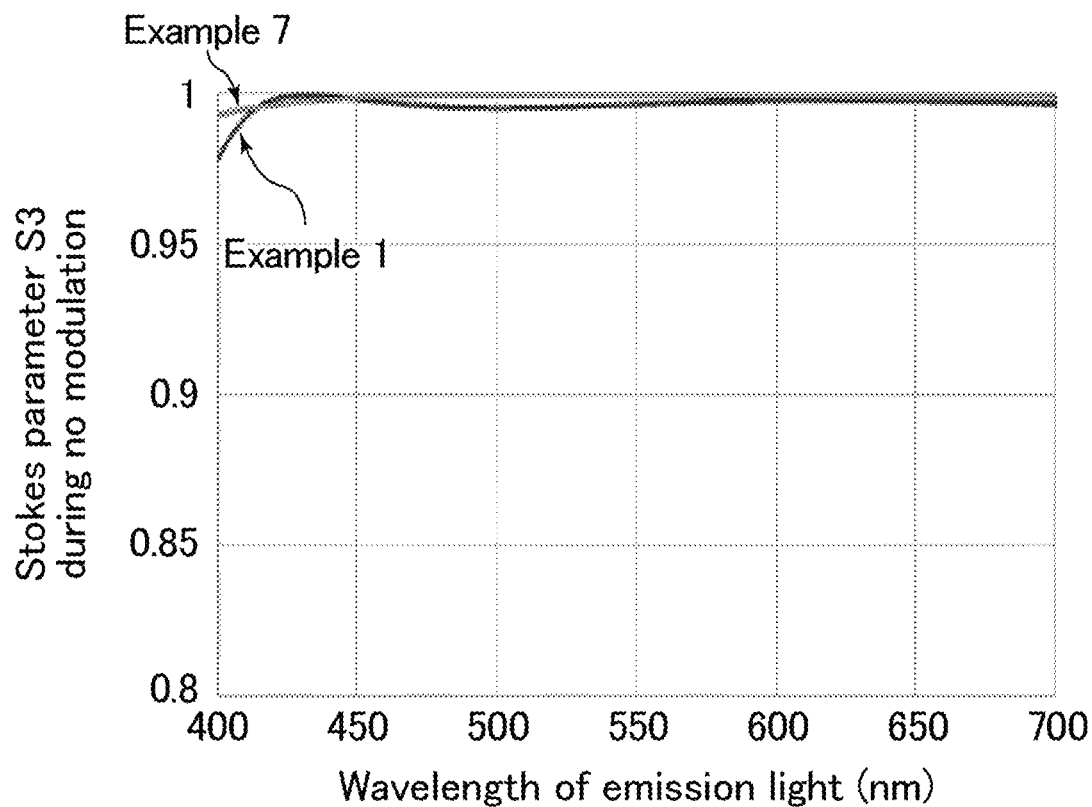

FIG. 179 is a graph showing the relationship between Stokes parameter S3 during no modulation and the wavelength of emission light in the optical elements of Example 1 and Example 7.

Figure 180:
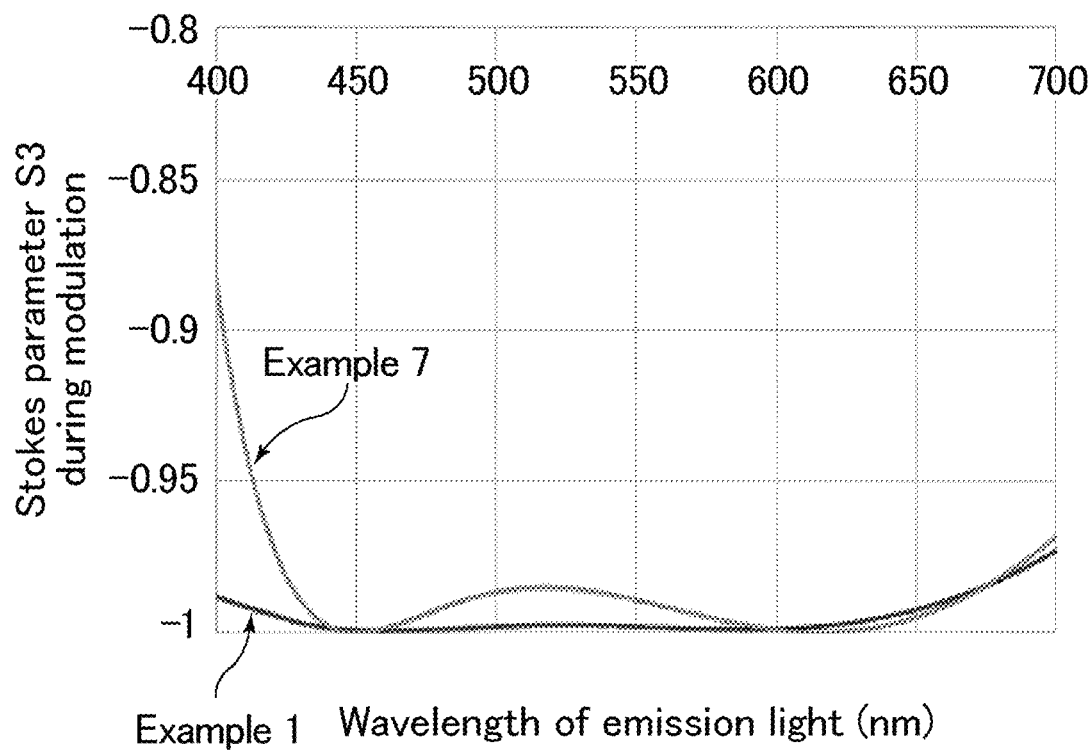

FIG. 180 is a graph showing the relationship between Stokes parameter S3 during modulation and the wavelength of emission light in the optical elements of Example 1 and Example 7.

Figure 181:
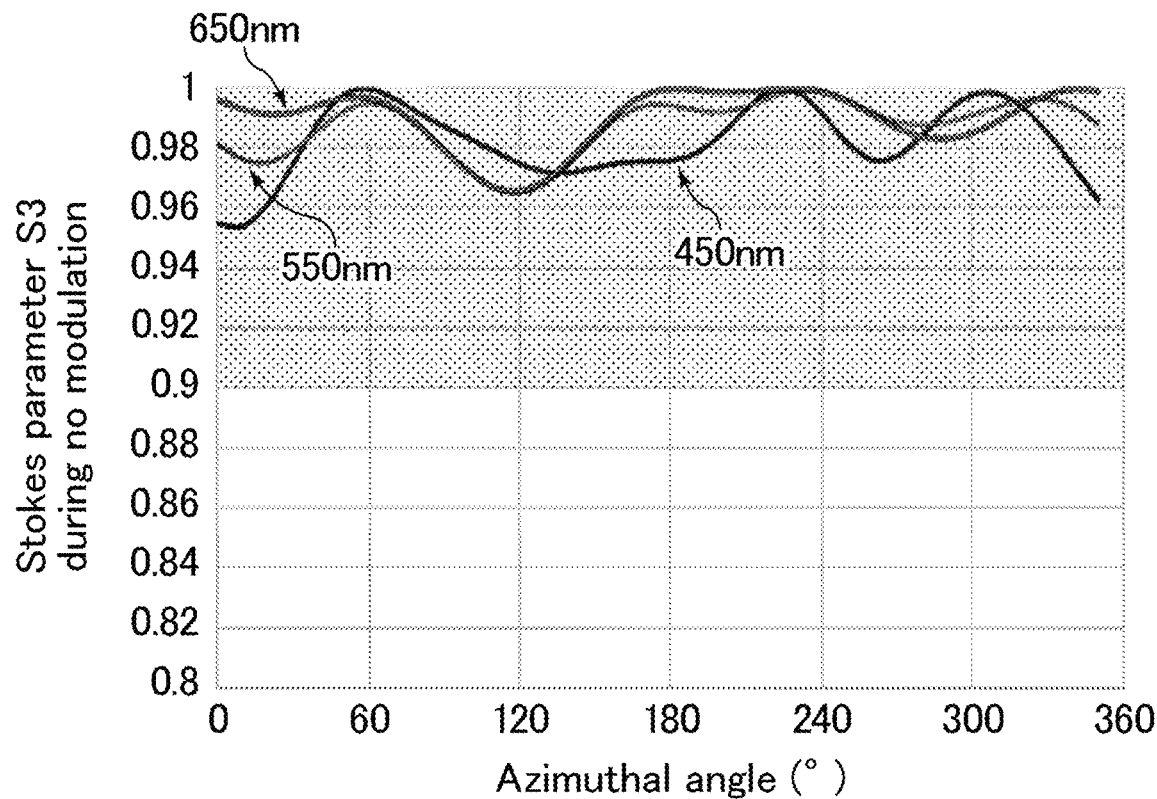

FIG. 181 is a graph showing the relationship between Stokes parameter S3 during no modulation and the azimuthal angle in the optical element of Example 1 when the angle of incidence is set to 30°.

Figure 182:
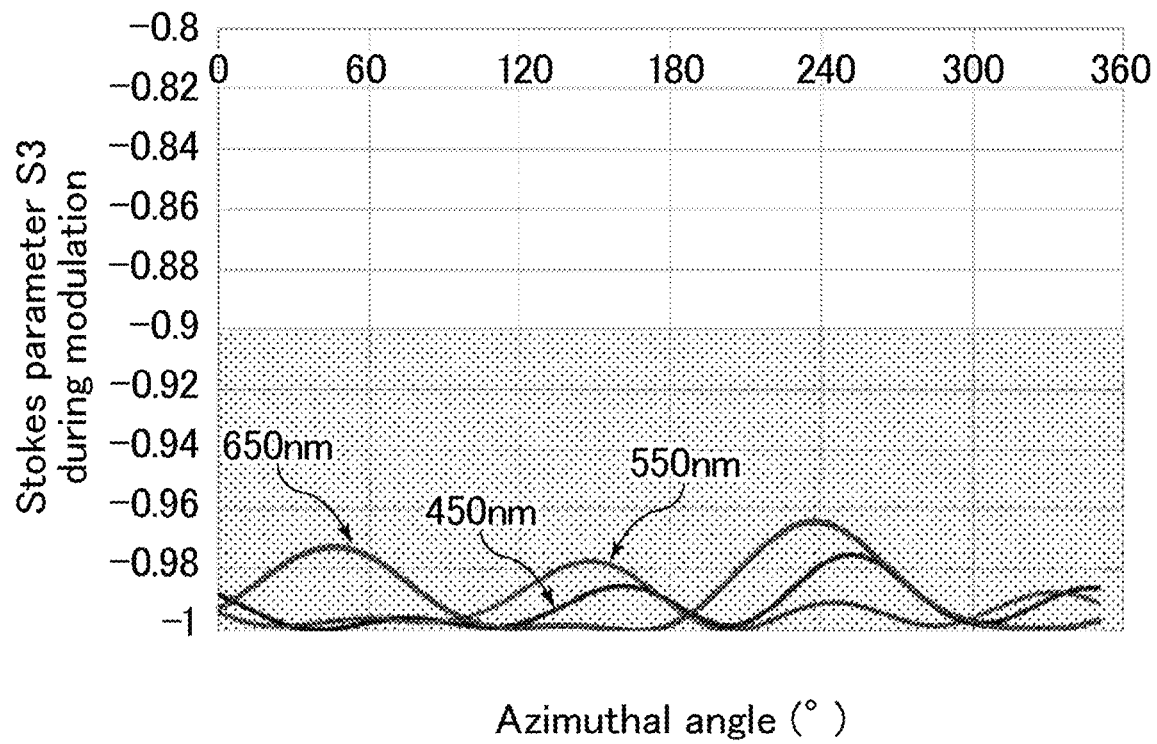

FIG. 182 is a graph showing the relationship between Stokes parameter S3 during modulation and the azimuthal angle in the optical element of Example 1 when the angle of incidence is set to 30°.

Figure 183:
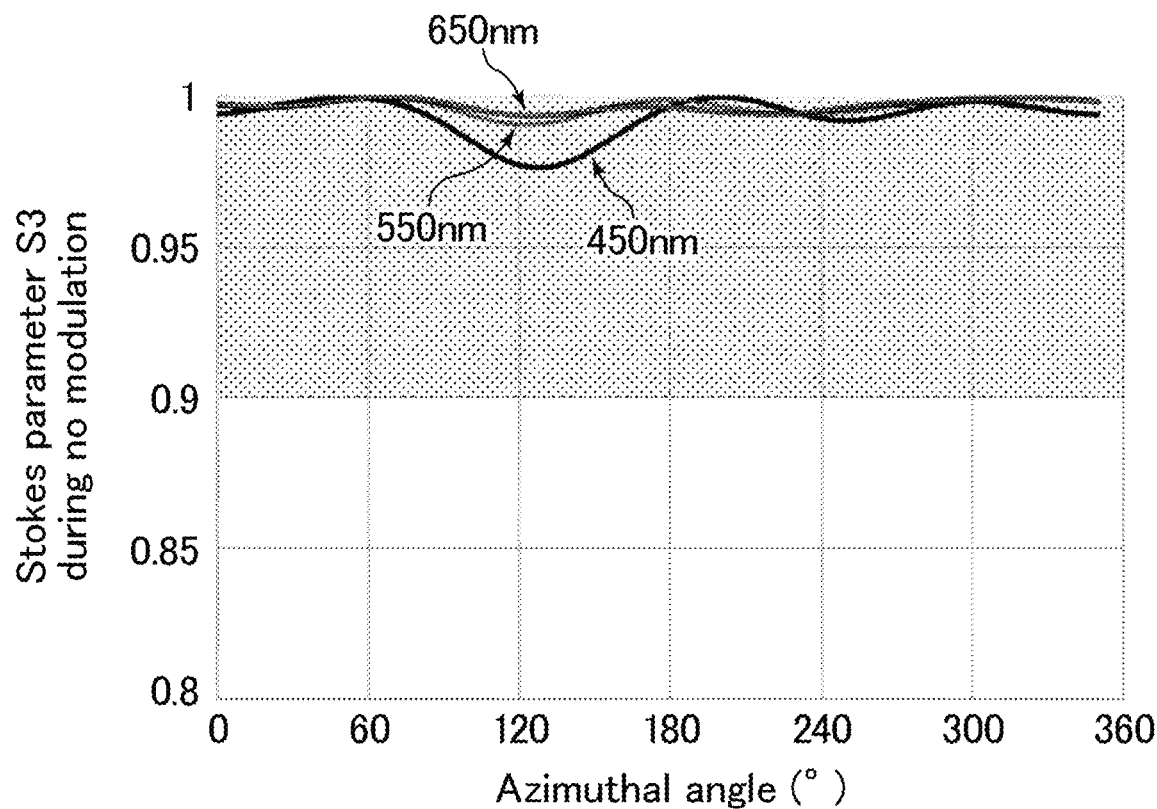

FIG. 183 is a graph showing the relationship between Stokes parameter S3 during no modulation and the azimuthal angle in the optical element of Example 7 when the angle of incidence is set to 30°.

Figure 184:
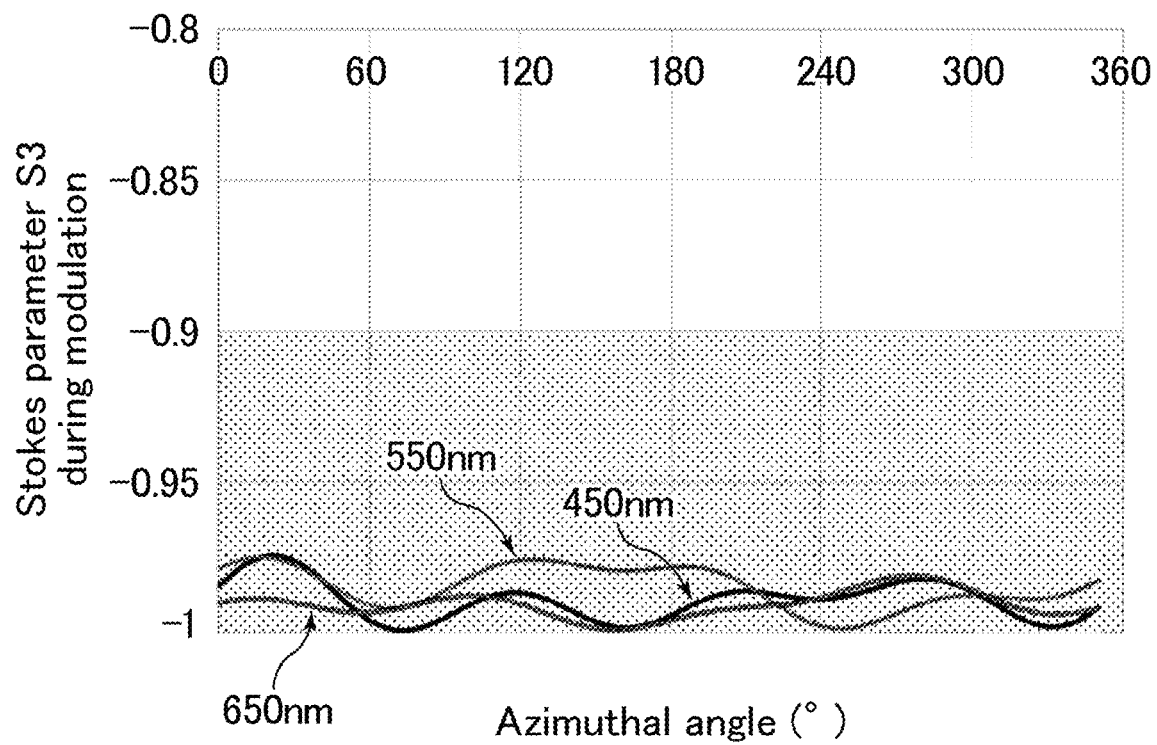

FIG. 184 is a graph showing the relationship between Stokes parameter S3 during modulation and the azimuthal angle in the optical element of Example 7 when the angle of incidence is set to 30°.

Figure 185:
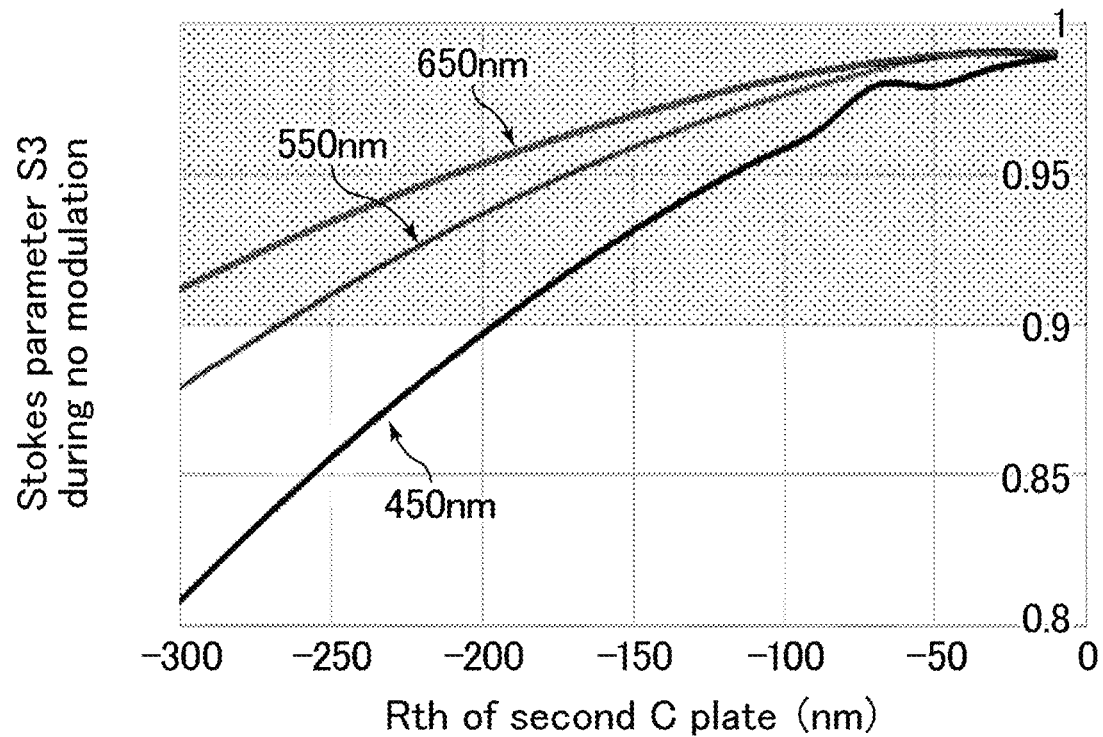

FIG. 185 is a graph of Stokes parameter S3 during no modulation versus thickness direction retardation Rth introduced by a second C plate in the optical element of Example 7.

Figure 186:
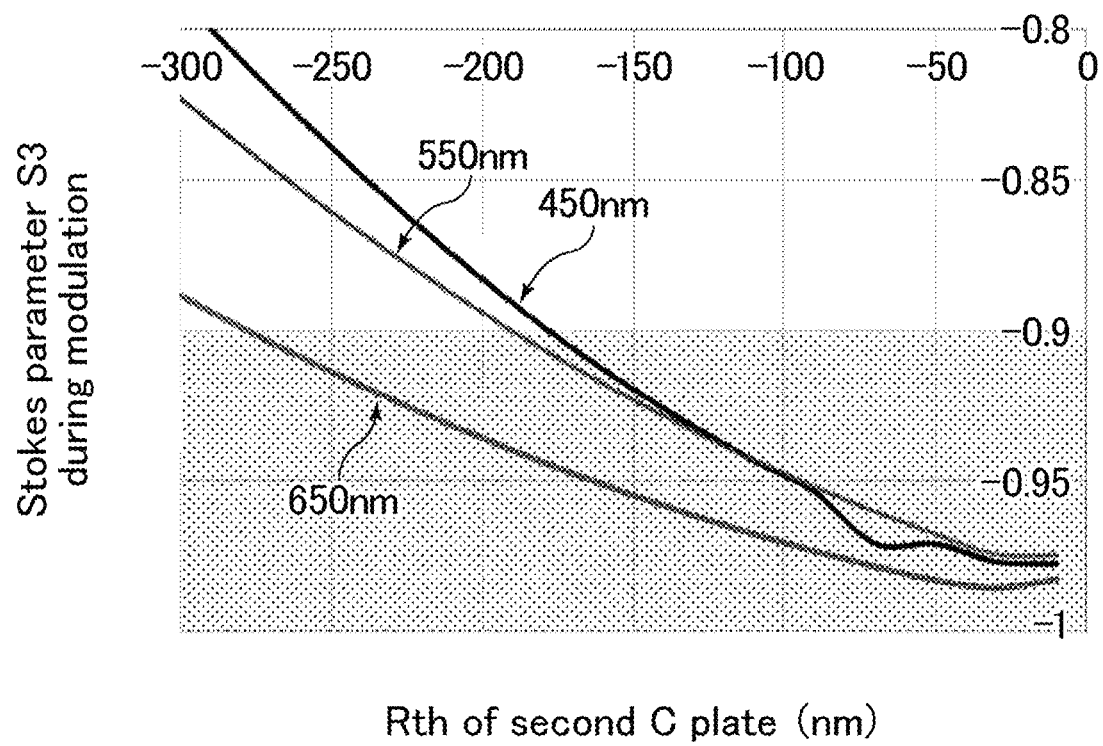

FIG. 186 is a graph of Stokes parameter S3 during modulation versus thickness direction retardation Rth introduced by the second C plate in the optical element of Example 7.

Figure 187:
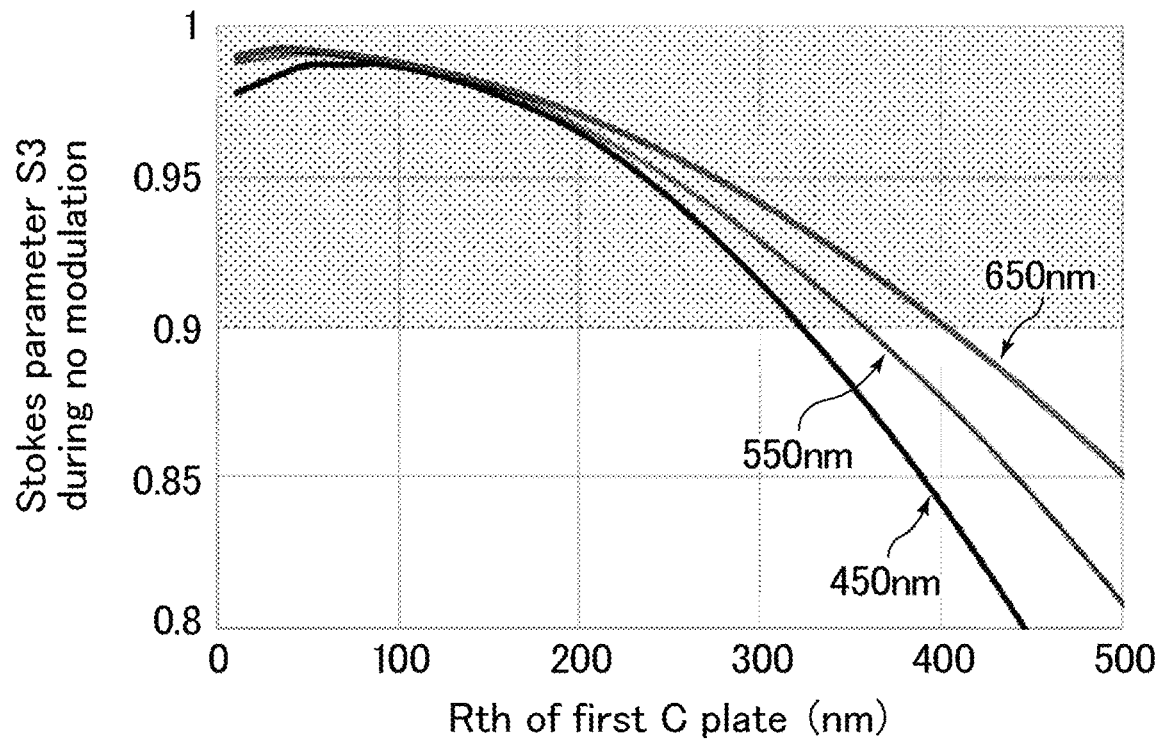

FIG. 187 is a graph of Stokes parameter S3 during no modulation versus thickness direction retardation Rth introduced by a first C plate in the optical element of Example 7.

Figure 188:
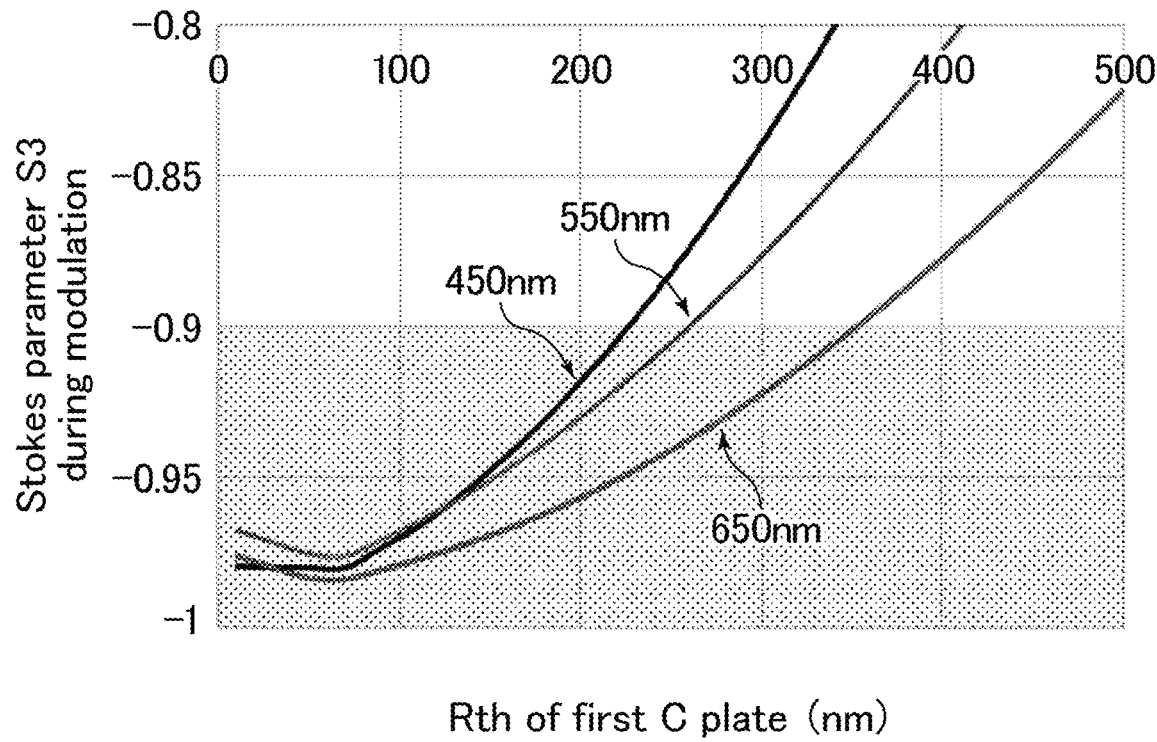

FIG. 188 is a graph of Stokes parameter S3 during modulation versus thickness direction retardation Rth introduced by the first C plate in the optical element of Example 7.

Figure 189:
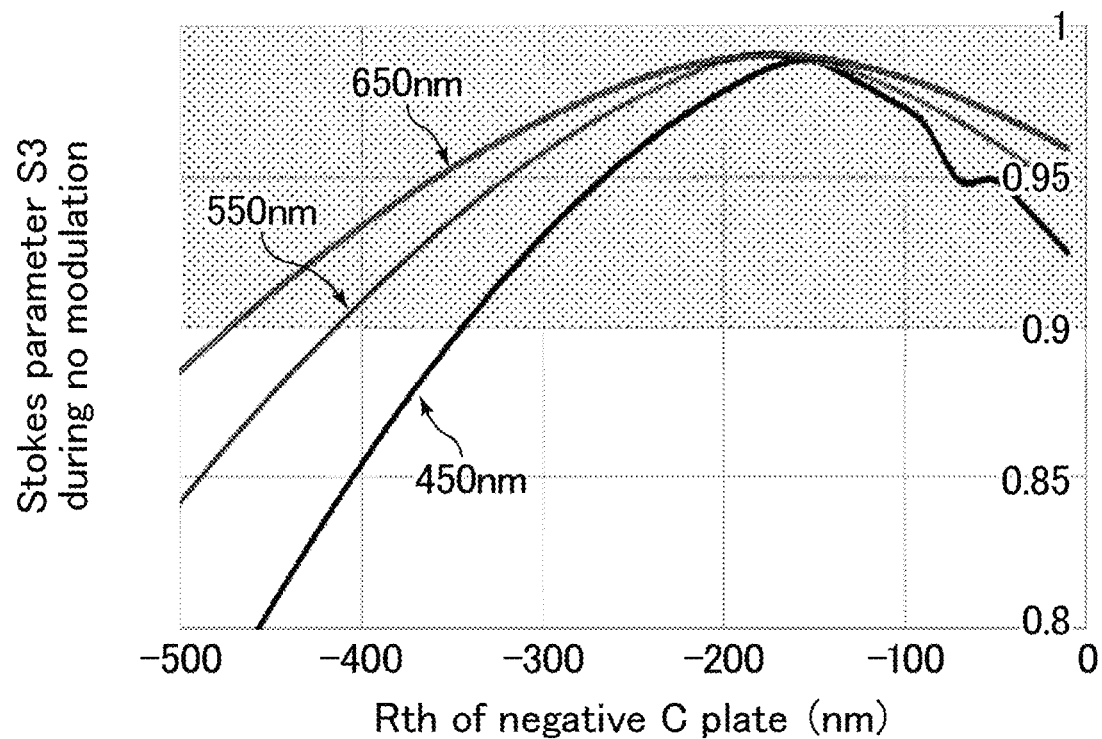

FIG. 189 is a graph of Stokes parameter S3 during no modulation versus thickness direction retardation Rth introduced by a negative C plate in the optical element of Example 7.

Figure 190:
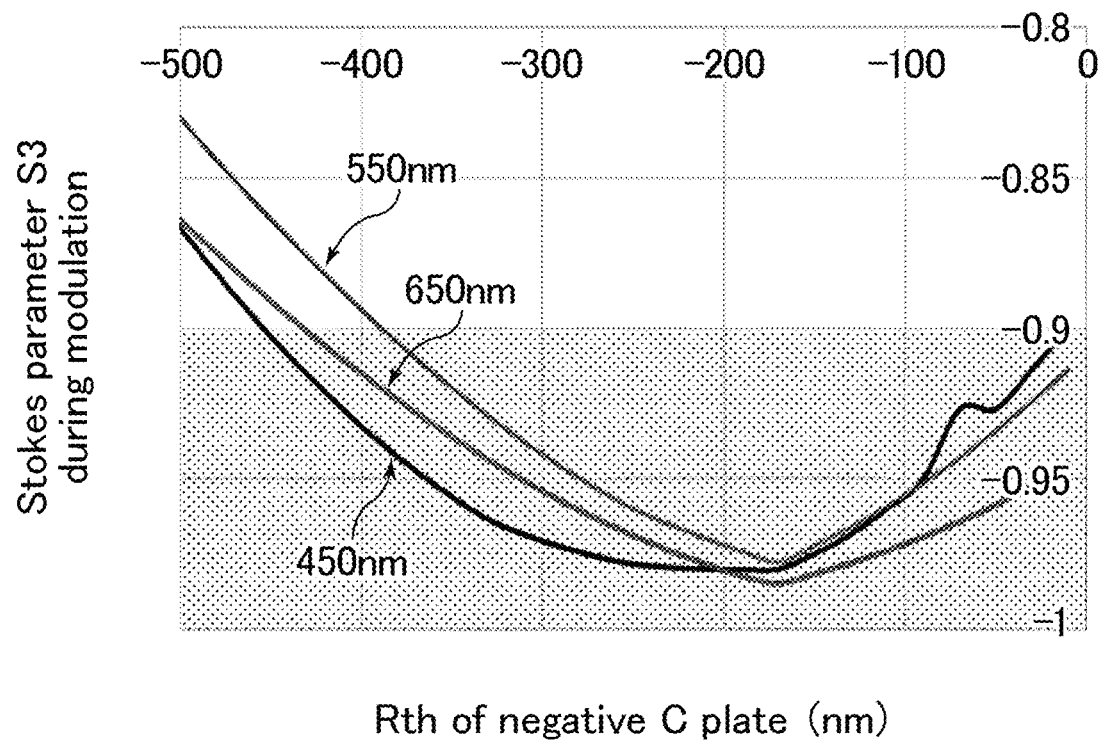

FIG. 190 is a graph of Stokes parameter S3 during modulation versus thickness direction retardation Rth introduced by the negative C plate in the optical element of Example 7.

Figure 191:
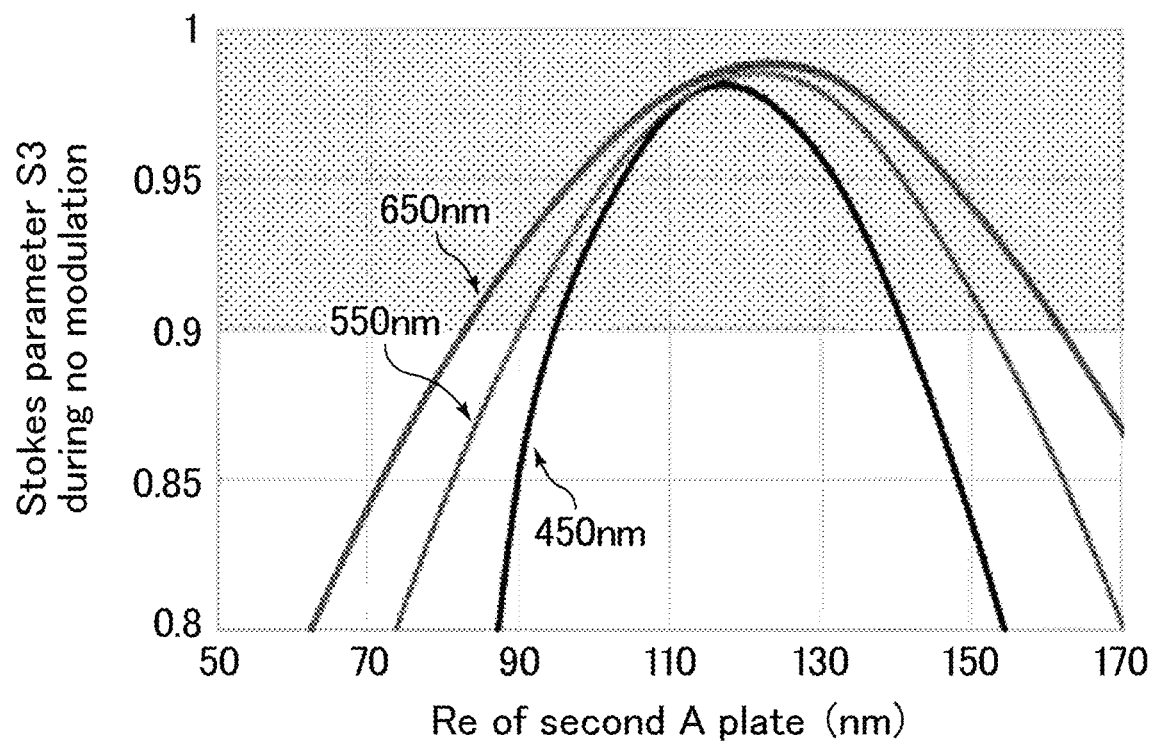

FIG. 191 is a graph of Stokes parameter S3 during no modulation versus in-plane phase difference Re introduced by a second A plate in the optical element of Example 7.

Figure 192:
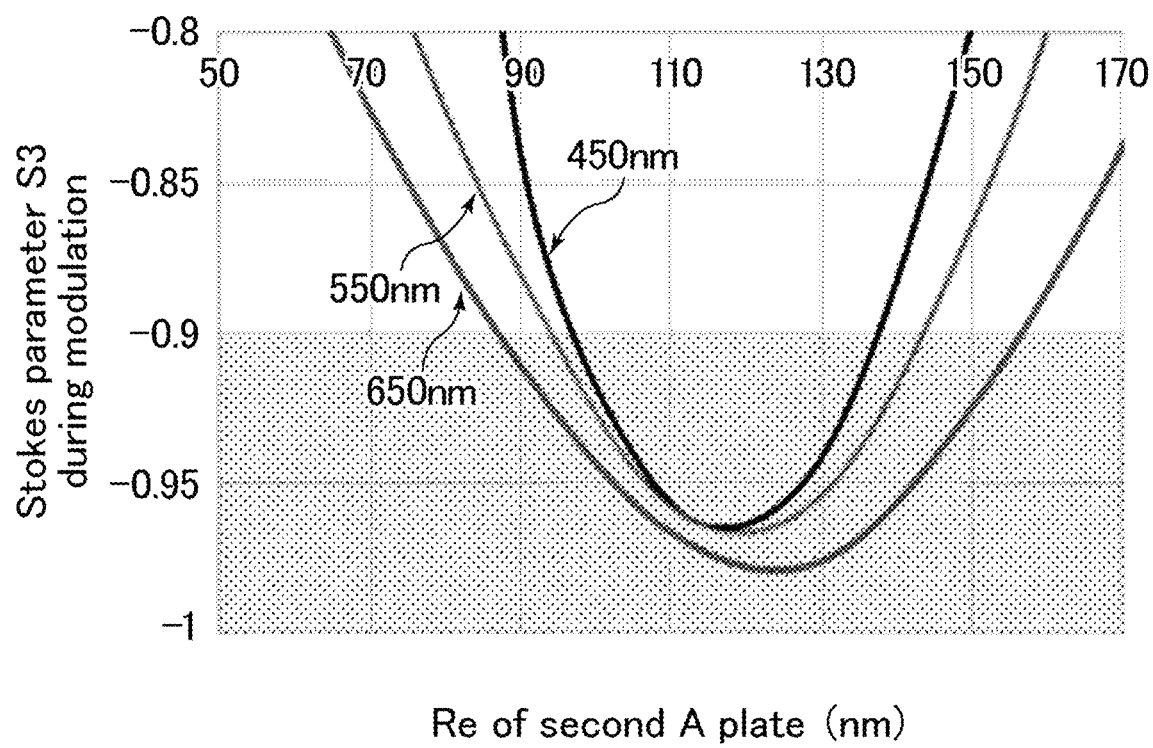

FIG. 192 is a graph of Stokes parameter S3 during modulation versus in-plane phase difference Re introduced by the second A plate in the optical element of Example 7.

Figure 193:
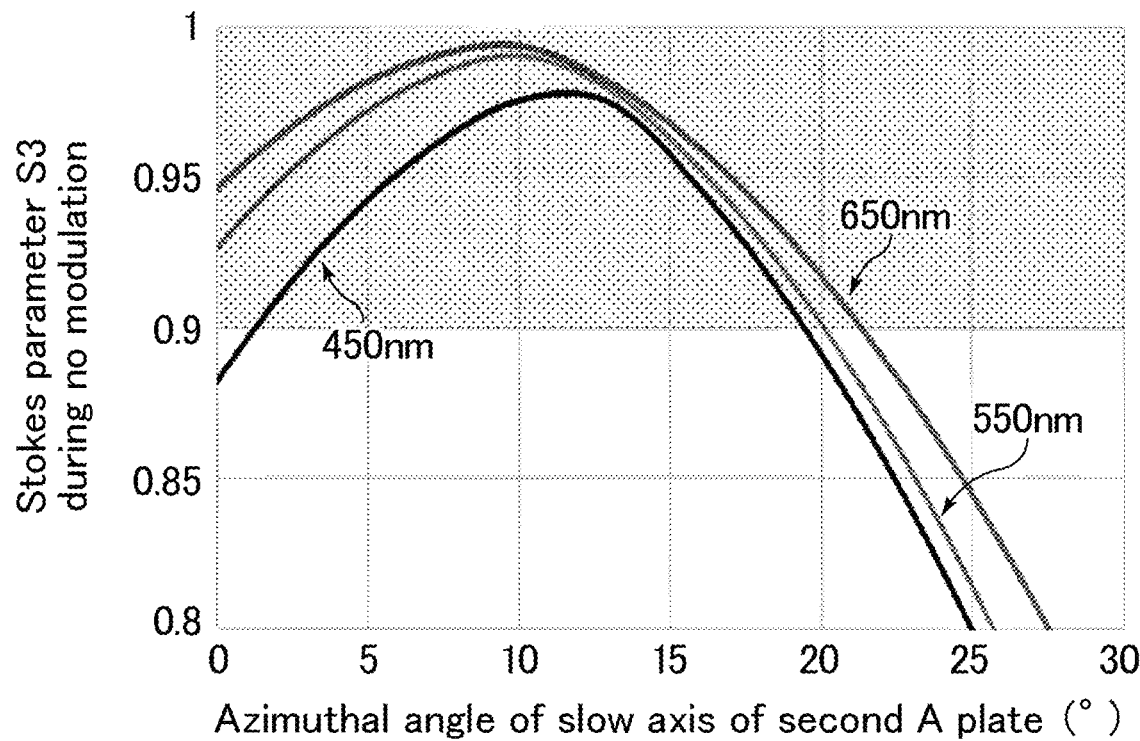

FIG. 193 is a graph of Stokes parameter S3 during no modulation versus azimuthal angle of the slow axis of the second A plate in the optical element of Example 7.

Figure 194:
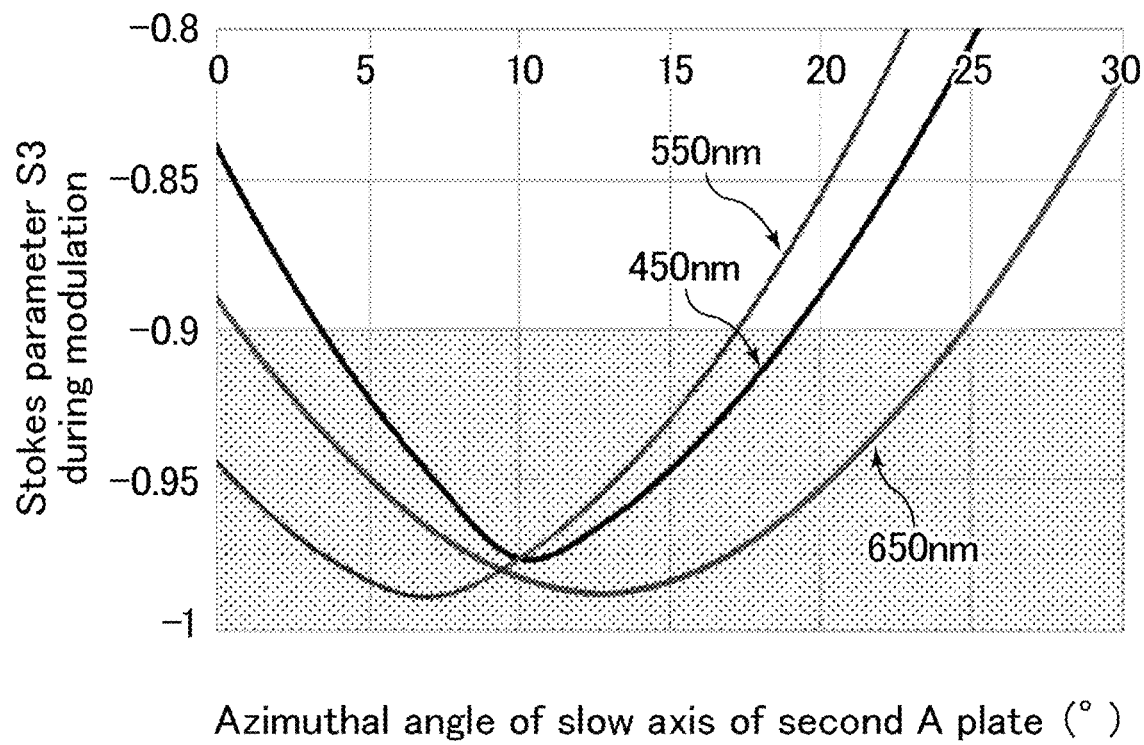

FIG. 194 is a graph of Stokes parameter S3 during modulation versus azimuthal angle of the slow axis of the second A plate in the optical element of Example 7.

Figure 195:
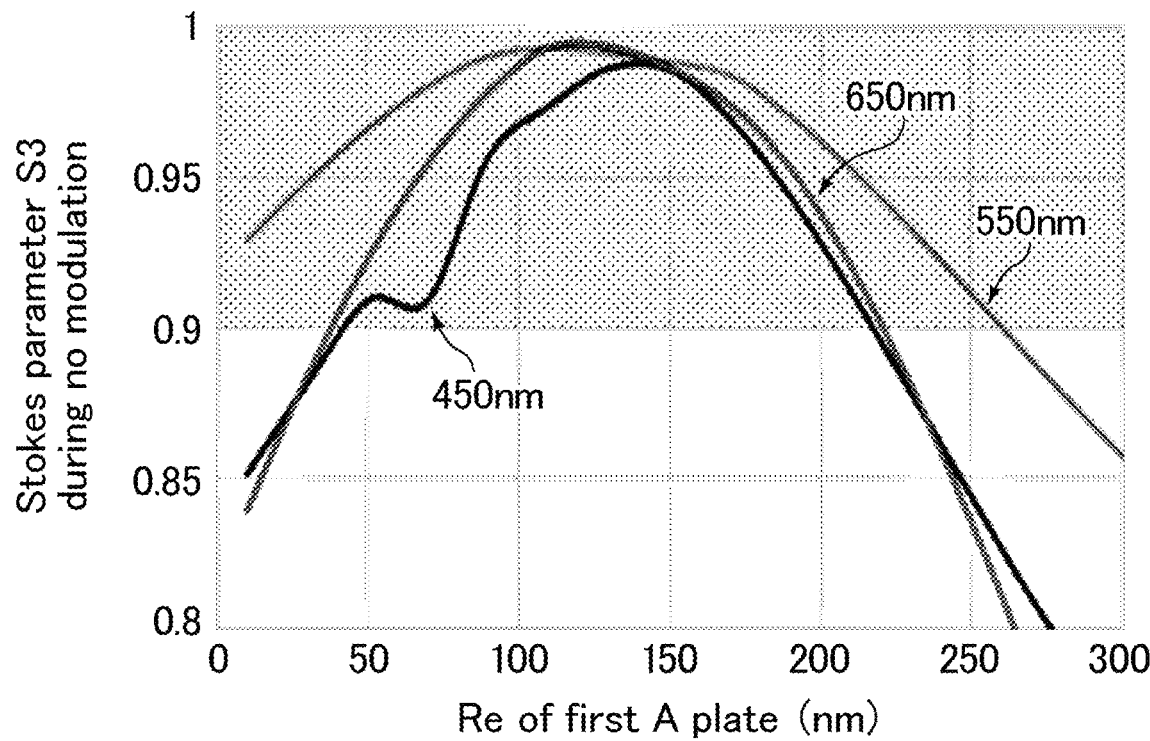

FIG. 195 is a graph of Stokes parameter S3 during no modulation versus in-plane phase difference Re introduced by a first A plate in the optical element of Example 7.

Figure 196:
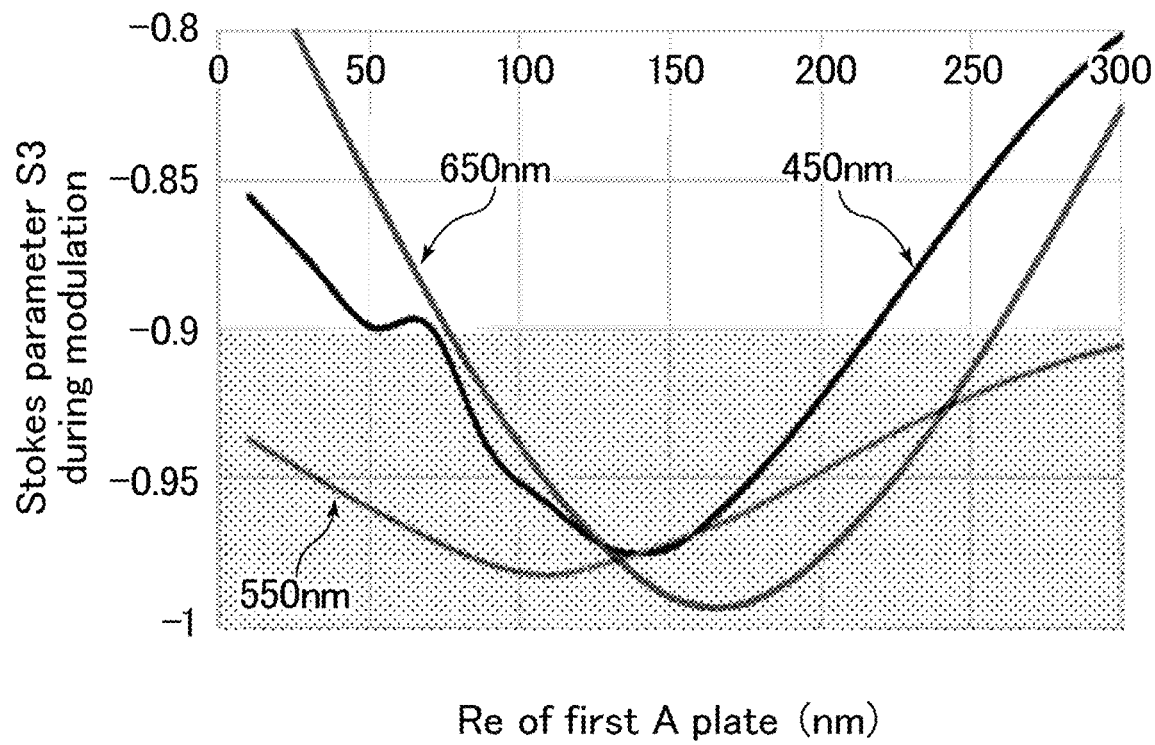

FIG. 196 is a graph of Stokes parameter S3 during modulation versus in-plane phase difference Re introduced by the first A plate in the optical element of Example 7.

Figure 197:
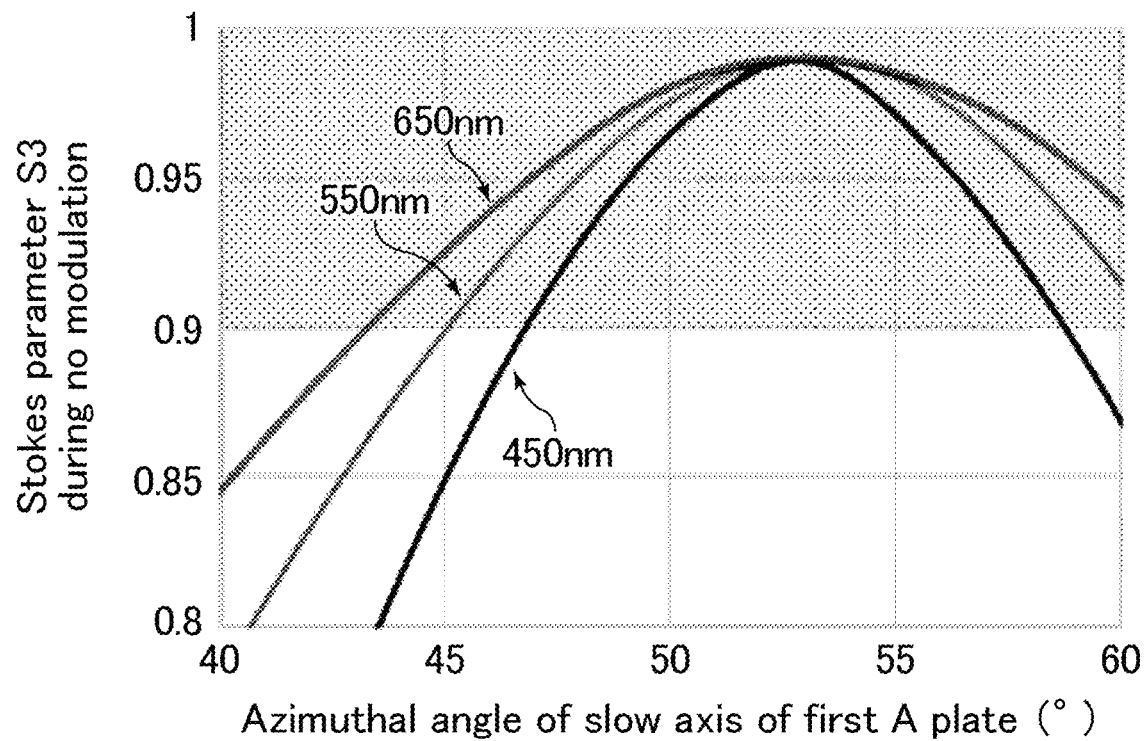

FIG. 197 is a graph of Stokes parameter S3 during no modulation versus azimuthal angle of the slow axis of the first A plate in the optical element of Example 7.

Figure 198:
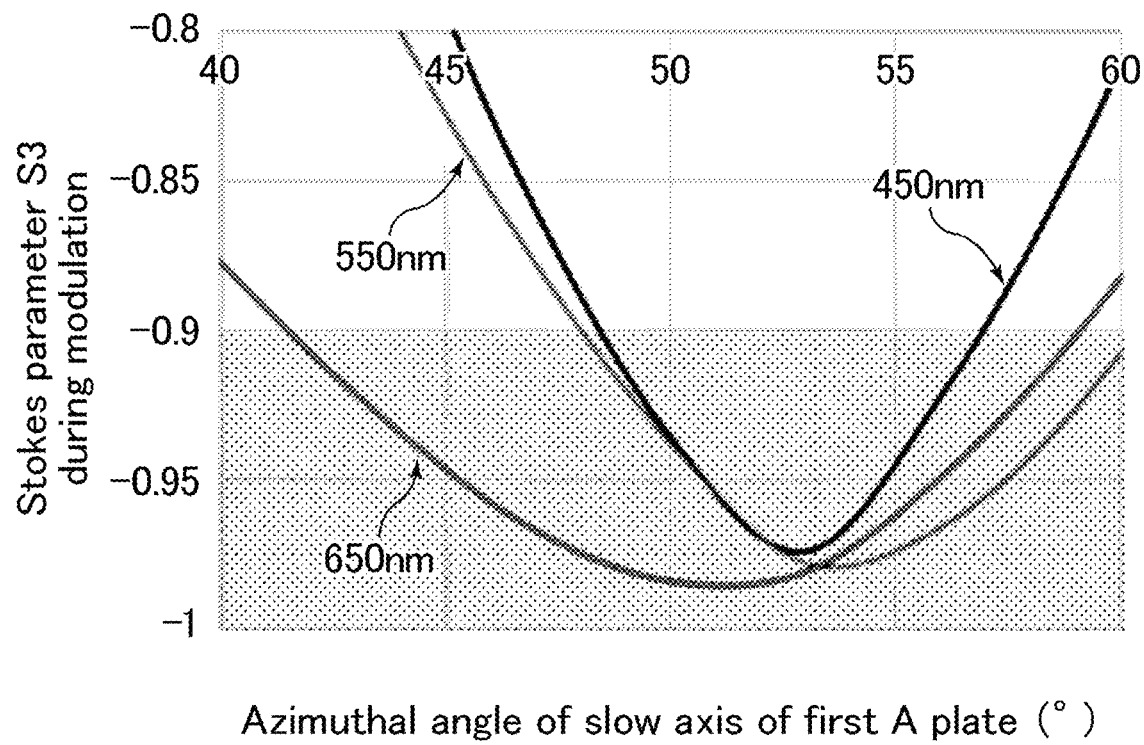

FIG. 198 is a graph of Stokes parameter S3 during modulation versus azimuthal angle of the slow axis of the first A plate in the optical element of Example 7.

Figure 199:
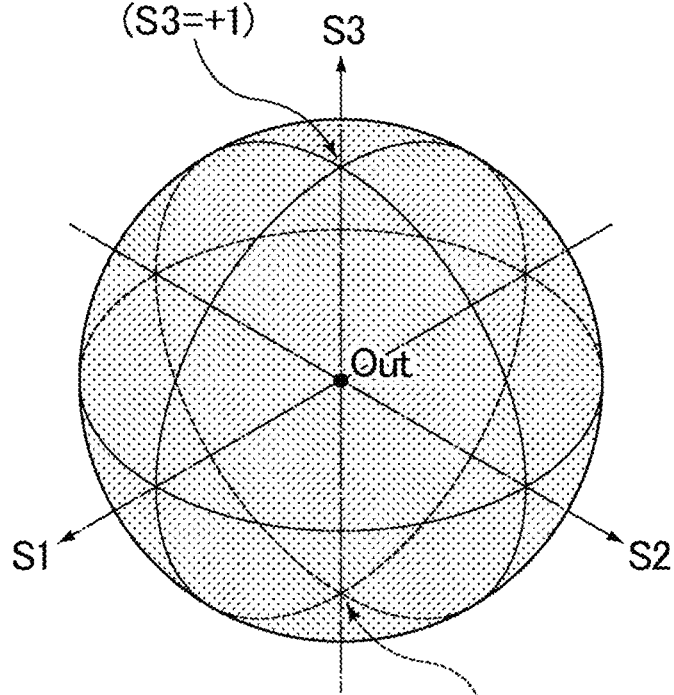

FIG. 199 is a view showing the polarization states.

Figure 200:
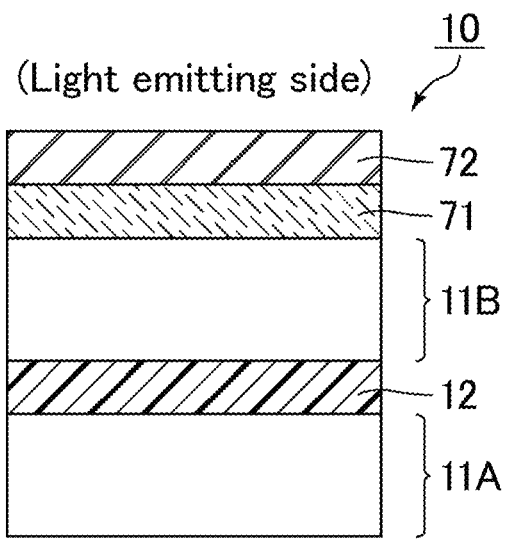

FIG. 200 is a schematic cross-sectional view of an optical element of Modified Example 3 of Embodiment 1.

Figure 201:
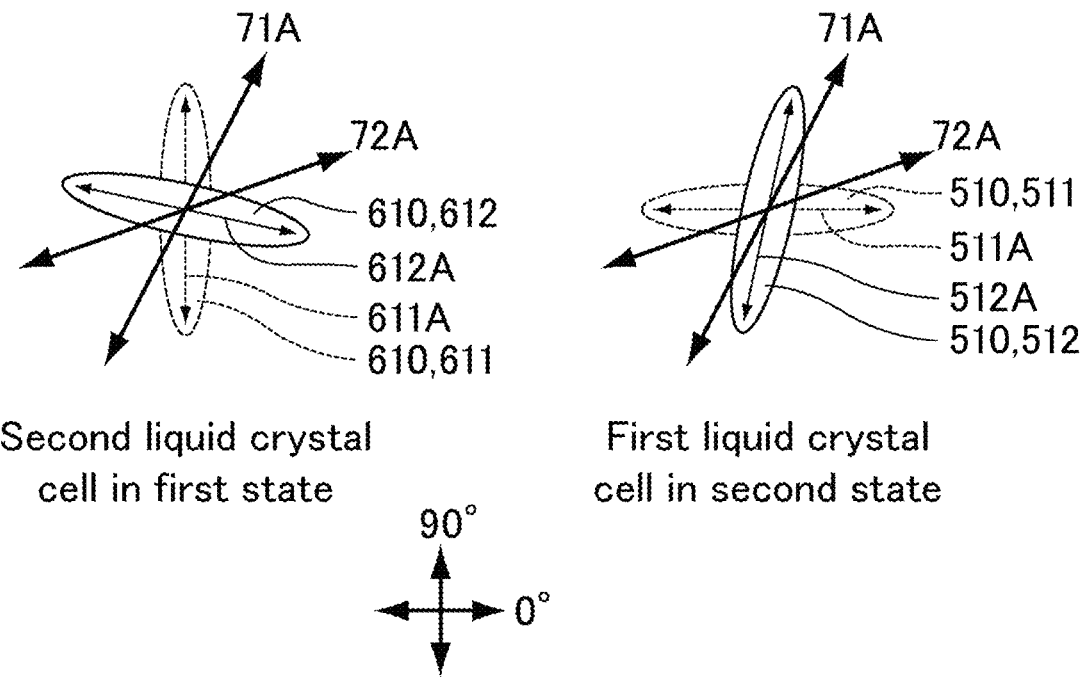

FIG. 201 includes schematic views showing the alignments of liquid crystal molecules in the first state and the second state in the optical element of Modified Example 3 of Embodiment 1.

Figure 202:
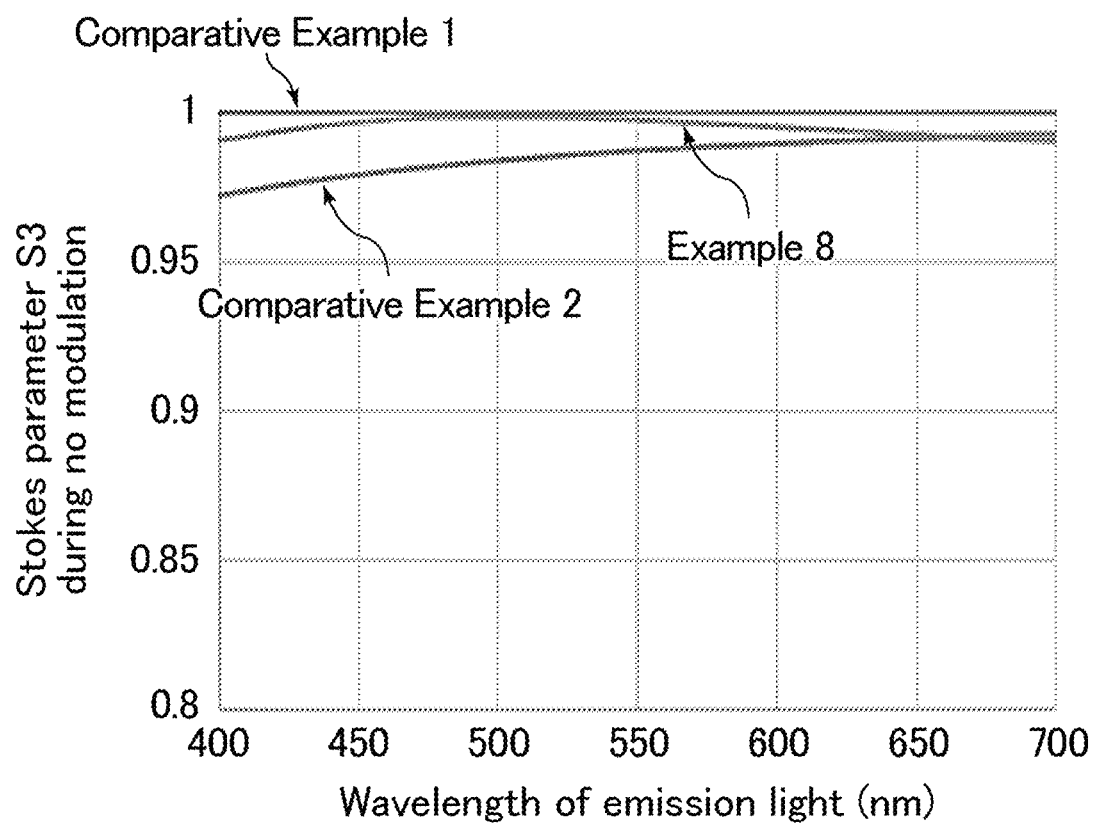

FIG. 202 is a graph showing the relationship between Stokes parameter S3 during no modulation and the wavelength of emission light in the optical elements of Example 8, Comparative Example 1, and Comparative Example 2.

Figure 203:
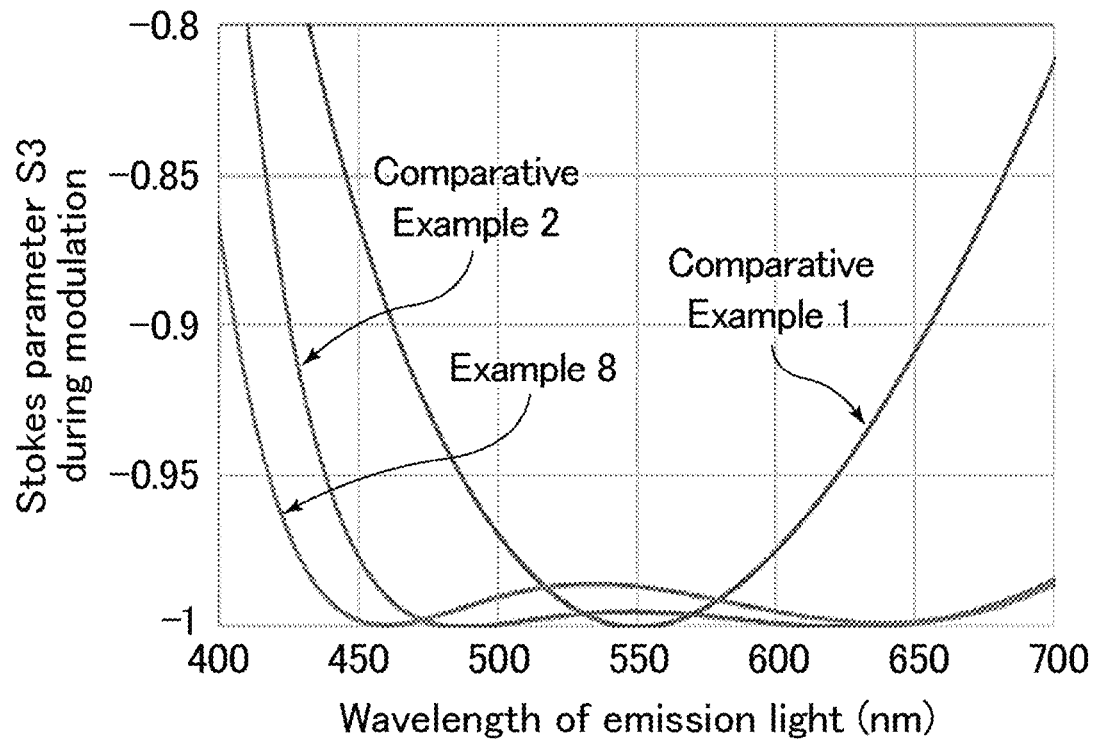

FIG. 203 is a graph showing the relationship between Stokes parameter S3 during modulation and the wavelength of emission light in the optical elements of Example 8, Comparative Example 1, and Comparative Example 2.

Figure 204:
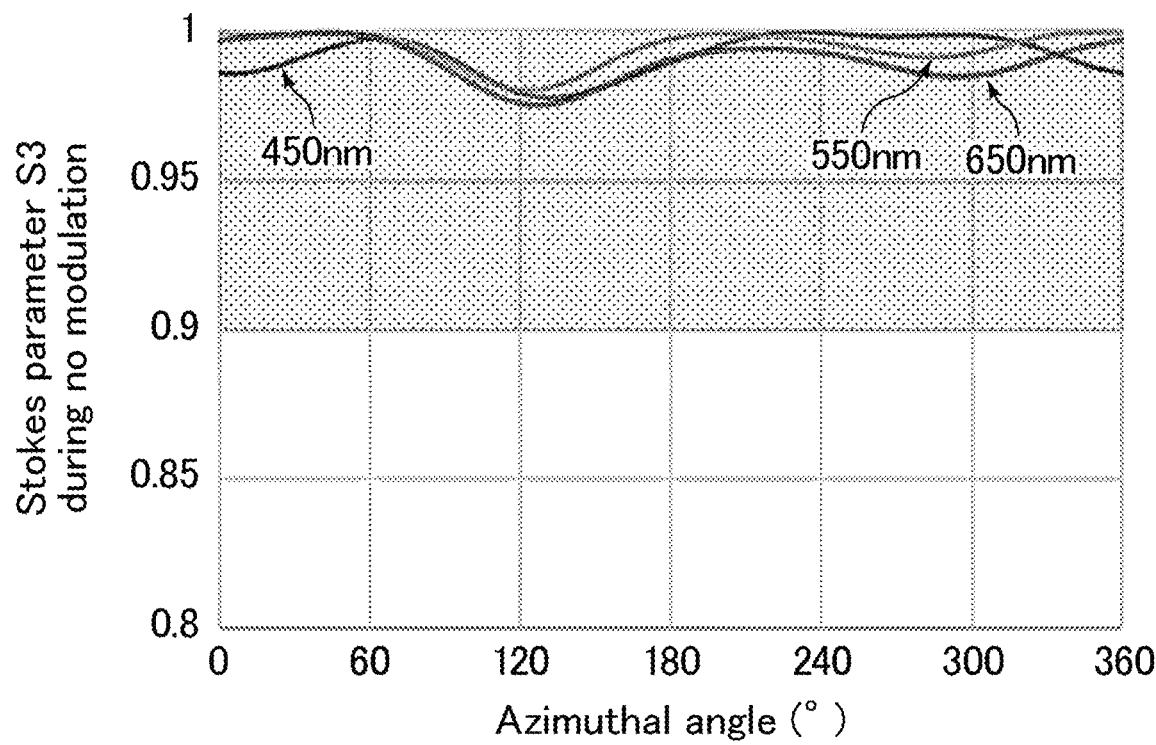

FIG. 204 is a graph showing the relationship between Stokes parameter S3 during no modulation and the azimuthal angle in the optical element of Example 8 when the angle of incidence is set to 30°.

Figure 205:
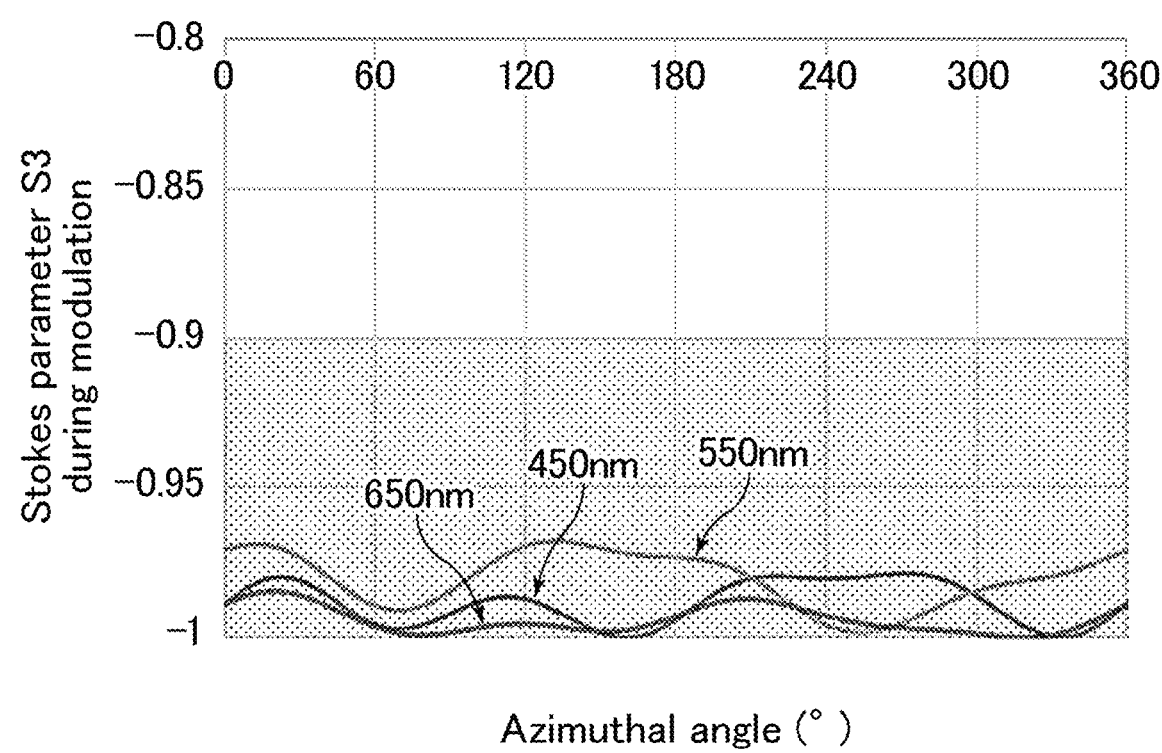

FIG. 205 is a graph showing the relationship between Stokes parameter S3 during modulation and the azimuthal angle in the optical element of Example 8 when the angle of incidence is set to 30°.

DETAILED DESCRIPTION OF THE INVENTION

Hereinafter, embodiments of the present invention are described. The present invention is not limited to the following embodiments. The design may be modified as appropriate within the range satisfying the configuration of the present invention. In the following description, the same components or components having the same function in different drawings are commonly provided with the same reference sign so as to appropriately avoid repetition of description. The configurations of the present invention may appropriately be combined without departing from the spirit of the present invention.

Definition of Terms

The "azimuth" herein means the direction in question in a view projected onto the surface of a substrate closer to the light emitting side of the optical element and is expressed as an angle (azimuthal angle) formed with the reference azimuth. The reference azimuth (0°) is set to the right in the horizontal direction of the screen of the liquid crystal panel when the optical element is viewed from its light emitting side. The azimuthal angle measures positive in the counterclockwise direction and measures negative in the clockwise direction. The counterclockwise direction and the clockwise direction are both the rotational directions when the optical element is viewed from its light emitting side. The azimuthal angle represents a value measured in a plan view of the light emitting side of the optical element.

The expression herein that two straight lines (including axes, directions, and azimuths) are perpendicular to each other means that they are perpendicular to each other in a plan view of the light emitting side of the optical element. The expression that one of two straight lines is oblique to the other means that the one straight line is oblique to the other in a plan view of the light emitting side of the optical element. Also, an angle formed by two straight lines means an angle formed by one of the straight lines and the other straight line in a plan view of the light emitting side of the optical element.

The expression herein that two straight lines (including axes, directions, and azimuths) are perpendicular to each other means that the angle formed by the straight lines is 90°±5°, preferably 90°±3°, more preferably 90°±1°, particularly preferably 90° (perfectly perpendicular). The expression herein that two straight lines are parallel to each other means that the angle formed by the straight lines is 0°±5°, preferably 0°±3°, more preferably 0°±1°, particularly preferably 0° (perfectly parallel).

The in-plane direction retardation (in-plane phase difference) Rp is defined by Rp=(ns−nf)d. The thickness direction retardation Rth is defined by Rth=(nz−(nx+ny)/2)d. In the formulas, ns represents nx or ny, whichever is greater, while of represents nx or ny, whichever is smaller; nx and ny each represent a principal refractive index in the in-plane direction of a birefringent layer (including a phase difference film (retarder) and a liquid crystal layer); nz represents a principal refractive index in the out-of-plane direction, i.e., the direction perpendicular to a surface of the birefringent layer; and d represents the thickness of the birefringent layer.

The measurement wavelength for optical parameters such as a principal refractive index and a phase difference herein is 550 nm unless otherwise specified.

Hereinafter, embodiments of the present invention are described. The present invention is not limited to the following embodiments. The design may be modified as appropriate within the range satisfying the configuration of the present invention.

Embodiment 1

Figure 1:
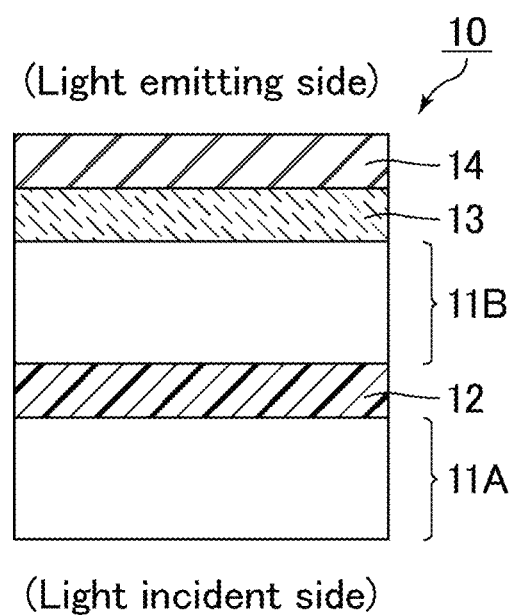
FIG. 1 is a schematic cross-sectional view of an optical element of Embodiment 1.
Figure 2:
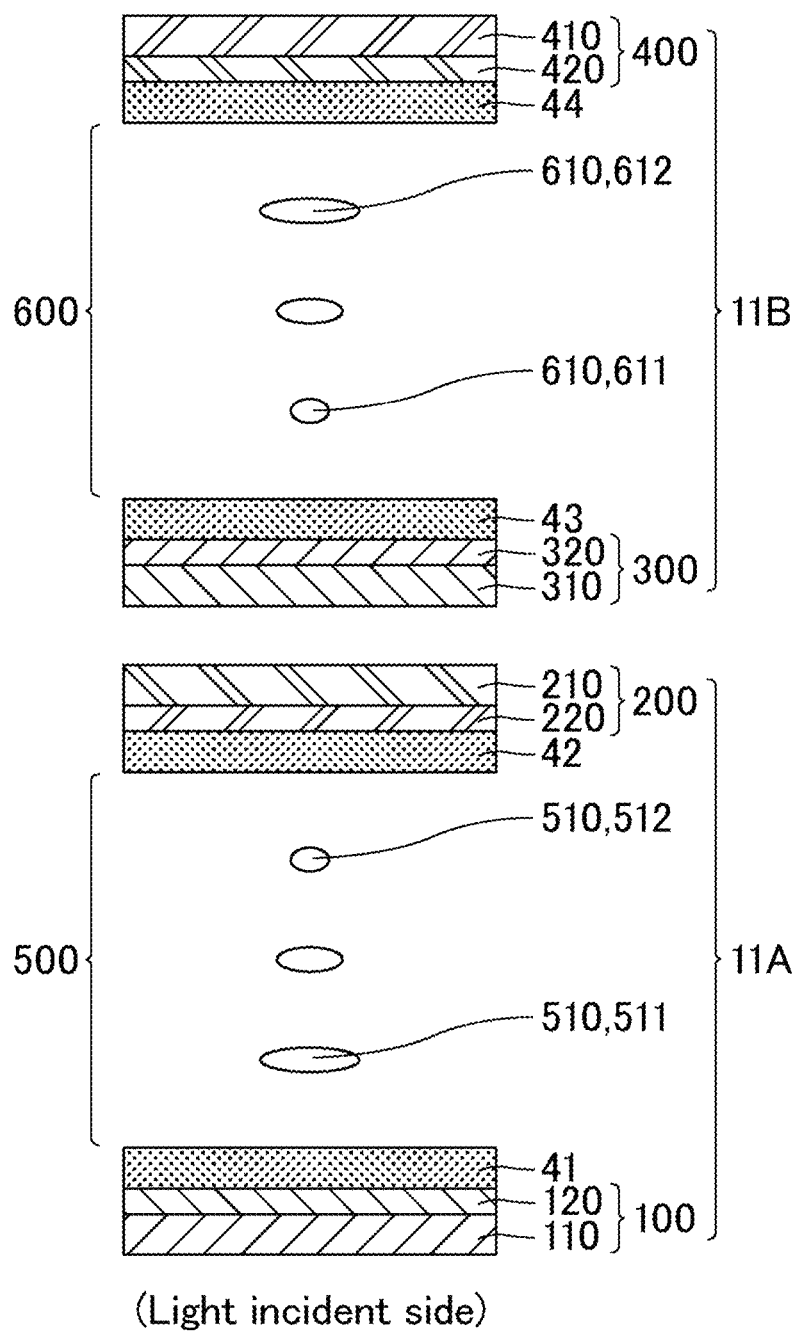
FIG. 2 is a schematic cross-sectional view of a first liquid crystal cell and a second liquid crystal cell in the optical element of Embodiment 1.
Figure 3:
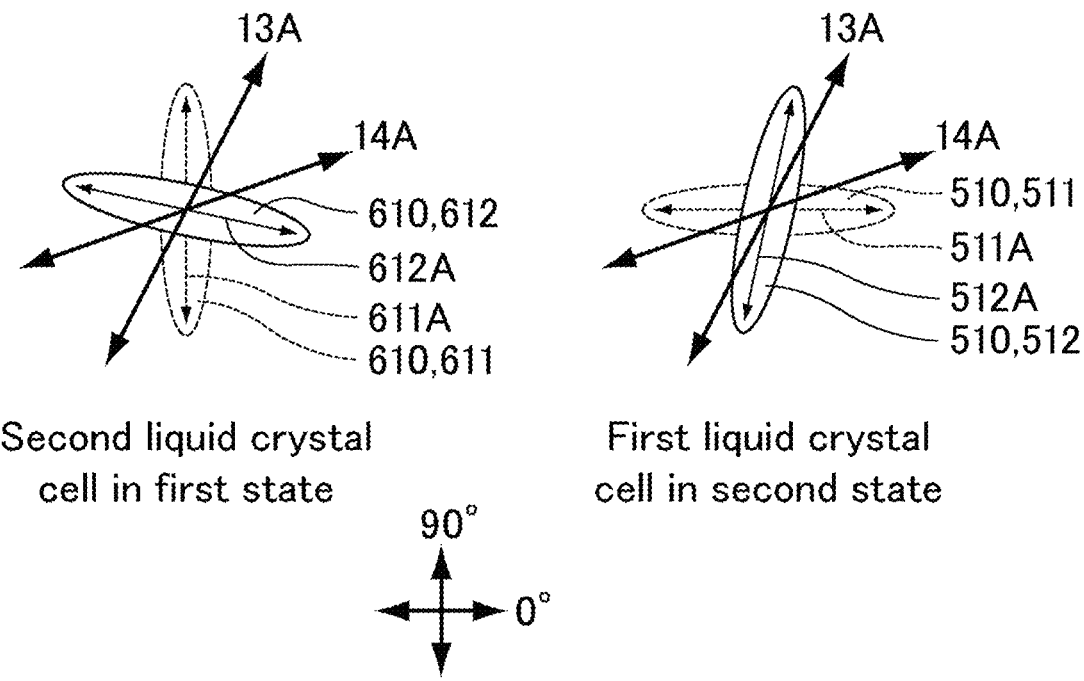
FIG. 3 includes schematic views showing the alignments of liquid crystal molecules in a first state and a second state in the optical element of Embodiment 1.

FIG. 1 is a schematic cross-sectional view of an optical element of Embodiment 1. FIG. 2 is a schematic cross-sectional view of a first liquid crystal cell and a second liquid crystal cell in the optical element of Embodiment 1. FIG. 3 includes schematic views showing the alignments of liquid crystal molecules in a first state and a second state in the optical element of Embodiment 1.

As shown in FIG. 1 to FIG. 3, an optical element 10 of the present embodiment sequentially includes: a first substrate 100; a first liquid crystal layer 500 containing first liquid crystal molecules 510; a second substrate 200; a third substrate 300; a second liquid crystal layer 600 containing second liquid crystal molecules 610; and a fourth substrate 400. The first substrate 100, the first liquid crystal layer 500, and the second substrate 200 define a first liquid crystal cell 11A. The third substrate 300, the second liquid crystal layer 600, and the fourth substrate 400 define a second liquid crystal cell 11B. The first liquid crystal cell 11A includes, as a first electrode for voltage application to the first liquid crystal layer 500, at least one of a first solid electrode 120 in the first substrate 100 or a second solid electrode 220 in the second substrate 200. The second liquid crystal cell 11B includes, as a second electrode for voltage application to the second liquid crystal layer 600, at least one of a third solid electrode 320 in the third substrate 300 or a fourth solid electrode 420 in the fourth substrate 400. The first electrode and the second electrode are disposed to enable switching between a first state and a second state. The first state twist-aligns the second liquid crystal molecules 610 and vertically aligns the first liquid crystal molecules 510. The second state twist-aligns the first liquid crystal molecules 510 and vertically aligns the second liquid crystal molecules 610. An alignment direction 611A of second liquid crystal molecules 611 near the third substrate 300 in the first state and an alignment direction 612A of second liquid crystal molecules 612 near the fourth substrate 400 in the first state are respectively at azimuthal angles resulting from a ¼ turn in the same direction of the azimuthal angle of an alignment direction 511A of first liquid crystal molecules 511 near the first substrate 100 in the second state and the azimuthal angle of an alignment direction 512A of first liquid crystal molecules 512 near the second substrate 200 in the second state. This configuration allows driving of the optical element in the first state and the second state by the same procedure except for turning the entire system a ¼ turn. The optical element thus can achieve polarization modulation in one of the first state and the second state while achieving no polarization modulation in the other state, over a broad bandwidth and a wide viewing angle range. In other words, the present embodiment can achieve an optical element, specifically a switchable half wave plate (sHWP) element, capable of switching between polarization modulation and no polarization modulation over a broad bandwidth and a wide viewing angle range.

Figure 4:
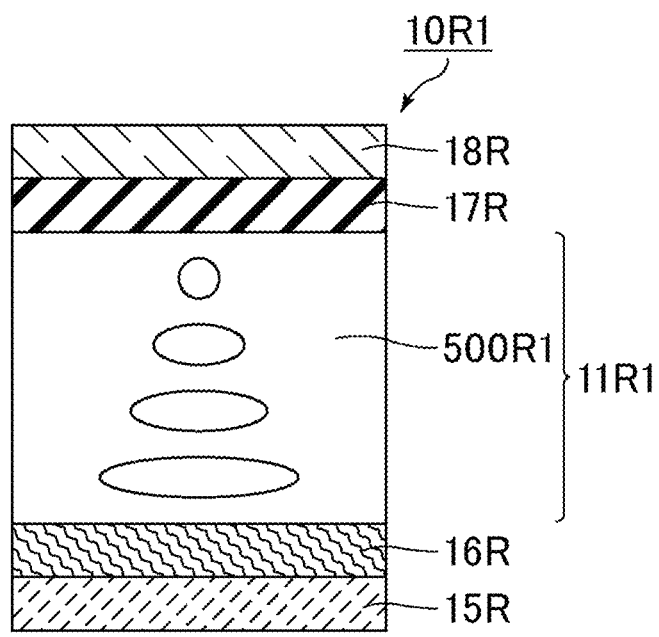
FIG. 4 is a schematic cross-sectional view of an optical element of Comparative Embodiment 1.

A possible configuration of a sHWP using one liquid crystal layer is, as shown in FIG. 4, the configuration of an optical element 10R1 of Comparative Embodiment 1 utilizing a liquid crystal cell 11R1 including a TN liquid crystal layer 500R1 with 90°-twisted alignment. Specifically, the optical element 10R1 of Comparative Embodiment 1 sequentially includes a quarter-wave film 15R whose slow axis is at an azimuthal angle of 75°, a half-wave film 16R whose slow axis is at an azimuthal angle of 15°, a liquid crystal cell 11R1, a half-wave film 17R whose slow axis is at an azimuthal angle of −75°, and a quarter-wave film 18R whose slow axis is at an azimuthal angle of −15°. FIG. 4 is a schematic cross-sectional view of the optical element of Comparative Embodiment 1.

Figure 5:
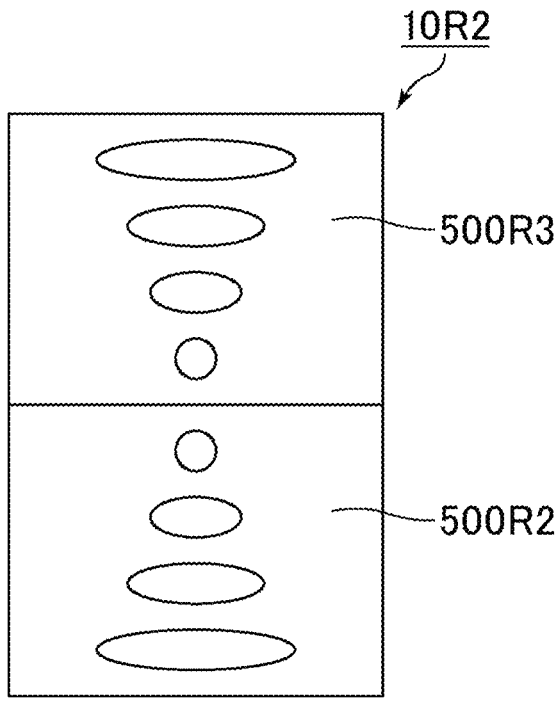
FIG. 5 is a schematic cross-sectional view of an optical element of Comparative Embodiment 2.

A possible configuration of a sHWP using two liquid crystal layers is, as shown in FIG. 5, the configuration of an optical element 10R2 of Comparative Embodiment 2 including a stack of a TN liquid crystal layer 500R2 with 70°-twisted alignment and a TN liquid crystal layer 500R3 with −70°-twisted alignment. FIG. 5 is a schematic cross-sectional view of the optical element of Comparative Embodiment 2.

Figure 6:
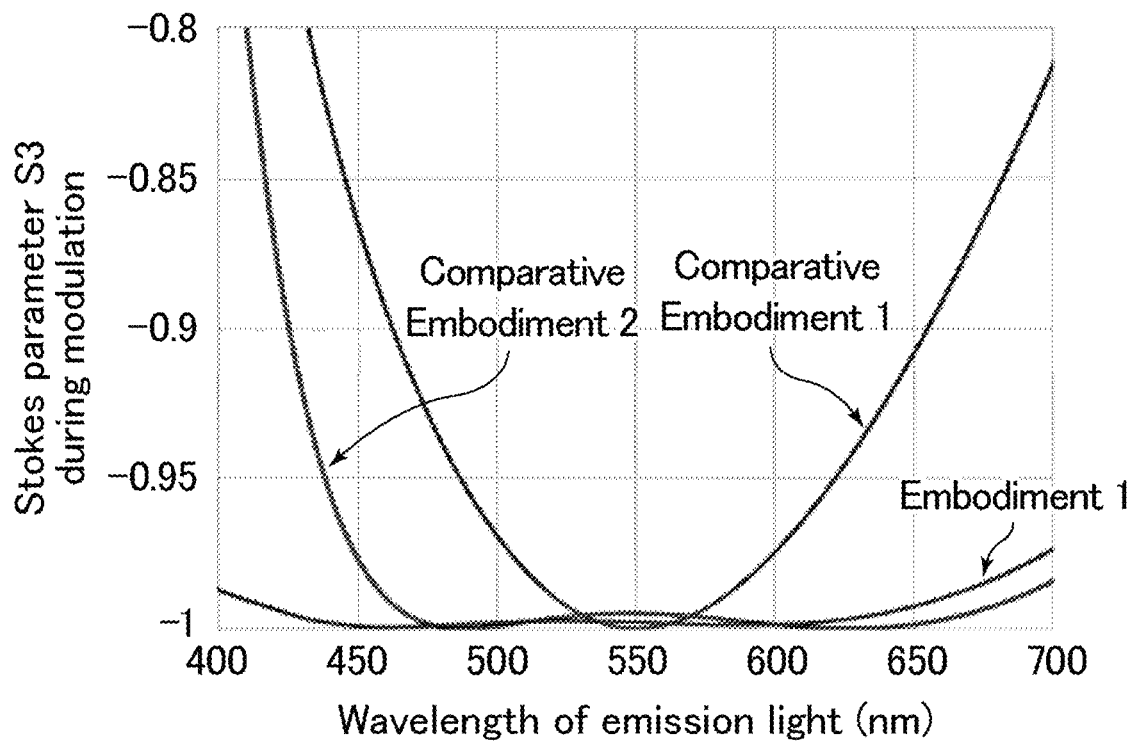
FIG. 6 is a graph showing the relationship between Stokes parameter S3 during modulation and the wavelength of emission light in the optical elements of Embodiment 1, Comparative Embodiment 1, and Comparative Embodiment 2.

FIG. 6 is a graph showing the relationship between Stokes parameter S3 during modulation and the wavelength of emission light in the optical elements of Embodiment 1, Comparative Embodiment 1, and Comparative Embodiment 2. FIG. 6 shows the wavelength dependence of the polarization state of the emission light derived from incident right-handed circularly polarized light (Stokes parameter S3=+1). A S3 value closer to −1 indicates more conversion to left-handed circularly polarized light. An optical element achieving a S3 value closer to −1 over a broader wavelength is considered to achieve modulation over a broader bandwidth.

The optical element 10R1 of Comparative Embodiment 1 is easy to design but has difficulty in achieving modulation over a broad bandwidth as shown in FIG. 6 due to the influences such as the wavelength dispersion of the TN liquid crystal layer 500R1 with 90°-twisted alignment, for example. The optical element 10R2 of Comparative Embodiment 2 can achieve modulation over a broad bandwidth with a stack of liquid crystal layers with about 70-degree-twisted alignment but has difficulty in achieving modulation in a wide viewing angle range. In contrast, the optical element 10 of the present embodiment can switch between polarization modulation and no polarization modulation over a broad bandwidth and a wide viewing angle range.

JP 2021-501361 T nowhere discloses polarization modulation properties. Although JP 2021-501361 T discloses the configuration of a single-layer TN liquid crystal layer, this configuration during polarization modulation (when deactivated or in voltage OFF states in JP 2021-501361 T)

appropriately converts the polarization state only at certain wavelengths, failing to convert the polarization state over a broad bandwidth.

Specifically, the single-layer configuration disclosed in JP 2021-501361 T twist-aligns liquid crystal molecules by 90° during polarization modulation while generating vertical electric fields to vertically align the liquid crystal molecules during no polarization modulation. Since the liquid crystal molecules are twist-aligned by 90° during polarization modulation, the polarization state depends on the wavelength, meaning that polarization modulation cannot be achieved over a broad bandwidth. Even when the twist angle of the liquid crystal molecules, the cell thickness of the liquid crystal layer, and other conditions are adjusted to achieve polarization modulation over a broad bandwidth, the configuration is under the influence of residual retardation introduced by the liquid crystal molecules near the substrate during no polarization modulation and thus fails to achieve no polarization modulation over a broad bandwidth. In other words, this configuration cannot achieve polarization modulation over a broad bandwidth and no polarization modulation over a broad bandwidth at the same time.

U.S. Ser. No. 10/678,057 B2 nowhere discloses modulation properties. This document does not mention the specific physical properties of components such as the phase difference film either. In addition, one of the stacked liquid crystal cells in U.S. Ser. No. 10/678,057 B2 is intended for backup use, which suggests that the cell design thereof is the same as that of the other liquid crystal cell.

Hereinafter, the present embodiment is described in detail.

The alignment direction of first liquid crystal molecules near the first substrate means the alignment direction of first liquid crystal molecules horizontally aligned in the vicinity of the first substrate. Specifically, when an alignment film on the first liquid crystal layer side of the first substrate is a horizontal alignment film, the alignment direction of first liquid crystal molecules near the first substrate means the alignment direction of first liquid crystal molecules in the first substrate side interface of the first liquid crystal layer. When an alignment film on the first liquid crystal layer side of the first substrate is a vertical alignment film, liquid crystal molecules in the first substrate side interface of the first liquid crystal layer are vertically aligned, and thus the alignment direction of first liquid crystal molecules near the first substrate means the alignment direction of horizontally aligned first liquid crystal molecules that are closer to the center of the first liquid crystal layer than the first liquid crystal molecules in the first substrate side interface are.

Similarly, the alignment direction of first liquid crystal molecules near the second substrate means the alignment direction of first liquid crystal molecules horizontally aligned in the vicinity of the second substrate. Specifically, when an alignment film on the first liquid crystal layer side of the second substrate is a horizontal alignment film, the alignment direction of first liquid crystal molecules near the second substrate means the alignment direction of first liquid crystal molecules in the second substrate side interface of the first liquid crystal layer. When an alignment film on the first liquid crystal layer side of the second substrate is a vertical alignment film, liquid crystal molecules in the second substrate side interface of the first liquid crystal layer are vertically aligned, and thus the alignment direction of first liquid crystal molecules near the second substrate means the alignment direction of horizontally aligned first liquid crystal molecules that are closer to the center of the first liquid crystal layer than the first liquid crystal molecules in the second substrate side interface are.

Similarly, the alignment direction of second liquid crystal molecules near the third substrate means the alignment direction of second liquid crystal molecules horizontally aligned in the vicinity of the third substrate. Specifically, when an alignment film on the second liquid crystal layer side of the third substrate is a horizontal alignment film, the alignment direction of second liquid crystal molecules near the third substrate means the alignment direction of second liquid crystal molecules in the third substrate side interface of the second liquid crystal layer. When an alignment film on the second liquid crystal layer side of the third substrate is a vertical alignment film, liquid crystal molecules in the third substrate side interface of the second liquid crystal layer are vertically aligned, and thus the alignment direction of second liquid crystal molecules near the third substrate means the alignment direction of horizontally aligned second liquid crystal molecules that are closer to the center of the second liquid crystal layer than the second liquid crystal molecules in the third substrate side interface are.

Similarly, the alignment direction of second liquid crystal molecules near the fourth substrate means the alignment direction of second liquid crystal molecules horizontally aligned in the vicinity of the fourth substrate. Specifically, when an alignment film on the second liquid crystal layer side of the fourth substrate is a horizontal alignment film, the alignment direction of second liquid crystal molecules near the fourth substrate means the alignment direction of second liquid crystal molecules in the fourth substrate side interface of the second liquid crystal layer. When an alignment film on the second liquid crystal layer side of the fourth substrate is a vertical alignment film, liquid crystal molecules in the fourth substrate side interface of the second liquid crystal layer are vertically aligned, and thus the alignment direction of second liquid crystal molecules near the fourth substrate means the alignment direction of horizontally aligned second liquid crystal molecules that are closer to the center of the second liquid crystal layer than the second liquid crystal molecules in the fourth substrate side interface are.

The expression that the "alignment direction of second liquid crystal molecules near the third substrate in the first state and the alignment direction of second liquid crystal molecules near the fourth substrate in the first state are respectively at azimuthal angles resulting from a ¼ turn in the same direction of the azimuthal angle of an alignment direction of first liquid crystal molecules near the first substrate in the second state and the azimuthal angle of an alignment direction of first liquid crystal molecules near the second substrate in the second state" means that the alignment direction of the second liquid crystal molecules near the third substrate in the first state and the alignment direction of the second liquid crystal molecules near the fourth substrate in the first state are respectively at azimuthal angles resulting from a ¼ turn in the positive direction of the azimuthal angle of the alignment direction of the first liquid crystal molecules near the first substrate in the second state and the azimuthal angle of the alignment direction of the first liquid crystal molecules near the second substrate in the second state, or the alignment direction of the second liquid crystal molecules near the third substrate in the first state and the alignment direction of the second liquid crystal molecules near the fourth substrate in the first state are respectively at azimuthal angles resulting from a ¼ turn in the negative direction of the azimuthal angle of the alignment direction of the first liquid crystal molecules near the first substrate in the second state and the azimuthal angle of the alignment direction of the first liquid crystal molecules near the second substrate in the second state.

The term "¼ turn" means a turn of not smaller than 80° and not greater than 100°, preferably not smaller than 85° and not greater than 95°, more preferably not smaller than 87° and not greater than 93°.

The first liquid crystal cell 11A includes, sequentially from the light incident side toward the light emitting side, the first substrate 100, the first liquid crystal layer 500 containing the first liquid crystal molecules 510, and the second substrate 200. The first substrate 100 includes a first support substrate 110 and a first solid electrode 120. The second substrate 200 includes a second support substrate 210 and a second solid electrode 220.

The second liquid crystal cell 11B includes, sequentially from the light incident side toward the light emitting side, the third substrate 300, the second liquid crystal layer 600 containing the second liquid crystal molecules 610, and the fourth substrate 400. The third substrate 300 includes a third support substrate 310 and a third solid electrode 320. The fourth substrate 400 includes a fourth support substrate 410 and a fourth solid electrode 420.

Examples of the first support substrate 110, the second support substrate 210, the third support substrate 310, and the fourth support substrate 410 include insulating substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, polyimide, and alicyclic polyolefin.

The first solid electrode 120, the second solid electrode 220, the third solid electrode 320, and the fourth solid electrode 420 can be formed by forming a single- or multi-layered film of a transparent conductive material such as indium tin oxide (ITO), indium zinc oxide (IZO), zinc oxide (ZnO), or tin oxide (SnO), or an alloy of any of these materials by sputtering or any other method, followed by patterning of the film by photolithography or any other method. The solid electrode herein means an electrode with no slit or no opening at least in a region overlapping an optical opening in a sub-pixel in a plan view.

One of the first solid electrode 120 and the second solid electrode 220 is a pixel electrode, and the other is a common electrode. One of the third solid electrode 320 and the fourth solid electrode 420 is a pixel electrode, and the other is a common electrode.

The first liquid crystal layer 500 contains a liquid crystal material. The alignment of the first liquid crystal molecules 510 in the liquid crystal material is varied according to the voltage applied to the first liquid crystal layer 500, so that the polarization state of light passing through the first liquid crystal layer 500 can be varied.

The second liquid crystal layer 600 contains a liquid crystal material. The alignment of the second liquid crystal molecules 610 in the liquid crystal material is varied according to the voltage applied to the second liquid crystal layer 600, so that the polarization state of light passing through the second liquid crystal layer 600 can be varied.

The first liquid crystal molecules 510 and the second liquid crystal molecules 610 may be positive liquid crystal molecules having a positive anisotropy of dielectric constant (Δε) according to the following formula (L) or negative liquid crystal molecules having a negative anisotropy of dielectric constant (Δε) according to the following formula (L). Either the first liquid crystal molecules 510 or the second liquid crystal molecules 610 may be positive liquid crystal molecules and the other may be negative liquid crystal molecules. In the present embodiment, positive liquid crystal molecules are used as the first liquid crystal molecules 510 and the second liquid crystal molecules 610. The long axis direction of the liquid crystal molecules corresponds to the direction of the slow axis.

$$\Delta\varepsilon = \text{(dielectric constant in long axis direction of liquid crystal molecules)} - \text{(dielectric constant in short axis direction of liquid crystal molecules)} \quad (L)$$

The first liquid crystal layer 500 contains the first liquid crystal molecules 510 twist-aligned between the first substrate 100 and the second substrate 200. In the second state, the first liquid crystal molecules 510 are twist-aligned from the first substrate 100 toward the second substrate 200.

The second liquid crystal layer 600 contains the second liquid crystal molecules 610 twist-aligned between the third substrate 300 and the fourth substrate 400. In the first state, the second liquid crystal molecules 610 are twist-aligned from the third substrate 300 toward the fourth substrate 400.

The twisted alignment of the first liquid crystal molecules 510 and the second liquid crystal molecules 610 is achieved by, for example, adding a chiral dopant to a liquid crystal material. The chiral dopant may be any known one. Examples of the chiral dopant include S-811 (available from Merck KGaA).

The first liquid crystal molecules 510 and the second liquid crystal molecules 610 in the present embodiment are twist-aligned positive liquid crystal molecules. Thus, with voltage applied to the first liquid crystal layer 500 and with no voltage applied to the second liquid crystal layer 600, the first state is achieved where the first liquid crystal molecules 510 are vertically aligned and the second liquid crystal molecules 610 are twist-aligned. Also, with no voltage applied to the first liquid crystal layer 500 and with voltage applied to the second liquid crystal layer 600, the second state is achieved where the first liquid crystal molecules 510 are twist-aligned and the second liquid crystal molecules 610 are vertically aligned. In the present embodiment, no polarization modulation can be achieved in the first state, while polarization modulation can be achieved in the second state.

Preferably, the retardation introduced by the first liquid crystal layer 500 at a wavelength of 550 nm in the second state is not less than 200 nm and not more than 260 nm, and the retardation introduced by the second liquid crystal layer 600 at a wavelength of 550 nm in the first state is not less than 210 nm and not more than 260 nm. This configuration enables switching between polarization modulation and no polarization modulation over a broader bandwidth. Herein, a state with voltage not lower than the threshold voltage applied to a liquid crystal layer is also simply referred to as "with voltage applied" or "during voltage application". A state with voltage lower than the threshold voltage applied to a liquid crystal layer (including application of no voltage) is also simply referred to as "with no voltage applied" or "during no voltage application".

Preferably, the first liquid crystal molecules 510 in the second state are twist-aligned with a twist angle of not smaller than 61° and not greater than 75°, and the second liquid crystal molecules 610 in the first state are twist-aligned with a twist angle of not smaller than 64° and not greater than 74°. This configuration enables switching between polarization modulation and no polarization modulation over a broader bandwidth. The twist angle of liquid crystal molecules can be determined from a Mueller matrix of light after exiting from the liquid crystal layer, the Mueller Matrix output from Axoscan (available from Opto Science, Inc.).

The twist angle of the first liquid crystal molecules 510 in the second state is an angle formed by the azimuthal angle of the alignment direction 511A of the first liquid crystal molecules 511 near the first substrate 100 in the second state and the azimuthal angle of the alignment direction 512A of the first liquid crystal molecules 512 near the second substrate 200. The twist angle of the second liquid crystal molecules 610 in the first state is an angle formed by the azimuthal angle of the alignment direction 611A of the second liquid crystal molecules 611 near the third substrate 300 in the first state and the azimuthal angle of the alignment direction 612A of the second liquid crystal molecules 612 near the fourth substrate 400.

Preferably, the alignment direction 511A of the first liquid crystal molecules 511 near the first substrate 100 in the second state is at an azimuthal angle of not smaller than −9° and not greater than 7°, and the alignment direction 611A of the second liquid crystal molecules 611 near the third substrate 300 in the first state is at an azimuthal angle of not smaller than 85° and not greater than 96°. This configuration enables switching between polarization modulation and no polarization modulation over a broader bandwidth. For example, the alignment direction 511A of the first liquid crystal molecules 511 near the first substrate 100 in the second state can be set at an azimuthal angle of 0°, and the alignment direction 611A of the second liquid crystal molecules 611 near the third substrate 300 in the first state can be set at an azimuthal angle of 90°.

Preferably, the first liquid crystal cell 11A includes a first alignment film 41 on the first liquid crystal layer 500 side of the first substrate 100 and a second alignment film 42 on the first liquid crystal layer 500 side of the second substrate 200. Preferably, the second liquid crystal cell 11B includes a third alignment film 43 on the second liquid crystal layer 600 side of the third substrate 300 and a fourth alignment film 44 on the second liquid crystal layer 600 side of the fourth substrate 400.

The first alignment film 41 and the second alignment film 42 each have a function of controlling the alignment of the first liquid crystal molecules 510 in the first liquid crystal layer 500. With no voltage applied to the first liquid crystal layer 500, the alignment of the first liquid crystal molecules 510 in the first liquid crystal layer 500 is controlled in large part by the actions of the first alignment film 41 and the second alignment film 42.

The third alignment film 43 and the fourth alignment film 44 each have a function of controlling the alignment of the second liquid crystal molecules 610 in the second liquid crystal layer 600. With no voltage applied to the second liquid crystal layer 600, the alignment of the second liquid crystal molecules 610 in the second liquid crystal layer 600 is controlled in large part by the actions of the third alignment film 43 and the fourth alignment film 44. The first alignment film 41, the second alignment film 42, the third alignment film 43, and the fourth alignment film 44 are also simply referred to as the alignment films hereinbelow.

The alignment films can be made of a material commonly used in the field of liquid crystal display panels, such as a polymer having a polyimide structure in its main chain, a polymer having a polyamic acid structure in its main chain, or a polymer having a polysiloxane structure in its main chain. The alignment films can each be formed by, for example, applying an alignment film material to a substrate. The application method may be any method such as flexographic printing or inkjet coating.

The alignment films may each be a horizontal alignment film which aligns liquid crystal molecules substantially horizontally to its surface or a vertical alignment film which aligns liquid crystal molecules substantially vertically to its surface. The present embodiment is described based on the case where the first alignment film 41, the second alignment film 42, the third alignment film 43, and the fourth alignment film 44 are horizontal alignment films.

A horizontal alignment film has a function of aligning liquid crystal molecules in a liquid crystal layer horizontally to its surface in a pixel region during no voltage application to the liquid crystal layer. The expression that a horizontal alignment film aligns liquid crystal molecules horizontally to its surface means that the pre-tilt angle of the liquid crystal molecules is 0° to 5°, preferably 0° to 2°, more preferably 0° to 1°, from the surface of the horizontal alignment film. The pre-tilt angle of liquid crystal molecules means the angle of inclination of the long axes of the liquid crystal molecules from the main surfaces of the substrates during no voltage application to the liquid crystal layer.

A vertical alignment film has a function of aligning liquid crystal molecules in a liquid crystal layer vertically to its surfaces during no voltage application to the liquid crystal layer. The expression that a vertical alignment film aligns liquid crystal molecules vertically to its surfaces means that the pre-tilt angle of the liquid crystal molecules is 86° to 90°, preferably 87° to 89°, more preferably 87.5° to 89°, from the surfaces of the vertical alignment film.

The alignment films may each be a photoalignment film containing a photo-functional group and having undergone a photoalignment treatment as the alignment treatment or a rubbed alignment film having undergone a rubbing treatment as the alignment treatment. An alignment film having undergone the alignment treatment can impart a pre-tilt angle to the liquid crystal molecules.

The alignment direction of liquid crystal molecules is the direction of the principal axes of alignment (the average direction of the long axes of molecules in nematic liquid crystal). The alignment direction 511A of the first liquid crystal molecules 511 near the first substrate 100 and the alignment treatment direction for the alignment film (first alignment film 41) on the first liquid crystal layer 500 side of the first substrate 100 are at the same azimuthal angle. The alignment direction 512A of the first liquid crystal molecules 512 near the second substrate 200 and the alignment treatment direction for the alignment film (second alignment film 42) on the first liquid crystal layer 500 side of the second substrate 200 are at the same azimuthal angle. The alignment direction 611A of the second liquid crystal molecules 611 near the third substrate 300 and the alignment treatment direction for the alignment film (third alignment film 43) on the second liquid crystal layer 600 side of the third substrate 300 are at the same azimuthal angle. The alignment direction 612A of the second liquid crystal molecules 612 near the fourth substrate 400 and the alignment treatment direction for the alignment film (fourth alignment film 44) on the second liquid crystal layer 600 side of the fourth substrate 400 are at the same azimuthal angle.

Figure 7:
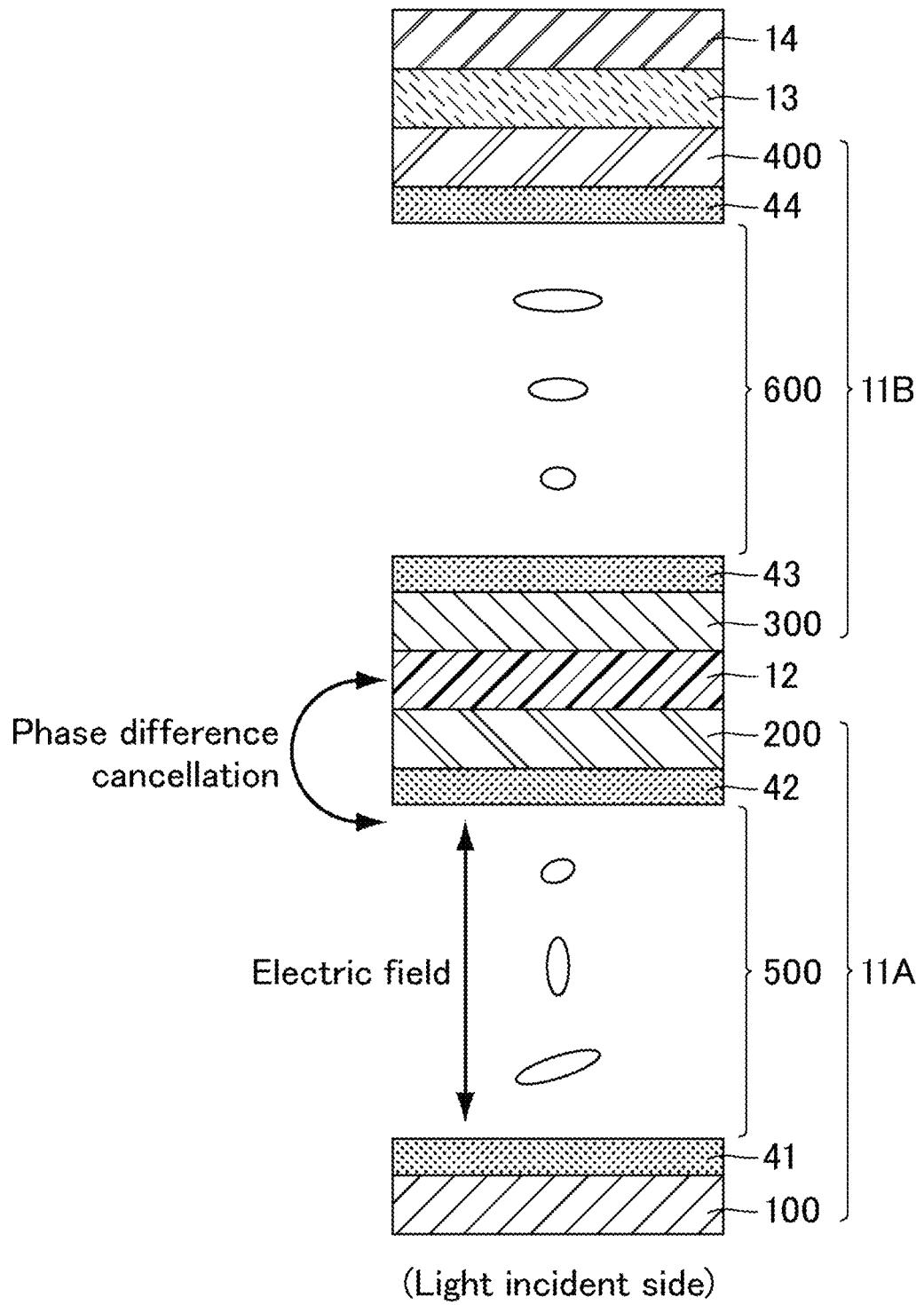
FIG. 7 is a schematic cross-sectional view showing the first state in the optical element of Embodiment 1.
Figure 8:
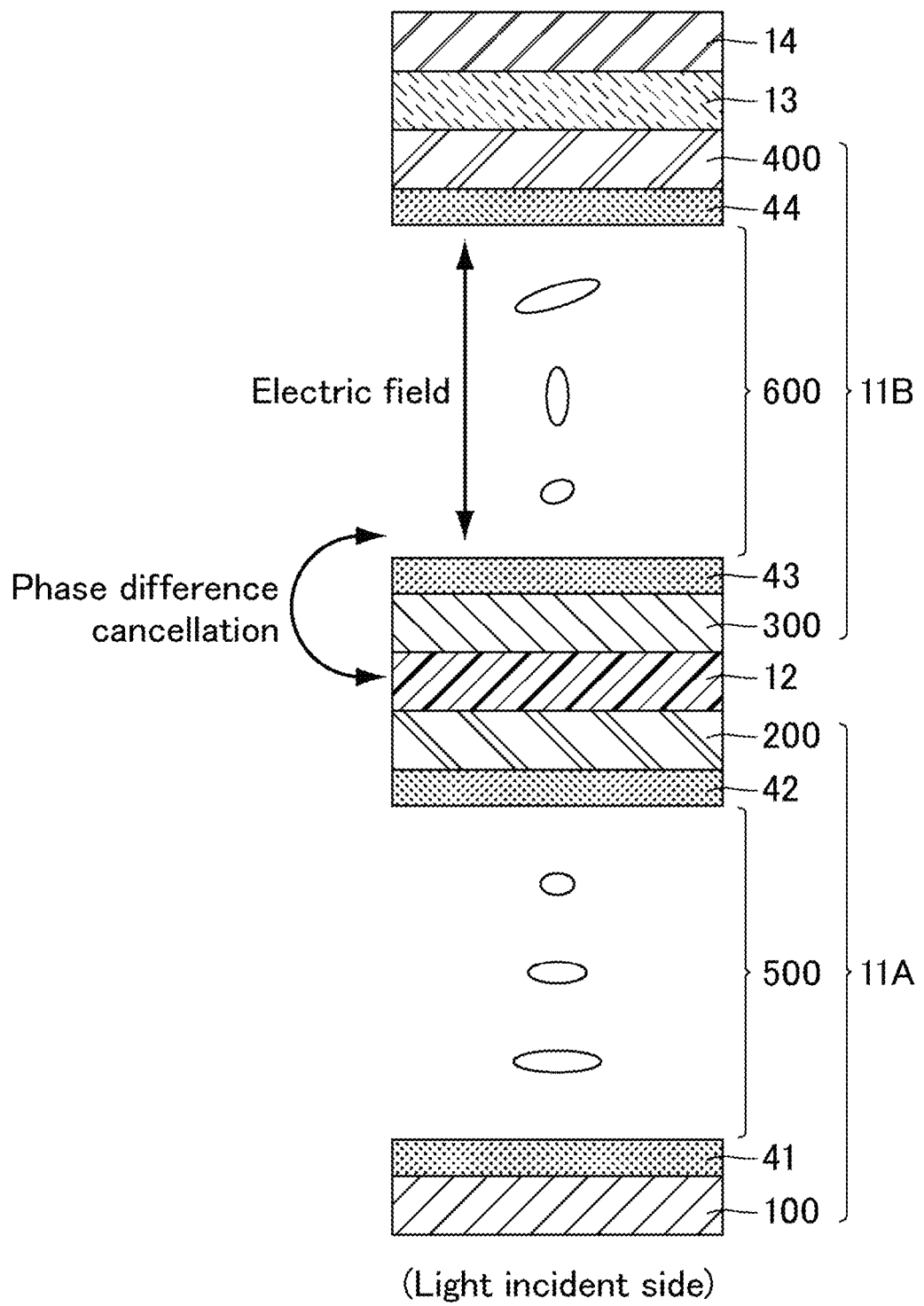
FIG. 8 is a schematic cross-sectional view showing the second state in the optical element of Embodiment 1.

FIG. 7 is a schematic cross-sectional view showing the first state in the optical element of Embodiment 1. FIG. 8 is a schematic cross-sectional view showing the second state in the optical element of Embodiment 1. The optical element 10 of the present embodiment preferably includes a negative C plate 12 between the first liquid crystal cell 11A and the second liquid crystal cell 11B. The optical element 10 with this configuration can, as shown in FIG. 7, use the negative C plate 12 to cancel the phase difference introduced by the first liquid crystal cell 11A to an obliquely incident light in the first state. The optical element 10, as shown in FIG. 8, can also use the negative C plate 12 to cancel the phase difference to be introduced by the second liquid crystal cell 11B to an obliquely incident light in the second state. This enables only the non-driven liquid crystal layer to allow switching between polarization modulation and no polarization modulation over a broader bandwidth and a wider viewing angle range.

Examples of the negative C plate 12 include stretched cycloolefin polymer films.

The thickness direction retardation Rth introduced by the negative C plate 12 is preferably not less than −220 nm and not more than 0 nm. This configuration enables switching between polarization modulation and no polarization modulation over a broader bandwidth. The negative C plate 12 may introduce an in-plane phase difference of several nanometers for manufacturing reasons. Thus, the in-plane phase difference of the negative C plate 12 is, for example, not less than 0 nm and not more than 5 nm.

As shown in the drawings including FIG. 1, the optical element 10 of the present embodiment preferably includes a first quarter-wave film 13 facing the second liquid crystal cell 11B across the first liquid crystal cell 11A or facing the first liquid crystal cell 11A across the second liquid crystal cell 11B. This configuration enables switching between polarization modulation and no polarization modulation over a broader bandwidth.

The optical element 10 of the present embodiment preferably further includes a second quarter-wave film 14 facing the first liquid crystal cell 11A and the second liquid crystal cell 11B across the first quarter-wave film 13. This configuration enables switching between polarization modulation and no polarization modulation over a broader bandwidth.

The quarter-wave films (specifically, the first quarter-wave film 13 and the second quarter-wave film 14) may be any films introducing an in-plane phase difference of not less than 20 nm and not more than 240 nm to at least light having a wavelength of 550 nm.

The quarter-wave films are made of, for example, a photopolymerizable liquid crystal material. The photopolymerizable liquid crystal material has a skeletal liquid crystal molecular structure terminated with a photopolymerizable group such as an acrylate group or a methacrylate group, for example.

The quarter-wave films can each be formed by the following method, for example. First, a photopolymerizable liquid crystal material is dissolved in an organic solvent such as propylene glycol monomethyl ether acetate (PGMEA). Then, the obtained solution is applied to a surface of a base material (for example, polyethylene terephthalate (PET) film) to form a film of the solution. The film of the solution is successively pre-baked, irradiated with light (for example, ultraviolet light), and post-baked, so that a quarter-wave film is formed.

Also, the quarter-wave films may each be a liquid crystal polymer film formed by polymerizing a mixture of the photopolymerizable liquid crystal material and a chiral dopant in a 70°-twisted state.

The quarter-wave films also can each be a stretched polymer film, for example. The polymer film is made of, for example, a cycloolefin polymer, polycarbonate, polysulfone, polyethersulfone, polyethylene terephthalate, polyethylene, polyvinyl alcohol, norbornene, triacetyl cellulose, or diacetyl cellulose.

The first quarter-wave film 13 preferably exhibits reverse wavelength dispersion. This configuration enables switching between polarization modulation and no polarization modulation over a broader bandwidth. Herein, the "wavelength dispersion" of a phase difference film means the correlation between the absolute value of a phase difference introduced by the phase difference film and the wavelength of incident light. The phase difference dispersion where the absolute value of the phase difference introduced by a phase difference film is constant regardless of the wavelength of incident light in the visible spectrum is also referred to as "flat wavelength dispersion". The phase difference dispersion where the absolute value of the phase difference introduced by a phase difference film decreases as the wavelength of incident light becomes longer in the visible spectrum is also referred to as "positive wavelength dispersion". The phase difference dispersion where the absolute value of the phase difference introduced by a phase difference film increases as the wavelength of incident light becomes longer in the visible spectrum is also referred to as "reverse wavelength dispersion".

Preferably, the in-plane phase difference introduced by the first quarter-wave film 13 at a wavelength of 450 nm is not less than 0.7 times and not more than 1 times the in-plane phase difference introduced by the first quarter-wave film 13 at a wavelength of 550 nm. This configuration enables switching between polarization modulation and no polarization modulation over a broader bandwidth.

Preferably, the in-plane phase difference introduced by the first quarter-wave film 13 at a wavelength of 650 nm is not less than 1 times and not more than 1.3 times the in-plane phase difference introduced by the first quarter-wave film 13 at a wavelength of 550 nm. This configuration enables switching between polarization modulation and no polarization modulation over a broader bandwidth.

A slow axis 13A of the first quarter-wave film 13 shown in FIG. 3 is preferably at an azimuthal angle of not smaller than 52° and not greater than 60°. This configuration enables switching between polarization modulation and no polarization modulation over a broader bandwidth.

Preferably, the in-plane phase difference introduced by the first quarter-wave film 13 at a wavelength of 550 nm is not less than 90 nm and not more than 170 nm. This configuration enables switching between polarization modulation and no polarization modulation over a broader bandwidth.

Preferably, the second quarter-wave film 14 exhibits flat wavelength dispersion. This configuration enables switching between polarization modulation and no polarization modulation over a broader bandwidth.

Preferably, a slow axis 14A of the second quarter-wave film 14 shown in FIG. 3 is at an azimuthal angle of not smaller than 8° and not greater than 18°. This configuration enables switching between polarization modulation and no polarization modulation over a broader bandwidth.

Preferably, the in-plane phase difference introduced by the second quarter-wave film 14 at a wavelength of 550 nm is not less than 120 nm and not more than 150 nm. This configuration enables switching between polarization modulation and no polarization modulation over a broader bandwidth.

Preferably, light incident on the optical element 10 is circularly polarized light. This configuration achieves an optical element 10 capable of switching the polarization states of circularly polarized light.

Modified Example 1 of Embodiment 1

In the present modified example, the optical element 10 of Embodiment 1 further includes a first positive C plate facing the second liquid crystal cell 11B across the first liquid crystal cell 11A and a second positive C plate facing the first liquid crystal cell 11A across the second liquid crystal cell 11B.

Figure 9:
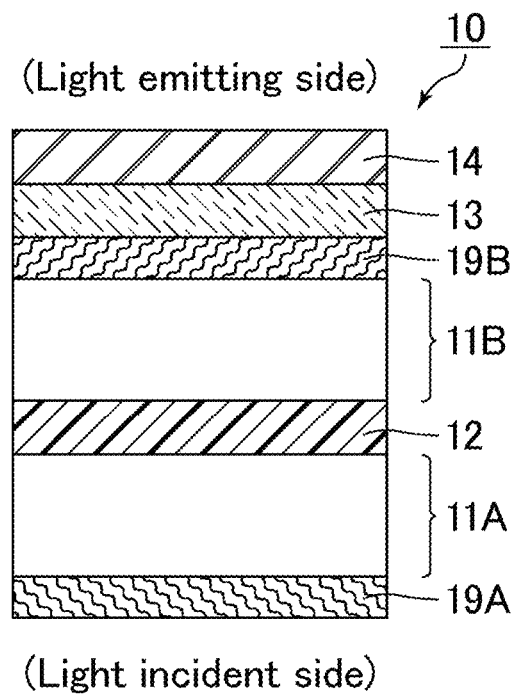
FIG. 9 is a schematic cross-sectional view of an optical element of Modified Example 1 of Embodiment 1.

FIG. 9 is a schematic cross-sectional view of an optical element of Modified Example 1 of Embodiment 1. The optical element 10 of the present embodiment as shown in FIG. 9 further includes a first positive C plate 19A facing the second liquid crystal cell 11B across the first liquid crystal cell 11A and a second positive C plate 19B facing the first liquid crystal cell 11A across the second liquid crystal cell 11B. This configuration enables switching between polarization modulation and no polarization modulation over a broader bandwidth.

As shown in FIG. 9, the second positive C plate 19B is preferably disposed between the second liquid crystal cell 11B and the first quarter-wave film 13. This configuration enables switching between polarization modulation and no polarization modulation over a broader bandwidth.

The first positive C plate 19A and the second positive C plate 19B can each appropriately be, for example, a horizontally and vertically biaxially stretched film containing a material having a negative intrinsic birefringence as its component, or a film coated with a liquid crystalline material such as nematic liquid crystal.

The thickness direction retardation Rth introduced by the first positive C plate 19A is preferably not less than 0 nm and not more than 190 nm. This configuration enables switching between polarization modulation and no polarization modulation over a broader bandwidth.

The thickness direction retardation Rth introduced by the second positive C plate 19B is preferably not less than 0 nm and not more than 220 nm. This configuration enables switching between polarization modulation and no polarization modulation over a broader bandwidth.

The first positive C plate 19A and the second positive C plate 19B may introduce an in-plane phase difference of several nanometers for manufacturing reasons. Thus, the in-plane phase difference of each of the first positive C plate 19A and the second positive C plate 19B is, for example, not less than 0 nm and not more than 5 nm. The thickness direction retardations Rth introduced by the first positive C plate 19A and the second positive C plate 19B may be the same as or different from each other. The in-plane phase differences introduced by the first positive C plate 19A and the second positive C plate 19B may be the same as or different from each other.

Modified Example 2 of Embodiment 1

In Modified Example 1 of Embodiment 1, the mode has been described where the optical element 10 includes the first positive C plate 19A facing the second liquid crystal cell 11B across the first liquid crystal cell 11A and includes the second positive C plate 19B, the first quarter-wave film 13, and the second quarter-wave film 14 which face the first liquid crystal cell 11A across the second liquid crystal cell 11B. There may be no first positive C plate 19A facing the second liquid crystal cell 11B across the first liquid crystal cell 11A. The structure of each phase difference layer facing the first liquid crystal cell 11A across the second liquid crystal cell 11B is not limited to that in Modified Example 1 of Embodiment 1 and may be any of the structures as described below.

<First Structure>

Figure 81:
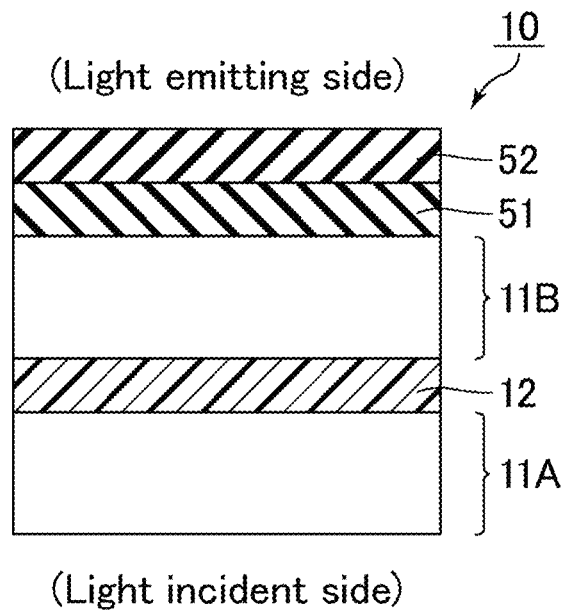
FIG. 81 is a schematic cross-sectional view of an optical element having a first structure of Modified Example 2 of Embodiment 1.
Figure 82:
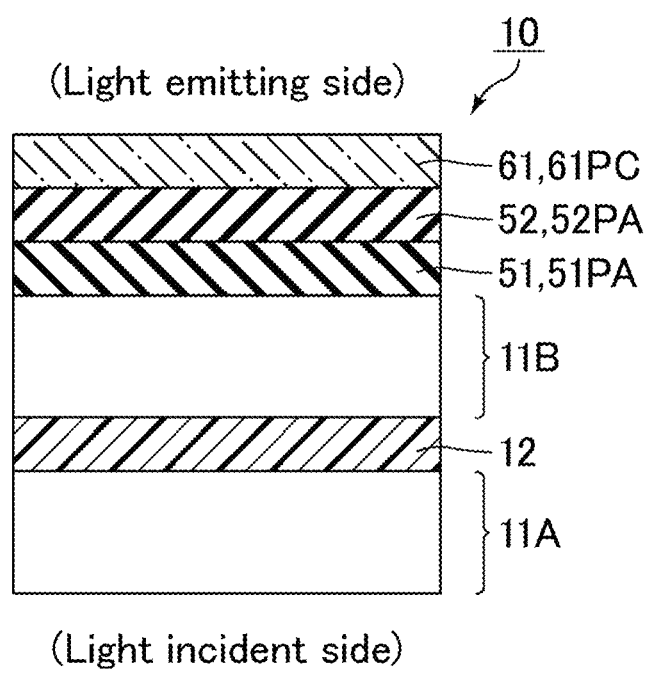
FIG. 82 is an example of a schematic cross-sectional view of an optical element having a second structure of Modified Example 2 of Embodiment 1.
Figure 83:
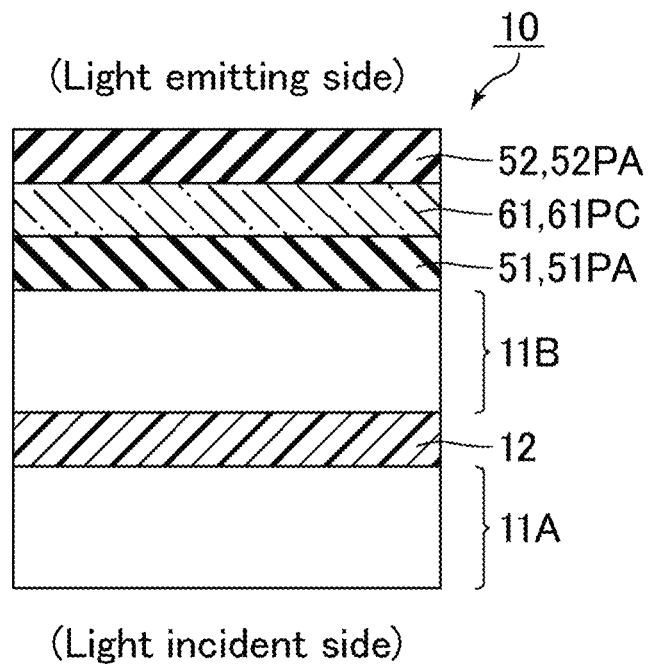
FIG. 83 is an example of a schematic cross-sectional view of an optical element having the second structure of Modified Example 2 of Embodiment 1.
Figure 84:
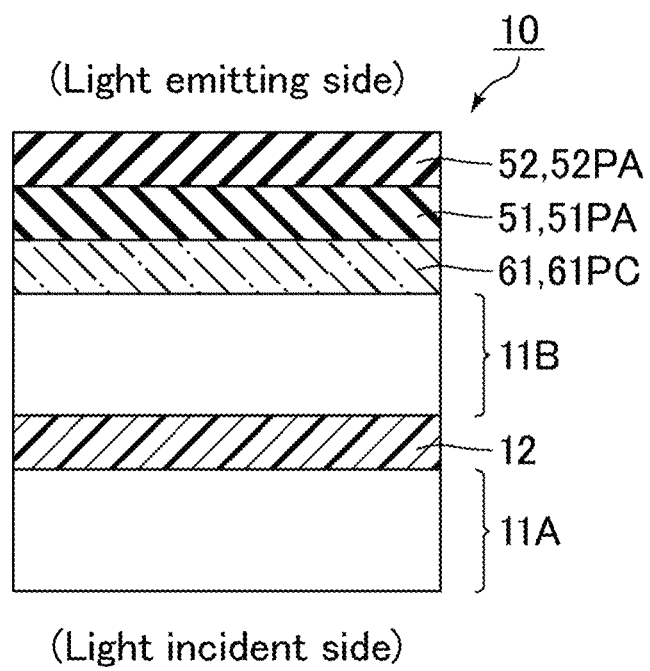
FIG. 84 is an example of a schematic cross-sectional view of an optical element having the second structure of Modified Example 2 of Embodiment 1.
Figure 85:
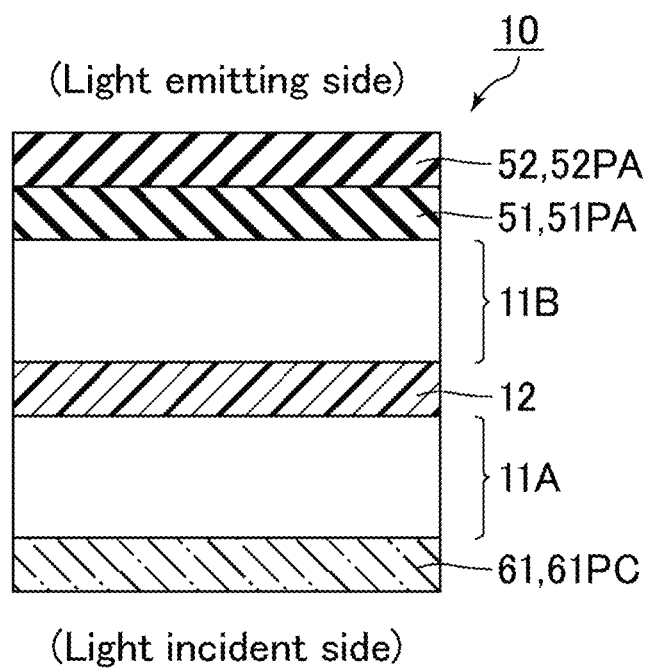
FIG. 85 is an example of a schematic cross-sectional view of an optical element having the second structure of Modified Example 2 of Embodiment 1.
Figure 86:
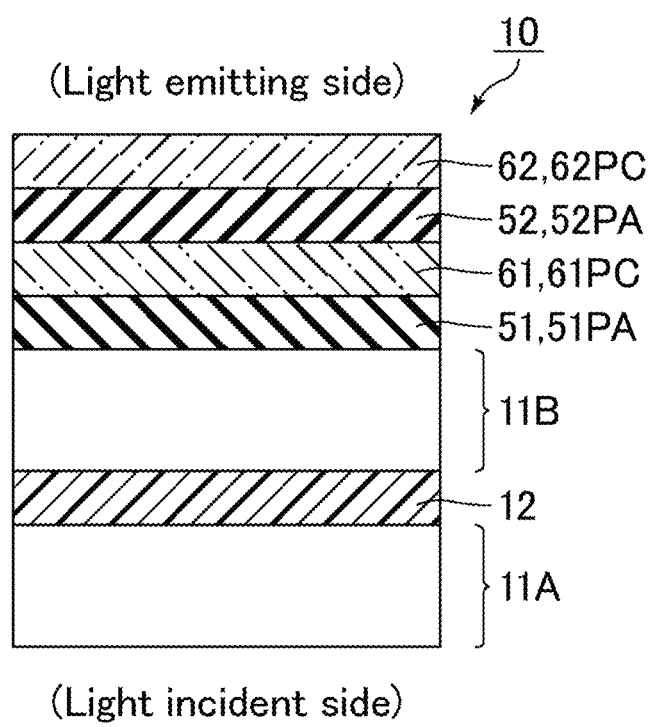
FIG. 86 is an example of a schematic cross-sectional view of an optical element having a third structure of Modified Example 2 of Embodiment 1.
Figure 87:
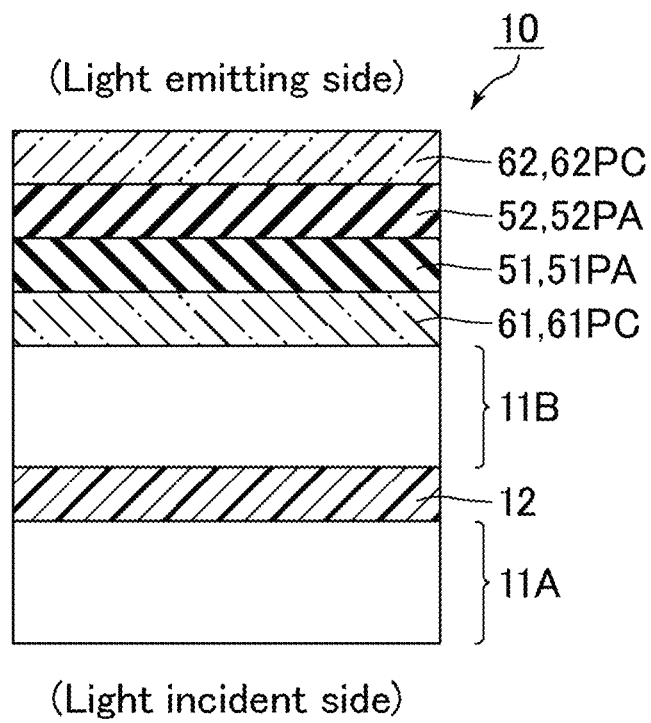
FIG. 87 is an example of a schematic cross-sectional view of an optical element having the third structure of Modified Example 2 of Embodiment 1.
Figure 88:
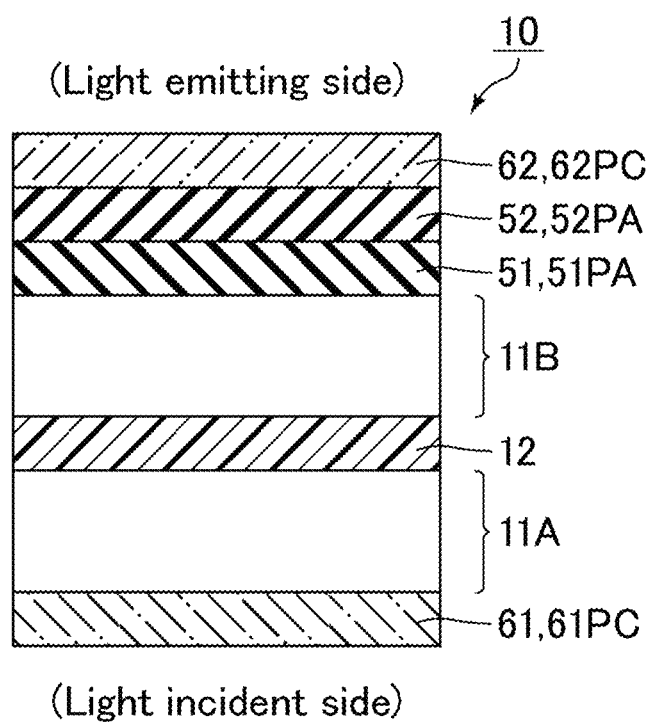
FIG. 88 is an example of a schematic cross-sectional view of an optical element having the third structure of Modified Example 2 of Embodiment 1.
Figure 89:
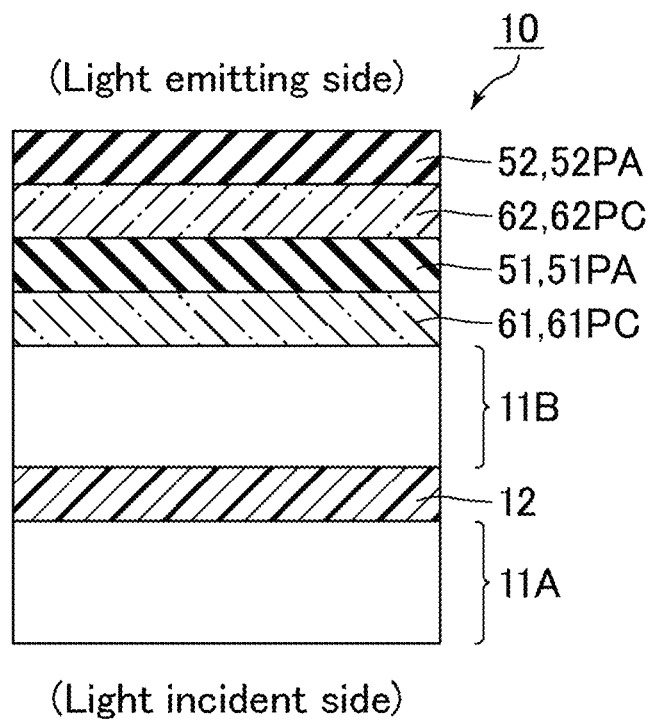
FIG. 89 is an example of a schematic cross-sectional view of an optical element having the third structure of Modified Example 2 of Embodiment 1.
Figure 90:
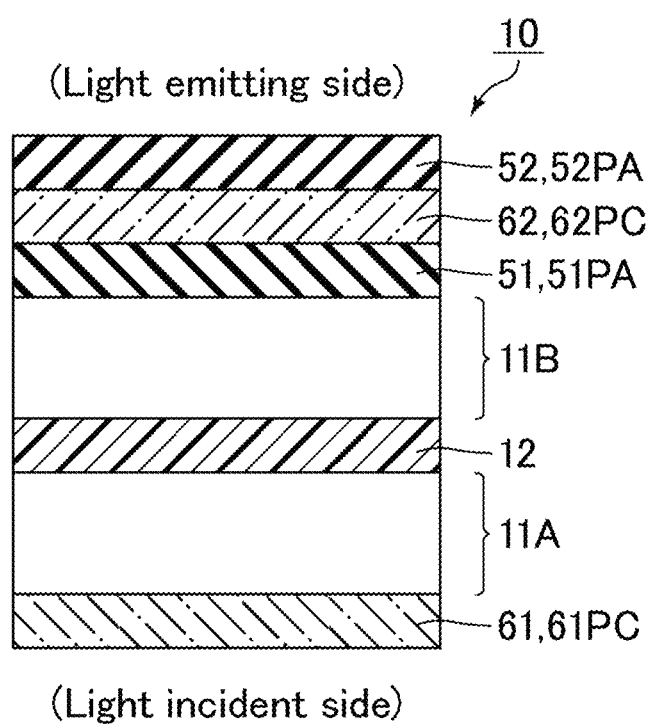
FIG. 90 is an example of a schematic cross-sectional view of an optical element having the third structure of Modified Example 2 of Embodiment 1.
Figure 91:
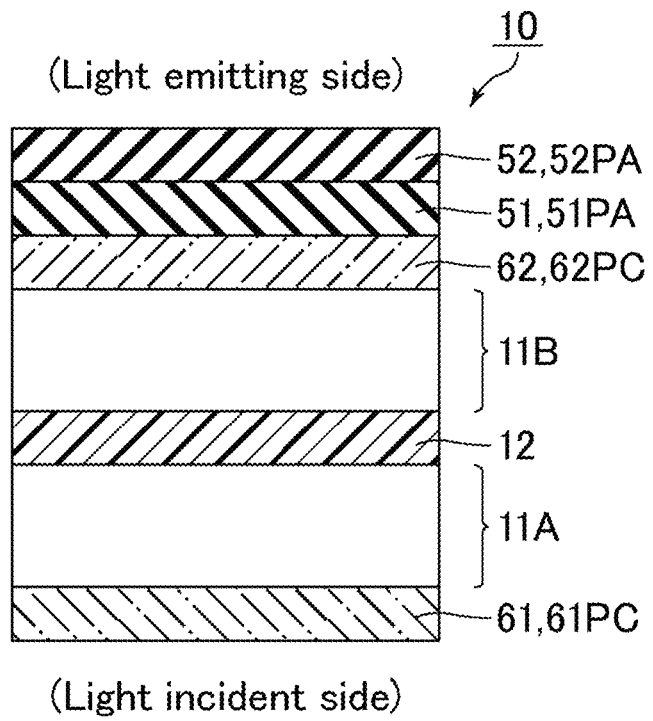
FIG. 91 is an example of a schematic cross-sectional view of an optical element having the third structure of Modified Example 2 of Embodiment 1.
Figure 92:
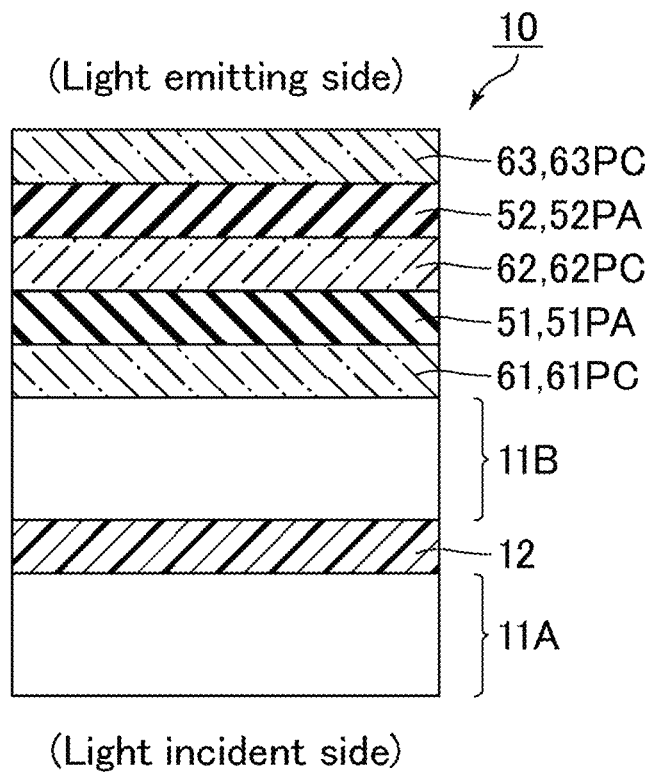
FIG. 92 is an example of a schematic cross-sectional view of an optical element having a fourth structure of Modified Example 2 of Embodiment 1.
Figure 93:
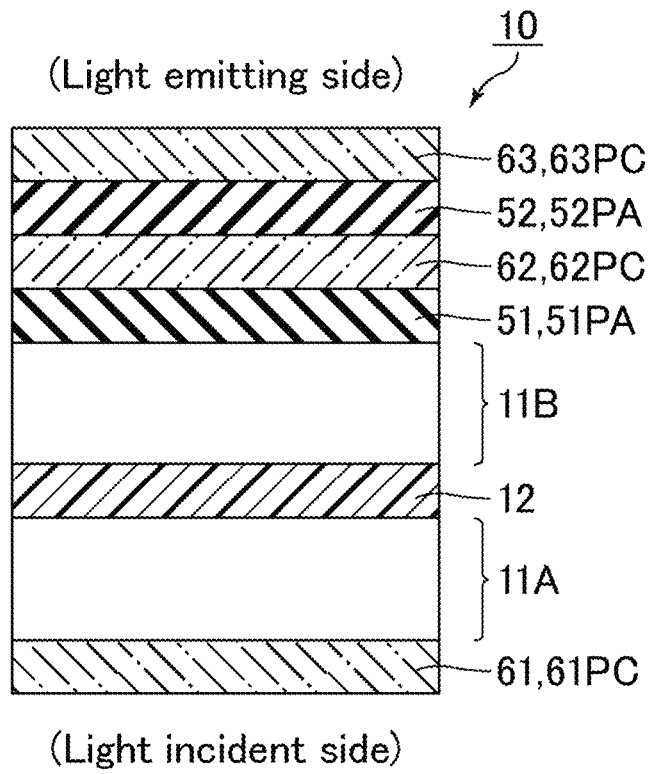
FIG. 93 is an example of a schematic cross-sectional view of an optical element having the fourth structure of Modified Example 2 of Embodiment 1.
Figure 94:
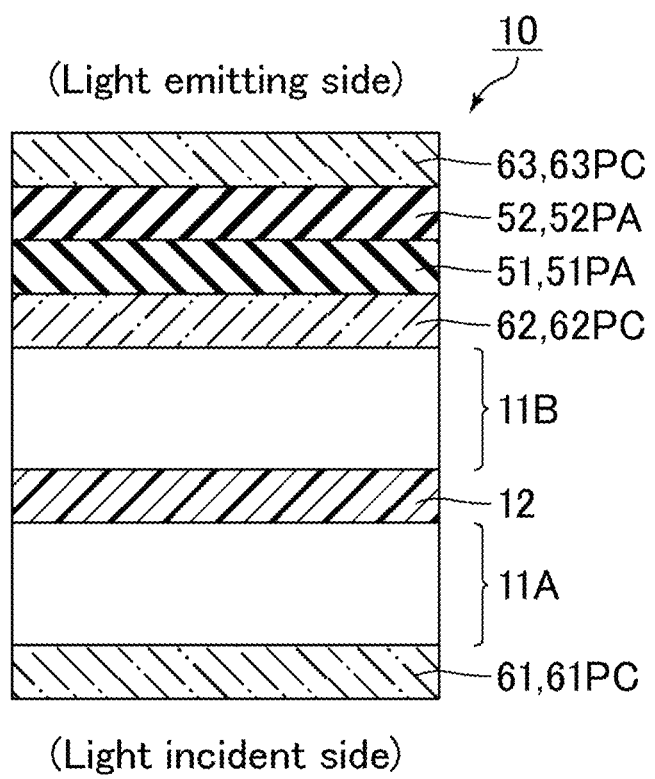
FIG. 94 is an example of a schematic cross-sectional view of an optical element having the fourth structure of Modified Example 2 of Embodiment 1.
Figure 95:
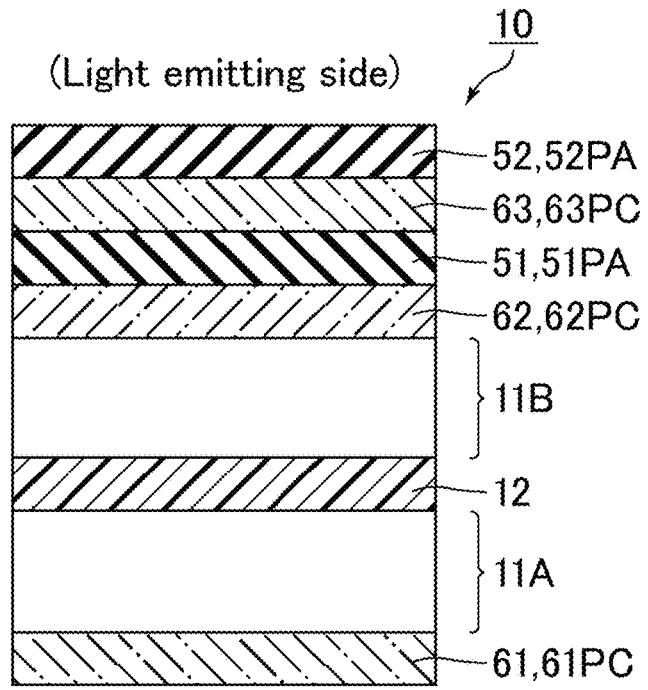
FIG. 95 is an example of a schematic cross-sectional view of an optical element having the fourth structure of Modified Example 2 of Embodiment 1.

FIG. 81 is a schematic cross-sectional view of an optical element having a first structure of Modified Example 2 of Embodiment 1. As shown in FIG. 81, an optical element 10 having the first structure of Modified Example 2 of Embodiment 1 includes a first A plate 51 and a second A plate 52 closer to the light emitting side than the first A plate 51 is, the plates facing the first liquid crystal cell 11A across the second liquid crystal cell 11B. In other words, the optical element 10 includes, sequentially from the side closer to the second liquid crystal cell 11B, the first A plate 51 and the second A plate 52 which face the first liquid crystal cell 11A across the second liquid crystal cell 11B. The optical element 10 includes no first positive C plate 19A facing the second liquid crystal cell 11B across the first liquid crystal cell 11A.

An A plate has refractive indices (nx, ny, nz) which satisfy the following Formula N1 or Formula N2. An A plate satisfying Formula N1 is also referred to as a positive A plate. An A plate satisfying Formula N2 is also referred to as a negative A plate. The first A plate 51 and the second A plate 52 are preferably positive A plates. The first quarter-wave film 13 and the second quarter-wave film 14 in Embodiment 1 are positive A plates. When the first A plate 51 and the second A plate 52 are positive A plates, the first quarter-wave film 13 in Embodiment 1 corresponds to the first A plate 51 and the second quarter-wave film 14 in Embodiment 1 corresponds to the second A plate 52. Due to manufacturing variations, a positive A plate may have refractive indices in the relationship of nx>ny>nz, and a negative A plate may have refractive indices in the relationship of nz>nx>ny or nx>nz>ny.

$$nx>ny=nz \quad \text{(Formula N1)}$$

$$nz=nx>ny \quad \text{(Formula N2)}$$

Here, "nx" is the refractive index in a direction in which the in-plane refractive index is maximum (i.e., slow axis direction); "ny" is the refractive index in a direction perpendicular to the slow axis in the plane; and "nz" is the refractive index in the thickness direction. The refractive index is, unless otherwise specified, a value for light having a wavelength of 550 nm at 23° C. The "light incident side" means the side of the optical element on which light is incident, and the "light emitting side" means the side of the optical element from which light is emitted.

The first A plate 51 may exhibit reverse wavelength dispersion, flat wavelength dispersion, or positive wavelength dispersion (normal wavelength dispersion), and preferably exhibits reverse wavelength dispersion. The second A plate 52 may exhibit reverse wavelength dispersion, flat wavelength dispersion, or positive wavelength dispersion, and preferably exhibits flat wavelength dispersion or positive wavelength dispersion.

Based on the first structure shown in FIG. 81, the phase difference layers are preferably arranged such that the layers satisfy at least one of the following Conditions (1) to (5). A C plate has refractive indices (nx, ny, nz) satisfying the following Formula N3 or Formula N4. A C plate satisfying Formula N3 is also referred to as a positive C plate. A C plate satisfying Formula N4 is also referred to as a negative C plate. Due to manufacturing variations, a C plate may introduce an in-plane phase difference Re of several nanometers.

$$nz>nx=ny \quad \text{(Formula N3)}$$

$$nx=ny>nz \quad \text{(Formula N4)}$$

(Condition 1) The optical element 10 includes at least one of a positive C plate facing the second liquid crystal cell 11B across the first liquid crystal cell 11A or a positive C plate facing the first liquid crystal cell 11A across the second liquid crystal cell 11B. This configuration can widen the viewing angle range.

(Condition 2) When at least one of the first A plate 51 or the second A plate 52 is a positive A plate, the optical element 10 includes at least one of a positive C plate on the light incident side of the positive A plate or a positive C plate on the light emitting side of the positive A plate. This configuration can widen the viewing angle range.

(Condition 3) When at least one of the first A plate 51 or the second A plate 52 is a negative A plate, the optical element 10 includes at least one of a negative C plate on the light incident side of the negative A plate or a negative C plate on the light emitting side of the negative A plate. This configuration can widen the viewing angle range.

(Condition 4) When at least one of the first A plate 51 or the second A plate 52 is a negative A plate, the optical element 10 includes a positive C plate or a negative C plate between the second liquid crystal cell 11B and the negative A plate. This configuration can widen the viewing angle range.

(Condition 5) When one of the first A plate 51 and the second A plate 52 is a positive A plate and the other is a negative A plate, the optical element 10 includes a positive C plate or a negative C plate between the positive A plate and the negative A plate. This configuration can widen the viewing angle range.

Structures (second structure to seventeenth structure) having the first structure and satisfying at least one of Conditions (1) to (5) are described below.

<Second Structure>

FIG. 82 to FIG. 85 each are an example of a schematic cross-sectional view of an optical element having a second structure of Modified Example 2 of Embodiment 1. As shown in FIG. 82 to FIG. 85, in an optical element 10 having the second structure, the first A plate 51 in the first structure is a positive A plate 51PA and the second A plate 52 in the first structure is a positive A plate 52PA. The optical element 10 further includes a C plate 61. The C plate 61 faces the second liquid crystal cell 11B across the first liquid crystal cell 11A or faces the first liquid crystal cell 11A across the second liquid crystal cell 11B.

When the C plate 61 faces the second liquid crystal cell 11B across the first liquid crystal cell 11A, the C plate 61 is preferably a positive C plate 61PC. When the C plate 61 faces the first liquid crystal cell 11A across the second liquid crystal cell 11B and the positive A plate 52PA is adjacent to the light incident side of the C plate 61, the C plate 61 is preferably a positive C plate 61PC.

<Third Structure>

FIG. 86 to FIG. 91 each are an example of a schematic cross-sectional view of an optical element having a third structure of Modified Example 2 of Embodiment 1. As shown in FIG. 86 to FIG. 91, in an optical element 10 having the third structure, the first A plate 51 in the first structure is a positive A plate 51PA and the second A plate 52 in the first structure is a positive A plate 52PA. The optical element 10 further includes a first C plate 61 and a second C plate 62 closer to the light emitting side than the first C plate 61 is. The first C plate 61 faces the second liquid crystal cell 11B across the first liquid crystal cell 11A or faces the first liquid crystal cell 11A across the second liquid crystal cell 11B. The second C plate 62 faces the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the second C plate 62 faces the first liquid crystal cell 11A across the second liquid crystal cell 11B and the positive A plate 52PA is adjacent to the light incident side of the second C plate 62, the second C plate 62 is preferably a positive C plate 62PC. The structure shown in FIG. 91 corresponds to the structure in Embodiment 1.

When a plurality of C plates faces the first liquid crystal cell 11A across the second liquid crystal cell 11B, the C plates are preferably not adjacent to one another. Specifically, at least one A plate is preferably disposed between the C plates.

<Fourth Structure>

FIG. 92 to FIG. 95 each are an example of a schematic cross-sectional view of an optical element having a fourth structure of Modified Example 2 of Embodiment 1. As shown in FIG. 92 to FIG. 95, in an optical element 10 having the fourth structure, the first A plate 51 in the first structure is a positive A plate 51PA and the second A plate 52 in the first structure is a positive A plate 52PA. The optical element 10 further includes a first C plate 61; a second C plate 62 closer to the light emitting side than the first C plate 61 is; and a third C plate 63 closer to the light emitting side than the second C plate 62 is. The first C plate 61 faces the second liquid crystal cell 11B across the first liquid crystal cell 11A or faces the first liquid crystal cell 11A across the second liquid crystal cell 11B. The second C plate 62 and the third C plate 63 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the third C plate 63 faces the first liquid crystal cell 11A across the second liquid crystal cell 11B and the positive A plate 52PA is adjacent to the light incident side of the third C plate 63, the third C plate 63 is preferably a positive C plate 63PC.

When a plurality of C plates faces the first liquid crystal cell 11A across the second liquid crystal cell 11B, the C plates are preferably not adjacent to one another. Specifically, at least one A plate is preferably disposed between the C plates.

<Fifth Structure>

Figure 96:
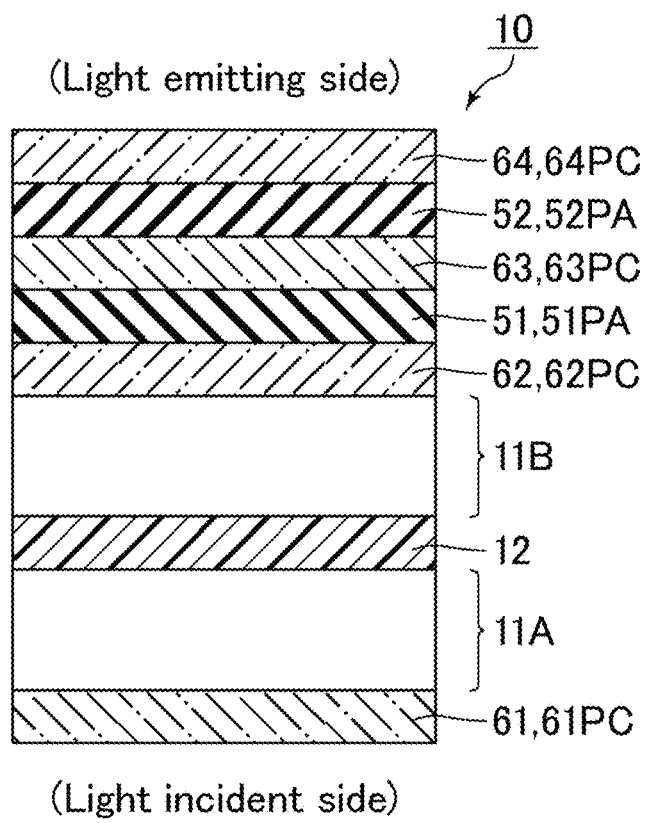
FIG. 96 is an example of a schematic cross-sectional view of an optical element having a fifth structure of Modified Example 2 of Embodiment 1.
Figure 97:
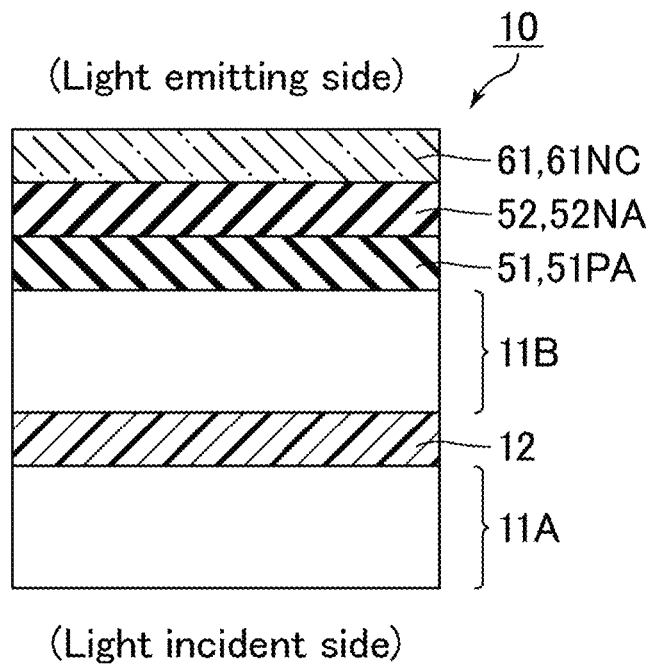
FIG. 97 is an example of a schematic cross-sectional view of an optical element having a sixth structure of Modified Example 2 of Embodiment 1.
Figure 98:
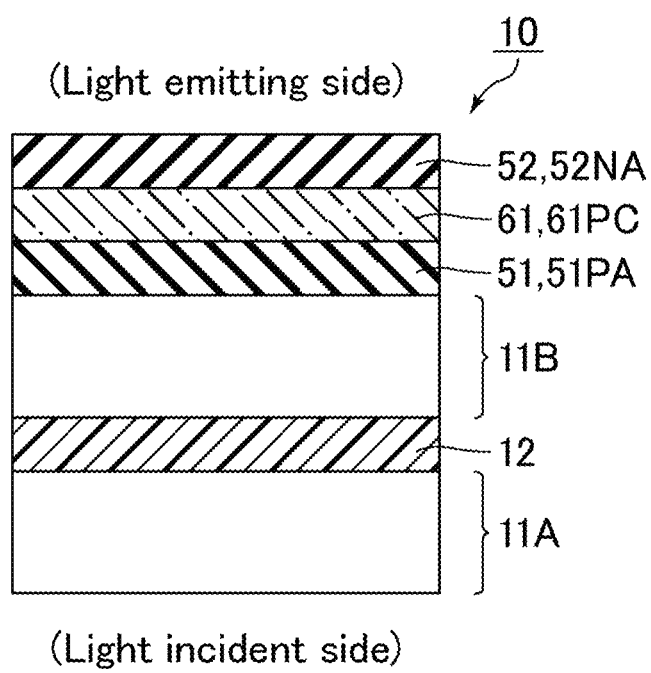
FIG. 98 is an example of a schematic cross-sectional view of an optical element having the sixth structure of Modified Example 2 of Embodiment 1.
Figure 99:
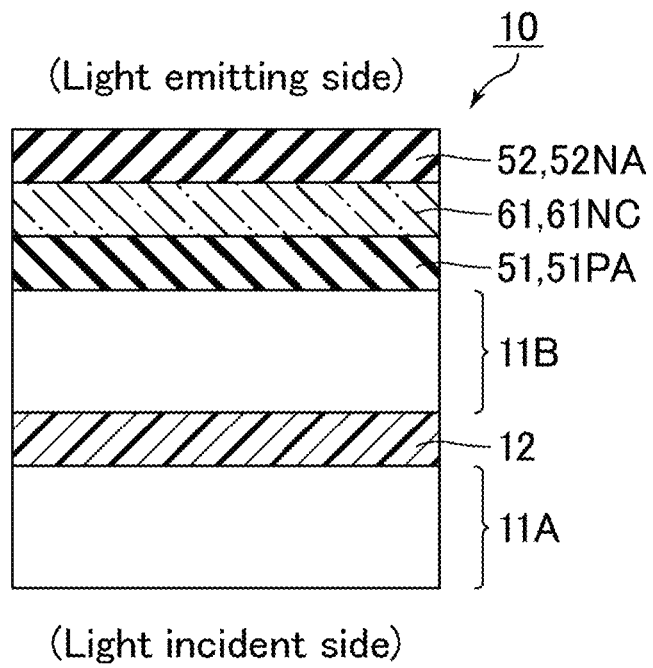
FIG. 99 is an example of a schematic cross-sectional view of an optical element having the sixth structure of Modified Example 2 of Embodiment 1.
Figure 100:
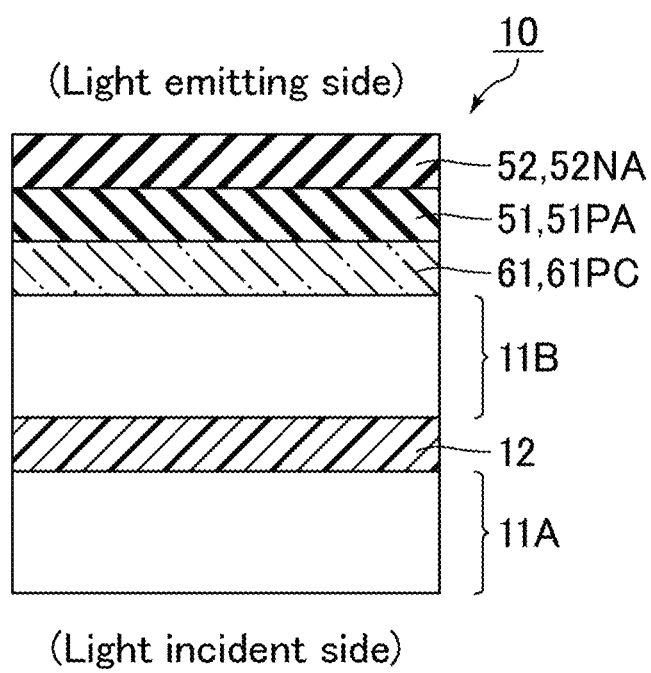
FIG. 100 is an example of a schematic cross-sectional view of an optical element having the sixth structure of Modified Example 2 of Embodiment 1.
Figure 101:
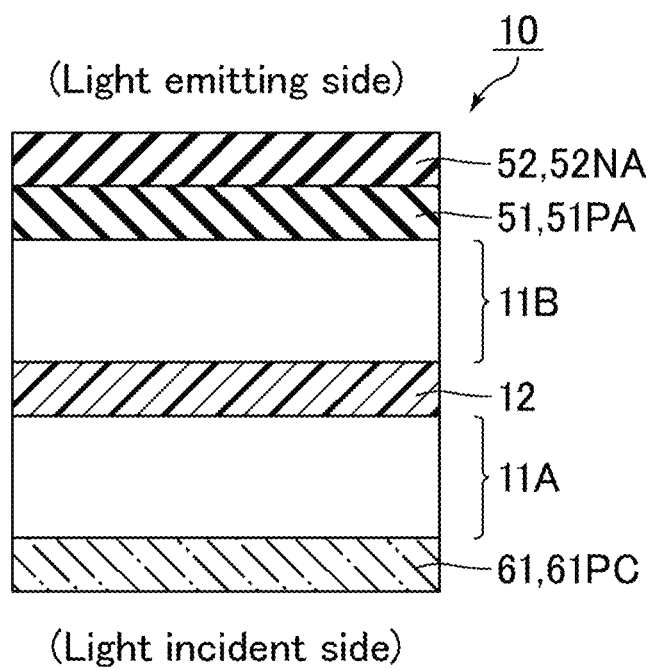
FIG. 101 is an example of a schematic cross-sectional view of an optical element having the sixth structure of Modified Example 2 of Embodiment 1.
Figure 102:
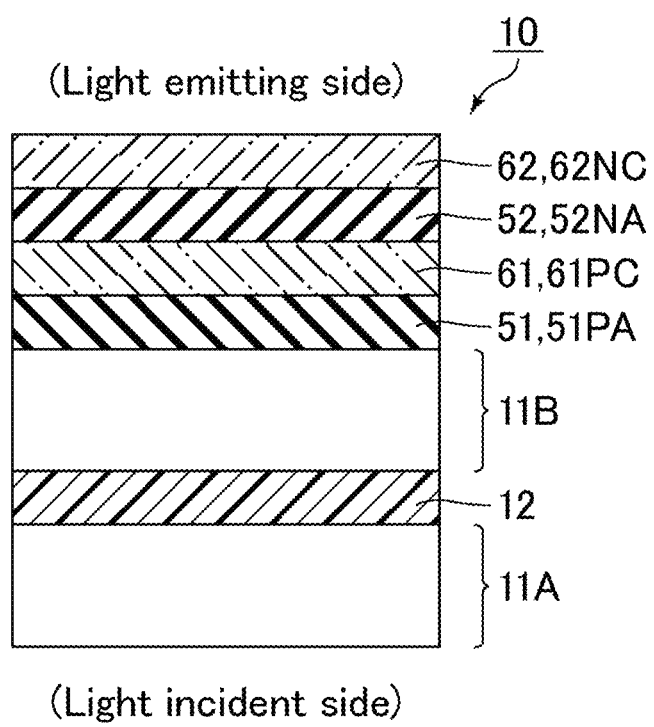
FIG. 102 is an example of a schematic cross-sectional view of an optical element having a seventh structure of Modified Example 2 of Embodiment 1.
Figure 103:
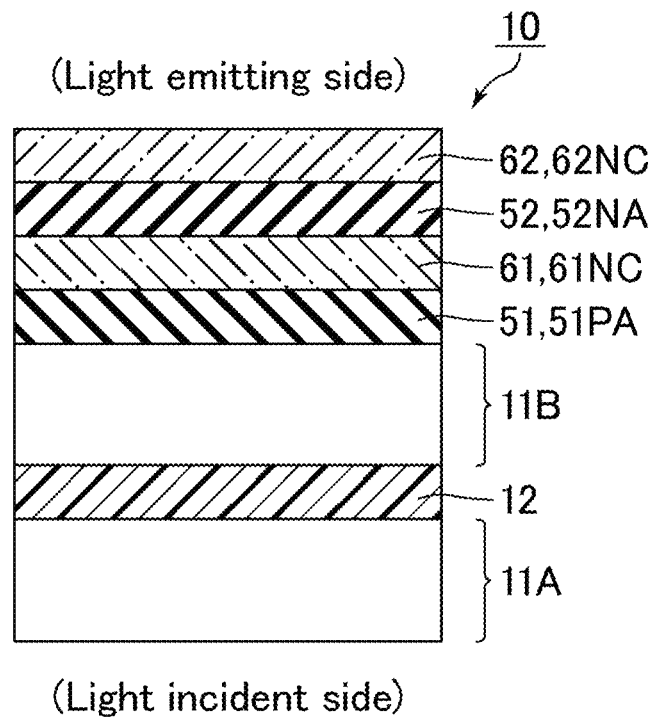
FIG. 103 is an example of a schematic cross-sectional view of an optical element having the seventh structure of Modified Example 2 of Embodiment 1.
Figure 104:
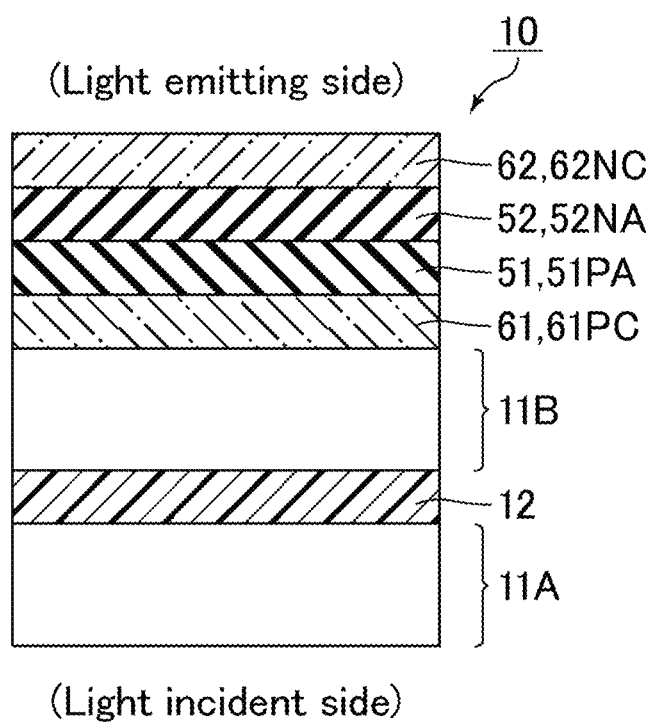
FIG. 104 is an example of a schematic cross-sectional view of an optical element having the seventh structure of Modified Example 2 of Embodiment 1.
Figure 105:
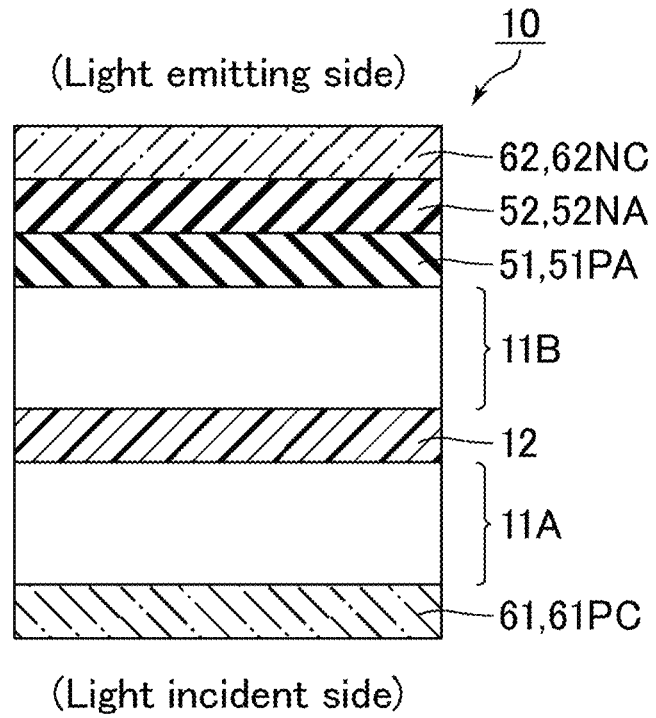
FIG. 105 is an example of a schematic cross-sectional view of an optical element having the seventh structure of Modified Example 2 of Embodiment 1.
Figure 106:
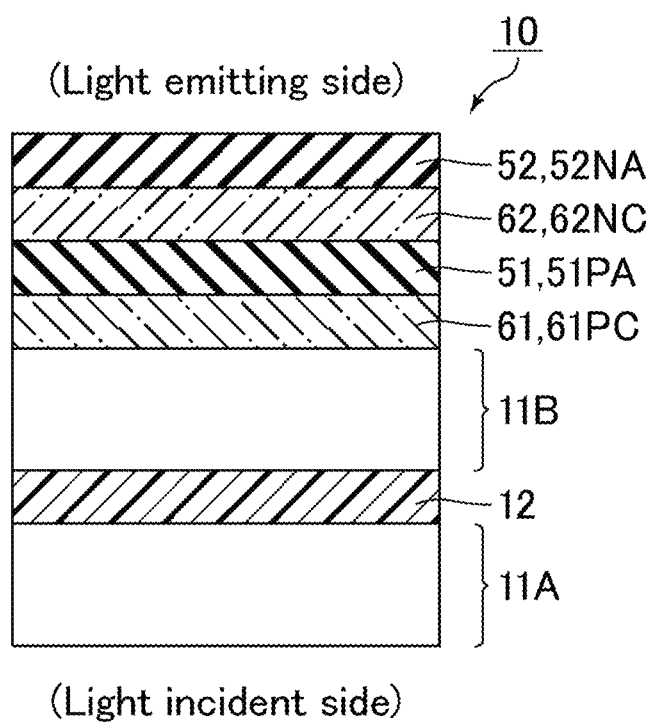
FIG. 106 is an example of a schematic cross-sectional view of an optical element having the seventh structure of Modified Example 2 of Embodiment 1.
Figure 107:
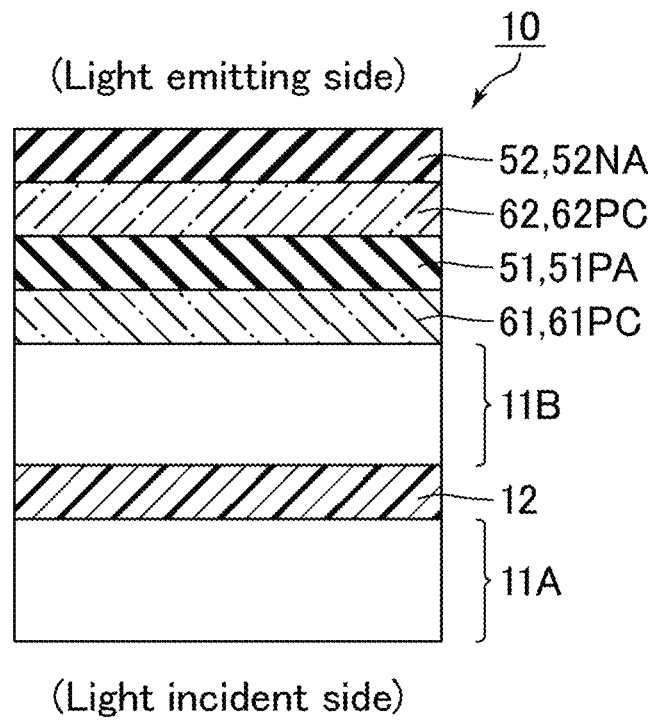
FIG. 107 is an example of a schematic cross-sectional view of an optical element having the seventh structure of Modified Example 2 of Embodiment 1.
Figure 108:
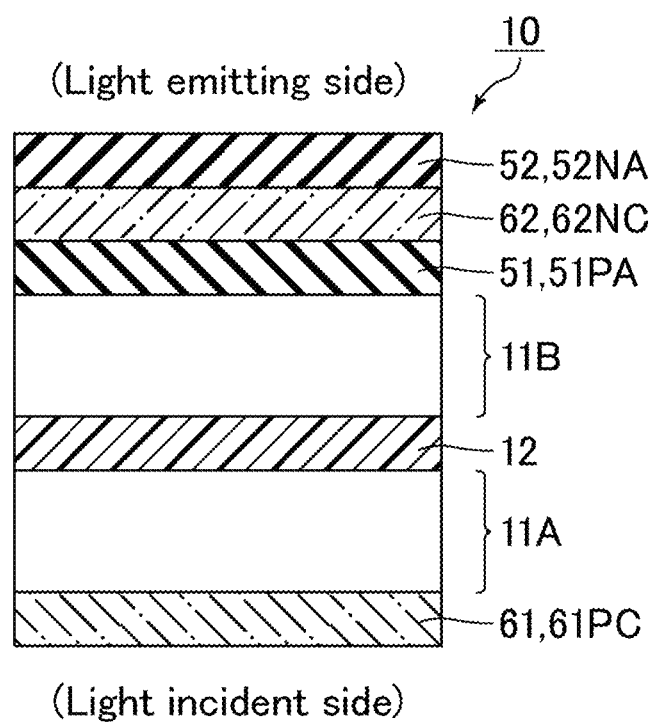
FIG. 108 is an example of a schematic cross-sectional view of an optical element having the seventh structure of Modified Example 2 of Embodiment 1.
Figure 109:
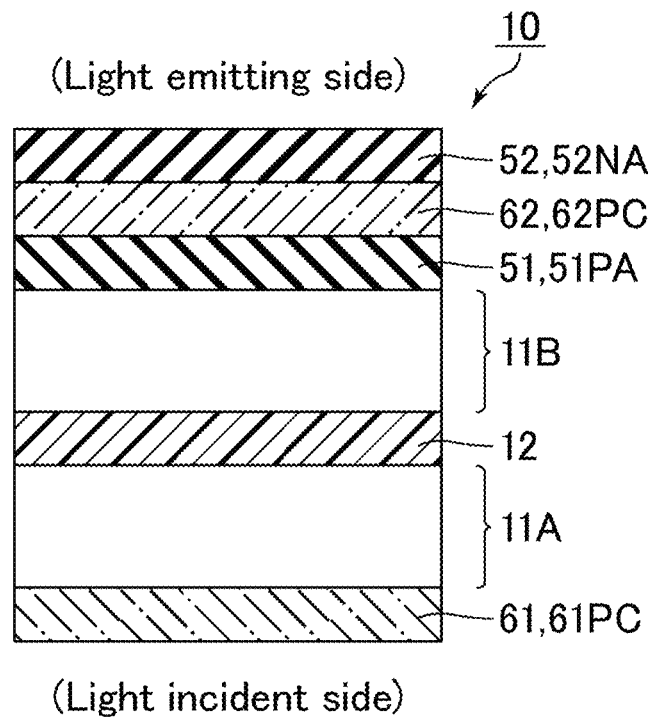
FIG. 109 is an example of a schematic cross-sectional view of an optical element having the seventh structure of Modified Example 2 of Embodiment 1.
Figure 110:
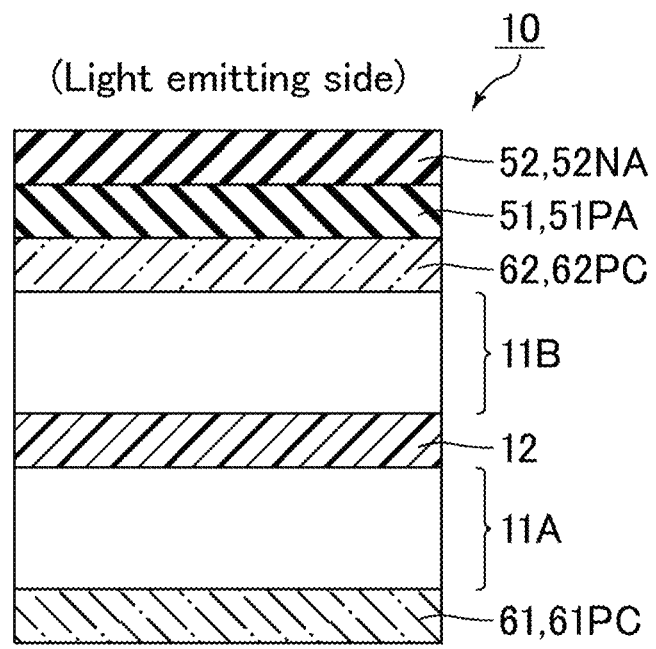
FIG. 110 is an example of a schematic cross-sectional view of an optical element having the seventh structure of Modified Example 2 of Embodiment 1.
Figure 111:
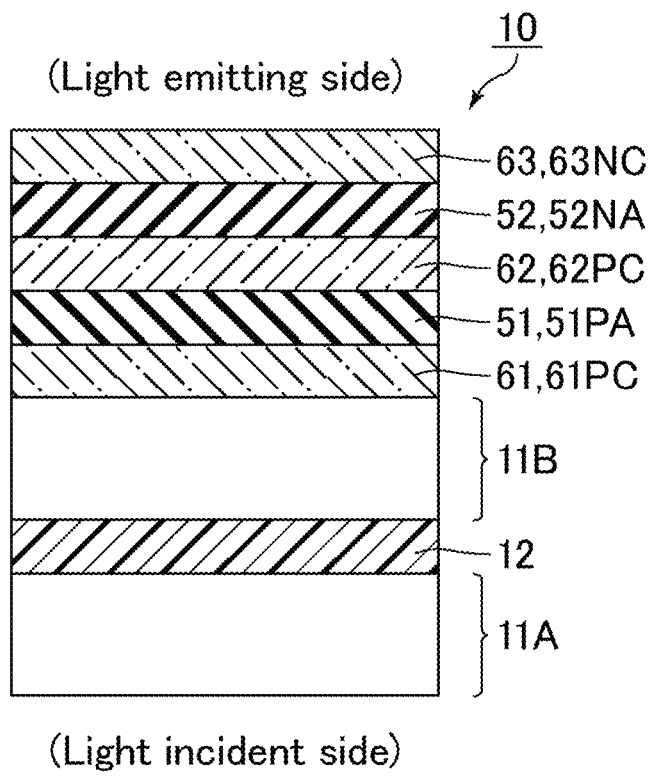
FIG. 111 is an example of a schematic cross-sectional view of an optical element having an eighth structure of Modified Example 2 of Embodiment 1.
Figure 112:
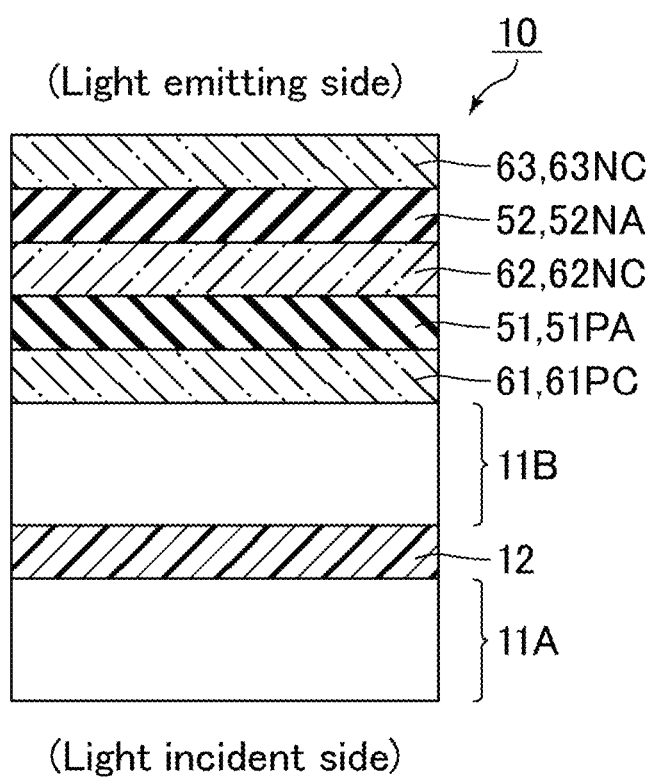
FIG. 112 is an example of a schematic cross-sectional view of an optical element having the eighth structure of Modified Example 2 of Embodiment 1.
Figure 113:
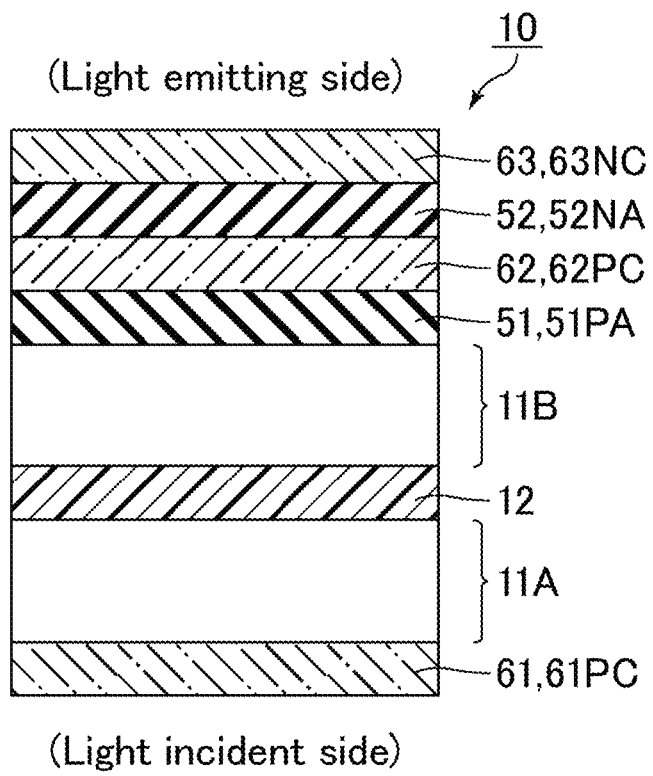
FIG. 113 is an example of a schematic cross-sectional view of an optical element having the eighth structure of Modified Example 2 of Embodiment 1.
Figure 114:
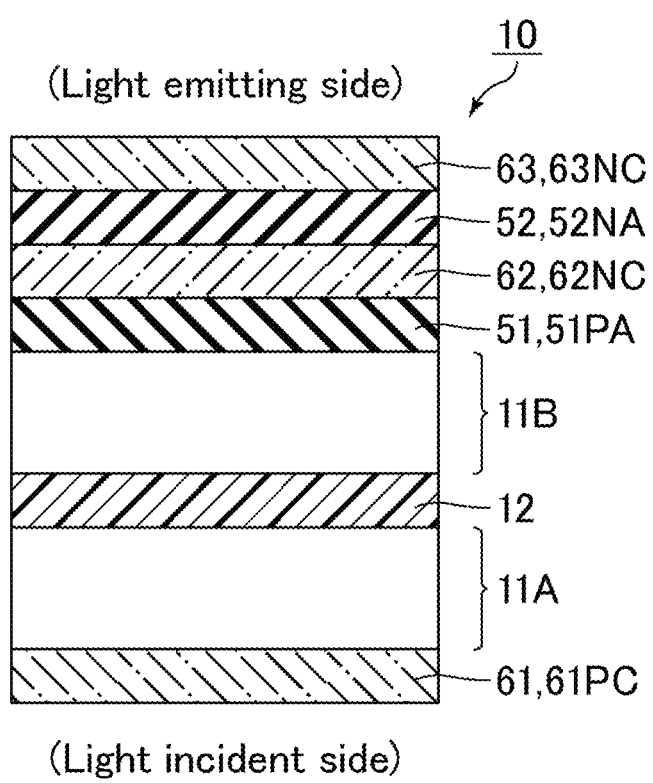
FIG. 114 is an example of a schematic cross-sectional view of an optical element having the eighth structure of Modified Example 2 of Embodiment 1.
Figure 115:
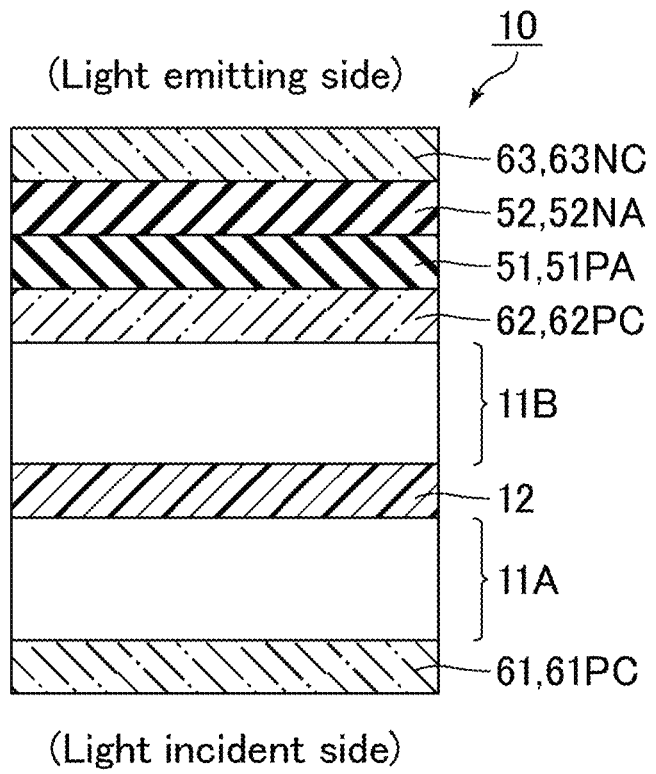
FIG. 115 is an example of a schematic cross-sectional view of an optical element having the eighth structure of Modified Example 2 of Embodiment 1.
Figure 116:
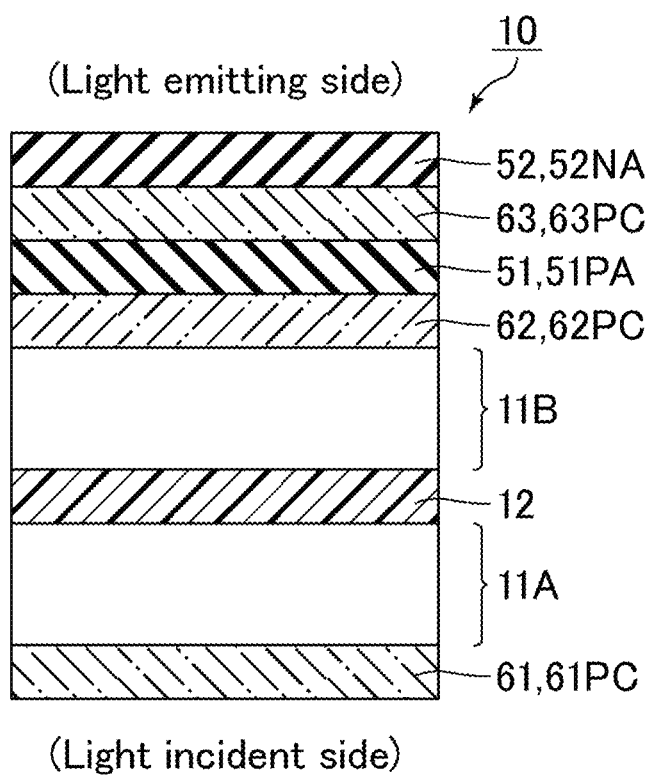
FIG. 116 is an example of a schematic cross-sectional view of an optical element having the eighth structure of Modified Example 2 of Embodiment 1.
Figure 117:
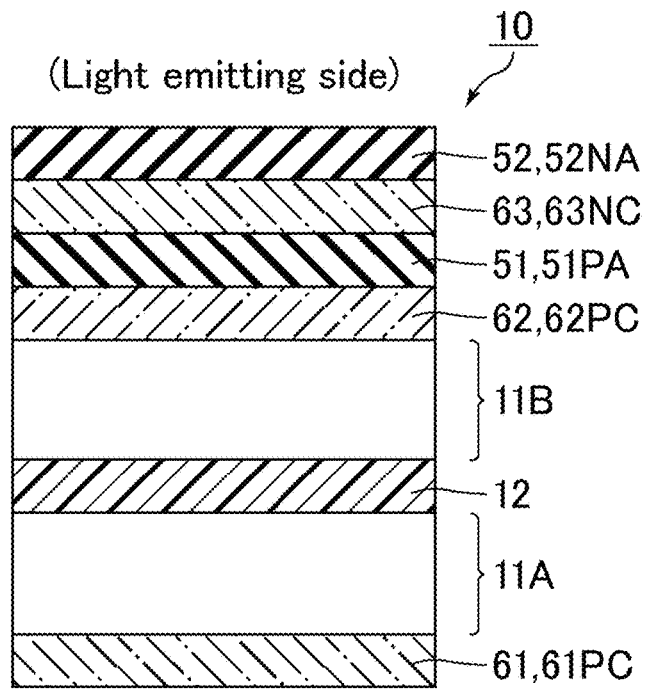
FIG. 117 is an example of a schematic cross-sectional view of an optical element having the eighth structure of Modified Example 2 of Embodiment 1.

FIG. 96 is an example of a schematic cross-sectional view of an optical element having a fifth structure of Modified Example 2 of Embodiment 1. As shown in FIG. 96, in an optical element 10 having the fifth structure, the first A plate 51 in the first structure is a positive A plate 51PA and the second A plate 52 in the first structure is a positive A plate 52PA. The optical element 10 further includes a first C plate 61; a second C plate 62 closer to the light emitting side than the first C plate 61 is; a third C plate 63 closer to the light emitting side than the second C plate 62 is; and a fourth C plate 64 closer to the light emitting side than the third C plate 63 is. The first C plate 61 faces the second liquid crystal cell 11B across the first liquid crystal cell 11A or faces the first liquid crystal cell 11A across the second liquid crystal cell 11B. The second C plate 62, the third C plate 63, and the fourth C plate 64 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the fourth C plate 64 faces the first liquid crystal cell 11A across the second liquid crystal cell 11B and the positive A plate 52PA is adjacent to the light incident side of the fourth C plate 64, the fourth C plate 64 is preferably a positive C plate 64PC.

When a plurality of C plates faces the first liquid crystal cell 11A across the second liquid crystal cell 11B, the C plates are preferably not adjacent to one another. Specifically, at least one A plate is preferably disposed between the C plates.

<Sixth Structure>

FIG. 97 to FIG. 101 each are an example of a schematic cross-sectional view of an optical element having a sixth structure of Modified Example 2 of Embodiment 1. As shown in FIG. 97 to FIG. 101, in an optical element 10 having the sixth structure, the first A plate 51 in the first structure is a positive A plate 51PA and the second A plate 52 in the first structure is a negative A plate 52NA. The optical element 10 further includes a C plate 61. The C plate 61 faces the second liquid crystal cell 11B across the first liquid crystal cell 11A or faces the first liquid crystal cell 11A across the second liquid crystal cell 11B.

When the C plate 61 faces the second liquid crystal cell 11B across the first liquid crystal cell 11A, the C plate 61 is preferably a positive C plate 61PC. When the C plate 61 faces the first liquid crystal cell 11A across the second liquid crystal cell 11B and the negative A plate 52NA is adjacent to the light incident side of the C plate 61, the C plate 61 is preferably a negative C plate 61NC.

<Seventh Structure>

FIG. 102 to FIG. 110 each are an example of a schematic cross-sectional view of an optical element having a seventh structure of Modified Example 2 of Embodiment 1. As shown in FIG. 102 to FIG. 110, in an optical element 10 having the seventh structure, the first A plate 51 in the first structure is a positive A plate 51PA and the second A plate 52 in the first structure is a negative A plate 52NA. The optical element 10 further includes a first C plate 61 and a second C plate 62 closer to the light emitting side than the first C plate 61 is. The first C plate 61 faces the second liquid crystal cell 11B across the first liquid crystal cell 11A or faces the first liquid crystal cell 11A across the second liquid crystal cell 11B. The second C plate 62 faces the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the second C plate 62 faces the first liquid crystal cell 11A across the second liquid crystal cell 11B and the negative A plate 52NA is adjacent to the light incident side of the second C plate 62, the second C plate 62 is preferably a negative C plate 62NC.

When a plurality of C plates faces the first liquid crystal cell 11A across the second liquid crystal cell 11B, the C plates are preferably not adjacent to one another. Specifically, at least one A plate is preferably disposed between the C plates.

<Eighth Structure>

FIG. 111 to FIG. 117 each are an example of a schematic cross-sectional view of an optical element having an eighth structure of Modified Example 2 of Embodiment 1. As shown in FIG. 111 to FIG. 117, in an optical element 10 having the eighth structure, the first A plate 51 in the first structure is a positive A plate 51PA and the second A plate 52 in the first structure is a negative A plate 52NA. The optical element 10 further includes a first C plate 61; a second C plate 62 closer to the light emitting side than the first C plate 61 is; and a third C plate 63 closer to the light emitting side than the second C plate 62 is. The first C plate 61 faces the second liquid crystal cell 11B across the first liquid crystal cell 11A or faces the first liquid crystal cell 11A across the second liquid crystal cell 11B. The second C plate 62 and the third C plate 63 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the third C plate 63 faces the first liquid crystal cell 11A across the second liquid crystal cell 11B and the negative A plate 52NA is adjacent to the light incident side of the third C plate 63, the third C plate 63 is preferably a negative C plate 63NC.

When a plurality of C plates faces the first liquid crystal cell 11A across the second liquid crystal cell 11B, the C plates are preferably not adjacent to one another. Specifically, at least one A plate is preferably disposed between the C plates.

<Ninth Structure>

Figure 118:
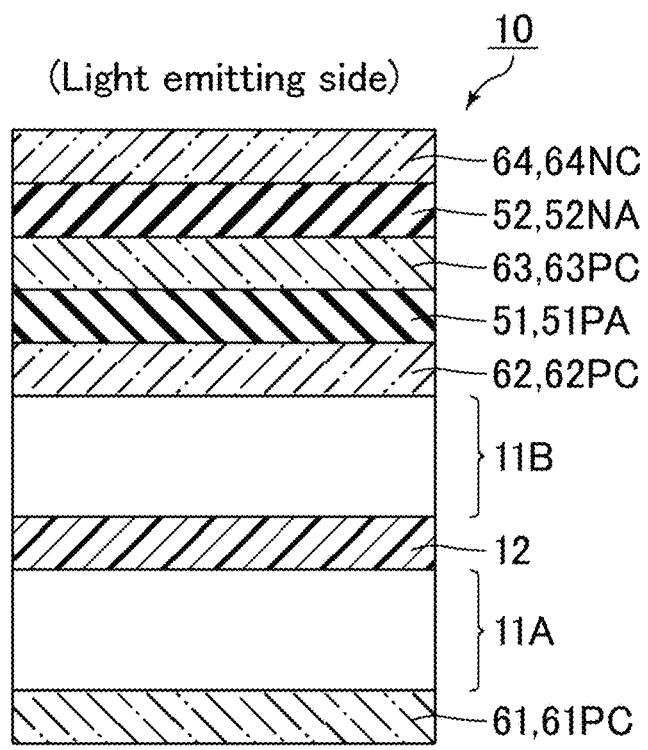
FIG. 118 is an example of a schematic cross-sectional view of an optical element having a ninth structure of Modified Example 2 of Embodiment 1.
Figure 119:
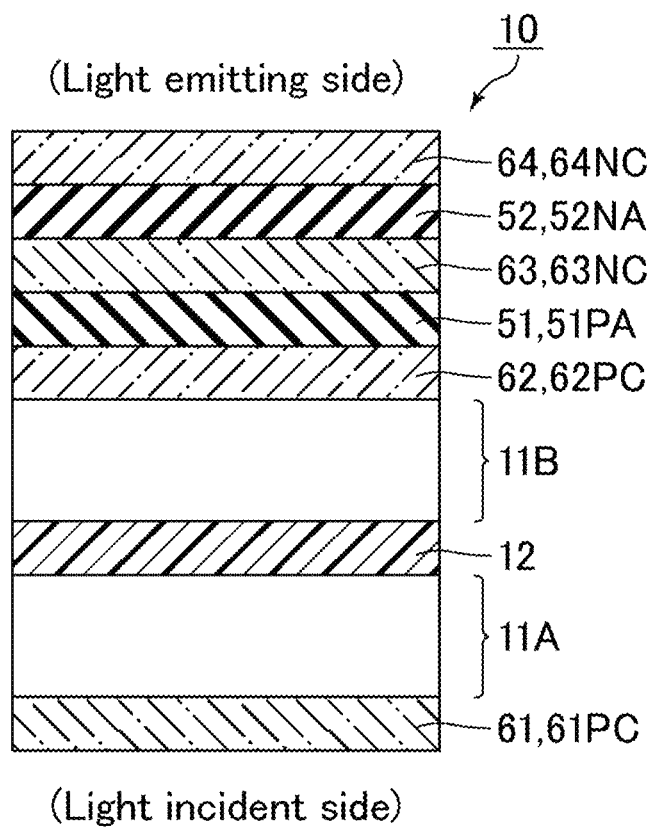
FIG. 119 is an example of a schematic cross-sectional view of an optical element having the ninth structure of Modified Example 2 of Embodiment 1.
Figure 120:
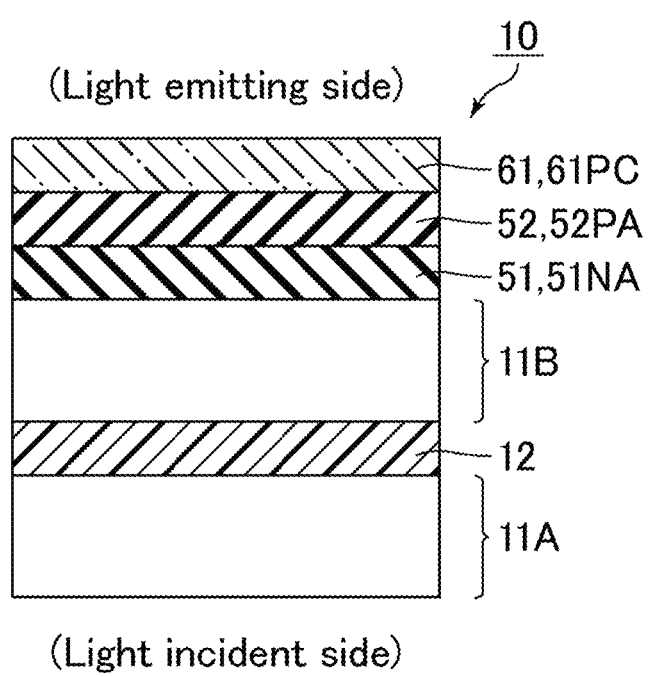
Figure 121:
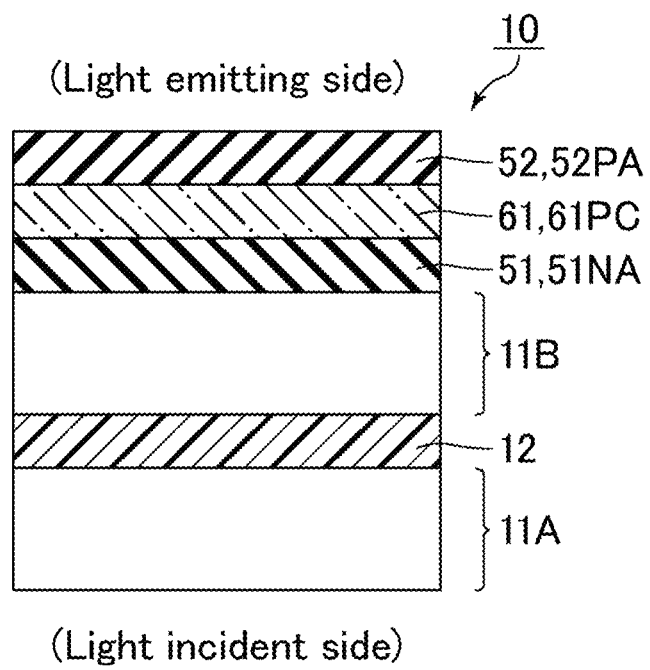
Figure 122:
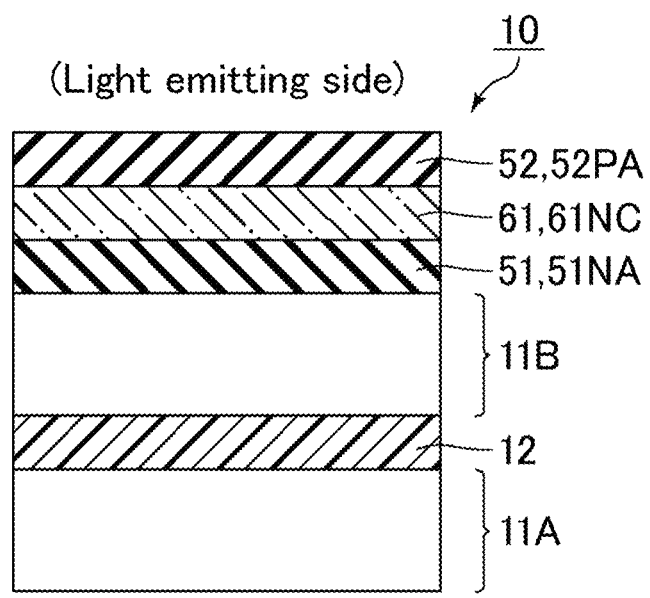
Figure 123:
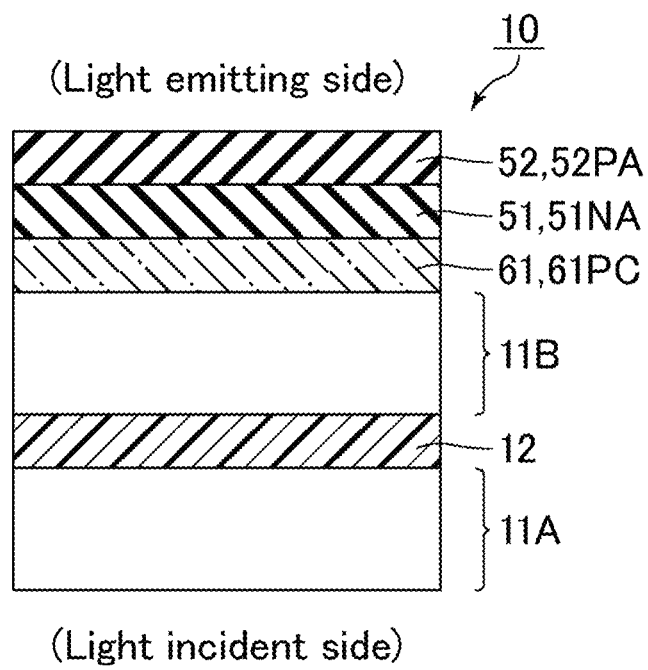
Figure 124:
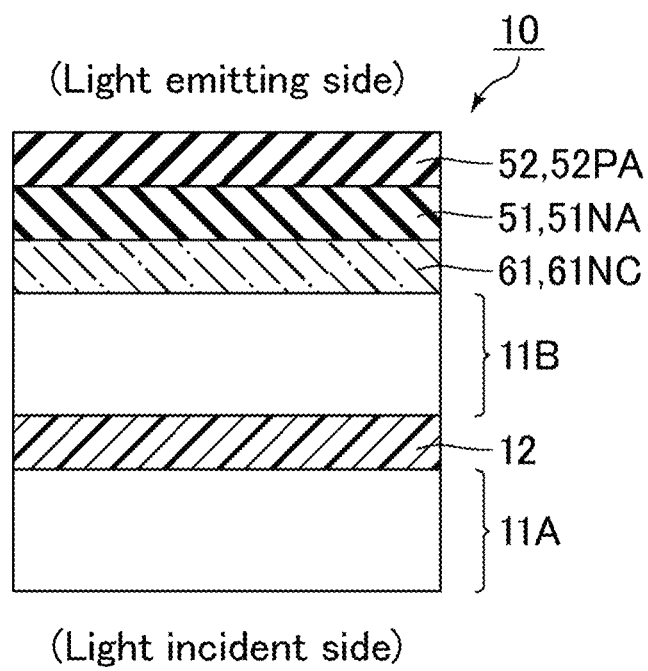
Figure 125:
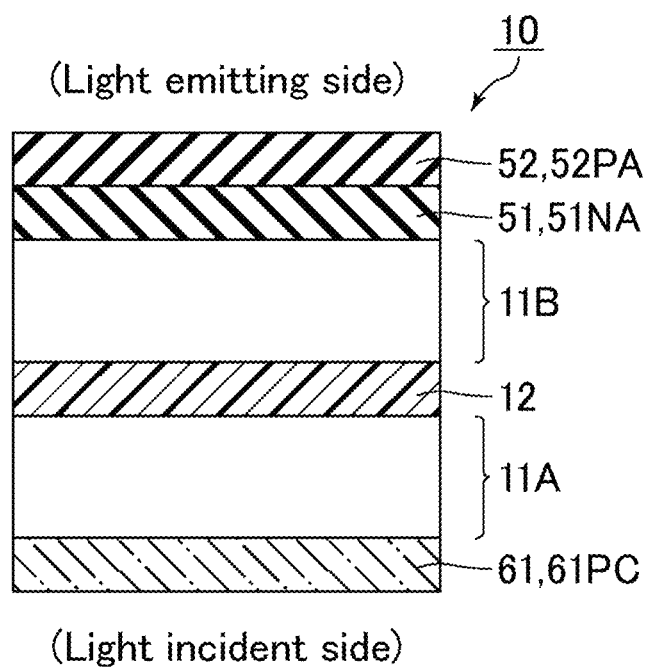
Figure 126:
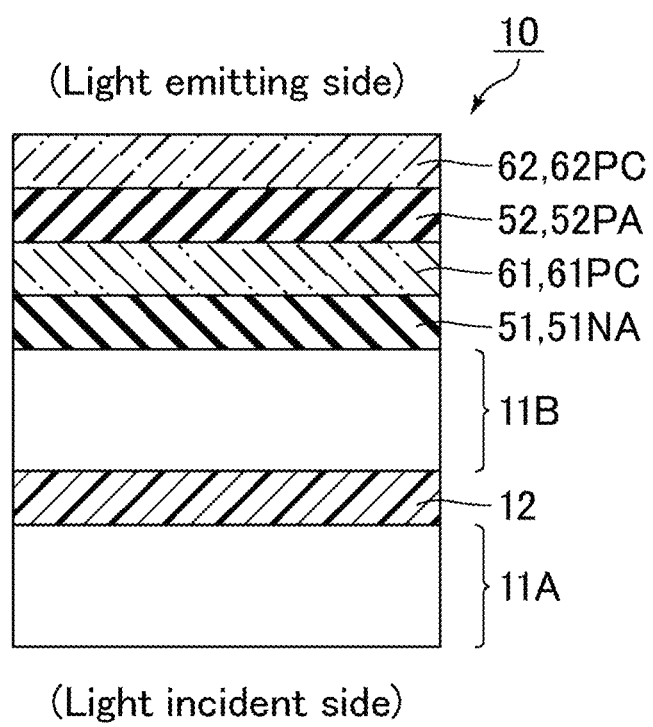
Figure 127:
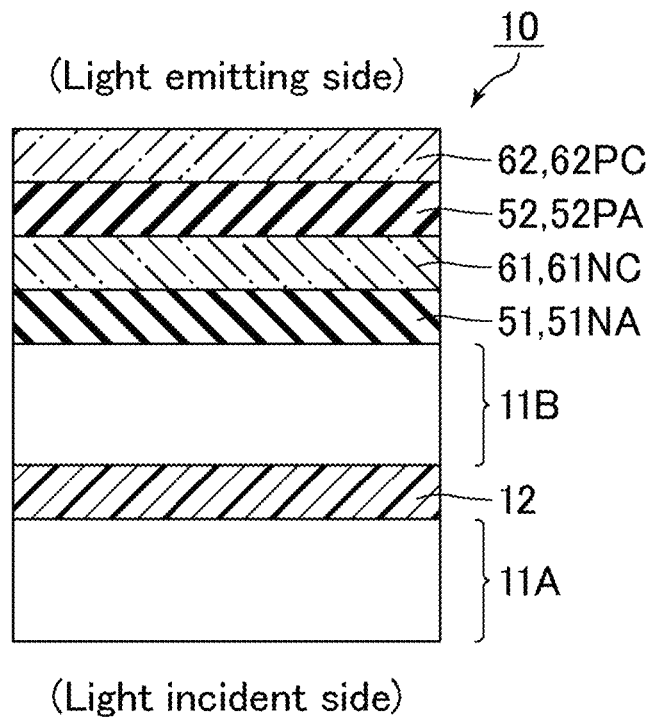
Figure 128:
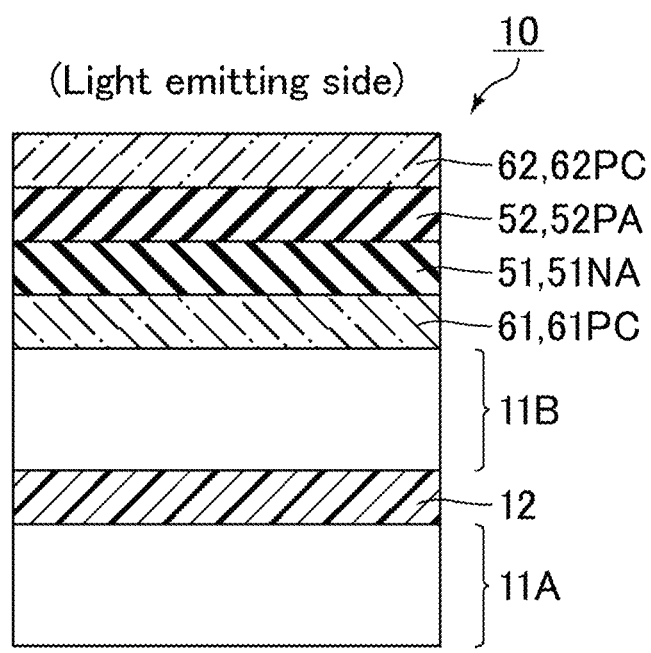
Figure 129:
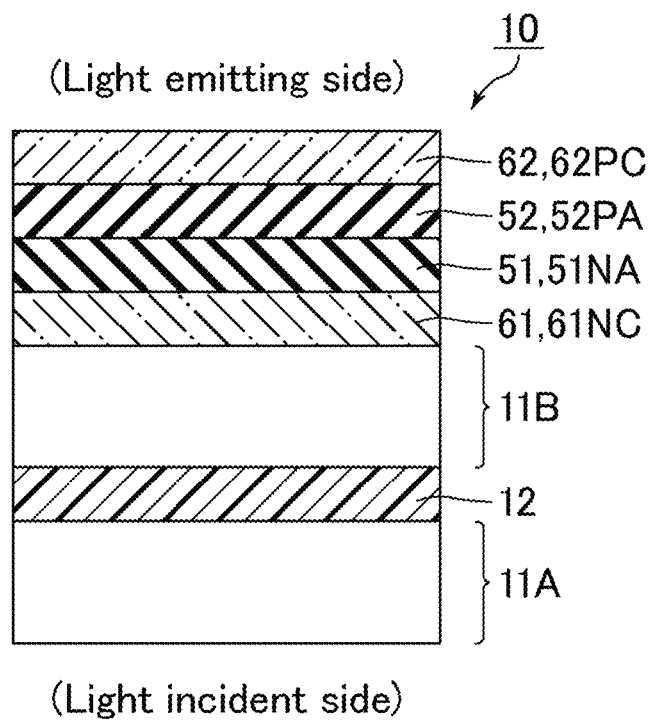
Figure 130:
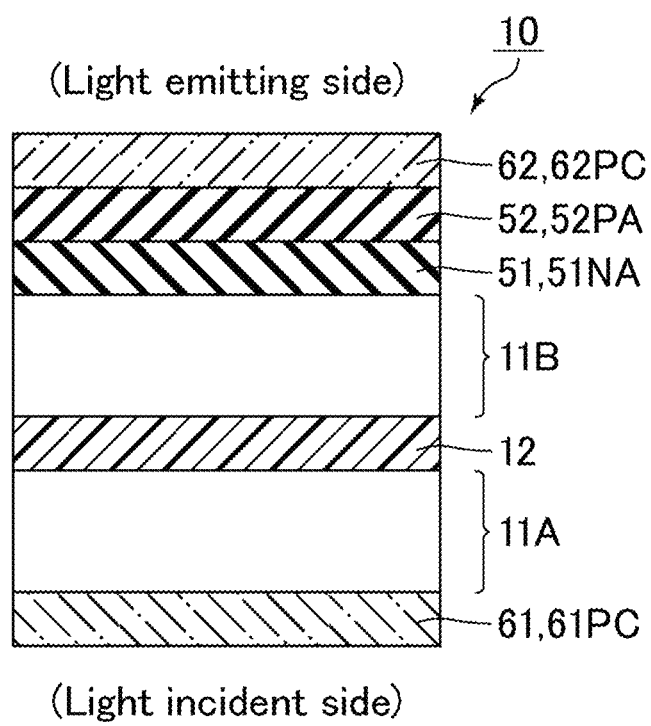
Figure 131:
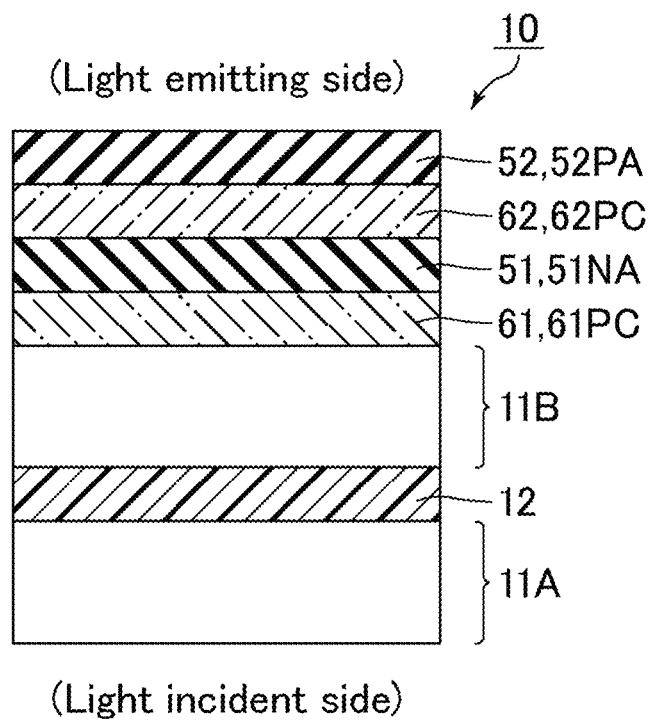

FIG. 118 and FIG. 119 each are an example of a schematic cross-sectional view of an optical element having a ninth structure of Modified Example 2 of Embodiment 1. As shown in FIG. 118 and FIG. 119, in an optical element 10 having the ninth structure, the first A plate 51 in the first structure is a positive A plate 51PA and the second A plate 52 in the first structure is a negative A plate 52NA. The optical element 10 further includes a first C plate 61; a second C plate 62 closer to the light emitting side than the first C plate 61 is; a third C plate 63 closer to the light emitting side than the second C plate 62 is; and a fourth C plate 64 closer to the light emitting side than the third C plate 63 is. The first C plate 61 faces the second liquid crystal cell 11B across the first liquid crystal cell 11A or faces the first liquid crystal cell 11A across the second liquid crystal cell 11B. The second C plate 62, the third C plate 63, and the fourth C plate 64 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the fourth C plate 64 faces the first liquid crystal cell 11A across the second liquid crystal cell 11B and the negative A plate 52NA is adjacent to the light incident side of the fourth C plate 64, the fourth C plate 64 is preferably a negative C plate 64NC.

When a plurality of C plates faces the first liquid crystal cell 11A across the second liquid crystal cell 11B, the C plates are preferably not adjacent to one another. Specifically, at least one A plate is preferably disposed between the C plates.

<Tenth Structure>

FIG. 120 to FIG. 125 each are an example of a schematic cross-sectional view of an optical element having a tenth structure of Modified Example 2 of Embodiment 1. As shown in FIG. 120 to FIG. 125, in an optical element 10 having the tenth structure, the first A plate 51 in the first structure is a negative A plate 51NA and the second A plate 52 in the first structure is a positive A plate 52PA. The optical element 10 further includes a C plate 61. The C plate 61 faces the second liquid crystal cell 11B across the first liquid crystal cell 11A or faces the first liquid crystal cell 11A across the second liquid crystal cell 11B.

When the C plate 61 faces the second liquid crystal cell 11B across the first liquid crystal cell 11A, the C plate 61 is preferably a positive C plate 61PC. When the C plate 61 faces the first liquid crystal cell 11A across the second liquid crystal cell 11B and the positive A plate 52PA is adjacent to the light incident side of the C plate 61, the C plate 61 is preferably a positive C plate 61PC.

<Eleventh Structure>

FIG. 126 to FIG. 138 each are an example of a schematic cross-sectional view of an optical element having an eleventh structure of Modified Example 2 of Embodiment 1. As shown in FIG. 126 to FIG. 138, in an optical element 10 having the eleventh structure, the first A plate 51 in the first structure is a negative A plate 51NA and the second A plate 52 in the first structure is a positive A plate 52PA. The optical element 10 further includes a first C plate 61 and a second C plate 62 closer to the light emitting side than the first C plate 61 is. The first C plate 61 faces the second liquid crystal cell 11B across the first liquid crystal cell 11A or faces the first liquid crystal cell 11A across the second liquid crystal cell 11B. The second C plate 62 faces the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the second C plate 62 faces the first liquid crystal cell 11A across the second liquid crystal cell 11B and the positive A plate 52PA is adjacent to the light incident side of the second C plate 62, the second C plate 62 is preferably a positive C plate 62PC.

When a plurality of C plates faces the first liquid crystal cell 11A across the second liquid crystal cell 11B, the C plates are preferably not adjacent to one another. Specifically, at least one A plate is preferably disposed between the C plates.

<Twelfth Structure>

FIG. 139 to FIG. 150 each are an example of a schematic cross-sectional view of an optical element having a twelfth structure of Modified Example 2 of Embodiment 1. As shown in FIG. 139 to FIG. 150, in an optical element 10 having the twelfth structure, the first A plate 51 in the first structure is a negative A plate 51NA and the second A plate 52 in the first structure is a positive A plate 52PA. The optical element 10 further includes a first C plate 61; a second C plate 62 closer to the light emitting side than the first C plate 61 is; and a third C plate 63 closer to the light emitting side than the second C plate 62 is. The first C plate 61 faces the second liquid crystal cell 11B across the first liquid crystal cell 11A or faces the first liquid crystal cell 11A across the second liquid crystal cell 11B. The second C plate 62 and the third C plate 63 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the third C plate 63 faces the first liquid crystal cell 11A across the second liquid crystal cell 11B and the positive A plate 52PA is adjacent to the light incident side of the third C plate 63, the third C plate 63 is preferably a positive C plate 63PC.

When a plurality of C plates faces the first liquid crystal cell 11A across the second liquid crystal cell 11B, the C plates are preferably not adjacent to one another. Specifically, at least one A plate is preferably disposed between the C plates.

<Thirteenth Structure>

FIG. 151 to FIG. 154 each are an example of a schematic cross-sectional view of an optical element having a thirteenth structure of Modified Example 2 of Embodiment 1. As shown in FIG. 151 to FIG. 154, in an optical element 10 having the thirteenth structure, the first A plate 51 in the first structure is a negative A plate 51NA and the second A plate 52 in the first structure is a positive A plate 52PA. The optical element 10 further includes a first C plate 61; a second C plate 62 closer to the light emitting side than the first C plate 61 is; a third C plate 63 closer to the light emitting side than the second C plate 62 is; and a fourth C plate 64 closer to the light emitting side than the third C plate 63 is. The first C plate 61 faces the second liquid crystal cell 11B across the first liquid crystal cell 11A or faces the first liquid crystal cell 11A across the second liquid crystal cell 11B. The second C plate 62, the third C plate 63, and the fourth C plate 64 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the fourth C plate 64 faces the first liquid crystal cell 11A across the second liquid crystal cell 11B and the positive A plate 52PA is adjacent to the light incident side of the fourth C plate 64, the fourth C plate 64 is preferably a positive C plate 64PC.

When a plurality of C plates faces the first liquid crystal cell 11A across the second liquid crystal cell 11B, the C plates are preferably not adjacent to one another. Specifically, at least one A plate is preferably disposed between the C plates.

<Fourteenth Structure>

FIG. 155 to FIG. 159 each are an example of a schematic cross-sectional view of an optical element having a fourteenth structure of Modified Example 2 of Embodiment 1. As shown in FIG. 155 to FIG. 159, in an optical element 10 having the fourteenth structure, the first A plate 51 in the first structure is a negative A plate 51NA and the second A plate 52 in the first structure is a negative A plate 52NA. The optical element 10 further includes a C plate 61. The C plate 61 faces the second liquid crystal cell 11B across the first liquid crystal cell 11A or faces the first liquid crystal cell 11A across the second liquid crystal cell 11B.

When the C plate 61 faces the second liquid crystal cell 11B across the first liquid crystal cell 11A, the C plate 61 is preferably a positive C plate 61PC. When the C plate 61 faces the first liquid crystal cell 11A across the second liquid crystal cell 11B and the negative A plate 52NA is adjacent to the light incident side of the C plate 61, the C plate 61 is preferably a negative C plate 61NC.

<Fifteenth Structure>

FIG. 160 to FIG. 168 each are an example of a schematic cross-sectional view of an optical element having a fifteenth structure of Modified Example 2 of Embodiment 1. As shown in FIG. 160 to FIG. 168, in an optical element 10 having the fifteenth structure, the first A plate 51 in the first structure is a negative A plate 51NA and the second A plate 52 in the first structure is a negative A plate 52NA. The optical element 10 further includes a first C plate 61 and a second C plate 62 closer to the light emitting side than the first C plate 61 is. The first C plate 61 faces the second liquid crystal cell 11B across the first liquid crystal cell 11A or faces the first liquid crystal cell 11A across the second liquid crystal cell 11B. The second C plate 62 faces the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the second C plate 62 faces the first liquid crystal cell 11A across the second liquid crystal cell 11B and the negative A plate 52NA is adjacent to the light incident side of the second C plate 62, the second C plate 62 is preferably a negative C plate 62NC.

When a plurality of C plates faces the first liquid crystal cell 11A across the second liquid crystal cell 11B, the C plates are preferably not adjacent to one another. Specifically, at least one A plate is preferably disposed between the C plates.

<Sixteenth Structure>

FIG. 169 to FIG. 175 each are an example of a schematic cross-sectional view of an optical element having a sixteenth structure of Modified Example 2 of Embodiment 1. As shown in FIG. 169 to FIG. 175, in an optical element 10 having the sixteenth structure, the first A plate 51 in the first structure is a negative A plate 51NA and the second A plate 52 in the first structure is a negative A plate 52NA. The optical element 10 further includes a first C plate 61; a second C plate 62 closer to the light emitting side than the first C plate 61 is; and a third C plate 63 closer to the light emitting side than the second C plate 62 is. The first C plate 61 faces the second liquid crystal cell 11B across the first liquid crystal cell 11A or faces the first liquid crystal cell 11A across the second liquid crystal cell 11B. The second C plate 62 and the third C plate 63 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the third C plate 63 faces the first liquid crystal cell 11A across the second liquid crystal cell 11B and the negative A plate 52NA is adjacent to the light incident side of the third C plate 63, the third C plate 63 is preferably a negative C plate 63NC.

When a plurality of C plates faces the first liquid crystal cell 11A across the second liquid crystal cell 11B, the C plates are preferably not adjacent to one another. Specifically, at least one A plate is preferably disposed between the C plates.

<Seventeenth Structure>

FIG. 176 and FIG. 177 each are an example of a schematic cross-sectional view of an optical element having a seventeenth structure of Modified Example 2 of Embodiment 1. As shown in FIG. 176 and FIG. 177, in an optical element 10 having the seventeenth structure, the first A plate 51 in the first structure is a negative A plate 51NA and the second A plate 52 in the first structure is a negative A plate 52NA. The optical element 10 further includes a first C plate 61; a second C plate 62 closer to the light emitting side than the first C plate 61 is; a third C plate 63 closer to the light emitting side than the second C plate 62 is; and a fourth C plate 64 closer to the light emitting side than the third C plate 63 is. The first C plate 61 faces the second liquid crystal cell 11B across the first liquid crystal cell 11A or faces the first liquid crystal cell 11A across the second liquid crystal cell 11B. The second C plate 62, the third C plate 63, and the fourth C plate 64 face the first liquid crystal cell 11A across the second liquid crystal cell 11B.

When the first C plate 61 faces the second liquid crystal cell 11B across the first liquid crystal cell 11A, the first C plate 61 is preferably a positive C plate 61PC. When the fourth C plate 64 faces the first liquid crystal cell 11A across the second liquid crystal cell 11B and the negative A plate 52NA is adjacent to the light incident side of the fourth C plate 64, the fourth C plate 64 is preferably a negative C plate 64NC.

When a plurality of C plates faces the first liquid crystal cell 11A across the second liquid crystal cell 11B, the C plates are preferably not adjacent to one another. Specifically, at least one A plate is preferably disposed between the C plates.

Modified Example 3 of Embodiment 1

In the present modified example, the mode is described where the optical element 10 of Embodiment 1 further includes a first phase difference film and a second phase difference film which face the first liquid crystal cell 11A across the second liquid crystal cell 11B.

FIG. 200 is a schematic cross-sectional view of an optical element of Modified Example 3 of Embodiment 1. As shown in FIG. 200, an optical element 10 of the present modified example further includes a first phase difference film 71 facing the first liquid crystal cell 11A across the second liquid crystal cell 11B and a second phase difference film 72 facing the second liquid crystal cell 11B across the first phase difference film 71. This configuration enables a wider viewing angle range.

The first phase difference film 71 and the second phase difference film 72 are preferably biaxial films. A biaxial film preferably has refractive indices (nx, ny, nz) which satisfy the following Formulas N5 and N6.

$$nx > ny \quad \text{(Formula N5)}$$

$$nz = (nx+ny)/2 \quad \text{(Formula N6)}$$

The first phase difference film 71 and the second phase difference film 72 may be made of any material. For example, a stretched polymer film, a film made of a liquid crystalline material whose alignment is fixed, or a thin plate made of an inorganic material can be used.

The first phase difference film 71 and the second phase difference film 72 may be formed by any method. When the phase difference films are formed from a polymer film, for example, a method such as solvent casting or melt extrusion can be used. The polymer film may or may not be stretched as long as the desired phase difference is introduced. The stretching method may be any method such as tensile stretching between rolls, compression stretching between rolls, tenter transverse uniaxial stretching, oblique stretching, vertical and transverse biaxial stretching, or special stretching where a film is stretched under the shrinkage stress of a heat shrinkable film. When the phase difference films are formed from a liquid crystalline material, for example, a method can be used such as a method of applying a liquid crystalline material to a base film having undergone an alignment treatment and fixing the alignment of the material. The method may be one including no special alignment treatment on a base film or one including removing the liquid crystalline material from the base material after the alignment fixation and transferring the material to another film.

The in-plane phase difference Re introduced by the first phase difference film 71 at a wavelength of 550 nm is preferably not less than 90 nm and not more than 170 nm. The in-plane phase difference introduced by the first phase difference film 71 at a wavelength of 450 nm is preferably not less than 1.0 times and not more than 1.1 times the in-plane phase difference introduced by the first phase difference film 71 at a wavelength of 550 nm. The in-plane phase difference introduced by the first phase difference film 71 at a wavelength of 650 nm is preferably not less than 0.9 times and not more than 1.0 times the in-plane phase difference introduced by the first phase difference film 71 at a wavelength of 550 nm.

The in-plane phase difference Re introduced by the second phase difference film 72 at a wavelength of 550 nm is preferably not less than 40 nm and not more than 210 nm. The in-plane phase difference introduced by the second phase difference film 72 at a wavelength of 450 nm is preferably not less than 1.0 times and not more than 1.1 times the in-plane phase difference introduced by the second phase difference film 72 at a wavelength of 550 nm. The in-plane phase difference introduced by the second phase difference film 72 at a wavelength of 650 nm is preferably not less than 0.9 times and less than 1.0 times the in-plane phase difference introduced by the second phase difference film 72 at a wavelength of 550 nm.

The difference between the in-plane phase difference Re introduced by the first phase difference film 71 and the in-plane phase difference Re introduced by the second phase difference film 72 is preferably not less than 0 nm and not more than 10 nm. This configuration enables formation of the first phase difference film 71 and the second phase difference film 72 using the same film, thus enabling a wider viewing angle range in a simpler manner.

FIG. 201 includes schematic views showing the alignments of liquid crystal molecules in the first state and the second state in the optical element of Modified Example 3 of Embodiment 1. The slow axis 71A of the first phase difference film 71 shown in FIG. 201 is preferably at an azimuthal angle of not smaller than 50° and not greater than 60°. This configuration enables switching between polarization modulation and no polarization modulation over a broader bandwidth. The slow axis 72A of the second phase difference film 72 is preferably at an azimuthal angle of not smaller than 5° and not greater than 24°. This configuration enables switching between polarization modulation and no polarization modulation over a broader bandwidth.

Embodiment 2

The features unique to the present embodiment are mainly described here, and description of the matters already described in Embodiment 1 and the modified examples thereof is omitted. The present embodiment is substantially the same as Embodiment 1, except for lacking the negative C plate 12.

Figure 10:
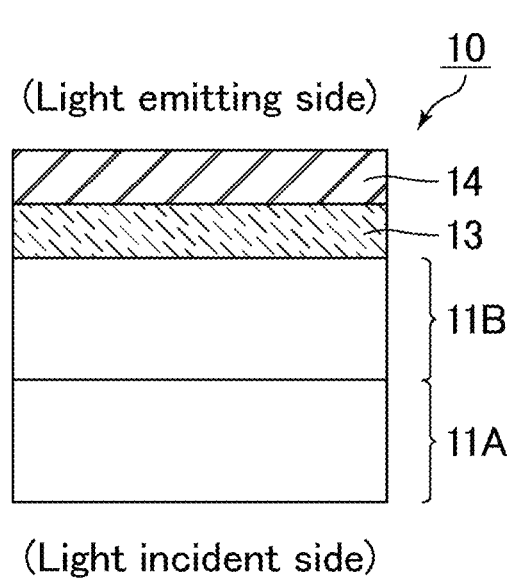
FIG. 10 is a schematic cross-sectional view of an optical element of Embodiment 2.

FIG. 10 is a schematic cross-sectional view of an optical element of Embodiment 2. In Embodiment 1, the modes have been described where the optical element 10 includes the negative C plate 12. Yet, as shown in FIG. 10, the optical element 10 may not include the negative C plate 12. This configuration enables production of an optical element 10 having a thin profile at low cost.

Embodiment 3

The features unique to the present embodiment are mainly described here, and description of the matters already described in Embodiment 1 and the modified examples thereof and Embodiment 2 is omitted. The present embodiment is substantially the same as Embodiment 1, except for the configurations of the first liquid crystal cell 11A and the second liquid crystal cell 11B.

Figure 11:
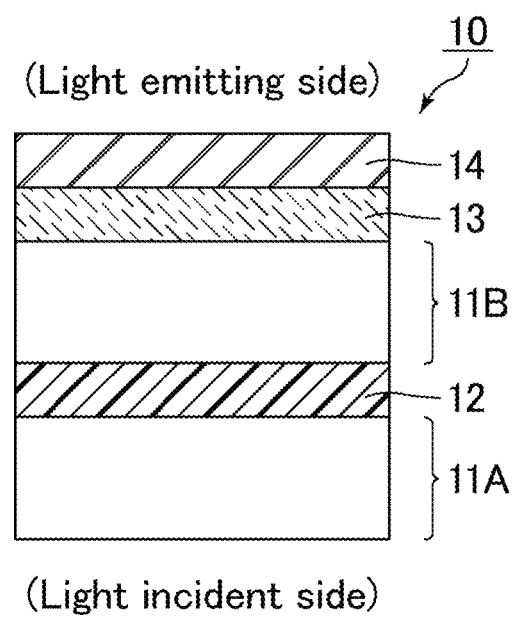
FIG. 11 is a schematic cross-sectional view of an optical element of Embodiment 3.
Figure 14:
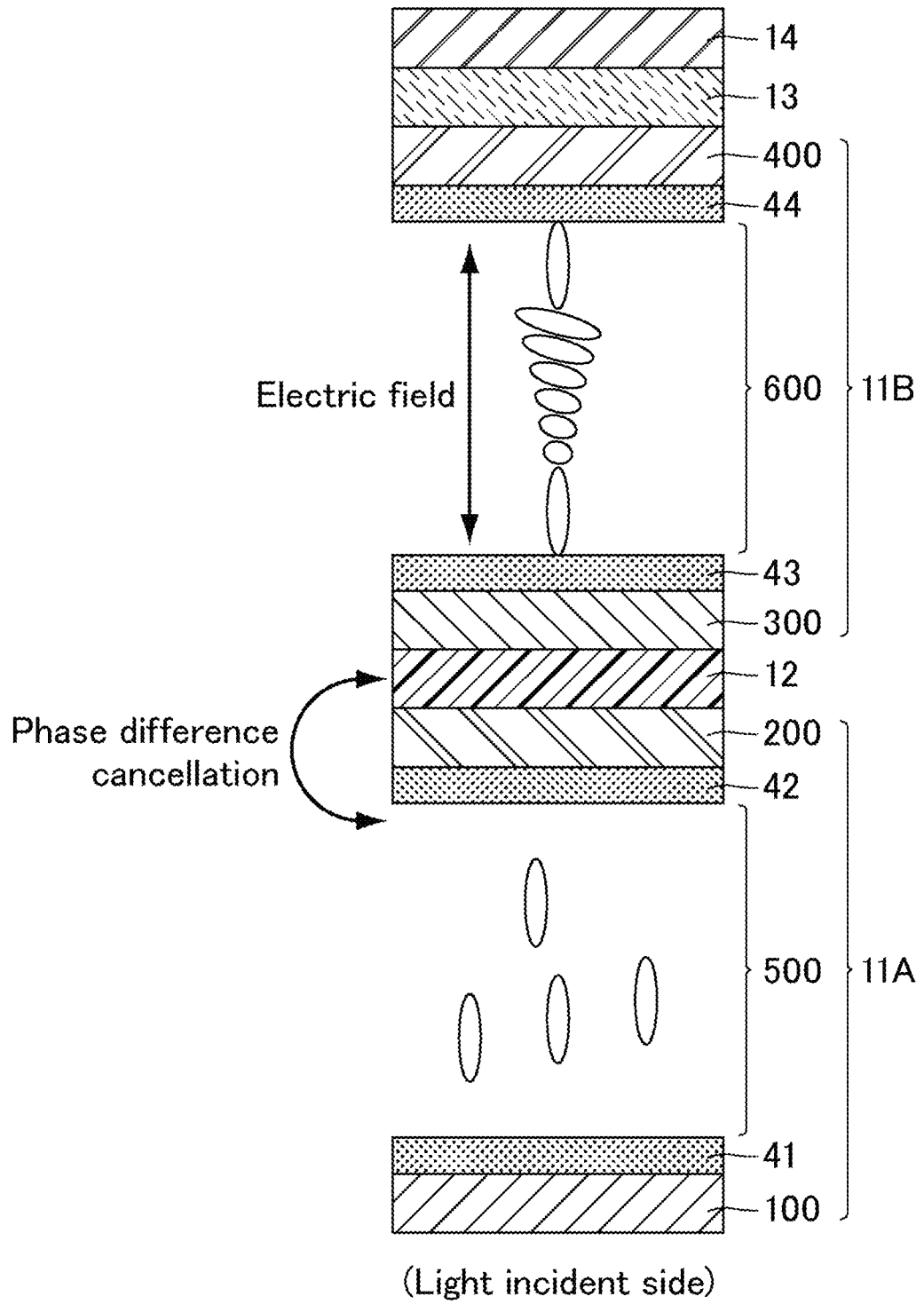
FIG. 14 is a schematic cross-sectional view showing the first state in the optical element of Embodiment 3.
Figure 15:
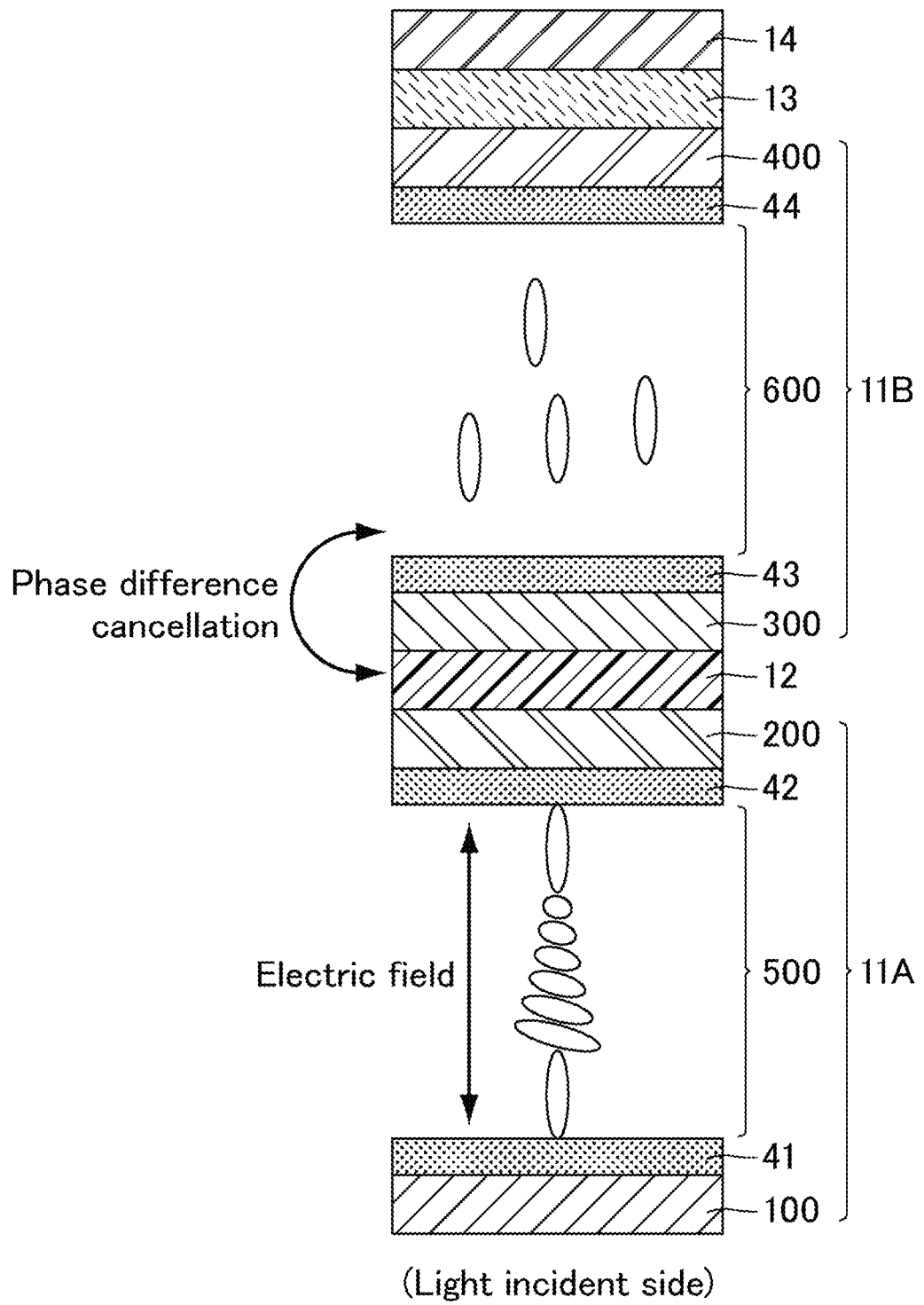
FIG. 15 is a schematic cross-sectional view showing the second state in the optical element of Embodiment 3.

FIG. 11 is a schematic cross-sectional view of an optical element of Embodiment 3. FIG. 12 is a schematic cross-sectional view of a first liquid crystal cell and a second liquid crystal cell in the optical element of Embodiment 3. FIG. 13 includes schematic views showing the alignments of liquid crystal molecules in the first state and the second state in the optical element of Embodiment 3. FIG. 14 is a schematic cross-sectional view showing the first state in the optical element of Embodiment 3. FIG. 15 is a schematic cross-sectional view showing the second state in the optical element of Embodiment 3.

The first liquid crystal molecules 510 and the second liquid crystal molecules 610 in the optical element 10 of the present embodiment shown in FIG. 11 to FIG. 15 are twist-aligned negative liquid crystal molecules. Thus, as shown in FIG. 14, with no voltage applied to the first liquid crystal layer 500 and with voltage applied to the second liquid crystal layer 600, a first state can be achieved where the first liquid crystal molecules 510 are vertically aligned and the second liquid crystal molecules 610 are twist-aligned. In the first state, the phase difference introduced by the first liquid crystal cell 11A can be cancelled by the negative C plate 12. Also, as shown in FIG. 15, with voltage applied to the first liquid crystal layer 500 and with no voltage applied to the second liquid crystal layer 600, a second state can be achieved where the first liquid crystal molecules 510 are twist-aligned and the second liquid crystal molecules 610 are vertically aligned. In the second state, the phase difference introduced by the second liquid crystal cell 11B can be cancelled by the negative C plate 12.

The first alignment film 41, the second alignment film 42, the third alignment film 43, and the fourth alignment film 44 are preferably vertical alignment films.

Embodiment 4

The features unique to the present embodiment are mainly described here, and description of the matters already described in Embodiment 1 and the modified examples thereof, Embodiment 2, and Embodiment 3 is omitted. The present embodiment is substantially the same as Embodiment 1, except for the configuration of the second liquid crystal cell 11B.

Figure 16:
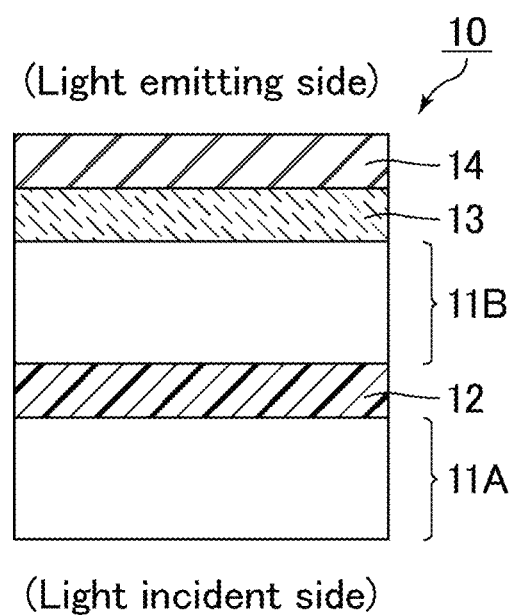
FIG. 16 is a schematic cross-sectional view of an optical element of Embodiment 4.
Figure 17:
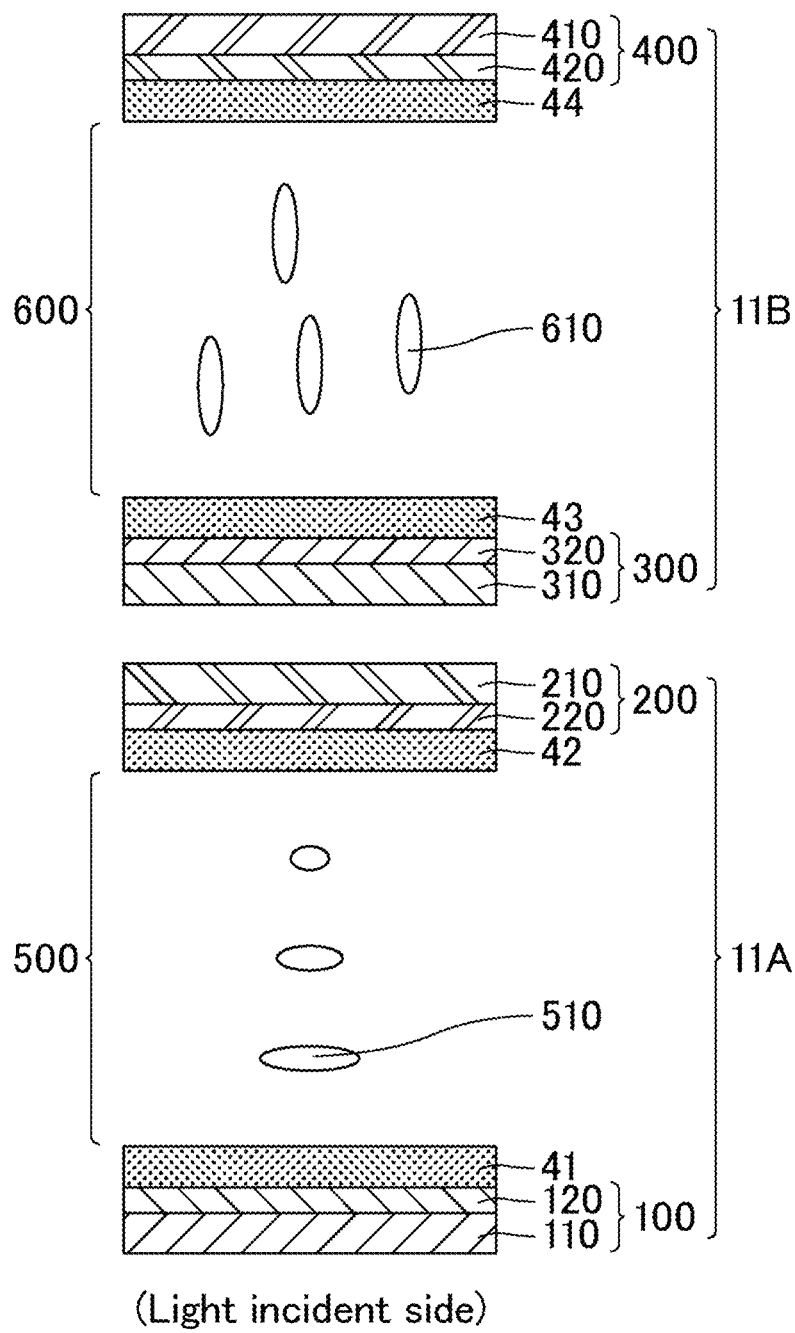
FIG. 17 is a schematic cross-sectional view of a first liquid crystal cell and a second liquid crystal cell in the optical element of Embodiment 4.
Figure 19:
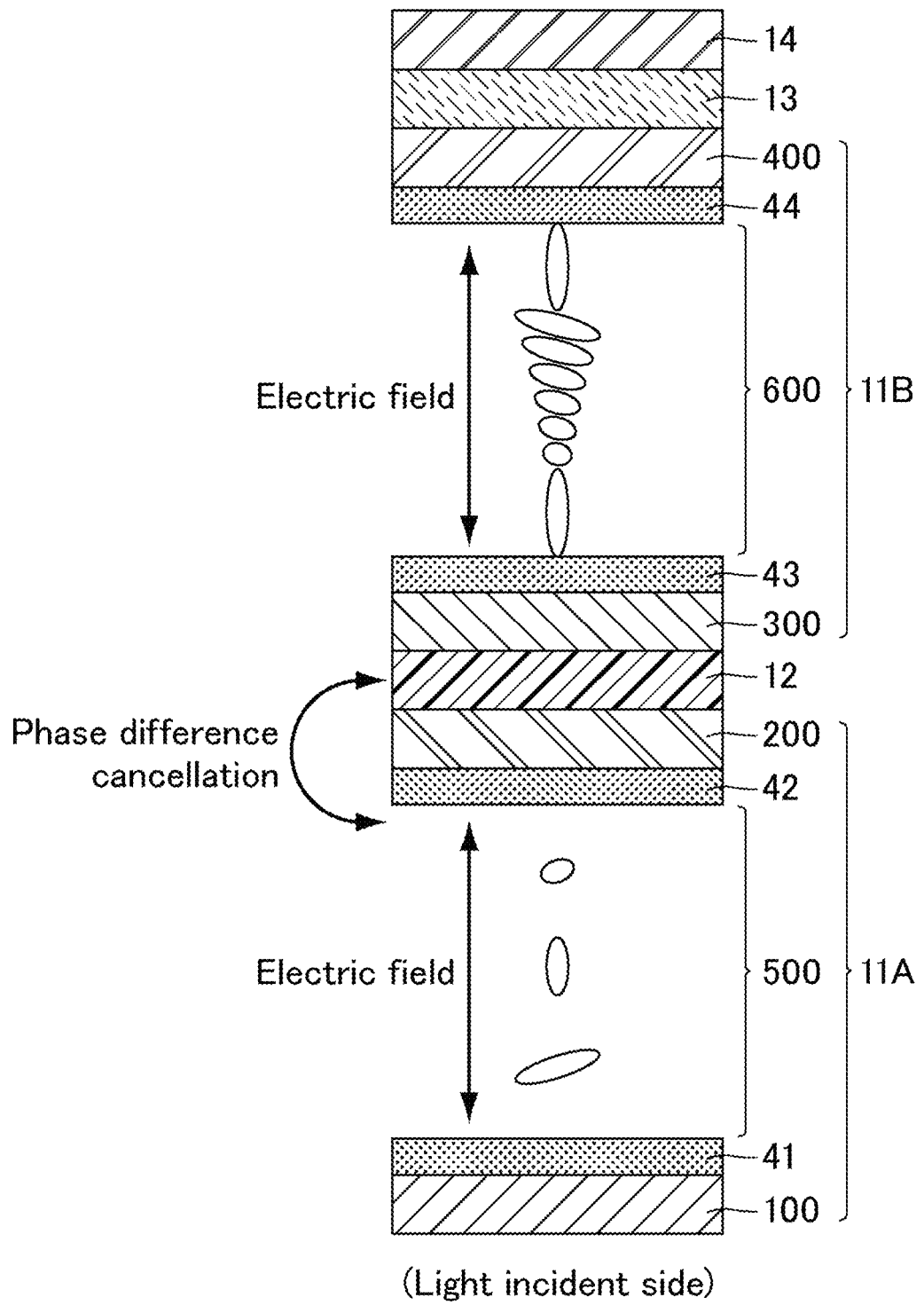
FIG. 19 is a schematic cross-sectional view showing the first state in the optical element of Embodiment 4.
Figure 20:
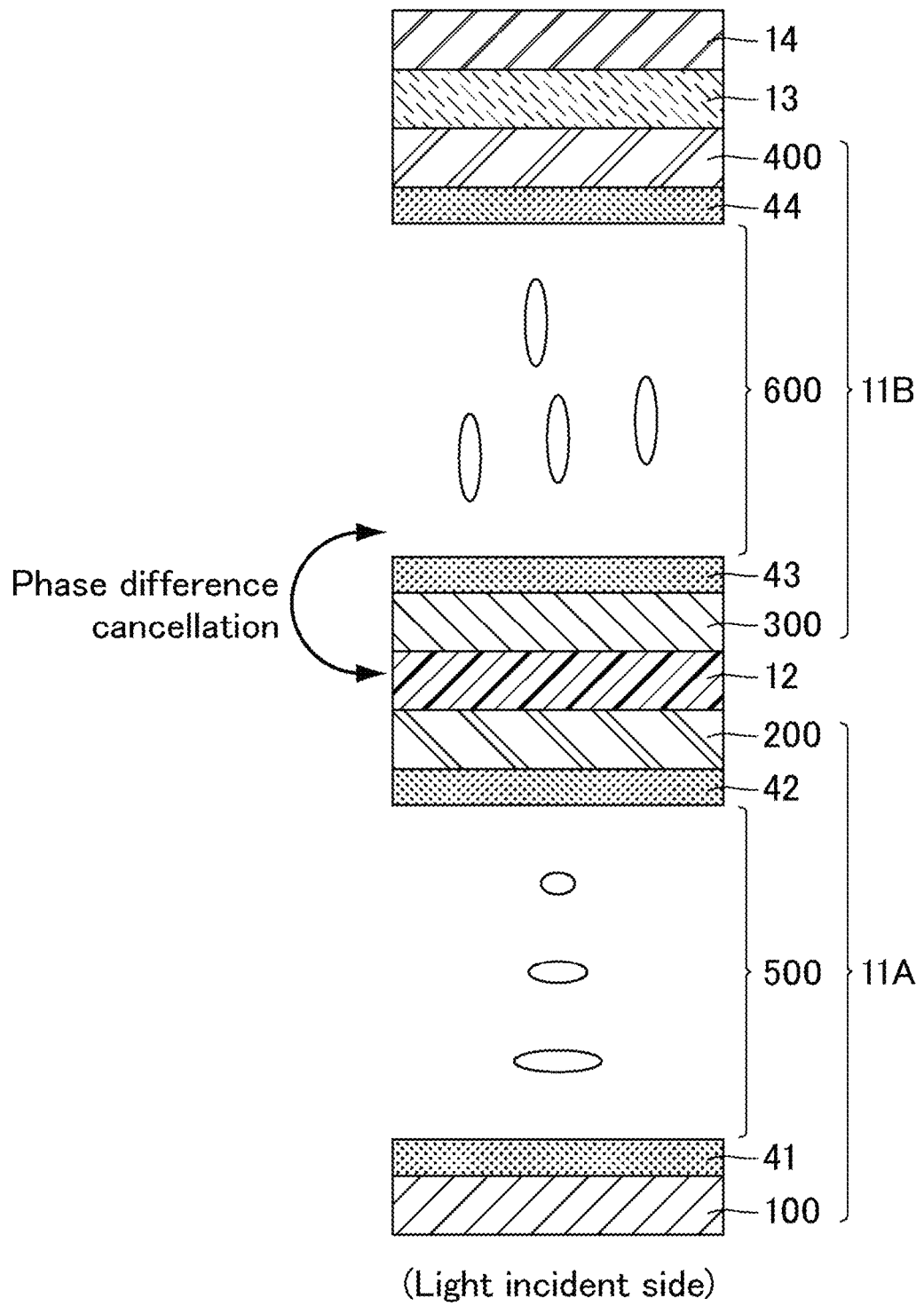
FIG. 20 is a schematic cross-sectional view showing the second state in the optical element of Embodiment 4.

FIG. 16 is a schematic cross-sectional view of an optical element of Embodiment 4. FIG. 17 is a schematic cross-sectional view of a first liquid crystal cell and a second liquid crystal cell in the optical element of Embodiment 4. FIG. 18 includes schematic views showing the alignments of liquid crystal molecules in the first state and the second state in the optical element of Embodiment 4. FIG. 19 is a schematic cross-sectional view showing the first state in the optical element of Embodiment 4. FIG. 20 is a schematic cross-sectional view showing the second state in the optical element of Embodiment 4.

In the optical element 10 of the present embodiment shown in FIG. 16 to FIG. 20, the first liquid crystal molecules 510 are twist-aligned positive liquid crystal molecules and the second liquid crystal molecules 610 are twist-aligned negative liquid crystal molecules. Thus, as shown in FIG. 19, with voltage applied to both the first liquid crystal layer 500 and the second liquid crystal layer 600, the first state can be achieved where the first liquid crystal molecules 510 are vertically aligned and the second liquid crystal molecules 610 are twist-aligned. In the first state, the phase difference introduced by the first liquid crystal cell 11A can be cancelled by the negative C plate 12. Also, as shown in FIG. with no voltage applied to both the first liquid crystal layer 500 and the second liquid crystal layer 600, the second state can be achieved where the first liquid crystal molecules 510 are twist-aligned and the second liquid crystal molecules 610 are vertically aligned. In the second state, the phase difference introduced by the second liquid crystal cell 11B can be cancelled by the negative C plate 12.

Preferably, the first alignment film 41 and the second alignment film 42 are horizontal alignment films and the third alignment film 43 and the fourth alignment film 44 are vertical alignment films.

Embodiment 5

Figure 21:
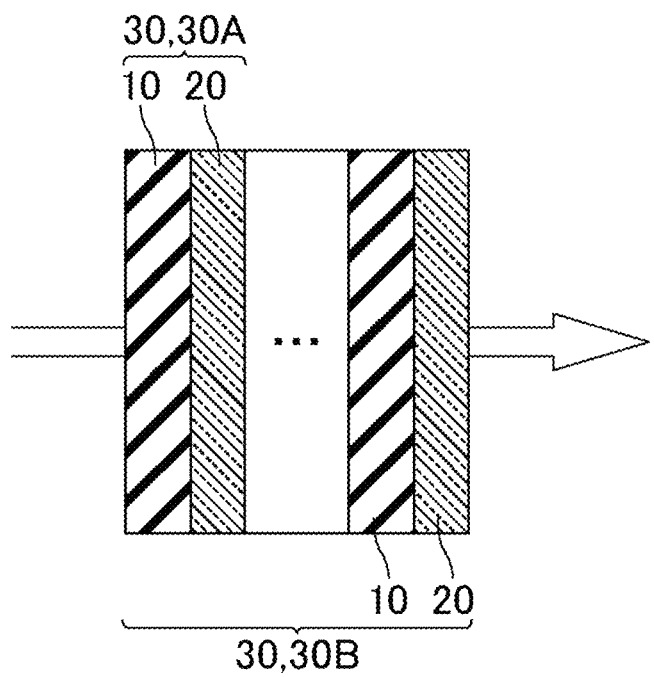
FIG. 21 is a schematic cross-sectional view of a varifocal element of Embodiment 5.

The features unique to the present embodiment are mainly described here, and description of the matters already described in Embodiment 1, the modified examples thereof, and Embodiments 2 to 4 is omitted. The present embodiment focuses on a varifocal element including the optical element (sHWP) of any one of Embodiments 1 to 4. FIG. 21 is a schematic cross-sectional view of a varifocal element of Embodiment 5. A varifocal element 30 of the present embodiment shown in FIG. 21 includes the optical element 10 and a Pancharatnam-Berry (PB) lens 20.

As described above, the optical elements 10 of Embodiments 1 to 4 each can modulate circularly polarized light. The PB lens 20 has different focal distances for right-handed circularly polarized light and left-handed circularly polarized light. Thus, any of the optical elements and the PB lens 20 in combination can achieve the varifocal element 30.

The PB lens 20 has a function of causing circularly polarized light to converge and diverge. The PB lens 20 can be produced by a method disclosed in, for example, WO 2019/189818.

Figure 22:
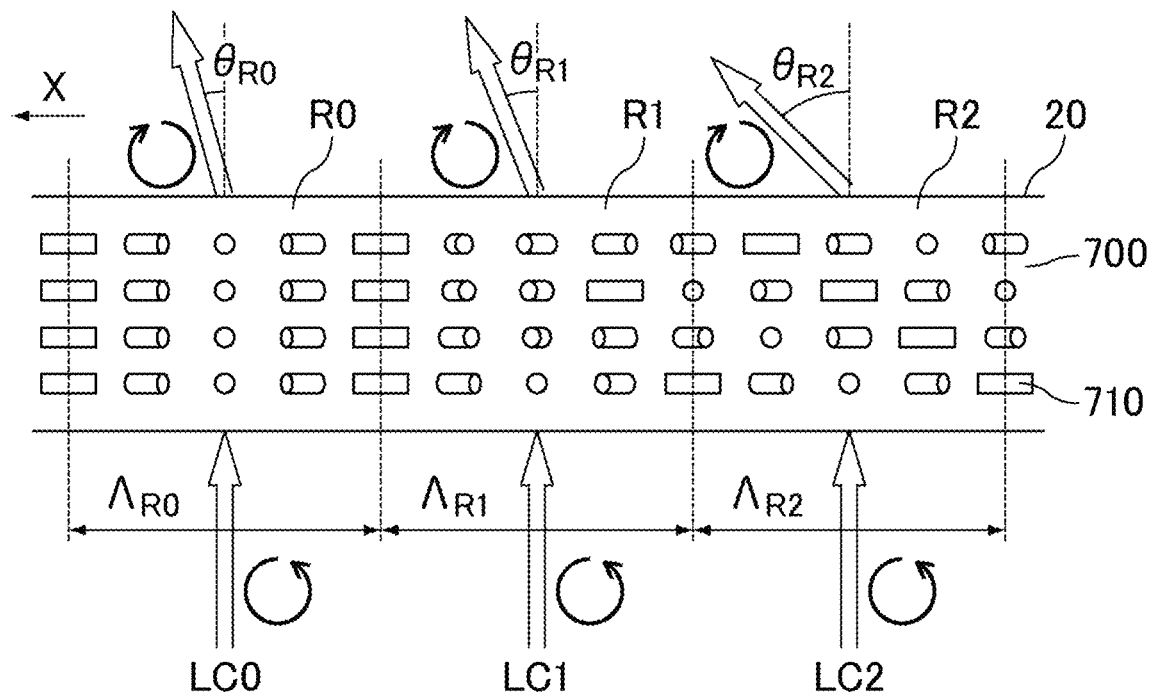
FIG. 22 is an example of a schematic cross-sectional view of a PB lens in the varifocal element of Embodiment 5.

FIG. 22 is an example of a schematic cross-sectional view of a PB lens in the varifocal element of Embodiment 5. The PB lens 20 includes, as shown in FIG. 22, an optically anisotropic layer 700. The PB lens 20 transmits incident circularly polarized light by refracting the light in a predetermined direction, for example. The incident light in FIG. 22 is left-handed circularly polarized light.

The portion of the optically anisotropic layer 700 shown in FIG. 22 includes three regions R0, R1, and R2 from the left in FIG. 22, and the regions have different lengths A of one period. Specifically, the order of length A of one period is regions R0, R1, and R2, from longest to shortest. The regions R1 and R2 each have a structure in which the optic axis is twist-rotated in the thickness direction of the optically anisotropic layer (hereinafter, also referred to as a twisted structure). The twist angle of the region R1 in the thickness direction is smaller than the twist angle of the region R2 in the thickness direction. The region R0 has no twisted structure (i.e., the twist angle is 0°). The twist angle means the twist angle in the thickness direction of the whole optically anisotropic layer.

In the optical element 10, left-handed circularly polarized light LC1 incident on the in-plane region R1 of the optically anisotropic layer 700 is transmitted after being refracted at a predetermined angle in the direction of the arrow X, i.e., one direction in which the orientation of the optic axis of liquid crystal molecules 710 varies while rotating continuously, from the incident direction. Similarly, left-handed circularly polarized light LC2 incident on the in-plane region R2 of the optically anisotropic layer 700 is transmitted after being refracted at a predetermined angle in the direction of the arrow X from the incident direction. Also, left-handed circularly polarized light LC0 incident on the in-plane region R0 of the optically anisotropic layer 700 is transmitted after being refracted at a predetermined angle in the direction of the arrow X from the incident direction.

The one period $\Lambda_{R2}$ of the liquid crystal alignment pattern of the region R2 is shorter than the one period $\Lambda_{R1}$ of the liquid crystal alignment pattern of the region R1. Thus, in the optically anisotropic layer 700, as shown in FIG. 22, the angle of refraction eR2 provided to light incident on and transmitted through the region R2 is larger than the angle of refraction eR1 provided to light incident on and transmitted through the region R1. Also, the one period $\Lambda_{R0}$ of the liquid crystal alignment pattern of the region R0 is longer than the one period $\Lambda_{R1}$ of the liquid crystal alignment pattern of the region R1. Thus, as shown in FIG. 22, the angle of refraction $\theta_{R0}$ provided to light incident on and transmitted through the region R0 is smaller than the angle of refraction eR1 provided to light incident on and transmitted through the region R1.

Here, diffraction of light by the optically anisotropic layer having a liquid crystal alignment pattern in which the orientation of the optic axis of the liquid crystal molecules varies while continuously rotating in a plane involves an issue that the diffraction efficiency decreases, i.e., the intensity of the diffracted light decreases, as the angle of diffraction increases. This means that when the optically anisotropic layer has a structure including regions with different lengths of one period, in which the orientation of the optic axis of the liquid crystal molecules is rotated by 180° in the plane, the angle of diffraction differs depending on the position of incidence of light, resulting in a difference in quantity of diffracted light depending on the in-plane position of incidence of light. In other words, the structure produces a region where transmitted, diffracted light weakens at certain in-plane positions of incidence of light.

Meanwhile, the PB lens 20 of the present embodiment includes the regions where liquid crystal molecules are twist-rotated in the thickness direction in the optically anisotropic layer and the twist angle in the thickness direction differs from region to region. In the example in FIG. 22, the twist angle $\varphi_{R2}$ in the thickness direction of the region R2 is larger than the twist angle $\varphi_{R1}$ in the thickness direction of the region R1 in the optically anisotropic layer 700. The region R0 has no twisted structure in the thickness direction. This can reduce or prevent a decrease in diffraction efficiency of refracted light.

In the example in FIG. 22, the regions R1 and R2 larger in angle of diffraction than the region R0 each have a twisted structure. This can reduce or prevent a decrease in quantity of light refracted by the regions R1 and R2. Also, the region R2 larger in angle of diffraction than the region R1 is also larger in twist angle of the twisted structure than the region R1. This can reduce or prevent a decrease in quantity of light refracted by the region R2. The configuration can equalize the quantities of transmitted lights regardless of the in-plane positions of incidence of light.

As described above, in an in-plane region where the optically anisotropic layer provides a large angle of refraction in the PB lens 20 of the present embodiment, incident light is refracted by passing through a layer with a large twist angle in the thickness direction. Meanwhile, in an in-plane region where the optically anisotropic layer provides a small angle of refraction, incident light is refracted by passing through a layer with a small twist angle in the thickness direction. In other words, the PB lens 20 can produce transmitted light brighter than incident light by setting the in-plane twist angle in the thickness direction according to the angle of refraction provided by the optically anisotropic layer. Thus, the PB lens 20 can reduce the refraction angle dependence of the quantity of transmitted light in the plane.

The angle of light refraction in the plane of the optically anisotropic layer 700 increases as the one period $\Lambda$ of the liquid crystal alignment pattern becomes shorter. Also, the twist angle in the thickness direction in the plane of the optically anisotropic layer 700 is larger in a region with a short one period $\Lambda$, in which the orientation of the optic axis rotates by 180° in the direction of the arrow X in the liquid crystal alignment pattern, than in a region with a long one period $\Lambda$. In the PB lens 20, for example, as shown in FIG. 22, the one period $\Lambda_{R2}$ of the liquid crystal alignment pattern in the region R2 of the optically anisotropic layer 700 is shorter than the one period $\Lambda_{R1}$ of the liquid crystal alignment pattern in the region R1, and the twist angle $\varphi_{R2}$ in the thickness direction is larger than the twist angle $\varphi_{R1}$. In other words, the region R2 in the optically anisotropic layer 700 on the light incident side more refracts light.

Thus, when the in-plane twist angle φ in the thickness direction is set for the one period Λ of the liquid crystal alignment pattern in question, the transmitted lights refracted at different angles in different in-plane regions can be suitably brighter.

In the PB lens 20, as described above, since the angle of refraction increases as the one period Λ of the liquid crystal alignment pattern becomes shorter, a larger twist angle in the thickness direction is set for a region with a shorter one period Λ of the liquid crystal alignment pattern, so that the transmitted light can be brighter. Thus, in the PB lens 20, preferably, the regions with different lengths of one period of the liquid crystal alignment pattern include regions where the order of length of one period and the order of twist angle in the thickness direction are different.

As described above, the PB lens 20 preferably includes the optically anisotropic layer 700 formed from a liquid crystal composition containing the liquid crystal molecules 710. Preferably, the optically anisotropic layer 700 includes regions each of which has a liquid crystal alignment pattern with the orientation of the optic axis of the liquid crystal molecules varying while continuously rotating in at least one in-plane direction, and in which the optic axis is preferably twist-rotated in the thickness direction of the optically anisotropic layer 700. The twist angle in the thickness direction preferably differs from region to region.

Preferably, the PB lens 20 includes regions with different lengths of one period in the liquid crystal alignment pattern, where the one period is the length in which the orientation of the optic axis of the liquid crystal molecules 710 is rotated by 180° in the plane.

Preferably, the optically anisotropic layer 700 includes the regions with different lengths of one period in the liquid crystal alignment pattern arranged by length of one period, and the regions with different twist angles in the thickness direction arranged by twist angle in the thickness direction, wherein the direction of the arrangement by length of one period and the direction of the arrangement by twist angle in the thickness direction are different.

Preferably, the optically anisotropic layer 700 includes regions where the twist angle in the thickness direction is 10° to 360°.

Preferably, in the optically anisotropic layer 700, the one period of the liquid crystal alignment pattern becomes shorter gradually in the one direction in which the orientation of the optic axis of the liquid crystal molecules 710 in the liquid crystal alignment pattern varies while continuously rotating.

Preferably, the liquid crystal alignment pattern of the optically anisotropic layer 700 is a concentric circular pattern where the one direction, in which the orientation of the optic axis of the liquid crystal molecules 710 varies while continuously rotating, lies from inside toward outside.

The PB lens 20 in FIG. 22 is a PB lens with the twist angle varying in the plane, and is an element having a high diffraction efficiency even when the angle of diffraction is large. Yet, the PB lens 20 may be a PB lens with the twist angle not varying in the plane. Specifically, the PB lens 20 may be a PB lens without a twist in the thickness direction or with a constant twist angle in the plane. For example, the polarization diffraction grating disclosed in JP 2008-532085 T can be used.

Preferably, the PB lens 20 is a PB lens including a plurality of optically anisotropic layers 700, and the optically anisotropic layers 700 are different from one another in orientation of the twist angle in the thickness direction of the optically anisotropic layers 700.

Preferably, the PB lens 20 is a PB lens including a plurality of optically anisotropic layers 700, and the optically anisotropic layers 700 are different from one another in twist angle in the thickness direction of the optically anisotropic layers 700.

Preferably, the PB lens 20 is a PB lens including a plurality of optically anisotropic layers 700, and the optically anisotropic layers 700 have liquid crystal alignment patterns that are the same as one another in at least one in-plane direction in which the orientation of the optic axis of the liquid crystal molecules 710 continuously rotates.

Preferably, the length of one period in the liquid crystal alignment pattern is not longer than 50 μm.

The varifocal element 30 may be a varifocal element 30A with two focal lengths including one stack of the optical element 10 and the PB lens 20, or a varifocal element 30B with multiple focal lengths including two or more stacks each consisting of the optical element 10 and the PB lens 20. In this manner, with a plurality of sets each consisting of the optical element 10 and the PB lens 20, the varifocal element 30B with tunable multiple focal lengths can be achieved.

The varifocal element 30 can be produced by, for example, attaching the PB lens 20 produced by the method disclosed in WO 2019/189818 to the optical element 10.

Modified Example 1 of Embodiment 5

Figure 23:
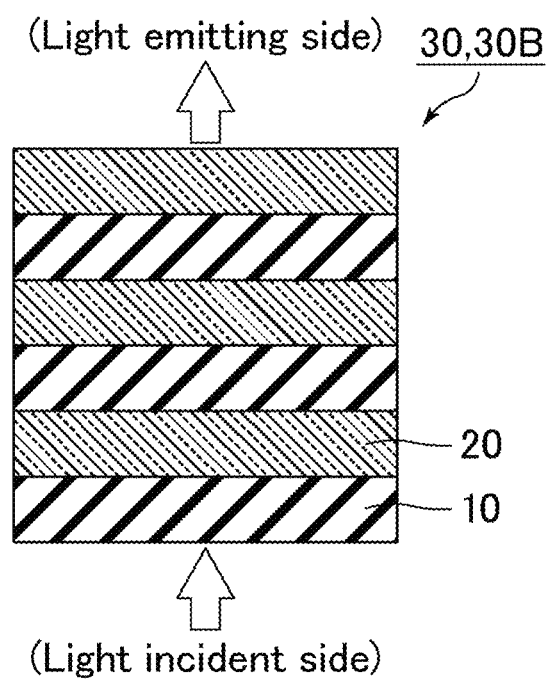
FIG. 23 is a schematic cross-sectional view of a varifocal element of Modified Example 1 of Embodiment 5.
Figure 24:
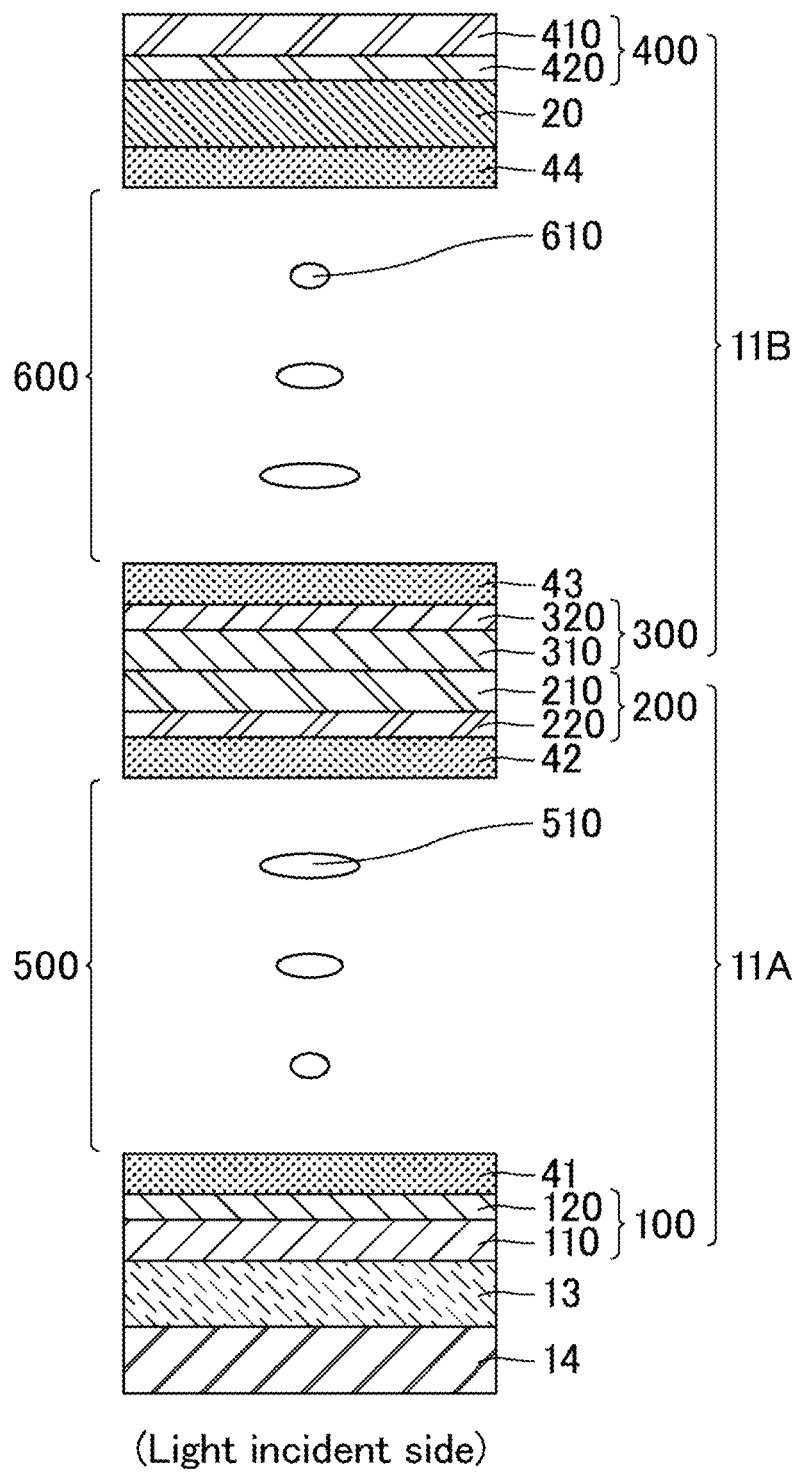
FIG. 24 is an enlarged schematic cross-sectional view of the varifocal element of Modified Example 1 of Embodiment 5.
Figure 25:
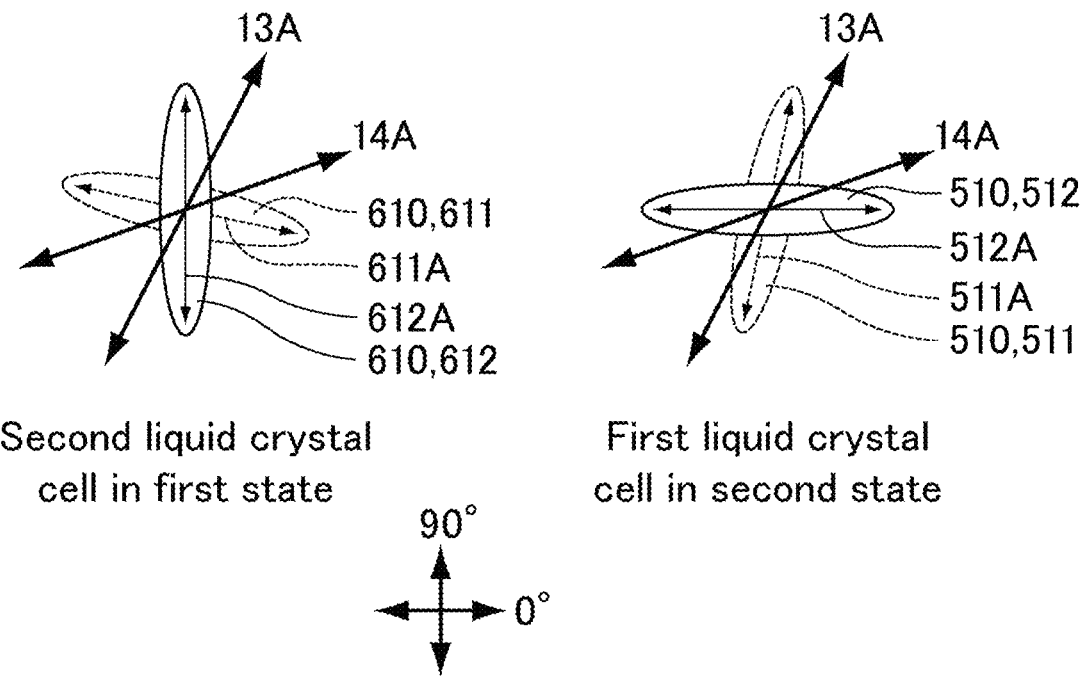
FIG. 25 includes schematic views showing the alignments of liquid crystal molecules in the first state and the second state in the optical element of Modified Example 1 of Embodiment 5.

In the present modified example, an in-cell varifocal element 30 is described in which the PB lens 20 in Embodiment 5 is disposed in the optical element 10. FIG. 23 is a schematic cross-sectional view of a varifocal element of Modified Example 1 of Embodiment 5. FIG. 24 is an enlarged schematic cross-sectional view of the varifocal element of Modified Example 1 of Embodiment 5. FIG. 25 includes schematic views showing the alignments of liquid crystal molecules in the first state and the second state in the optical element of Modified Example 1 of Embodiment 5.

The varifocal element 30 of the present modified example is, as shown in FIG. 23, a varifocal element 30B with multiple focal lengths including not less than 2 stacks each consisting of the optical element 10 and the PB lens 20.

The PB lens 20 in the varifocal element 30 of the present modified example is disposed in the optical element 10 as shown in FIG. 24. Such a structure including the PB lens 20 in the cell eliminates the need for externally providing the PB lens 20, thus enabling a significant reduction of the production cost. The structure also can reduce the thickness of the varifocal element 30. FIG. 23 shows, for convenience, the optical element 10 and the PB lens 20 separately.

As shown in FIG. 24, the varifocal element 30 of the present modified example specifically includes, sequentially from the light incident side toward the light emitting side, the second quarter-wave film 14; the first quarter-wave film 13; the first substrate 100; the first liquid crystal layer 500; the second substrate 200; the third substrate 300; the second liquid crystal layer 600; the PB lens 20; and the fourth substrate 400.

The varifocal element 30 may include the first alignment film 41 between the first substrate 100 and the first liquid crystal layer 500. The varifocal element 30 may also include the second alignment film 42 between the second substrate 200 and the first liquid crystal layer 500. The varifocal element 30 may also include the third alignment film 43 between the third substrate 300 and the second liquid crystal layer 600. The varifocal element 30 may also include the fourth alignment film 44 between the PB lens 20 and the second liquid crystal layer 600.

In the present modified example, the first liquid crystal cell 11A and the second liquid crystal cell 11B each have the same configuration as in Embodiment 1, and the first alignment film 41, the second alignment film 42, the third alignment film 43, and the fourth alignment film 44 are horizontal alignment films.

As shown in FIG. 25, in the present modified example, preferably, the alignment direction 512A of the first liquid crystal molecules 512 near the second substrate 200 in the second state is at an azimuthal angle of not smaller than −9° and not greater than 7°, and the alignment direction 612A of the second liquid crystal molecules 612 near the fourth substrate 400 in the first state is not smaller than 85° and not greater than 96°. This configuration enables switching between polarization modulation and no polarization modulation over a broader bandwidth.

In the present modified example, the negative C plate 12 is not disposed between the first liquid crystal cell 11A and the second liquid crystal cell 11B. Yet, the negative C plate 12 may be disposed between the first liquid crystal cell 11A and the second liquid crystal cell 11B.

The PB lens 20 (PB lens layer) disposed in the cell is, in other words, an in-cell phase difference layer that is patterned such that its slow axis direction rotates in the plane.

The PB lens can be disposed in the cell by the following procedure, for example. The fourth substrate 400 is coated with a photosensitive material for forming an in-cell PB lens, the material containing a polymer represented by the following general formula (PB-1), so that a film for forming a PB lens is formed, followed by alignment treatment on the film for forming a PB lens. Thus, the PB lens 20 can be disposed in the cell.

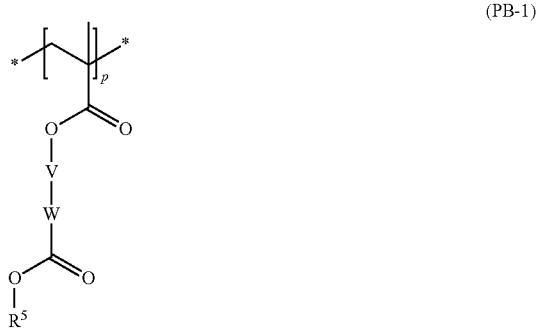

(PB-1)

In the formula, V represents a spacer group, W represents a divalent organic group having a photo-functional group, $R^5$ represents a monovalent group, and p represents an integer of not smaller than 1.

Preferably, V in the general formula (PB-1) represents a spacer group. V preferably has an alkylene group having a carbon number of not smaller than 2 represented by $-(CH_2)_n-$ (where n is an integer of not smaller than 2). This configuration can provide a favorable phase difference. The alkylene group preferably has a linear structure.

W in the general formula (PB-1) represents a divalent organic group having a photo-functional group. Examples of the divalent organic group having a photo-functional group include divalent organic groups having a photo-functional group (photoreactive site) that can undergo a reaction such as photodimerization, photoisomerization, photo-Fries rearrangement, and photolysis. Examples of photo-functional groups that can undergo photodimerization and photoisomerization include cinnamate, chalcone, coumarin, and stilbene groups. Examples of photo-functional groups that can undergo photoisomerization include an azobenzene group. Examples of photo-functional groups that can undergo photo-Fries rearrangement include a phenolic ester group. Examples of photo-functional groups that can undergo photolysis include a cyclobutane ring.

$R^5$ in the general formula (PB-1) represents a monovalent group. $R^5$ is preferably a hydrogen atom or a monovalent hydrocarbon group, more preferably a hydrogen atom, a methyl group, or an ethyl group.

The alignment treatment on the film for forming a PB lens is performed by a plurality of alignment treatments, and the polarization directions of the alignment treatments are different from one another. The alignment treatment on the film for forming a PB lens includes, for example, first alignment treatment of performing alignment treatment on the film for forming a PB lens using light polarized at an azimuthal angle of 0°; second alignment treatment of performing alignment treatment on the film for forming a PB lens using light polarized at an azimuthal angle of 45°; third alignment treatment of performing alignment treatment on the film for forming a PB lens using light polarized at an azimuthal angle of 90°; and fourth alignment treatment of performing alignment treatment on the film for forming a PB lens using light polarized at an azimuthal angle of 135°.

Figure 26:
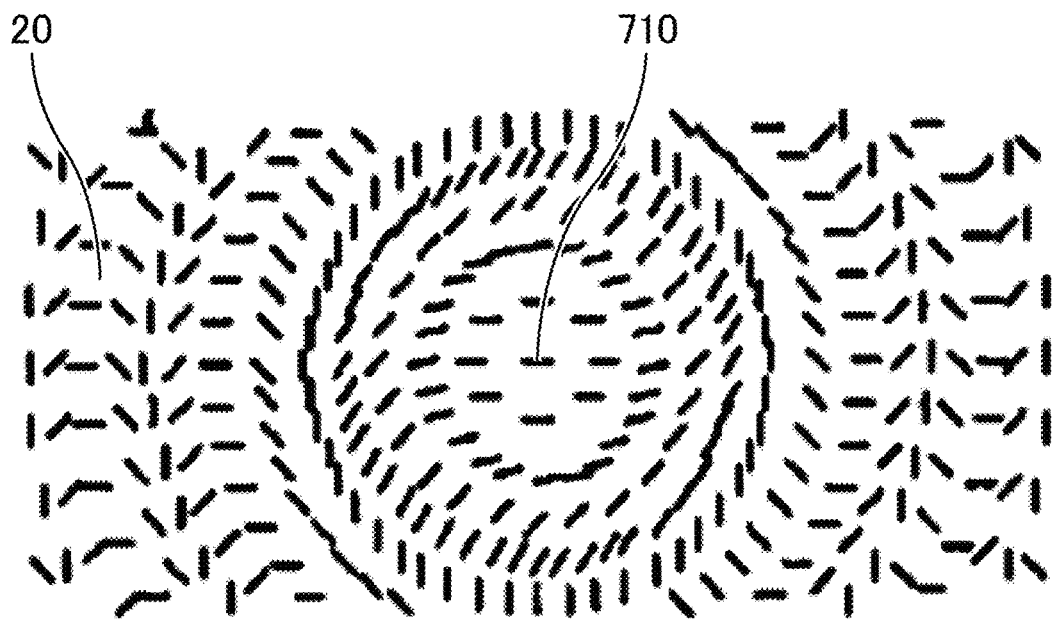
FIG. 26 is a schematic plan view of an alignment pattern of a PB lens in the varifocal element of Modified Example 1 of Embodiment 5.

FIG. 26 is a schematic plan view of an alignment pattern of a PB lens in the varifocal element of Modified Example 1 of Embodiment 5. As shown in FIG. 26, the alignment direction in the alignment pattern of the PB lens 20 continuously rotates from the center toward the periphery, for example. Also, in a plan view, the alignment directions of the liquid crystal molecules 710 at a position corresponding to a certain radius R are all the same. In other words, the alignment pattern has a predetermined angle distribution according to the distance from the center. The period $P_1$ and the angle of diffraction θ of the alignment pattern satisfy the expression $P_1=2×λ/\sin θ$. A shorter period of the alignment pattern causes greater diffraction of light. This means that the lens focusing effect can be achieved by widening the pitch (reducing the angle of diffraction) at a position closer to the center of the optical element while narrowing the pitch (increasing the angle of diffraction) at a position closer to the periphery.

The later-described PB lenses 20 with different diopters D can be produced by varying the design of the alignment pattern period. The alignment pattern can also be designed based on the teachings from WO 2020/186123 and JP 2008-532085 T.

In the present embodiment, the alignment treatment is performed through four times of exposure to light. Yet, increasing the number of times of exposure to light produces a varifocal element 30 having higher diffraction efficiency. Production through multiple photo-alignment treatments utilizing a photo-alignment apparatus is compatible with the existing liquid crystal plants, and thus leads to a high productivity. Although production of the PB lens 20 by multiple photo-alignment treatments is described in the present embodiment, the alignment pattern may be formed by an existing technique such as optical interferometry or laser direct lithography.

The phase difference introduced by the PB lens 20 (PB lens layer) disposed in the cell is preferably not less than 100 nm and not more than 500 nm, more preferably not less than 200 nm and not more than 350 nm, particularly preferably λ/2 (i.e., 275 nm). The diffraction efficiency, represented by the following Formula 1, reaches the maximum when Δnd=λ/2.

$$\eta = \sin^2\left(\frac{\pi \Delta nd}{\lambda}\right) \quad \text{(Formula 1)}$$

The varifocal element 30 of the present modified example, i.e., the varifocal element 30 with multiple focal lengths including a combination of a plurality of stacks each consisting of the optical element 10 and the PB lens 20 disposed in the cell of the optical element 10, has the following features, for example.

Figure 27:
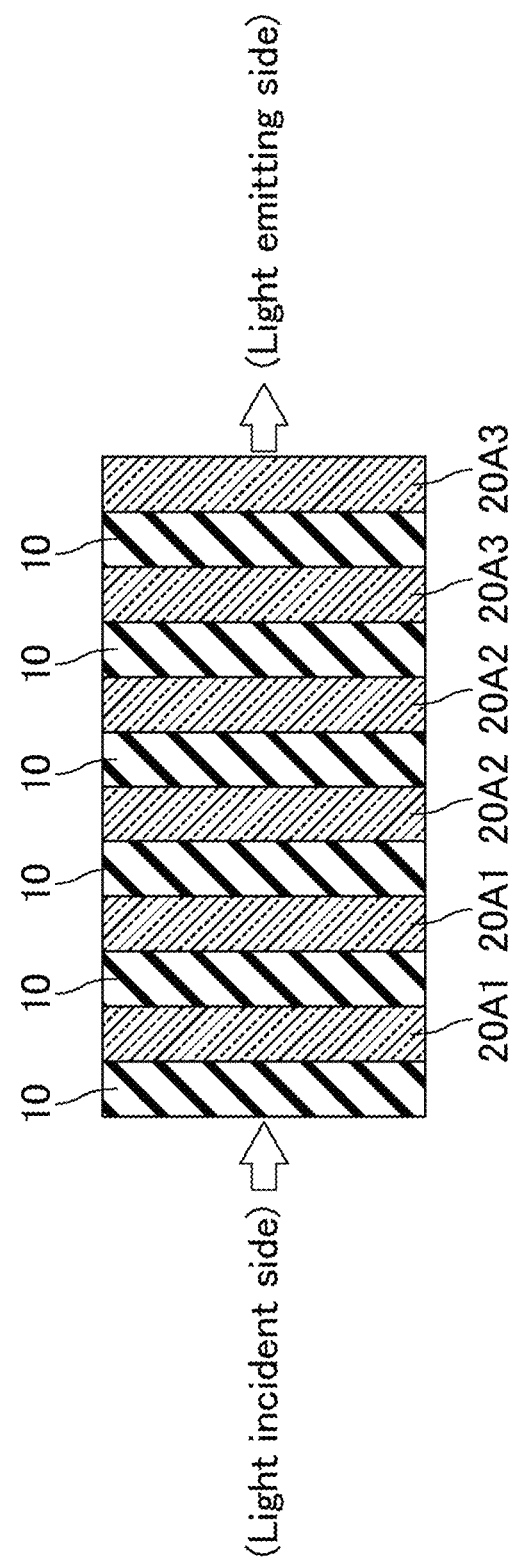
FIG. 27 is a schematic cross-sectional view showing the detailed structure of the varifocal element of Modified Example 1 of Embodiment 5.

FIG. 27 is a schematic cross-sectional view showing the detailed structure of the varifocal element of Modified Example 1 of Embodiment 5. As shown in FIG. 27, the varifocal element 30 includes, sequentially from the light incident side toward the light emitting side, an optical element 10, a first PB lens 20A1, an optical element 10, another first PB lens 20A1, another optical element 10, a second PB lens 20A2, another optical element 10, another second PB lens 20A2, another optical element 10, a third PB lens 20A3, another optical element 10, and another third PB lens 20A3.

The first PB lenses 20A1 each have a diopter D of ±0.25. The second PB lenses 20A2 each have a diopter D of ±0.5. The third PB lenses 20A3 each have a diopter D of ±1. Each lens causes incident right-handed circularly polarized light to converge (+) while causing incident left-handed circularly polarized light to diverge (−).

The following Table 1 shows the states of the optical elements 10 and the PB lenses 20A1, 20A2, and 20A3 in the varifocal element 30 of Modified Example 1 of Embodiment 5 in each mode.

TABLE 1

|  | F0 | F1 | F-2.5 |
| --- | --- | --- | --- |
| Optical element | First state | First state | Second state |
| First PB lens | 0.25 D | 0.25 D | −0.25 D |
| Optical element | First state | First state | Second state |
| First PB lens | −0.25 D | −0.25 D | −0.25 D |
| Optical element | First state | First state | First state |
| Second PB lens | 0.5 D | 0.5 D | 0.5 D |
| Optical element | First state | Second state | First state |
| Second PB lens | −0.5 D | 0.5 D | −0.5 D |
| Optical element | First state | First state | Second state |
| Third PB lens | 1 D | −1 D | −1 D |
| Optical element | First state | First state | Second state |
| Third PB lens | −1 D | 1 D | −1 D |
| Emission | 0 D | 1 D | −2.5 D |

The F0 mode is described with reference to Table 1. This mode sets all the optical elements 10 in the first state (no modulation). Right-handed circularly polarized light entering the primary optical element 10 undergoes no modulation and enters the primary first PB lens 20A1 in the same state. The light here converges due to the lens power 0.25 D. The exiting light is converted to left-handed circularly polarized light. Causing such a change in direction of circularly polarized light passing through a PB lens 20 is the feature of the PB lens 20. Since the optical elements 10 provide no modulation, the left-handed circularly polarized light passes through the secondary optical element 10 as is. The light entering the secondary first PB lens 20A1 diverges due to the lens power −0.25 D. The incident light therefore passes through the primary four lenses from the light incident side (optical element 10, first PB lens 20A1, optical element 10, and first PB lens 20A1) as is. The light then passes through the subsequent second PB lenses 20A2 and third PB lenses 20A3 in the same manner and exits as emission light in the same state as the incident light, so that the varifocal element has power 0 D.

The F1 mode is described with reference to Table 1. In this mode, only the quaternary optical element 10 from the light incident side is set in the second state. In this mode, after passing through the primary second PB lens 20A2, the light is left-handed circularly polarized light due to the lens power 0.5 D as in the F0 mode. The light is then converted to right-handed circularly polarized light by the optical element in the second state. The light then passes through the secondary second PB lens 20A2 with power +0.5 D and thus emitted as left-handed circularly polarized light due to the total lens power 1 D. The light is emitted as the same left-handed circularly polarized light, so that the varifocal element has power 1 D. The light is converted to left-handed circularly polarized light by the secondary second PB lens 20A2, and thus the third PB lenses 20A3 have a power with the opposite sign from those in the F0 mode.

Figure 28:
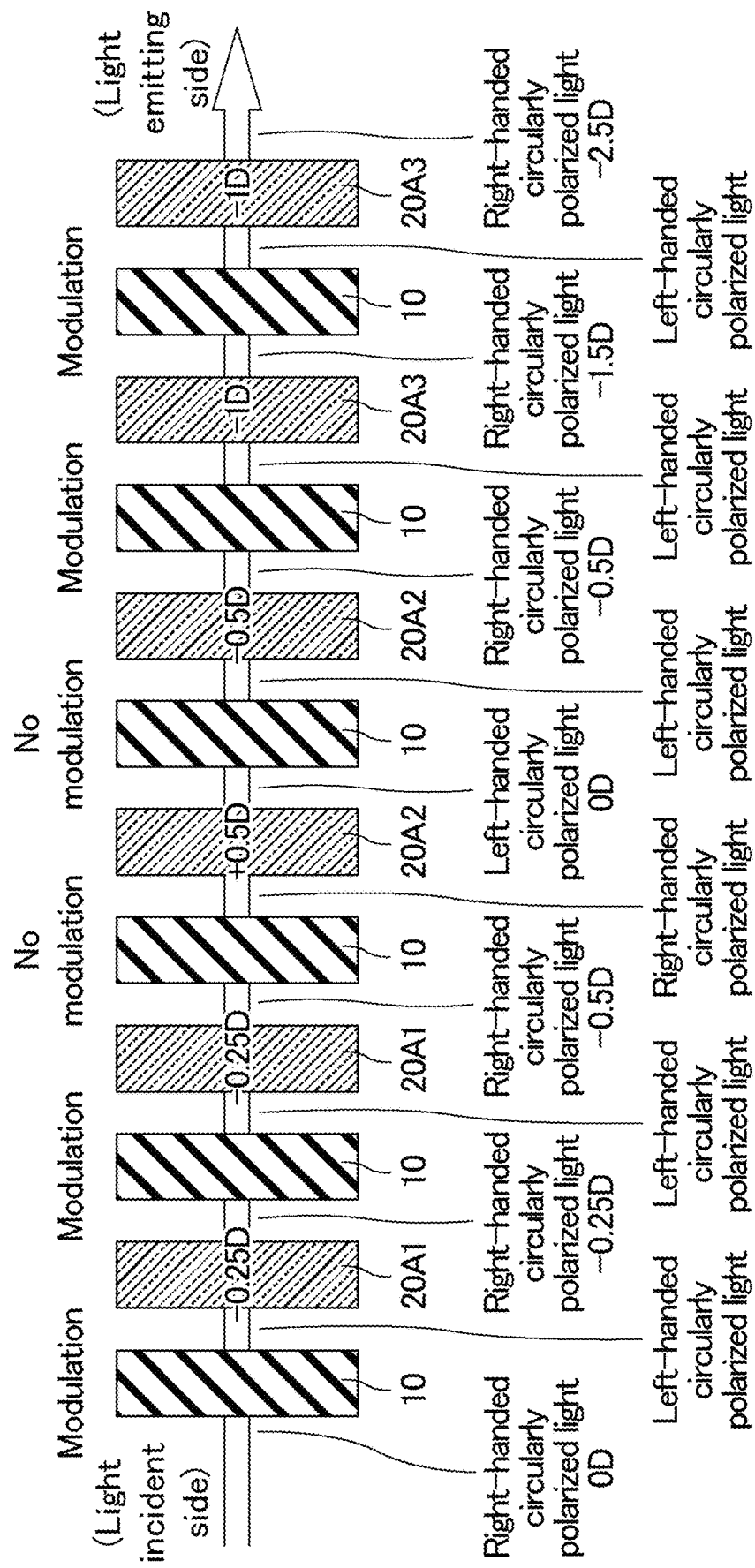
FIG. 28 shows the polarization states in the F-2.5 mode in the varifocal element of Modified Example 1 of Embodiment 5.

The F-2.5 mode is described with reference to Table 1 and FIG. 28. FIG. 28 shows the polarization states in the F-2.5 mode in the varifocal element of Modified Example 1 of Embodiment 5. As shown in Table 1 and FIG. 28, in the F-2.5 mode, the light is converted to right-handed circularly polarized light by the primary four lenses from the light incident side with power −0.5 D (optical element 10, first PB lens 20A1, optical element 10, and first PB lens 20A1). The light passes through the last four lenses on the light emitting side with power −2 D (optical element 10, third PB lens 20A3, optical element 10, and third PB lens 20A3), so that the light is emitted as right-handed circularly polarized light due to the total lens power −2.5 D.

In addition, based on the same principle, the optical element 10 to be in the modulation second state can be varied to achieve multiple focal distances. The present modified example selectively shows only the three conditions.

Modified Example 2 of Embodiment 5

In Embodiment 5 and Modified Example 1 of Embodiment 5, PB lenses in the form of film (in-cell polymer lenses) are used. Yet, a PB lens itself may be formed using a liquid crystal layer having fluidity, i.e., a liquid crystal layer that can be driven by voltage application. In the present modified example, a PB lens formed using a liquid crystal layer that can be driven by voltage application is described.

The polymer PB lenses as in Embodiment 5 and Modified Example 1 of Embodiment 5 are called passive PB lenses as the lenses themselves cannot be driven by voltage application. In contrast, a PB lens formed using a liquid crystal layer having fluidity is called active PB lens as it can be driven by voltage application.

An active PB lens can be produced by the following procedure. First, the alignment film on one of paired substrates is subjected to alignment treatment for PB lens pattern. The alignment film on the other substrate is made to function as a weak anchoring alignment film (slippery interface). Both substrates include a transparent electrode. When the paired substrates are attached to each other with a liquid crystal layer in between, the liquid crystal molecules are aligned along the pattern formed by the alignment treatment, so that the liquid crystal layer exhibits the PB lens pattern alignment. This achieves an active PB lens. More preferably, thereafter, polymer sustained alignment (PSA) is performed to stabilize the alignment of the liquid crystal molecules in the interfaces for achievement of an active PB lens with high alignment stability and high reliability.

The active PB lens in the voltage OFF state exhibits a PB lens pattern and thus causes incident light to converge or diverge according to the polarization state of the incident light. In the voltage ON state, the liquid crystal molecules are vertically aligned and thus the lens transmits the incident light as is without causing convergence or divergence.

A varifocal element utilizing a sHWP and a passive PB lens in combination as in Embodiment 5 and Modified Example 1 of Embodiment 5 switches between the two modes of convergence and divergence. Meanwhile, a varifocal element utilizing a sHWP and an active PB lens in combination as in the present modified example can switch among the three modes of convergence, divergence, and transmission. This allows smoother focal distance control or reduction in the number of stacks of voltage-driven elements used to achieve the same number of focal distances.

Embodiment 6

Figure 29:
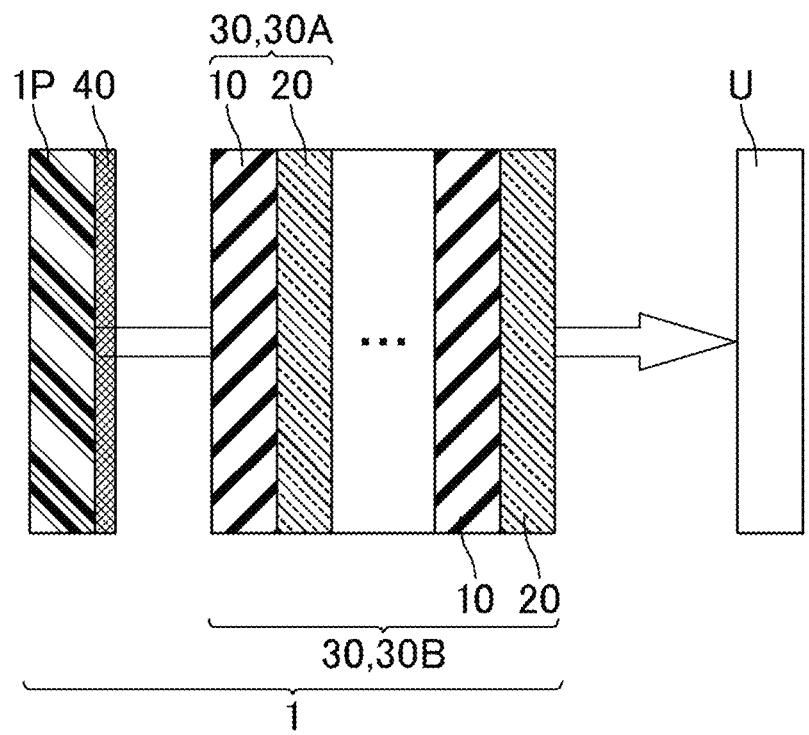
FIG. 29 is a schematic cross-sectional view of a head mounted display of Embodiment 6.
Figure 30:
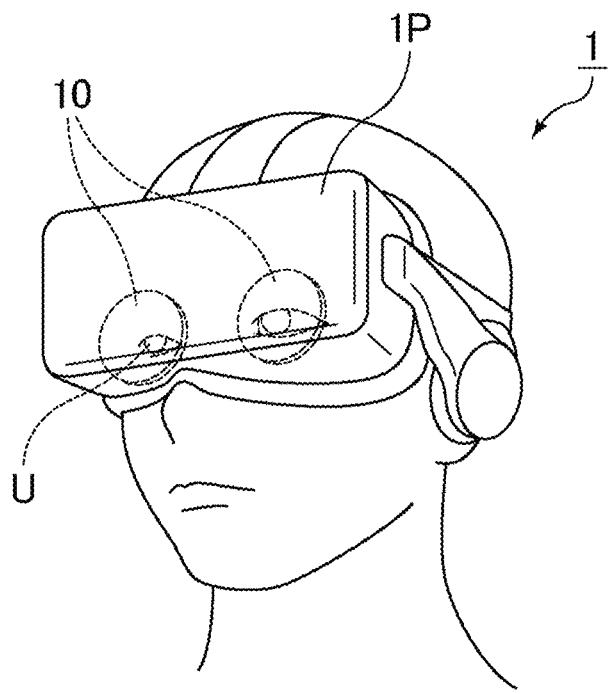
FIG. 30 is a schematic perspective view of an example of the appearance of the head mounted display of Embodiment 6.

The features unique to the present embodiment are mainly described here, and description of the matters already described in Embodiment 1, the modified examples thereof, Embodiments 2 to 5, and the modified examples thereof is omitted. In the present embodiment, a head mounted display including the varifocal element 30 is described. FIG. 29 is a schematic cross-sectional view of a head mounted display of Embodiment 6. FIG. 30 is a schematic perspective view of an example of the appearance of the head mounted display of Embodiment 6.

As shown in FIG. 29 and FIG. 30, a head mounted display 1 of the present embodiment includes a display panel 1P that displays images, a phase difference plate (retarder) 40, and the varifocal element 30. The head mounted display 1 causes light emitted from the display panel 1P, such as a liquid crystal display device or an organic electroluminescent display device, to be converted to circularly polarized light through the phase difference plate 40, to pass through the varifocal element 30, and to be perceived by a user U.

EXAMPLES

The effects of the present invention are described below with reference to examples and comparative examples. The present invention is not limited to these examples.

Example 1

An optical element 10 of Example 1 having the same configuration as in Embodiment 1 was produced. The first liquid crystal cell 11A and the second liquid crystal cell 11B were stacked, with the negative C plate 12 introducing a thickness direction retardation Rth of −110 nm in between. The first liquid crystal molecules 510 and the second liquid crystal molecules 610 were positive liquid crystal molecules having a refractive index anisotropy Δn of 0.066. The first alignment film 41, the second alignment film 42, the third alignment film 43, and the fourth alignment film 44 were horizontal alignment films.

The alignment direction 511A of the first liquid crystal molecules 511 near the first substrate 100 in the second state was at an azimuthal angle of 0°, and the alignment direction 512A of the first liquid crystal molecules 512 near the second substrate 200 in the second state was at an azimuthal angle of 68°. Also, the alignment direction 611A of the second liquid crystal molecules 611 near the third substrate 300 in the first state was at an azimuthal angle of 90°, and the alignment direction 612A of the second liquid crystal molecules 612 near the fourth substrate 400 in the first state was at an azimuthal angle of 158°. The alignment direction 511A of the first liquid crystal molecules 511 near the first substrate 100 in the second state, the alignment direction 512A of the first liquid crystal molecules 512 near the second substrate 200 in the second state, the alignment direction 611A of the second liquid crystal molecules 611 near the third substrate 300 in the first state, and the alignment direction 612A of the second liquid crystal molecules 612 near the fourth substrate 400 in the first state were respectively the same as the alignment treatment directions for the first alignment film 41, the second alignment film 42, the third alignment film 43, and the fourth alignment film 44. In EXAMPLES, the alignment directions 511A, 512A, 611A, and 612A were thus determined from the alignment treatment directions for the first alignment film 41, the second alignment film 42, the third alignment film 43, and the fourth alignment film 44.

The first quarter-wave film 13 exhibited reverse wavelength dispersion. The second quarter-wave film 14 exhibited flat wavelength dispersion. The slow axis 13A of the first quarter-wave film 13 was at an azimuthal angle of 57.2°. The slow axis 14A of the second quarter-wave film 14 was at an azimuthal angle of 12.2°.

In the first state, the first liquid crystal layer 500 was driven by voltage application. The voltage applied to the first liquid crystal layer 500 in the first state is preferably as high as possible. In the present example, a voltage of 20 V was applied. Since the negative C plate 12 was designed to cancel the phase difference introduced by the driven liquid crystal layer (first liquid crystal layer 500), only the non-driven liquid crystal layer (second liquid crystal layer 600) was effective. Thus, a sHWP having a wide viewing angle range and a broad bandwidth was achieved.

In the second state, conversely to the first state, the second liquid crystal layer 600 was driven by voltage application, so that the liquid crystal layer (first liquid crystal layer 500) was effective which had a 90-degree-rotated alignment direction from the liquid crystal layer (second liquid crystal layer 600) effective in the first state. Thus, light having passed through the two quarter-wave films (the first quarter-wave film 13 and the second quarter-wave film 14) was the opposite-handed circularly polarized light from the light incident on the optical element 10.

Comparative Example 1

Figure 31:
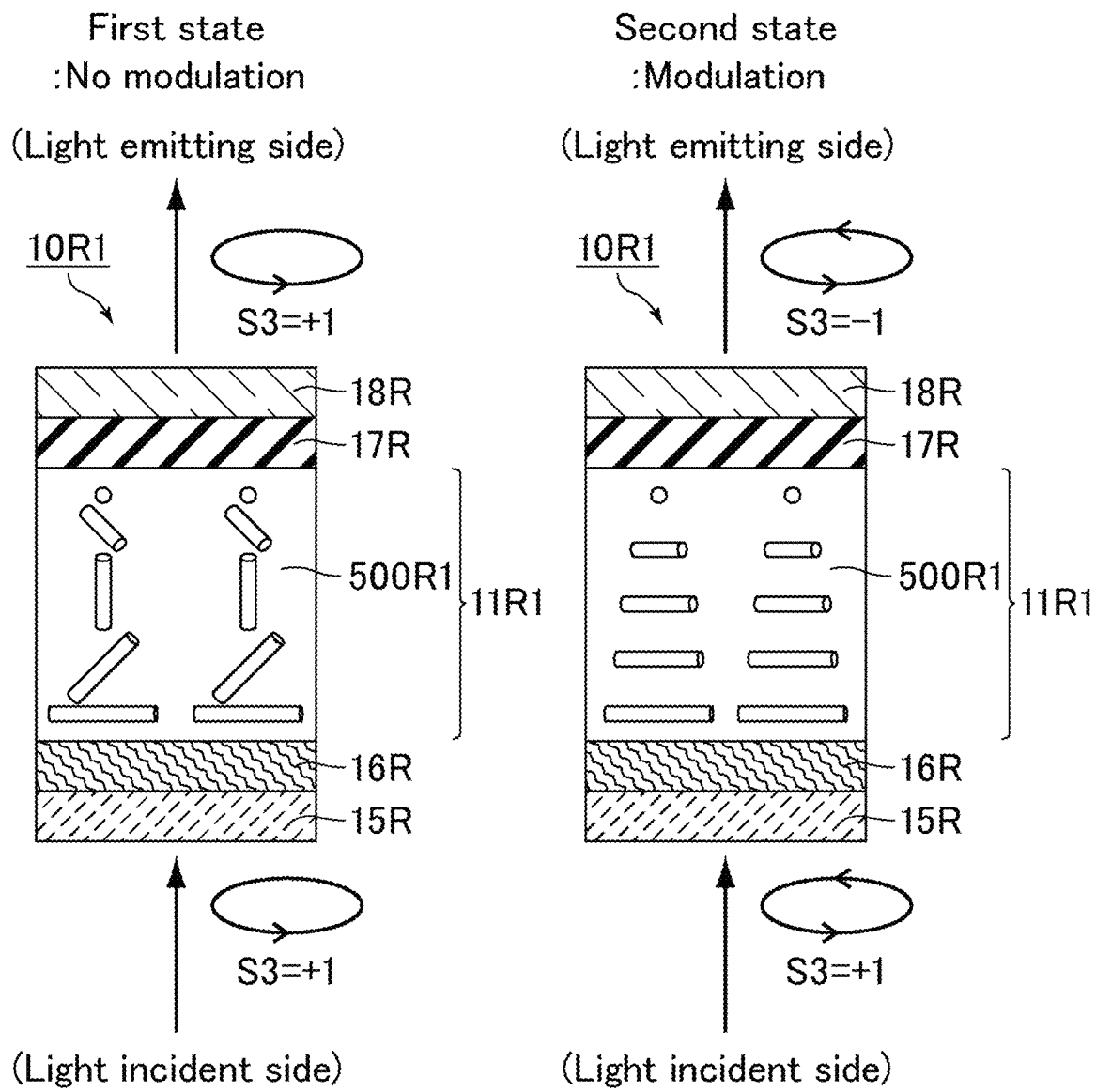
FIG. 31 includes schematic cross-sectional views of an optical element of Comparative Example 1.

FIG. 31 shows schematic cross-sectional views of an optical element of Comparative Example 1. An optical element 10R1 of Comparative Example 1 shown in FIG. 31 was produced. The optical element 10R1 of Comparative Example 1 corresponds to the optical element of Comparative Embodiment 1. The optical element 10R1 of Comparative Example 1 included, sequentially from the light incident side toward the light emitting side, the quarter-wave film 15R whose slow axis was at an azimuthal angle of 75°, the half-wave film 16R whose slow axis was at an azimuthal angle of 15°, the liquid crystal cell 11R1 including a TN liquid crystal layer 500R1 with 90°-twisted alignment, the half-wave film 17R whose slow axis was at an azimuthal angle of −75°, and the quarter-wave film 18R whose slow axis was at an azimuthal angle of −15°.

Comparative Example 2

Figure 32:
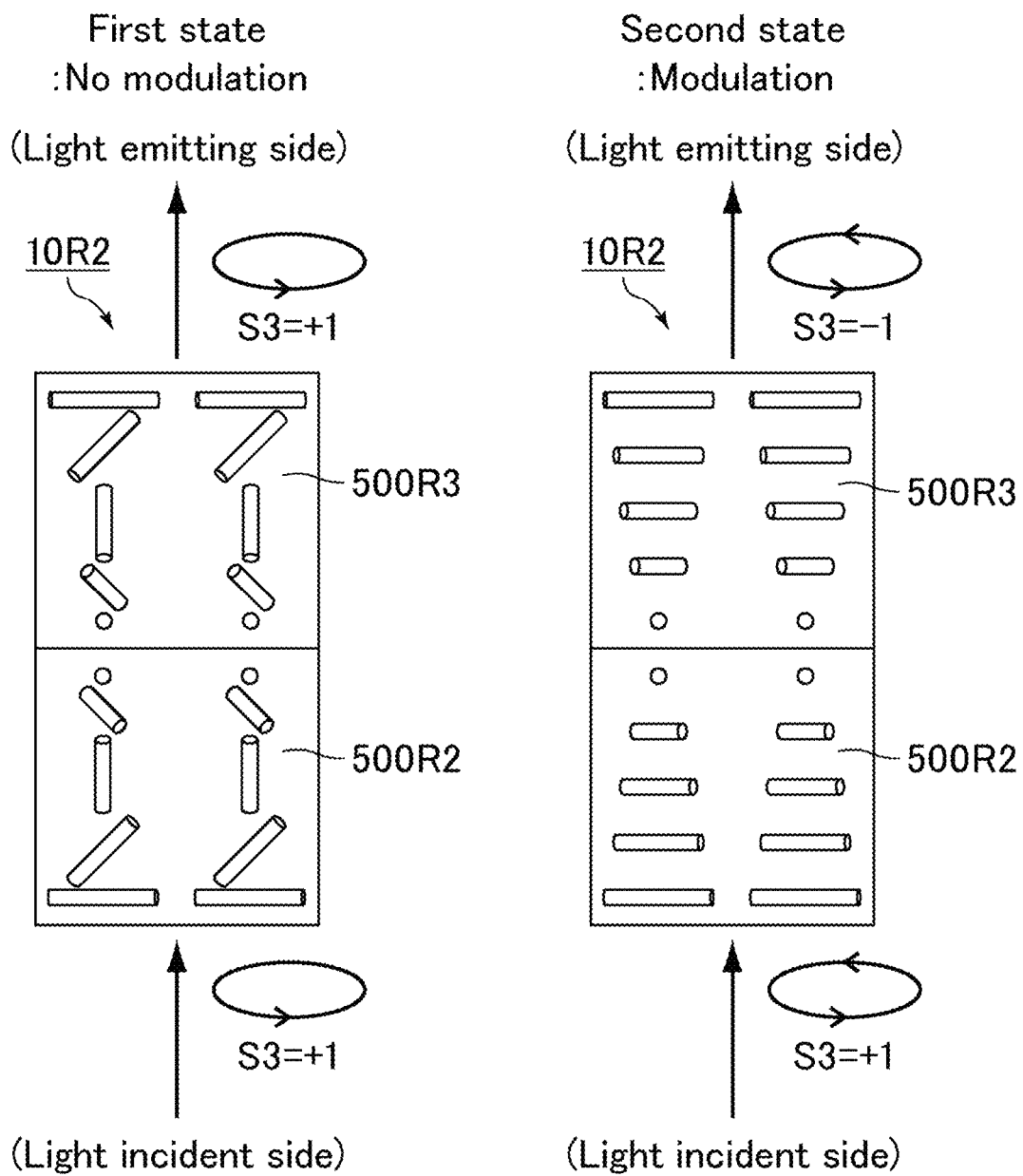
FIG. 32 includes schematic cross-sectional views of an optical element of Comparative Example 2.

FIG. 32 shows schematic cross-sectional views of an optical element of Comparative Example 2. An optical element of Comparative Example 2 shown in FIG. 32 was produced. The optical element 10R2 of Comparative Example 2 corresponds to the optical element of Comparative Embodiment 2. The optical element 10R2 of Comparative Example 2 included a stack including, sequentially from the light incident side toward the light emitting side, the TN liquid crystal layer 500R2 with 70°-twisted alignment and the TN liquid crystal layer 500R3 with −70°-twisted alignment.

(Evaluation of Example 1, Comparative Example 1, and Comparative Example 2

Figure 33:
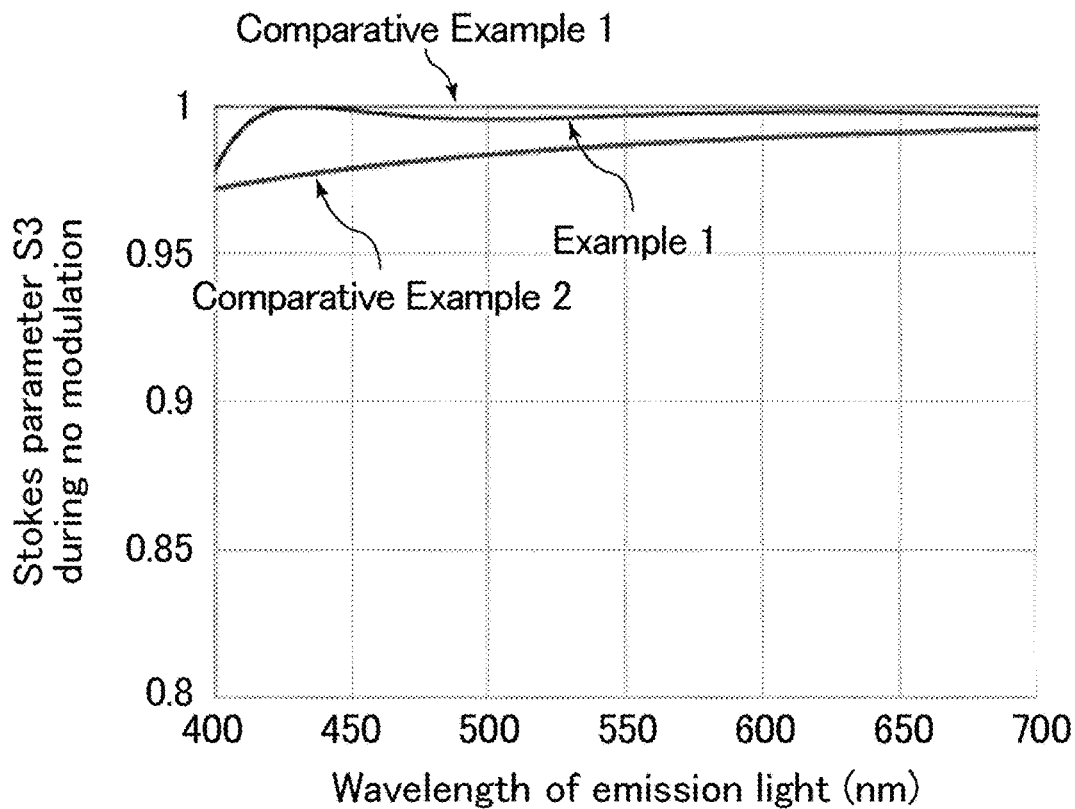
FIG. 33 is a graph showing the relationship between Stokes parameter S3 during no modulation and the wavelength of emission light in the optical elements of Example 1, Comparative Example 1, and Comparative Example 2.
Figure 34:
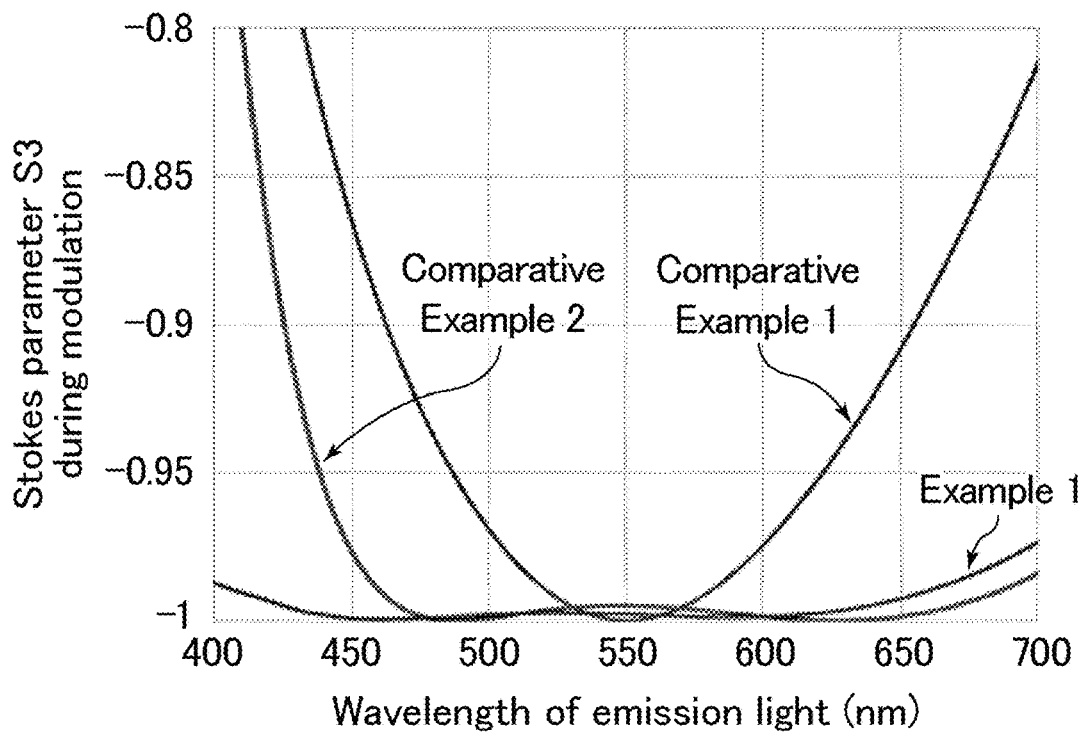
FIG. 34 is a graph showing the relationship between Stokes parameter S3 during modulation and the wavelength of emission light in the optical elements of Example 1, Comparative Example 1, and Comparative Example 2.

The Stokes parameter S3 of the emission light resulting from right-handed circularly polarized light (S3=+1) incident on each of the optical elements (sHWPs) of Example 1, Comparative Example 1, and Comparative Example 2 was evaluated. In the examples and comparative examples herein, unless otherwise specified, Stokes parameter S3 of emission light derived from incident right-handed circularly polarized light (S3=+1) was evaluated. FIG. 33 is a graph showing the relationship between Stokes parameter S3 during no modulation and the wavelength of emission light in the optical elements of Example 1, Comparative Example 1, and Comparative Example 2. FIG. 34 is a graph showing the relationship between Stokes parameter S3 during modulation and the wavelength of emission light in the optical elements of Example 1, Comparative Example 1, and Comparative Example 2. As shown in FIG. 33 and FIG. 34, in Example 1, a state with |S3|≥0.9 was achieved in a wavelength range of 450 nm to 650 nm both during modulation and during no modulation.

Figure 35:
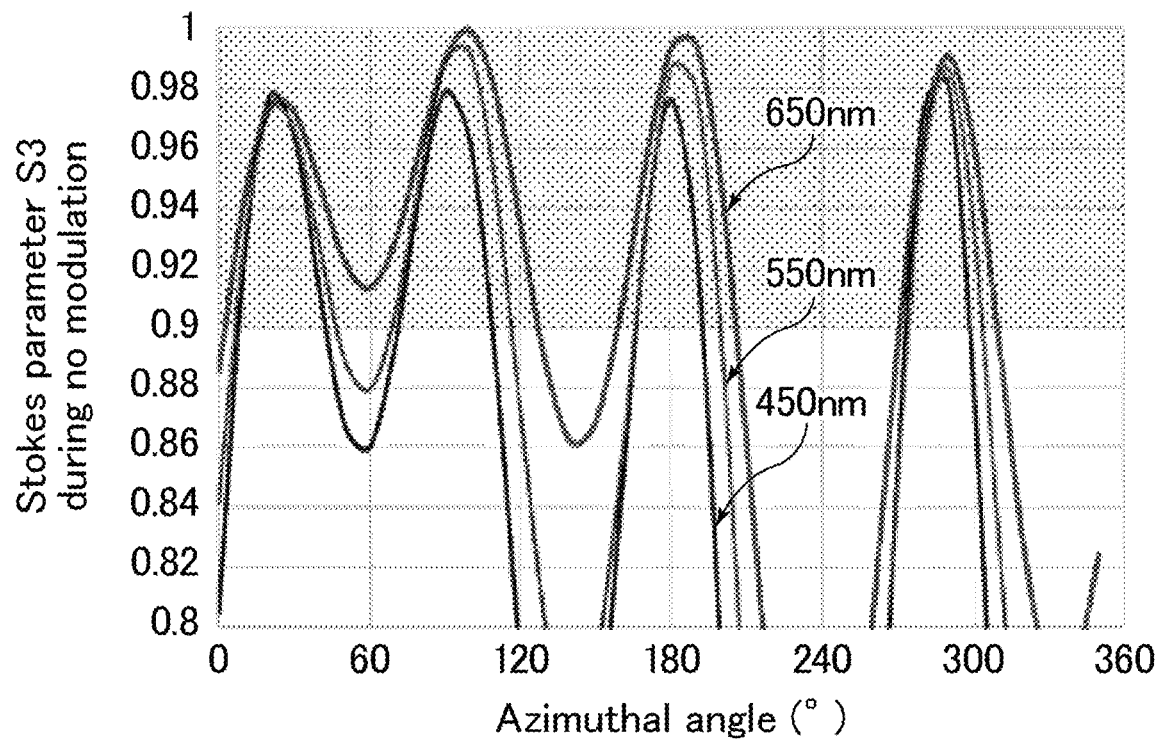
FIG. 35 is a graph showing the relationship between Stokes parameter S3 during no modulation and the azimuthal angle in the optical element of Comparative Example 1 when the angle of incidence is set to 30°.
Figure 36:
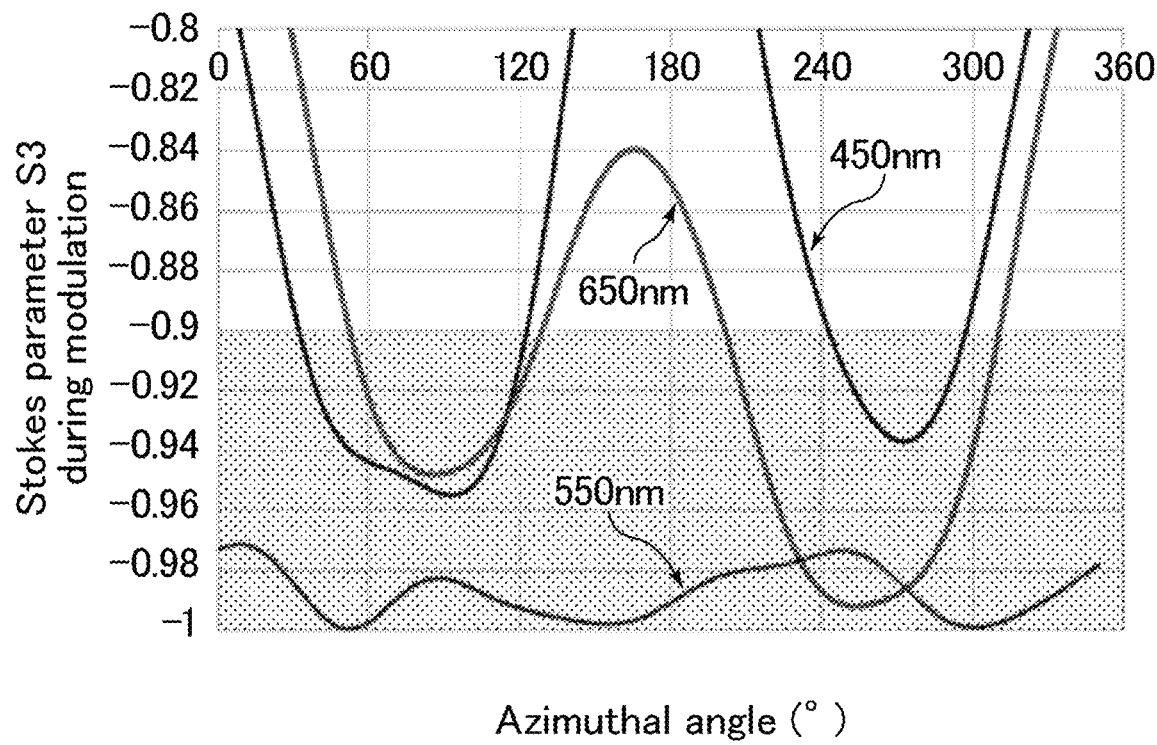
FIG. 36 is a graph showing the relationship between Stokes parameter S3 during modulation and the azimuthal angle in the optical element of Comparative Example 1 when the angle of incidence is set to 30°.
Figure 37:
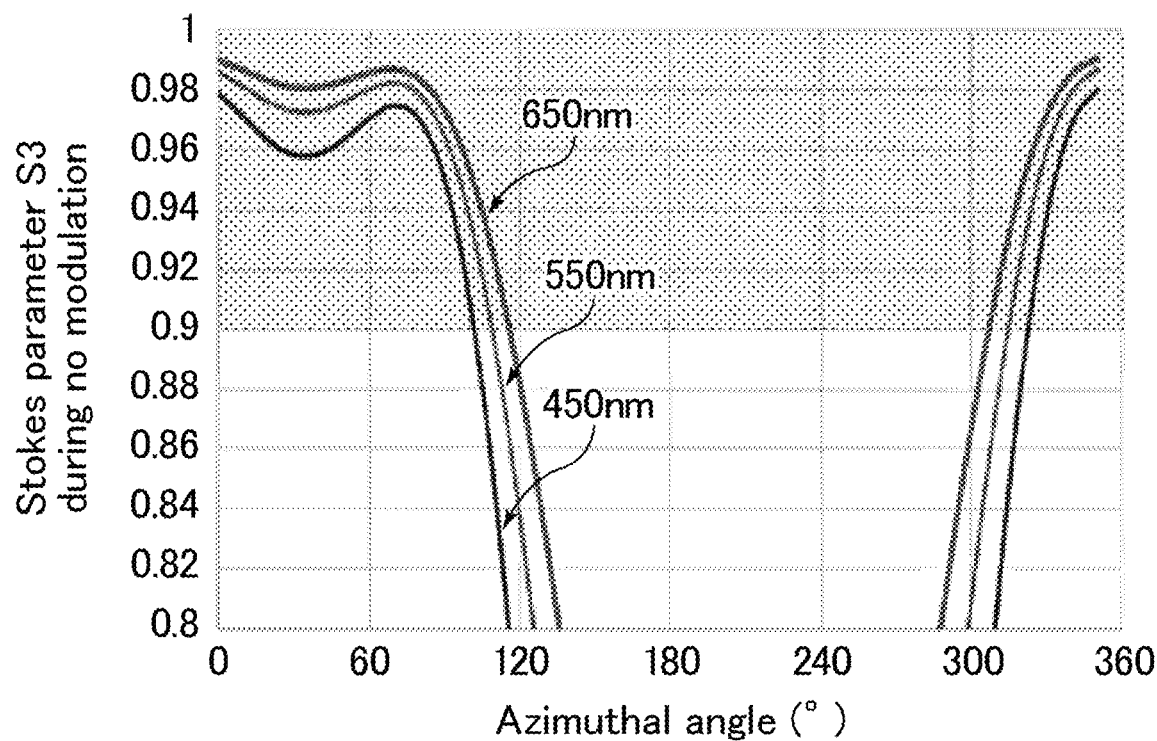
FIG. 37 is a graph showing the relationship between Stokes parameter S3 during no modulation and the azimuthal angle in the optical element of Comparative Example 2 when the angle of incidence is set to 30°.
Figure 38:
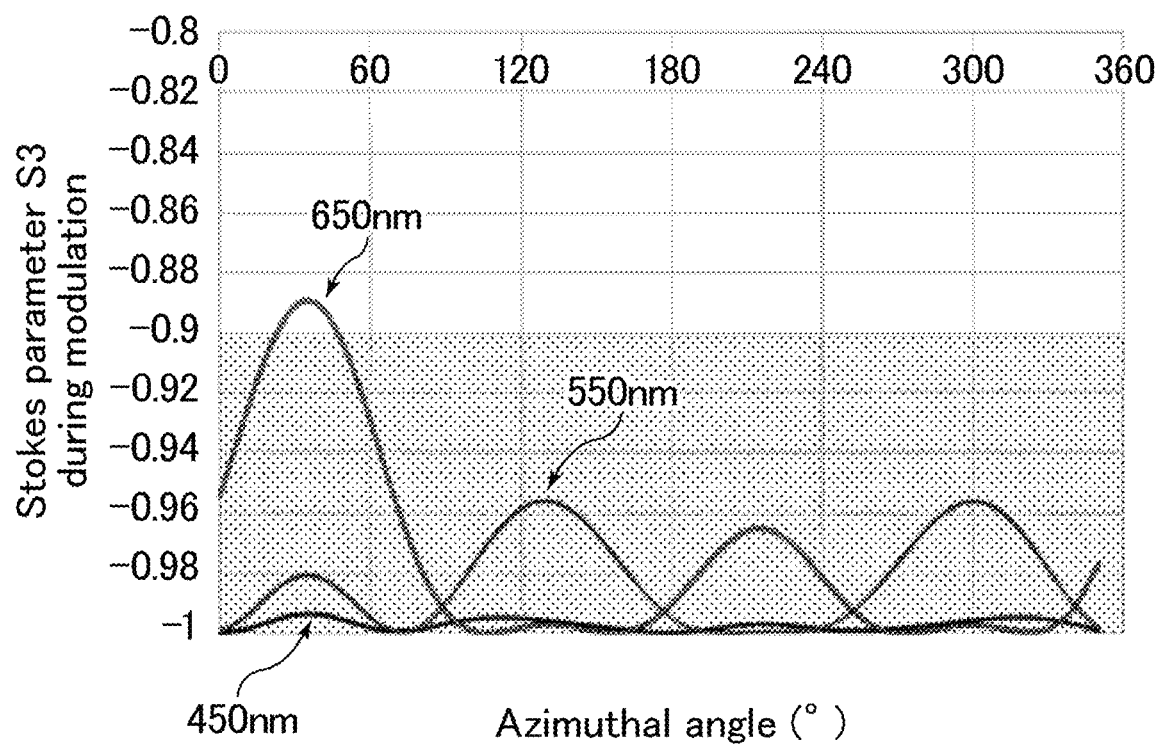
FIG. 38 is a graph showing the relationship between Stokes parameter S3 during modulation and the azimuthal angle in the optical element of Comparative Example 2 when the angle of incidence is set to 30°.
Figure 39:
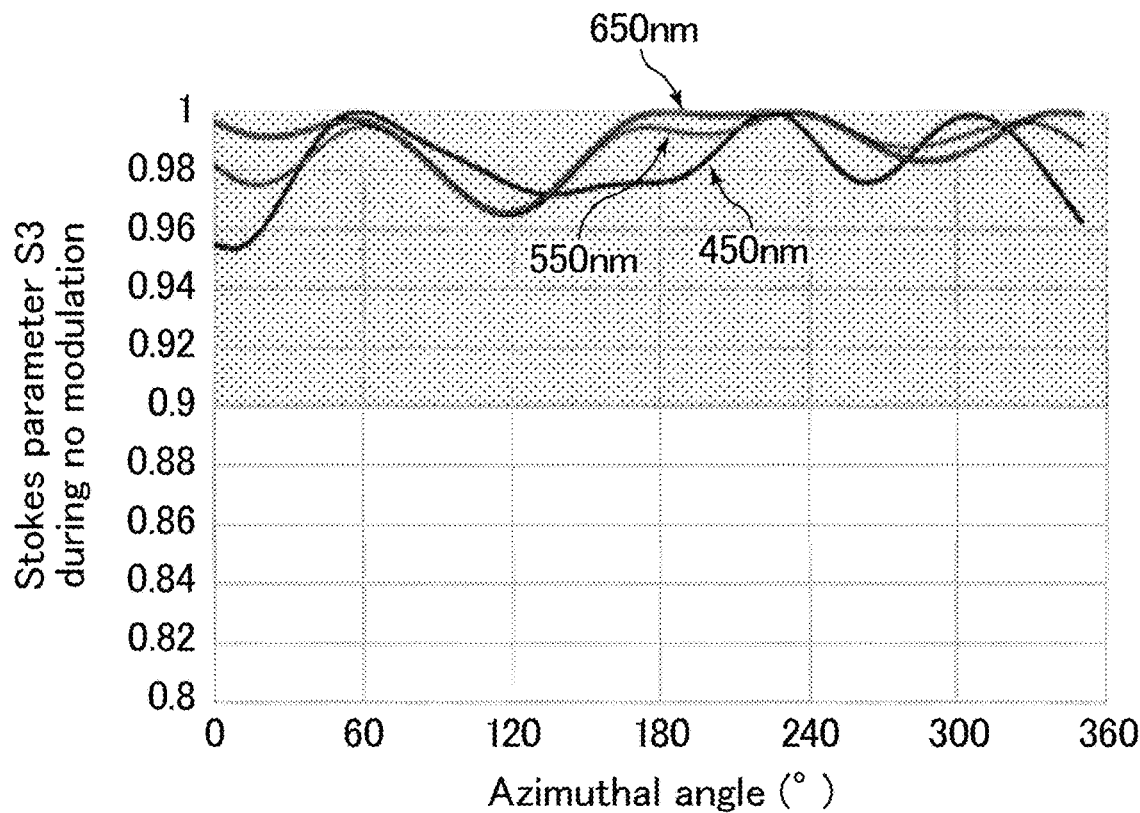
FIG. 39 is a graph showing the relationship between Stokes parameter S3 during no modulation and the azimuthal angle in the optical element of Example 1 when the angle of incidence is set to 30°.
Figure 40:
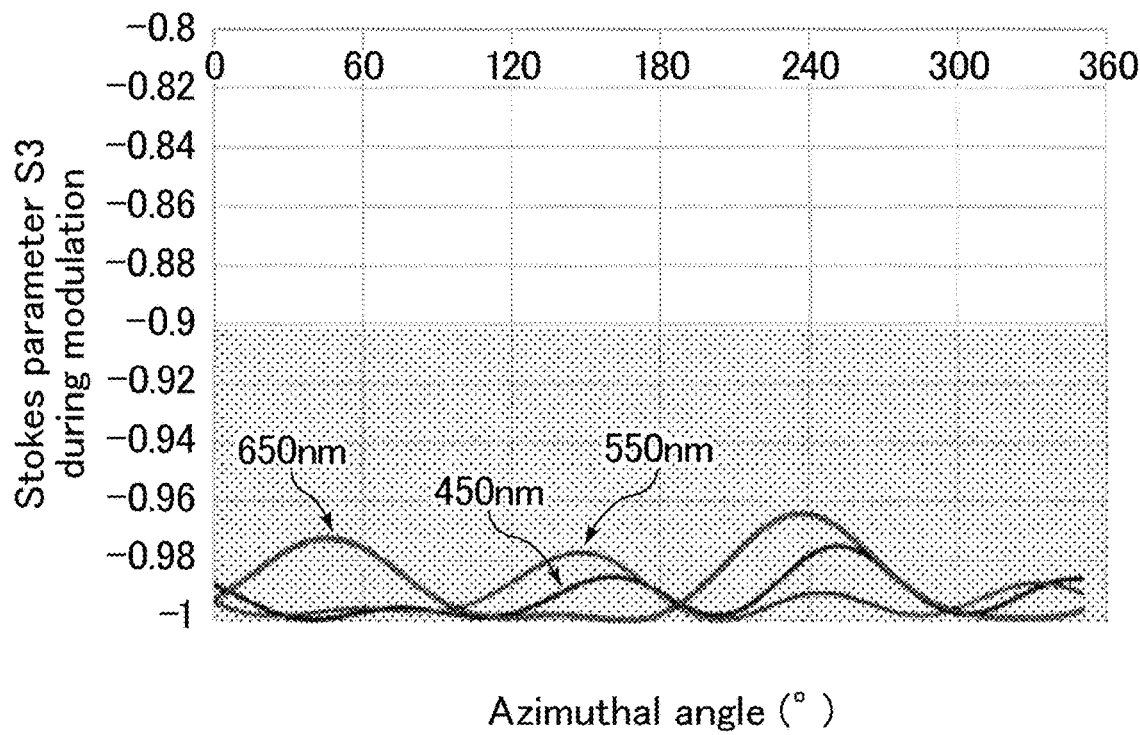
FIG. 40 is a graph showing the relationship between Stokes parameter S3 during modulation and the azimuthal angle in the optical element of Example 1 when the angle of incidence is set to 30°.

FIG. 35 is a graph showing the relationship between Stokes parameter S3 during no modulation and the azimuthal angle in the optical element of Comparative Example 1 when the angle of incidence is set to 30°. FIG. 36 is a graph showing the relationship between Stokes parameter S3 during modulation and the azimuthal angle in the optical element of Comparative Example 1 when the angle of incidence is set to 30°. FIG. 37 is a graph showing the relationship between Stokes parameter S3 during no modulation and the azimuthal angle in the optical element of Comparative Example 2 when the angle of incidence is set to 30°. FIG. 38 is a graph showing the relationship between Stokes parameter S3 during modulation and the azimuthal angle in the optical element of Comparative Example 2 when the angle of incidence is set to 30°. FIG. 39 is a graph showing the relationship between Stokes parameter S3 during no modulation and the azimuthal angle in the optical element of Example 1 when the angle of incidence is set to °. FIG. 40 is a graph showing the relationship between Stokes parameter S3 during modulation and the azimuthal angle in the optical element of Example 1 when the angle of incidence is set to 30°.

As shown in FIG. 35 and FIG. 36, Comparative Example 1 failed to achieve a state with |S3|≥0.9 during modulation and during no modulation. As shown in FIG. 37 and FIG. 38, Comparative Example 2 almost achieved a state with |S3|≥0.9 during modulation but failed to achieve a state with |S3|≥0.9 during no modulation. In contrast, as shown in FIG. 39 and FIG. 40, Example 1 achieved a state with |S3|≥0.9 at all the azimuths in a wavelength range of 450 nm to 650 nm both during modulation and during no modulation.

Figure 41:
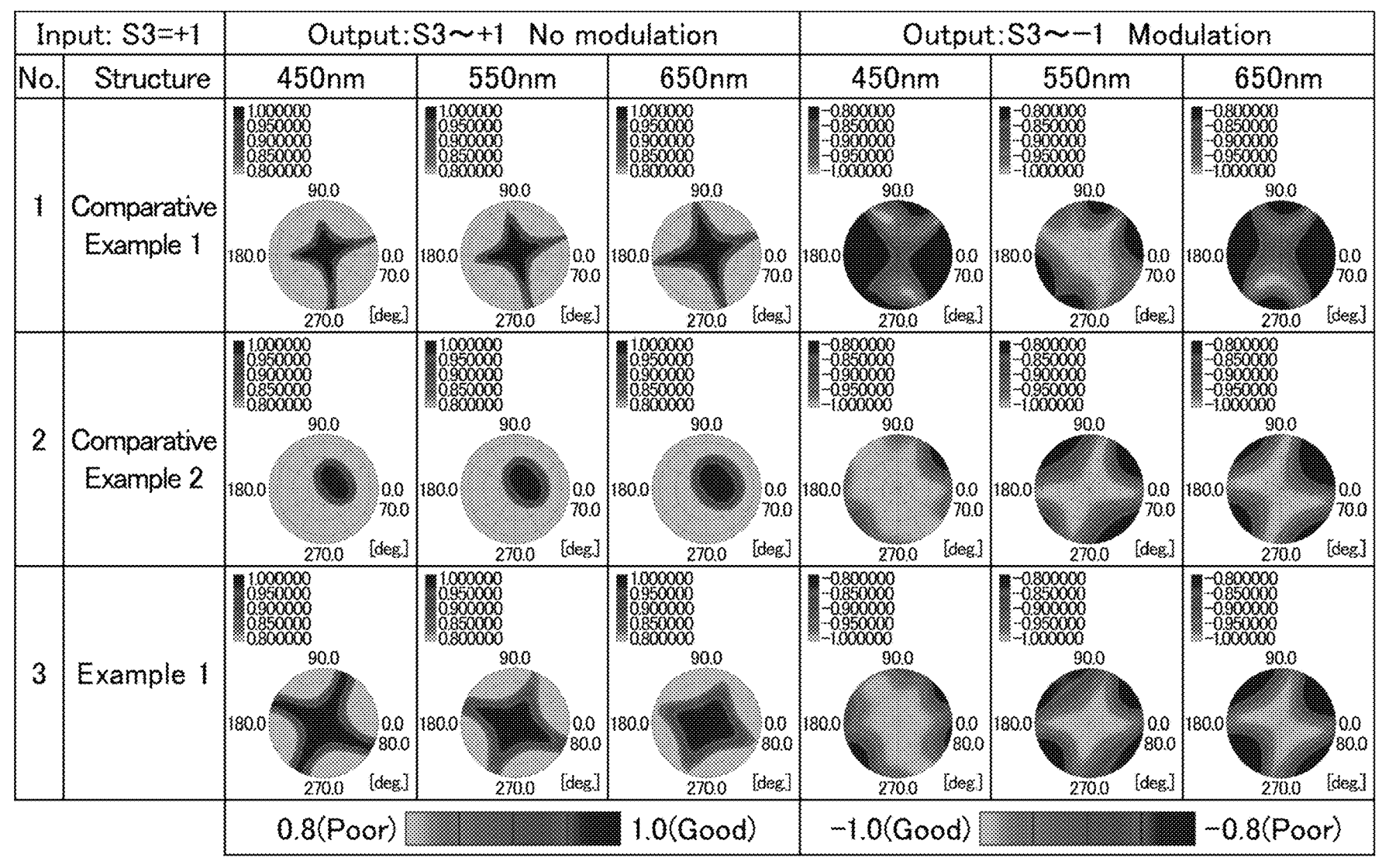

The viewing angle characteristics of the optical elements of Example 1, Comparative Example 1, and Comparative Example 2 were evaluated during no modulation and during modulation by simulation. FIG. 41 shows the simulation results of viewing angle characteristics during no modulation and during modulation of the optical elements of Example 1, Comparative Example 1, and Comparative Example 2.

In FIG. 41, a wider dark region in the graphs during no modulation indicates better performance while a wider light region in the graphs during modulation indicates better performance. As shown in FIG. 41, in Example 1, a good viewing angle range was achieved both during no modulation and during modulation in a wavelength range of 450 nm to 650 nm. In contrast, Comparative Example 1 demonstrated a high degree of wavelength dependence during modulation although exhibiting a good viewing angle range during no modulation. Comparative Example 2 exhibited a poor viewing angle range during no modulation while exhibiting a good viewing angle range during modulation.

For determination of suitable designs of the liquid crystal cells, the LCD-MASTER 1D available from Shintech, Inc. was used to perform optical calculations for the optical element 10 of Example 1. Hereinafter, based on the simulation results, the range in which 90% or higher modulation and no modulation were achieved at an angle of incidence of 30° and in a wavelength range of 450 nm to 650 nm was regarded as the suitable range. The graphs mentioned below only show the data on the worst azimuths at an angle of incidence of 30° at wavelengths of 450 nm, 550 nm, and 650 nm for simplification.

Figure 42:
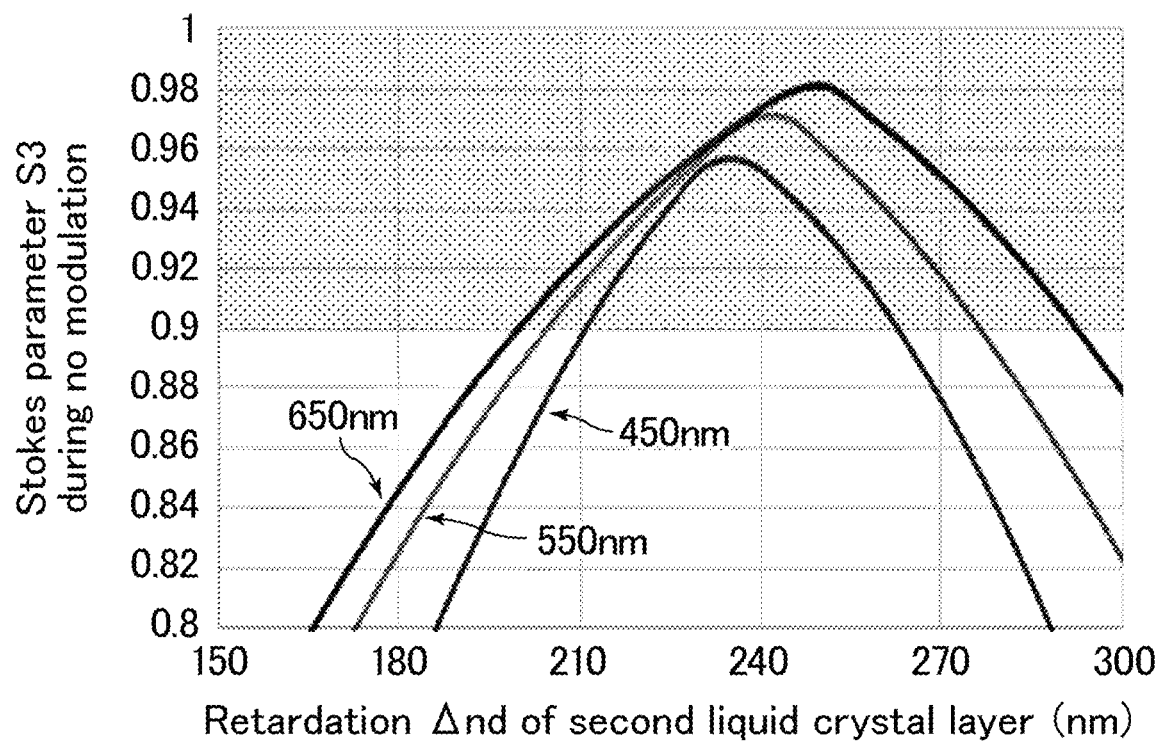
FIG. 42 is a graph of Stokes parameter S3 during no modulation versus retardation introduced by the second liquid crystal layer in the optical element of Example 1 in the first state.
Figure 43:
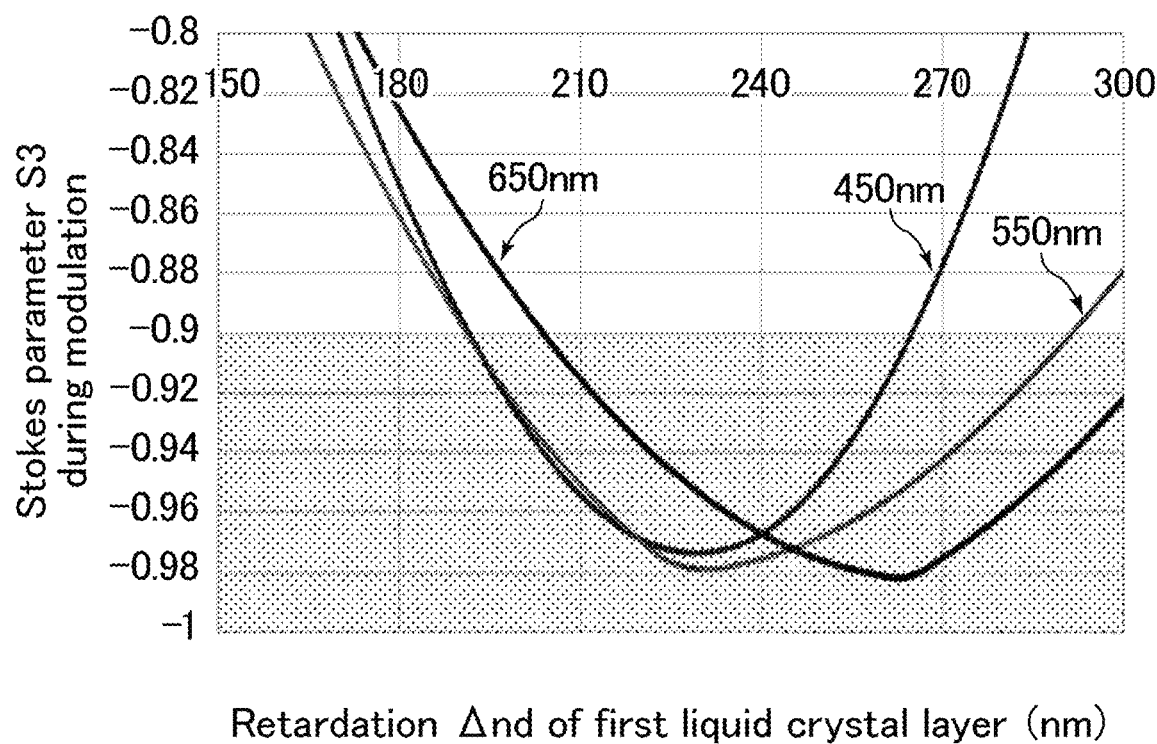
FIG. 43 is a graph of Stokes parameter S3 during modulation versus retardation introduced by the first liquid crystal layer in the optical element of Example 1 in the second state.

First, for determination of the suitable range of retardations And introduced by the first liquid crystal layer 500 at a wavelength of 550 nm in the second state and the suitable range of retardations And introduced by the second liquid crystal layer 600 at a wavelength of 550 nm in the first state, Stokes parameter S3 during no modulation versus retardation introduced by the second liquid crystal layer 600 in the optical element 10 of Example 1 in the first state and Stokes parameter S3 during modulation versus retardation introduced by the first liquid crystal layer 500 in the optical element 10 of Example 1 in the second state were simulated. FIG. 42 is a graph of Stokes parameter S3 during no modulation versus retardation introduced by the second liquid crystal layer in the optical element of Example 1 in the first state. FIG. 43 is a graph of Stokes parameter S3 during modulation versus retardation introduced by the first liquid crystal layer in the optical element of Example 1 in the second state.

FIG. 42 shows that the suitable range of retardations introduced by the second liquid crystal layer 600 at a wavelength of 550 nm in the first state was not less than 210 nm and not more than 260 nm. Also, FIG. 43 shows that the suitable range of retardations introduced by the first liquid crystal layer 500 at a wavelength of 550 nm in the second state was not less than 200 nm and not more than 260 nm.

Figure 44:
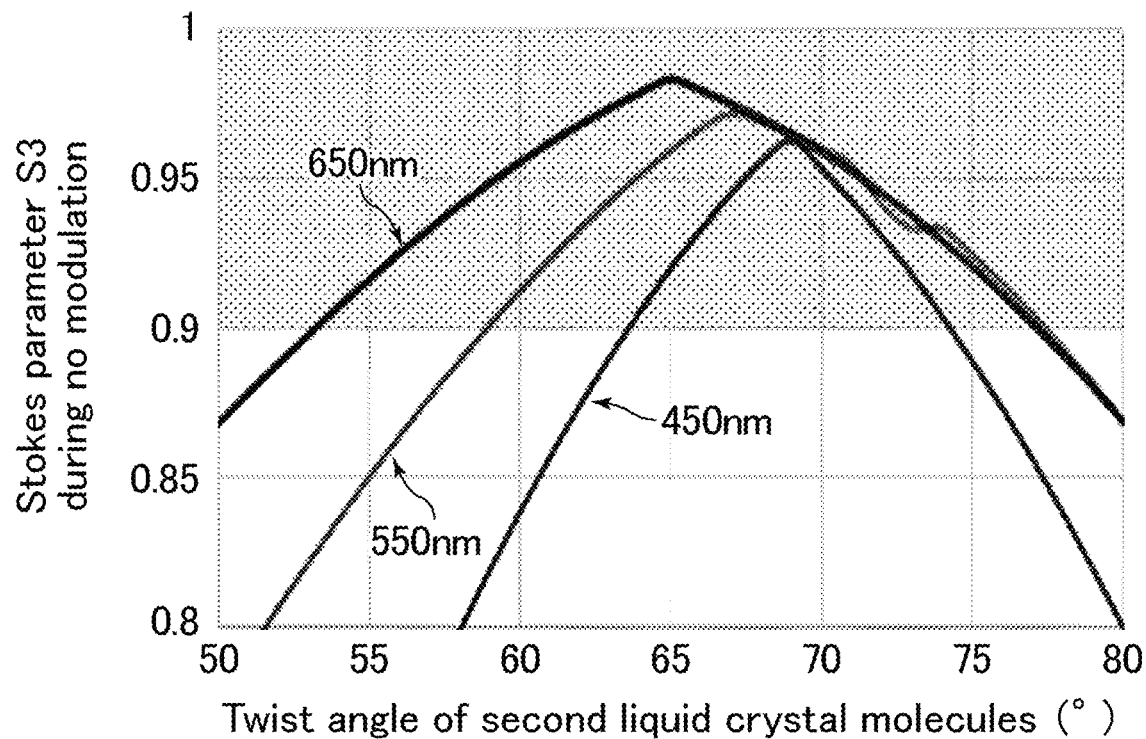
FIG. 44 is a graph of Stokes parameter S3 during no modulation versus twist angle of the second liquid crystal molecules in the optical element of Example 1.
Figure 45:
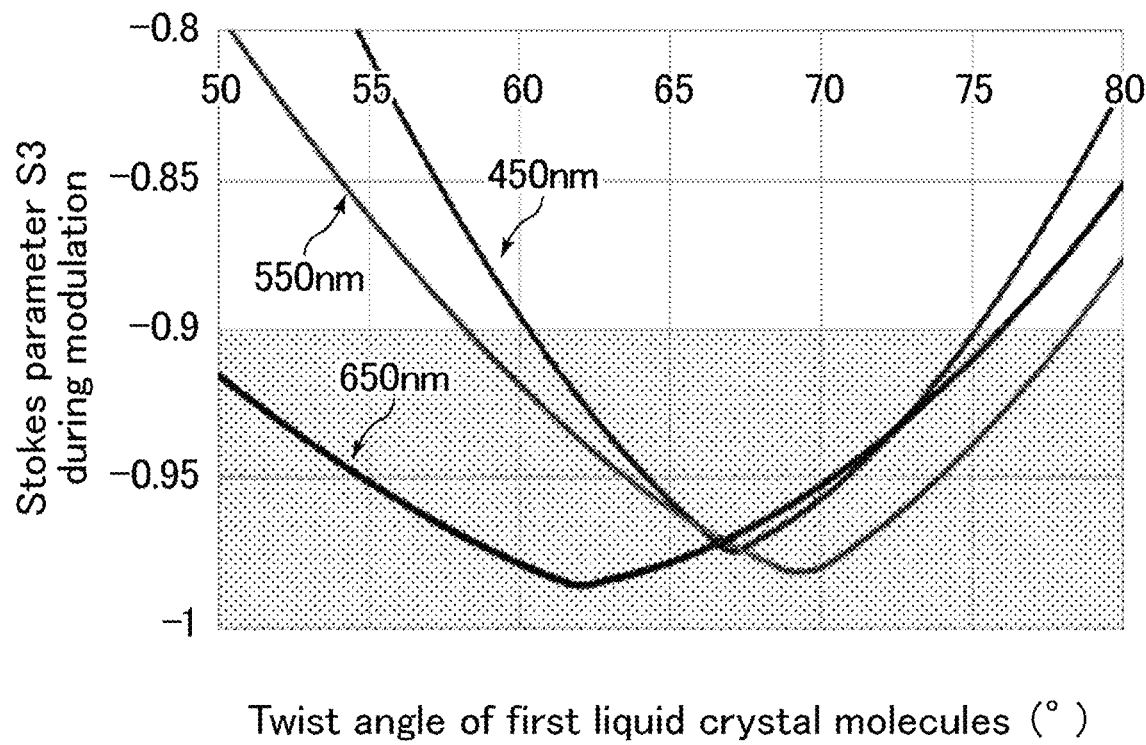
FIG. 45 is a graph of Stokes parameter S3 during modulation versus twist angle of the first liquid crystal molecules in the optical element of Example 1.

For determination of the suitable range of twist angles of the first liquid crystal molecules 510 and the second liquid crystal molecules 610, Stokes parameter S3 during no modulation versus twist angle of the second liquid crystal molecules 610 in the optical element 10 of Example 1 and Stokes parameter S3 during modulation versus twist angle of the first liquid crystal molecules 510 in the optical element 10 of Example 1 were simulated. FIG. 44 is a graph of Stokes parameter S3 during no modulation versus twist angle of the second liquid crystal molecules in the optical element of Example 1. FIG. 45 is a graph of Stokes parameter S3 during modulation versus twist angle of the first liquid crystal molecules in the optical element of Example 1.

FIG. 44 shows that the suitable range of twist angles in the twist alignment of the second liquid crystal molecules 610 in the first state (during no modulation) was not smaller than 64° and not greater than 74°. FIG. 45 shows that the suitable range of twist angles in the twist alignment of the first liquid crystal molecules 510 in the second state (during modulation) was not smaller than 61° and not greater than 75°.

Figure 46:
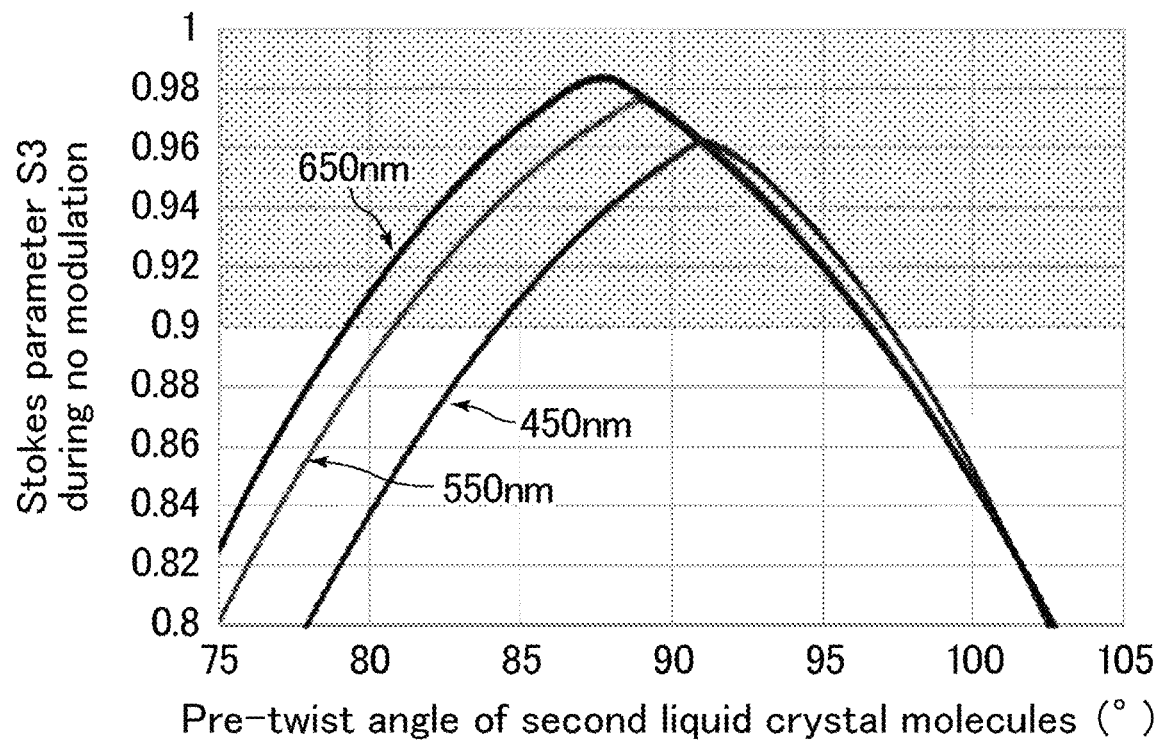
FIG. 46 is a graph of Stokes parameter S3 during no modulation versus pre-twist angle of the second liquid crystal molecules in the optical element of Example 1.
Figure 47:
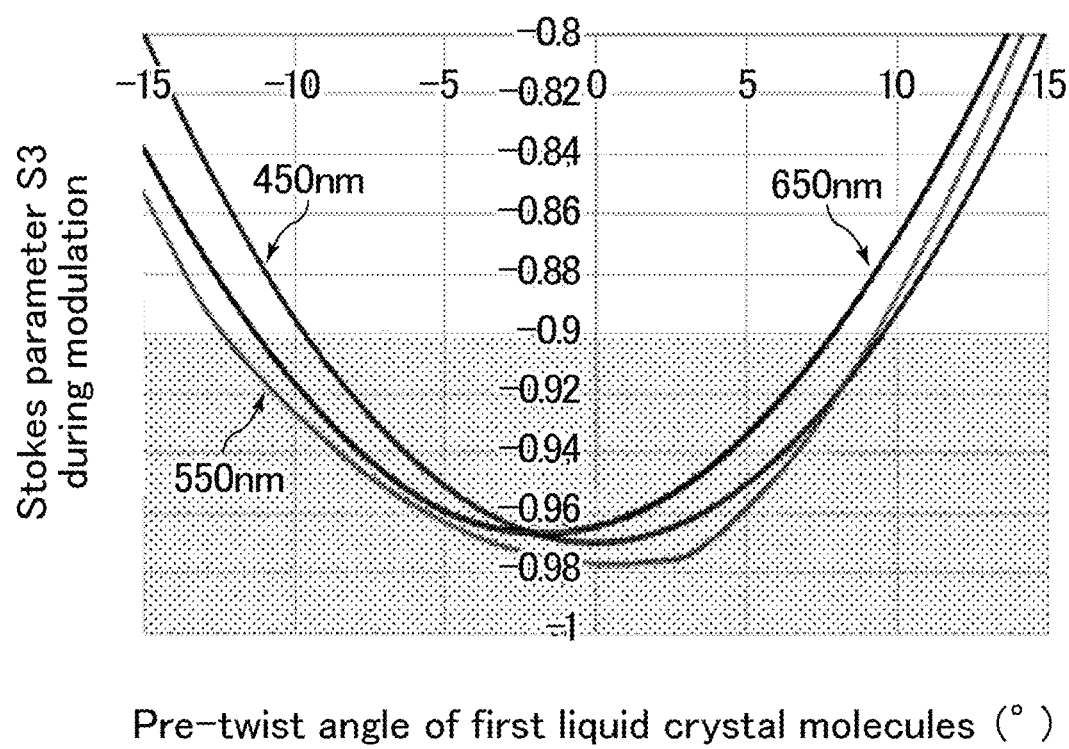
FIG. 47 is a graph of Stokes parameter S3 during modulation versus pre-twist angle of the first liquid crystal molecules in the optical element of Example 1.

For determination of the suitable range of pre-twist angles of the first liquid crystal molecules 510 and the second liquid crystal molecules 610, Stokes parameter S3 during no modulation versus pre-twist angle of the second liquid crystal molecules 610 in the optical element 10 of Example 1 and Stokes parameter S3 during modulation versus pre-twist angle of the first liquid crystal molecules 510 in the optical element 10 of Example 1 were simulated. FIG. 46 is a graph of Stokes parameter S3 during no modulation versus pre-twist angle of the second liquid crystal molecules in the optical element of Example 1. FIG. 47 is a graph of Stokes parameter S3 during modulation versus pre-twist angle of the first liquid crystal molecules in the optical element of Example 1. The pre-twist angle here means the azimuthal angle of the alignment direction of the liquid crystal molecules near the light incident side substrate in each liquid crystal cell. The pre-twist angle of the first liquid crystal molecules 510 specifically means the azimuthal angle at which the alignment direction 511A of the first liquid crystal molecules 511 near the first substrate 100 in the second state lies. The pre-twist angle of the second liquid crystal molecules 610 specifically means the azimuthal angle at which the alignment direction 611A of the second liquid crystal molecules 611 near the third substrate 300 in the first state lies.

FIG. 46 shows that the suitable range of pre-twist angles of the second liquid crystal molecules 610, i.e., the azimuthal angle at which the alignment direction 611A of the second liquid crystal molecules 611 near the third substrate 300 in the first state lies, was not smaller than 85° and not greater than 96°. FIG. 47 shows that the suitable range of pre-twist angles of the first liquid crystal molecules 510, i.e., the azimuthal angle at which the alignment direction 511A of the first liquid crystal molecules 511 near the first substrate 100 in the second state lies, was not smaller than −9° and not greater than 7°.

FIG. 42 to FIG. 47 show that the optimal retardation And, the optical twist angle, and the optimal pre-twist angle of the liquid crystal layer vary between the first liquid crystal cell 11A and the second liquid crystal cell 11B, meaning that the stacked liquid crystal cells are not necessarily of the same design. In other words, the first liquid crystal cell 11A may not have the same configuration as the second liquid crystal cell 11B.

Figure 48:
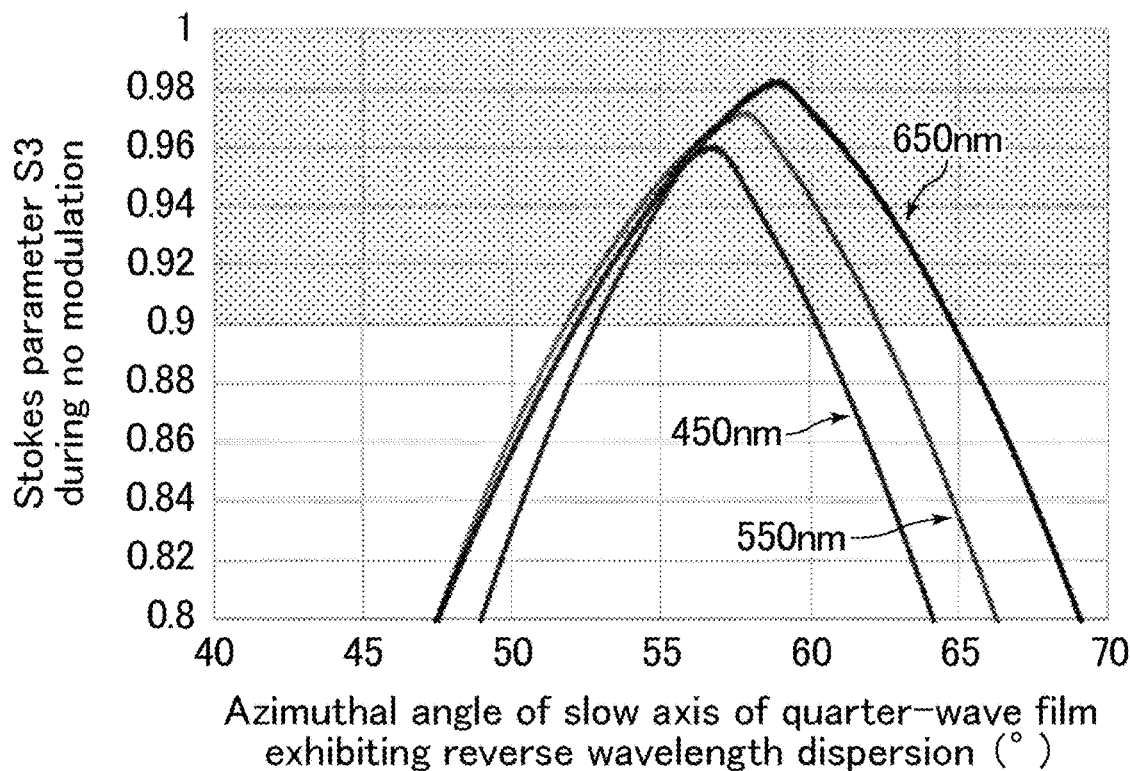
FIG. 48 is a graph of Stokes parameter S3 during no modulation versus azimuthal angle of the slow axis of a quarter-wave film exhibiting reverse wavelength dispersion in the optical element of Example 1.
Figure 49:
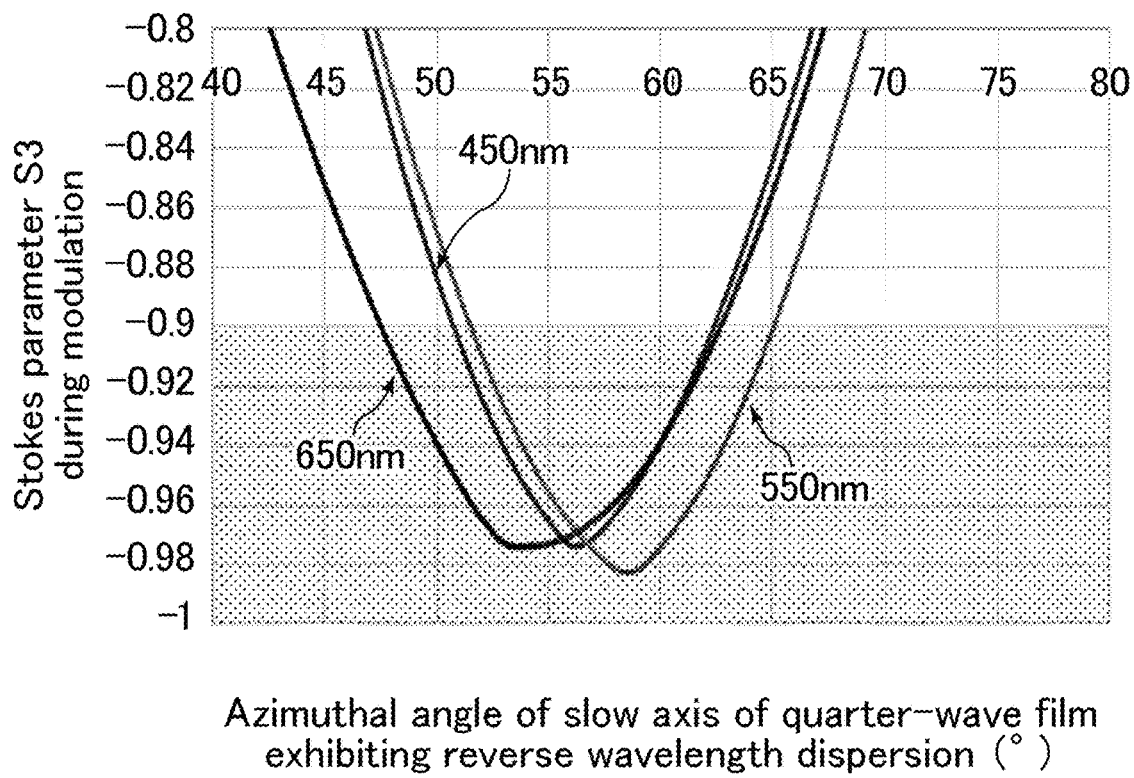
FIG. 49 is a graph of Stokes parameter S3 during modulation versus azimuthal angle of the slow axis of the quarter-wave film exhibiting reverse wavelength dispersion in the optical element of Example 1.

For determination of the suitable range of azimuthal angles at which the slow axis of the quarter-wave film exhibiting reverse wavelength dispersion (first quarter-wave film 13) lies, Stokes parameter S3 during no modulation and during modulation versus azimuthal angle of the slow axis of the quarter-wave film exhibiting reverse wavelength dispersion in the optical element 10 of Example 1 was simulated. FIG. 48 is a graph of Stokes parameter S3 during no modulation versus azimuthal angle of the slow axis of a quarter-wave film exhibiting reverse wavelength dispersion in the optical element of Example 1. FIG. 49 is a graph of Stokes parameter S3 during modulation versus azimuthal angle of the slow axis of the quarter-wave film exhibiting reverse wavelength dispersion in the optical element of Example 1. As shown in FIG. 48 and FIG. 49, the suitable range of azimuthal angles at which the slow axis of the quarter-wave film exhibiting reverse wavelength dispersion as the first quarter-wave film 13 lies was not smaller than 52° and not greater than 60°.

Figure 50:
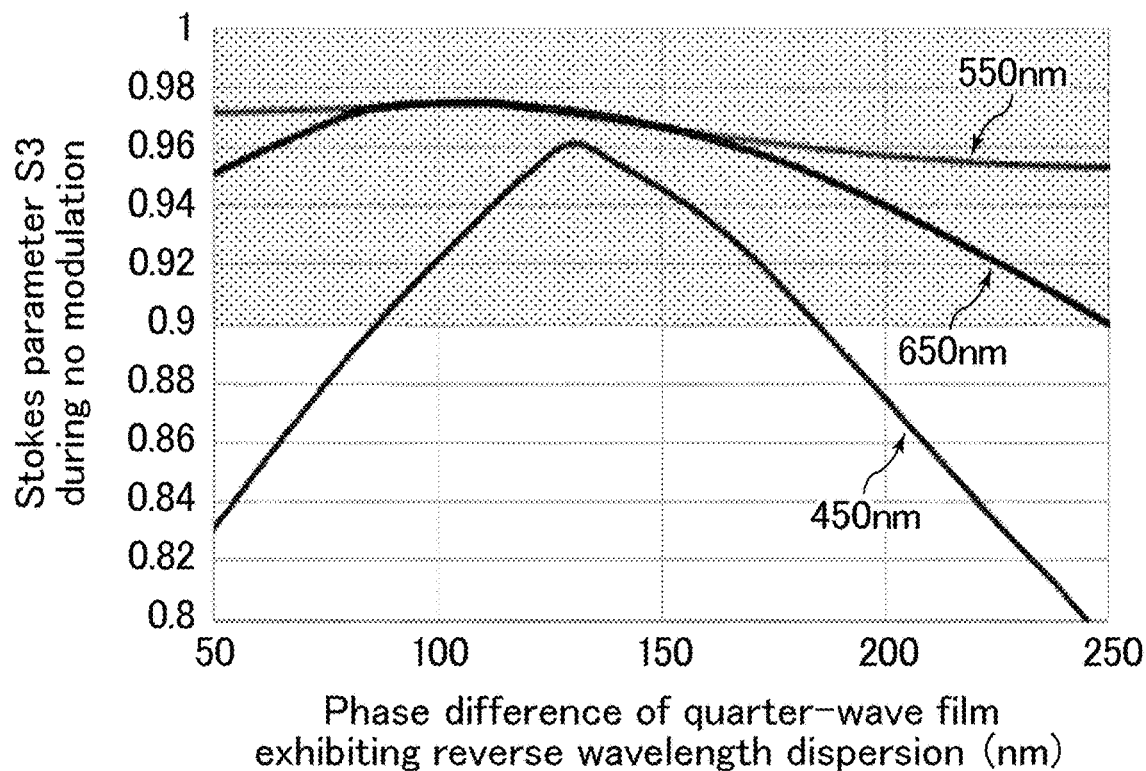
FIG. 50 is a graph of Stokes parameter S3 during no modulation versus phase difference introduced by the quarter-wave film exhibiting reverse wavelength dispersion in the optical element of Example 1.
Figure 51:
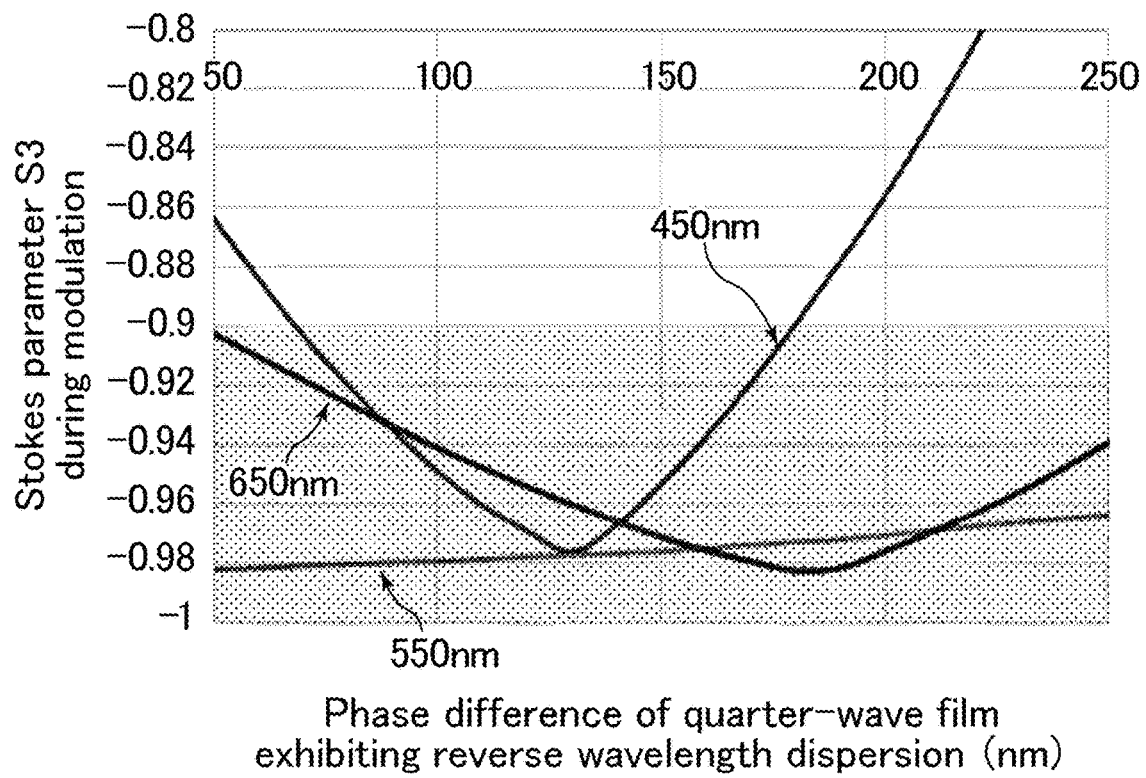
FIG. 51 is a graph of Stokes parameter S3 during modulation versus phase difference introduced by the quarter-wave film exhibiting reverse wavelength dispersion in the optical element of Example 1.

For determination of the suitable range of phase differences introduced by the quarter-wave film exhibiting reverse wavelength dispersion, the wavelength dispersions of Stokes parameter S3 during no modulation and during modulation versus phase difference introduced by the quarter-wave film exhibiting reverse wavelength dispersion in the optical element 10 of Example 1 were simulated. FIG. 50 is a graph of Stokes parameter S3 during no modulation versus phase difference introduced by the quarter-wave film exhibiting reverse wavelength dispersion in the optical element of Example 1. FIG. 51 is a graph of Stokes parameter S3 during modulation versus phase difference introduced by the quarter-wave film exhibiting reverse wavelength dispersion in the optical element of Example 1. As shown in FIG. 50 and FIG. 51, the suitable range of phase differences introduced by the quarter-wave film exhibiting reverse wavelength dispersion as the first quarter-wave film 13 was not less than 90 nm and not more than 170 nm.

Figure 52:
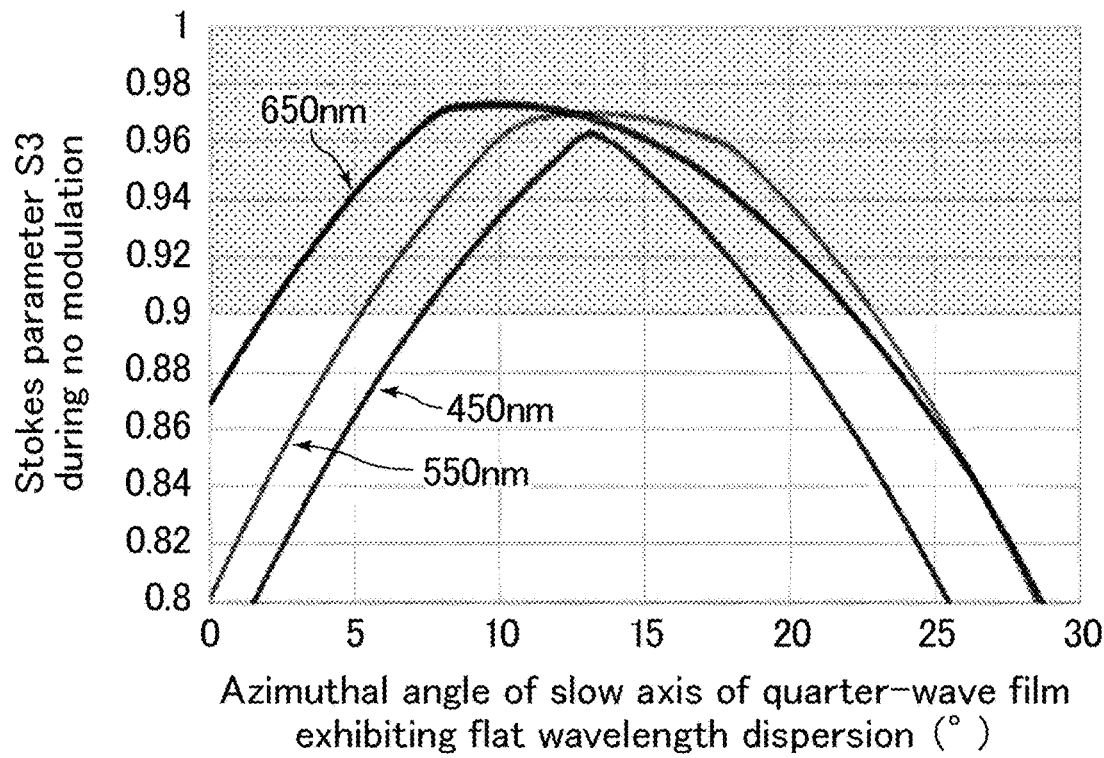
FIG. 52 is a graph of Stokes parameter S3 during no modulation versus azimuthal angle of the slow axis of a quarter-wave film exhibiting flat wavelength dispersion in the optical element of Example 1.
Figure 53:
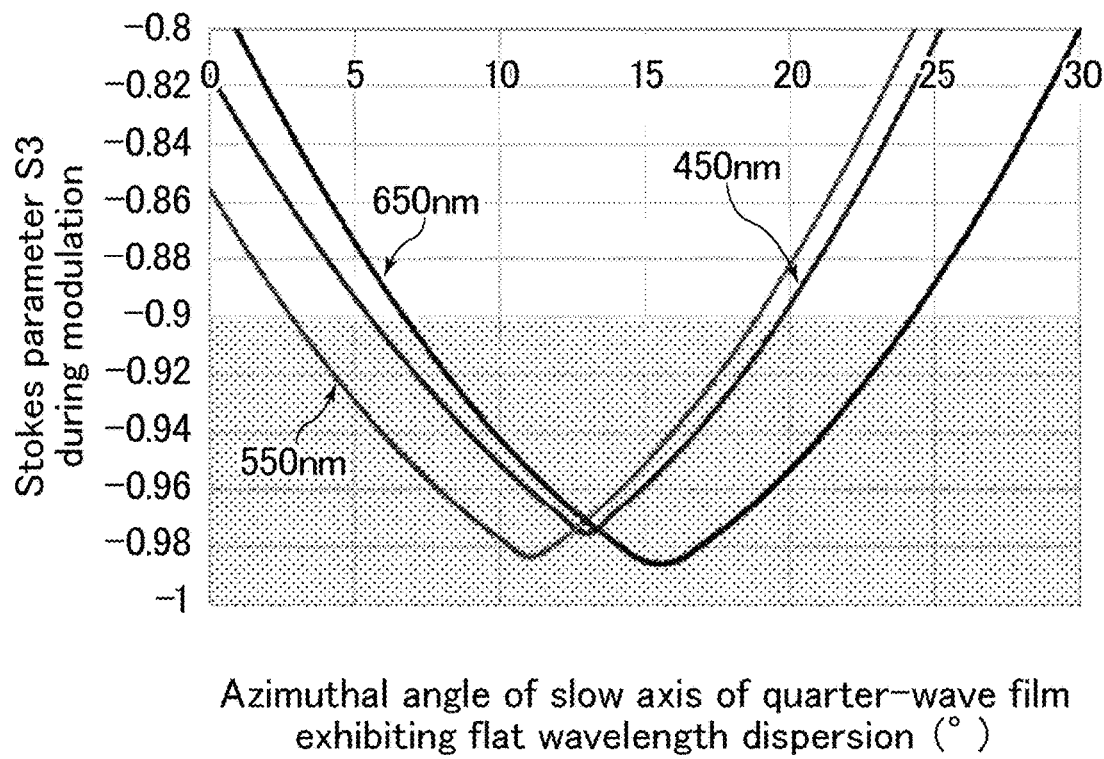
FIG. 53 is a graph of Stokes parameter S3 during modulation versus azimuthal angle of the slow axis of a quarter-wave film exhibiting flat wavelength dispersion in the optical element of Example 1.

For determination of the suitable range of azimuthal angles at which the slow axis of the quarter-wave film exhibiting flat wavelength dispersion (second quarter-wave film 14) lies, the wavelength dispersions of Stokes parameter S3 during no modulation and during modulation versus azimuthal angle of the slow axis of the quarter-wave film exhibiting flat wavelength dispersion in the optical element 10 of Example 1 were simulated. FIG. 52 is a graph of Stokes parameter S3 during no modulation versus azimuthal angle of the slow axis of a quarter-wave film exhibiting flat wavelength dispersion in the optical element of Example 1. FIG. 53 is a graph of Stokes parameter S3 during modulation versus azimuthal angle of the slow axis of a quarter-wave film exhibiting flat wavelength dispersion in the optical element of Example 1. As shown in FIG. 52 and FIG. 53, the suitable range of azimuthal angles at which the slow axis of the quarter-wave film exhibiting flat wavelength dispersion as the second quarter-wave film 14 lies was not smaller than 8° and not greater than 18°.

Figure 54:
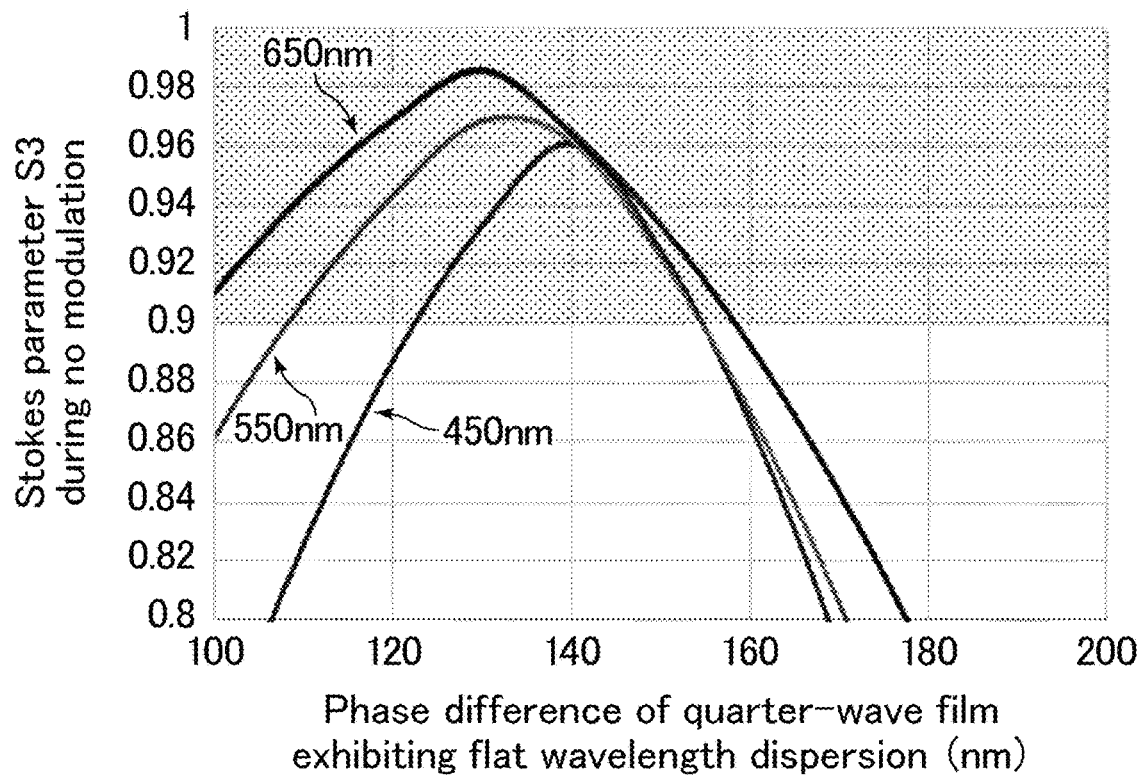
FIG. 54 is a graph of Stokes parameter S3 during no modulation versus phase difference introduced by the quarter-wave film exhibiting flat wavelength dispersion in the optical element of Example 1.
Figure 55:
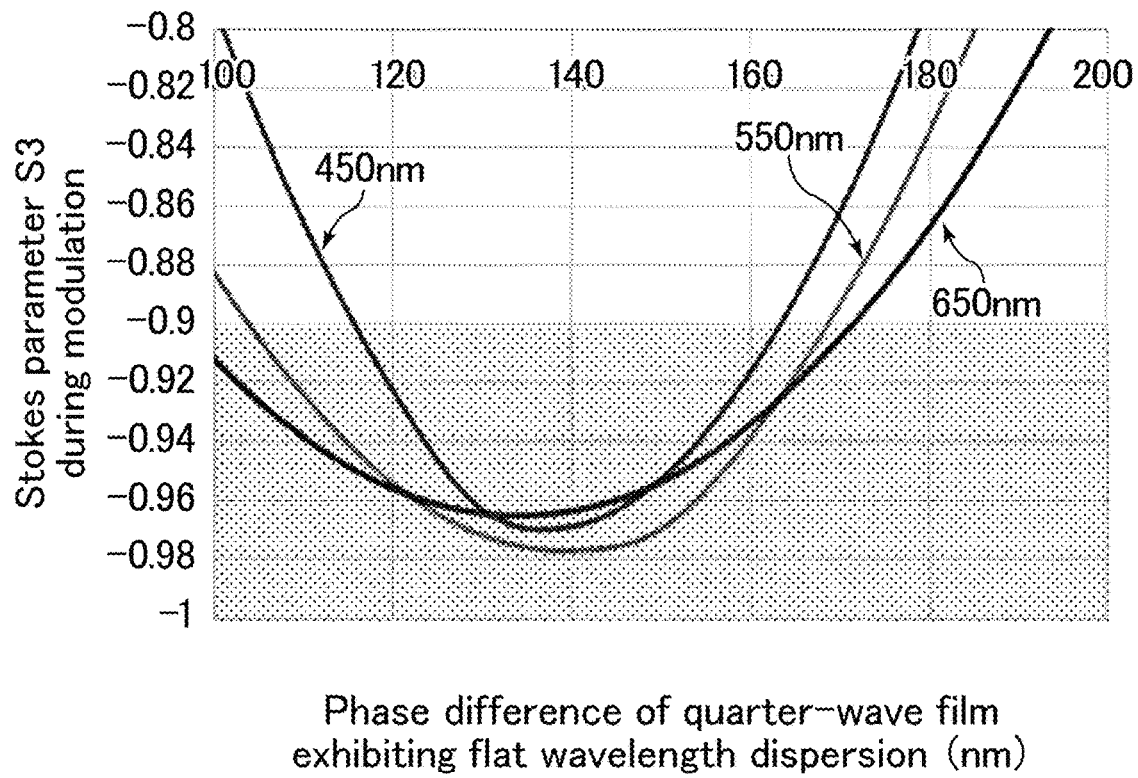
FIG. 55 is a graph of Stokes parameter S3 during modulation versus phase difference introduced by the quarter-wave film exhibiting flat wavelength dispersion in the optical element of Example 1.

For determination of the suitable range of phase differences introduced by the quarter-wave film exhibiting flat wavelength dispersion, the wavelength dispersions of Stokes parameter S3 during no modulation and during modulation versus phase difference introduced by the quarter-wave film exhibiting flat wavelength dispersion in the optical element 10 of Example 1 were simulated. FIG. 54 is a graph of Stokes parameter S3 during no modulation versus phase difference introduced by the quarter-wave film exhibiting flat wavelength dispersion in the optical element of Example 1. FIG. 55 is a graph of Stokes parameter S3 during modulation versus phase difference introduced by the quarter-wave film exhibiting flat wavelength dispersion in the optical element of Example 1. As shown in FIG. 54 and FIG. 55, the suitable range of phase differences introduced by the quarter-wave film exhibiting flat wavelength dispersion as the second quarter-wave film 14 was not less than 120 nm and not more than 150 nm.

Example 2

An optical element 10 of Example 2 having the same configuration as in Embodiment 2 was produced. Specifically, the optical element 10 of Example 2 was produced by the same procedure as in Example 1, except for lacking the negative C plate 12.

The viewing angle characteristics during no modulation and during modulation in the optical elements of Example 1, Example 2, and Comparative Example 1 were simulated. FIG. 56 shows the results. FIG. 56 shows the simulation results of viewing angle characteristics during no modulation and during modulation of the optical elements of Example 1, Example 2, and Comparative Example 1.

In FIG. 56, a wider dark region in the graphs during no modulation indicates better performance while a wider light region in the graphs during modulation indicates better performance. As shown in FIG. 56, in Example 2, a good viewing angle range, though not as good as in Example 1, was achieved both during no modulation and during modulation in a wavelength range of 450 nm to 650 nm. The optical element 10 of Example 2 was produced at low cost and successfully had a thin profile as it did not include the negative C plate 12.

Figure 57:
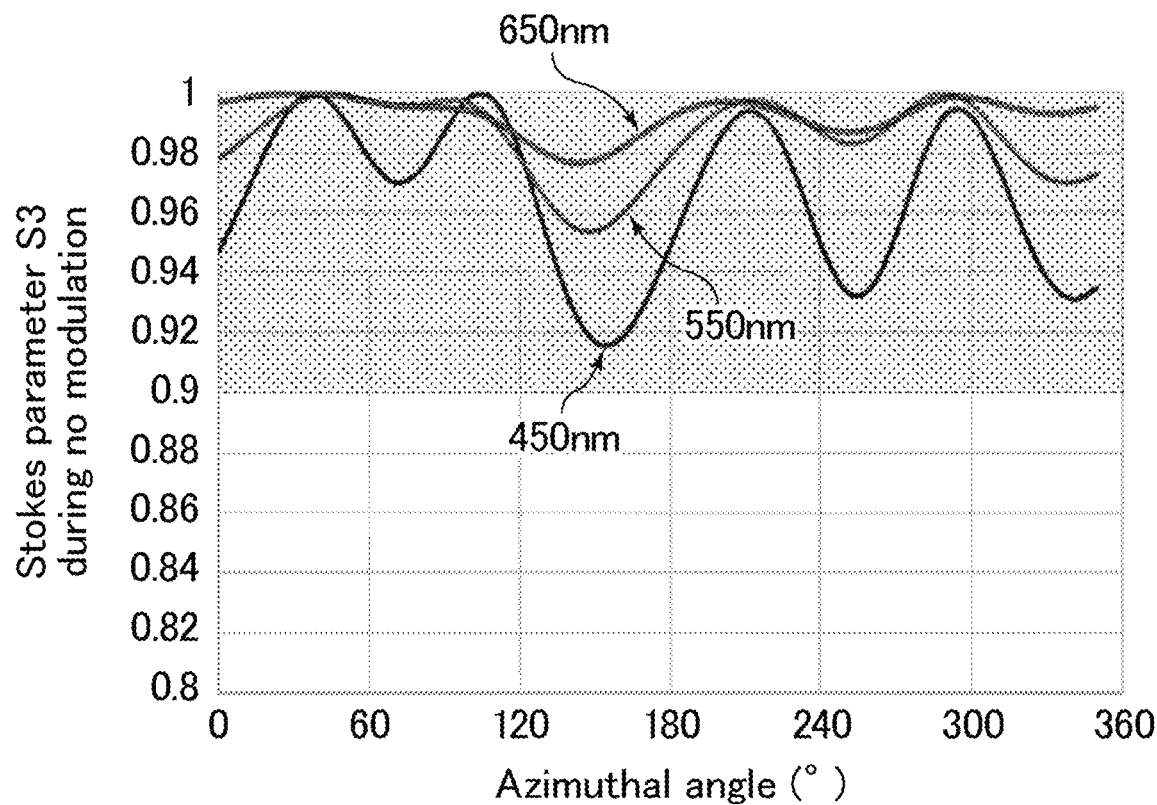
FIG. 57 is a graph showing the relationship between Stokes parameter S3 during no modulation and the azimuthal angle in the optical element of Example 2 when the angle of incidence is set to 30°.
Figure 58:
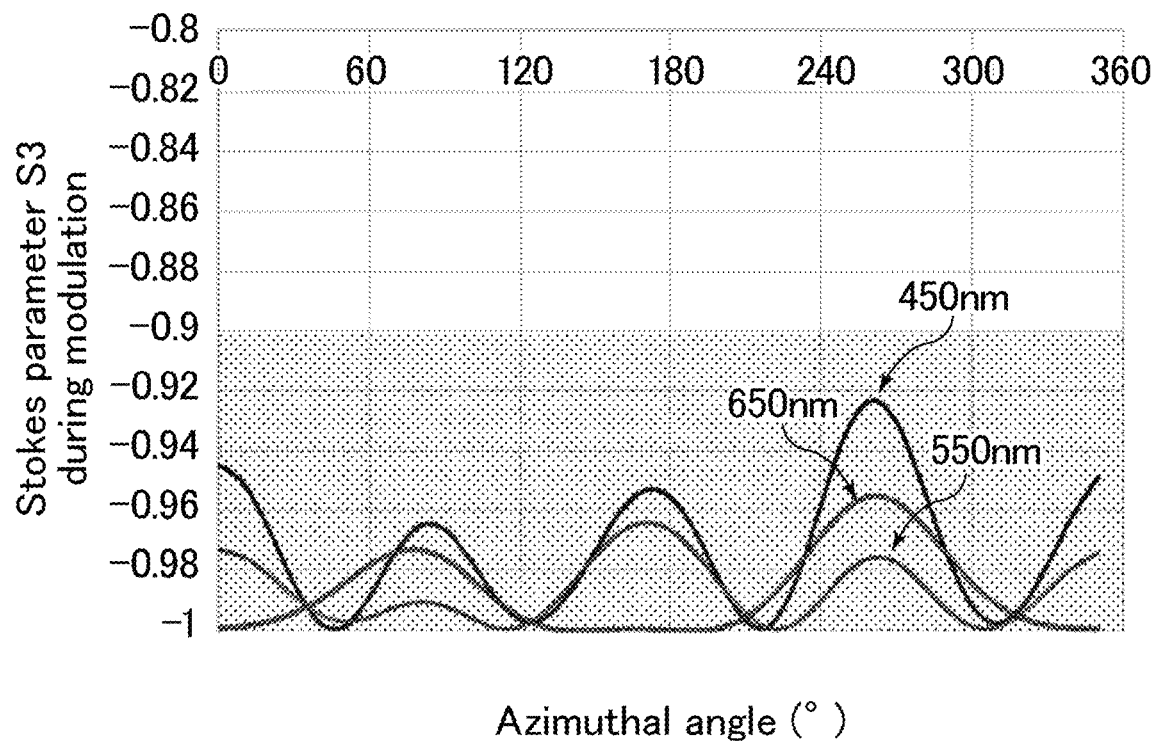
FIG. 58 is a graph showing the relationship between Stokes parameter S3 during modulation and the azimuthal angle in the optical element of Example 2 when the angle of incidence is set to 30°.

The Stokes parameter S3 of emission light derived from incident right-handed circularly polarized light (S3=+1) in the optical element (sHWP) of Example 2 was evaluated. FIG. 57 is a graph showing the relationship between Stokes parameter S3 during no modulation and the azimuthal angle in the optical element of Example 2 when the angle of incidence is set to 30°. FIG. 58 is a graph showing the relationship between Stokes parameter S3 during modulation and the azimuthal angle in the optical element of Example 2 when the angle of incidence is set to 30°. FIG. 57 and FIG. 58 show the evaluation results at wavelengths of 450 nm, 550 nm, and 650 nm. As shown in FIG. 57 and FIG. 58, in Example 2, a state with |S3|≥0.9 was achieved at all the azimuths in a wavelength range of 450 nm to 650 nm both during modulation and during no modulation.

Figure 59:
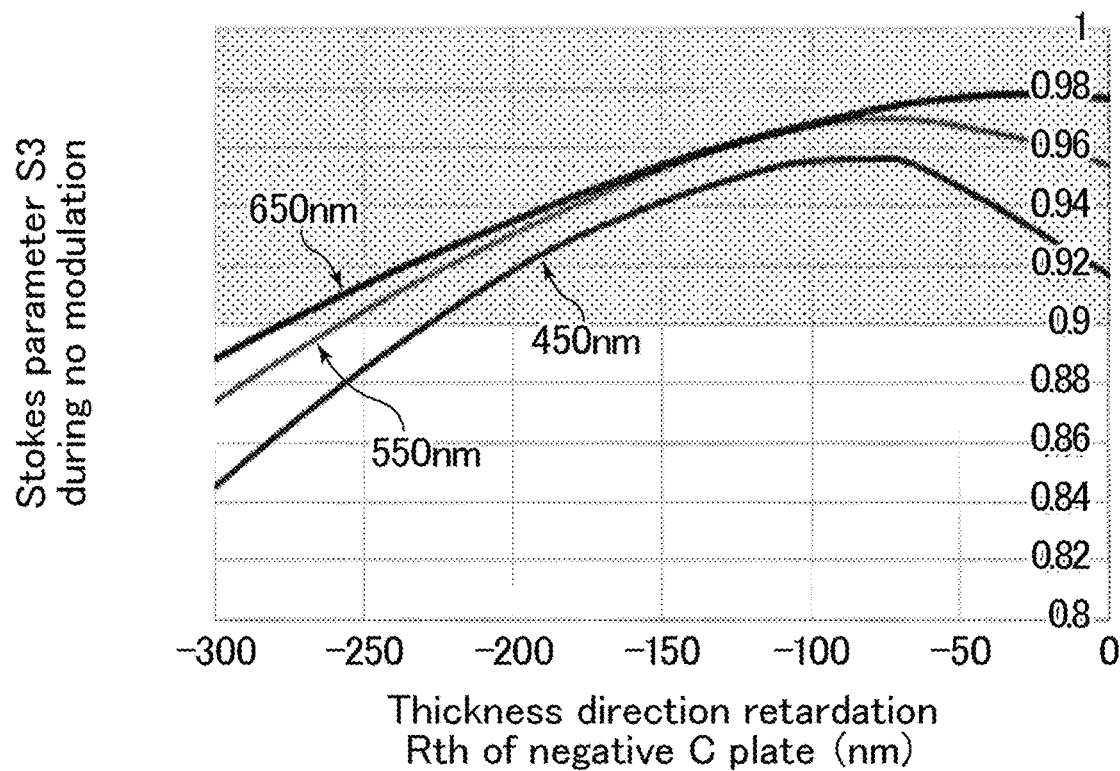
FIG. 59 is a graph showing the relationship between Stokes parameter S3 during no modulation versus thickness direction retardation Rth introduced by negative C plates in the optical elements of the examples.
Figure 60:
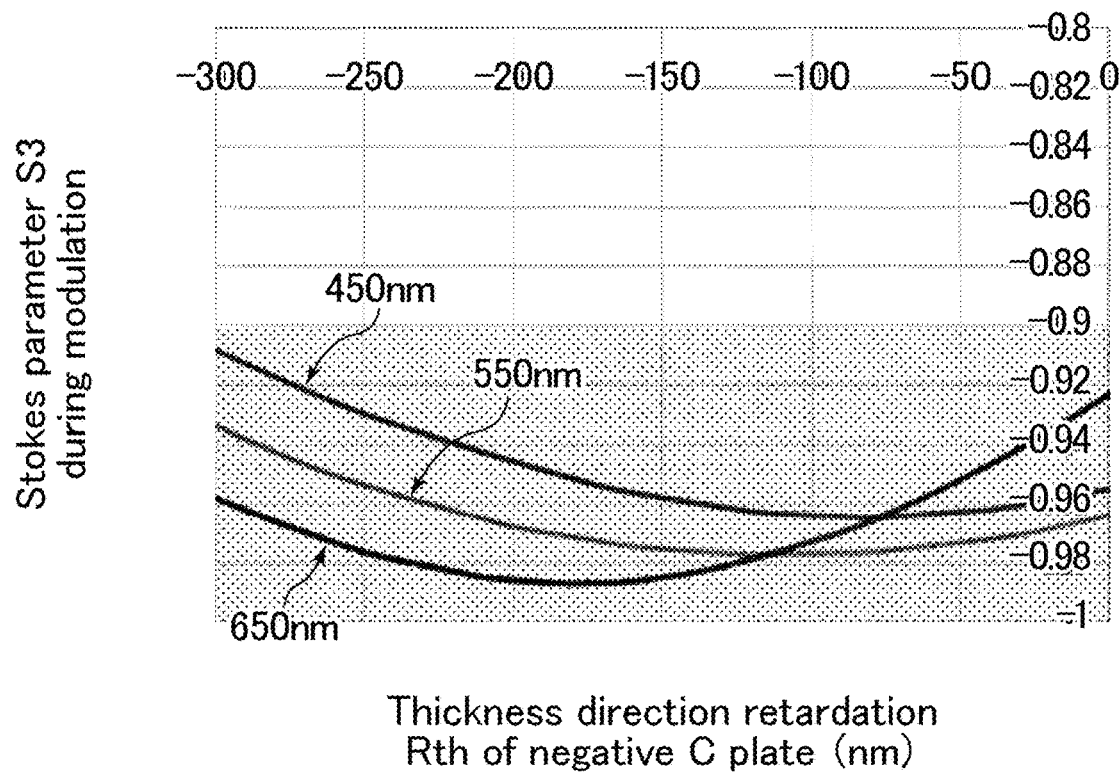
FIG. 60 is a graph showing the relationship between Stokes parameter S3 during modulation versus thickness direction retardation Rth introduced by the negative C plates in the optical elements of the examples.

The suitable range of thickness direction retardations Rth introduced by the negative C plate 12 in examples including Example 1 was determined. Specifically, Stokes parameter S3 in optical elements having the same configuration as the optical element of Example 1 were simulated when the thickness direction retardation Rth introduced by the negative C plate 12 was −300 nm to 0 nm. The mode where the thickness direction retardation Rth introduced by the negative C plate 12 was 0 nm corresponds to a mode where the stack included no negative C plate 12, i.e., the configuration of Example 2. FIG. 59 and FIG. 60 show the results.

FIG. 59 is a graph showing the relationship between Stokes parameter S3 during no modulation versus thickness direction retardation Rth introduced by negative C plates in the optical elements of the examples. FIG. 60 is a graph showing the relationship between Stokes parameter S3 during modulation versus thickness direction retardation Rth introduced by the negative C plates in the optical elements of the examples. FIG. 59 and FIG. 60 only show the data on the worst azimuths at an angle of incidence of 30° at wavelengths of 450 nm, 550 nm, and 650 nm. FIG. 59 and FIG. 60 show that the suitable range of thickness direction retardations Rth introduced by the negative C plate 12 was not less than −220 nm and not more than 0 nm.

Example 3

An optical element 10 of Example 3 having the same configuration as in Embodiment 3 was produced. Specifically, the optical element 10 of Example 3 was produced by the same procedure as in Example 1, except that the first liquid crystal molecules 510 and the second liquid crystal molecules 610 were twist-aligned negative liquid crystal molecules (refractive index anisotropy Δn=0.079) with a chiral pitch of 15.7 μm; the first alignment film 41, the second alignment film 42, the third alignment film 43, and the fourth alignment film 44 were vertical alignment films; the pre-tilt angle provided to the first substrate 100 side of the first liquid crystal layer 500 was an azimuthal angle of 0° (in other words, the alignment direction 511A of the first liquid crystal molecules 511 near the first substrate 100 in the second state was at an azimuthal angle of 0°); and the pre-tilt angle provided to the third substrate 300 side of the second liquid crystal layer 600 was an azimuthal angle of 90° (in other words, the alignment direction 611A of the second liquid crystal molecules 611 near the third substrate 300 in the first state was at an azimuthal angle of 90°).

In the first state, the second liquid crystal layer 600 was driven by voltage application. The voltage applied to the second liquid crystal layer 600 in the first state is preferably as high as possible. In the present example, a voltage of 20 V was applied. Since the negative C plate 12 was designed to cancel the phase difference introduced by the non-driven liquid crystal layer (first liquid crystal layer 500), only the driven liquid crystal layer (second liquid crystal layer 600) was effective. Thus, a sHWP having a wide viewing angle range and a broad bandwidth was achieved.

In the second state, conversely to the first state, the first liquid crystal layer 500 was driven by voltage application, so that the liquid crystal layer (first liquid crystal layer 500) was effective which had a 90-degree-rotated alignment direction from the liquid crystal layer (second liquid crystal layer 600) effective in the first state. Thus, light having passed through the two quarter-wave films (the first quarter-wave film 13 and the second quarter-wave film 14) was the opposite-handed circularly polarized light from the light incident on the optical element 10.

Figure 61:
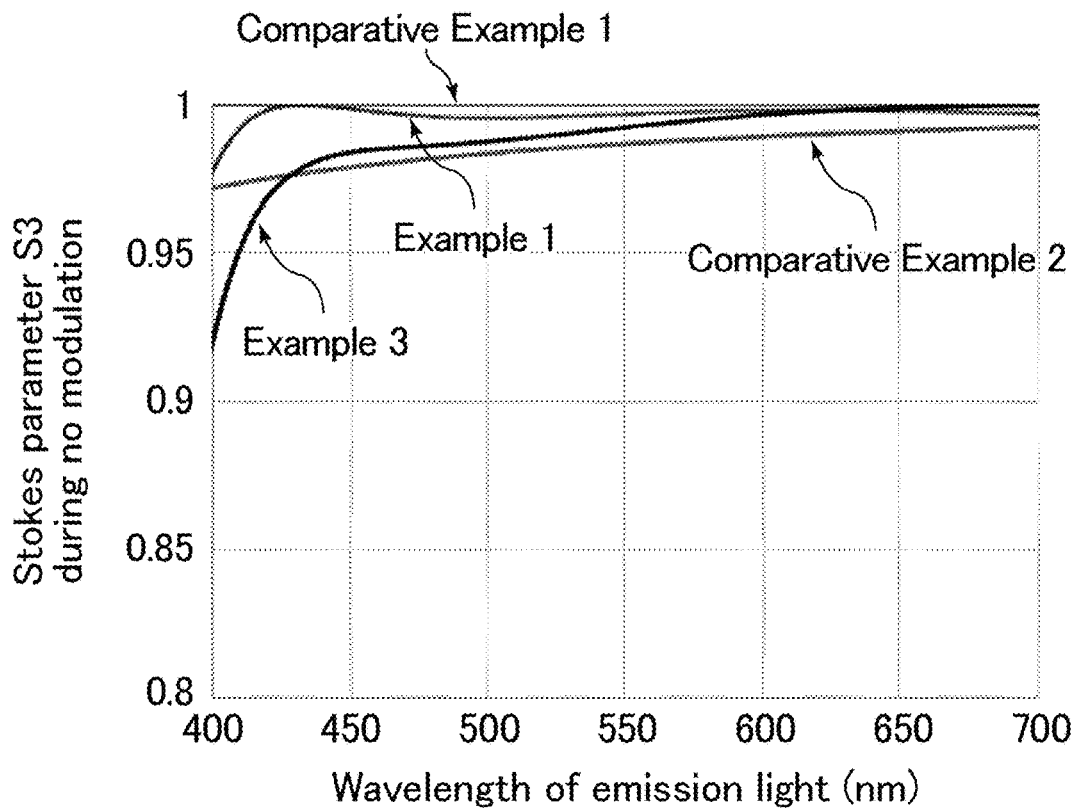
FIG. 61 is a graph showing the relationship between Stokes parameter S3 during no modulation and the wavelength of emission light in the optical elements of Example 1, Example 3, Comparative Example 1, and Comparative Example 2 when the angle of incidence is set to 0°.
Figure 62:
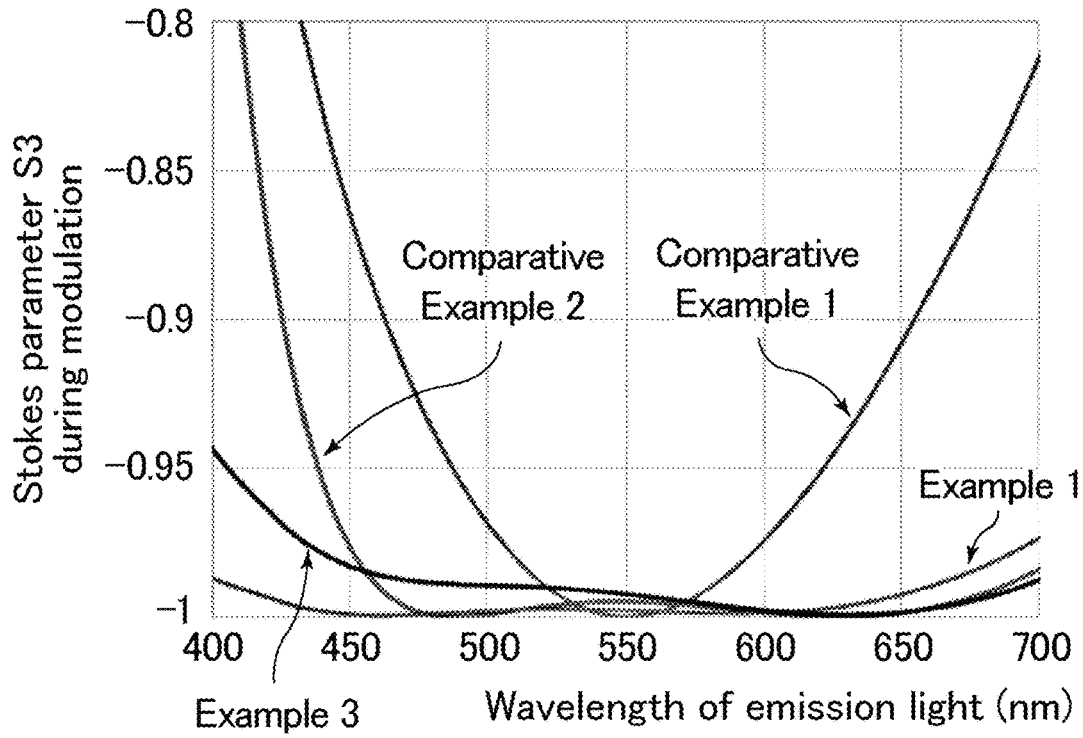
FIG. 62 is a graph showing the relationship between Stokes parameter S3 during modulation and the wavelength of emission light in the optical elements of Example 1, Example 3, Comparative Example 1, and Comparative Example 2 when the angle of incidence is set to 0°.

The Stokes parameter S3 of the emission light resulting from right-handed circularly polarized light (S3=+1) incident on the optical element (sHWP) of Example 3 was evaluated. FIG. 61 is a graph showing the relationship between Stokes parameter S3 during no modulation and the wavelength of emission light in the optical elements of Example 1, Example 3, Comparative Example 1, and Comparative Example 2 when the angle of incidence is set to 0°. FIG. 62 is a graph showing the relationship between Stokes parameter S3 during modulation and the wavelength of emission light in the optical elements of Example 1, Example 3, Comparative Example 1, and Comparative Example 2 when the angle of incidence is set to 0°. FIG. 61 and FIG. 62 show modulation and no modulation of light in the visible light range when the angle of incidence was set to 0°. As shown in FIG. 61 and FIG. 62, in Example 3, a state with |S3|≥0.9 was achieved in a wavelength range of 450 nm to 650 nm both during modulation and during no modulation.

Figure 63:
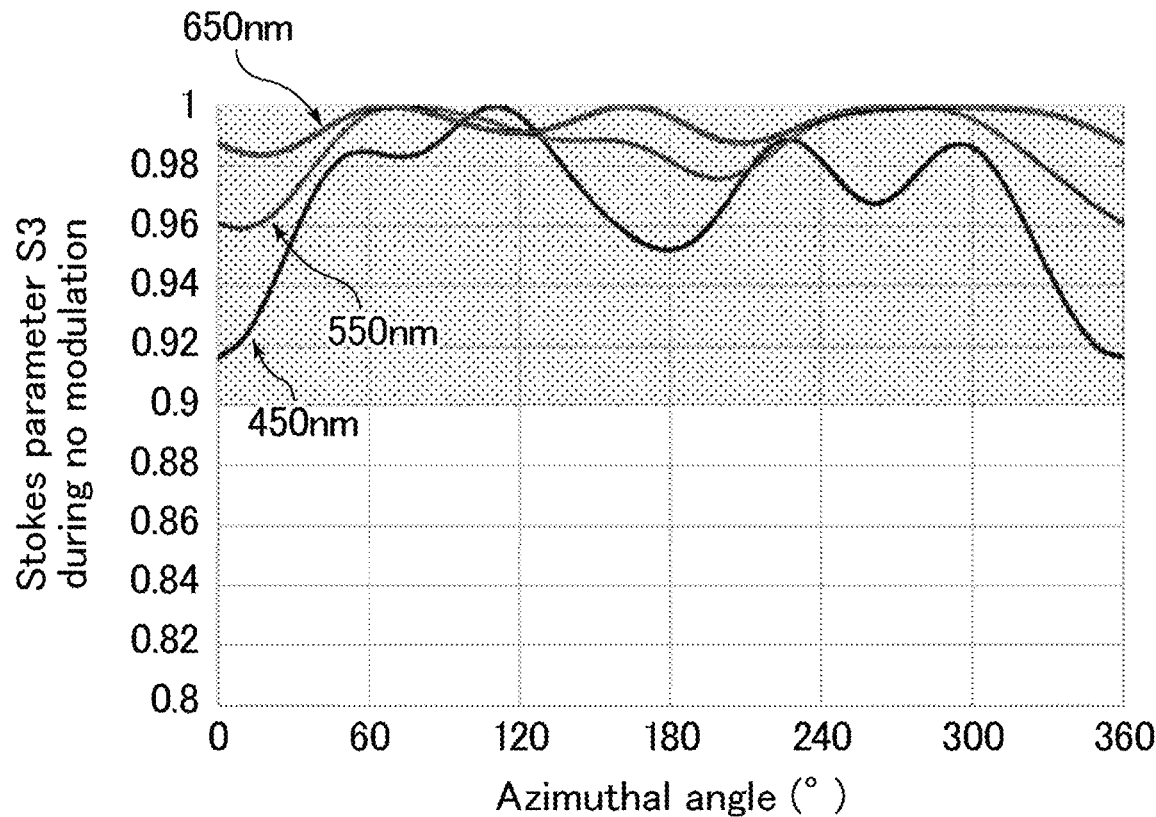
FIG. 63 is a graph showing the relationship between Stokes parameter S3 during no modulation and the azimuthal angle in the optical element of Example 3 when the angle of incidence is set to 30°.
Figure 64:
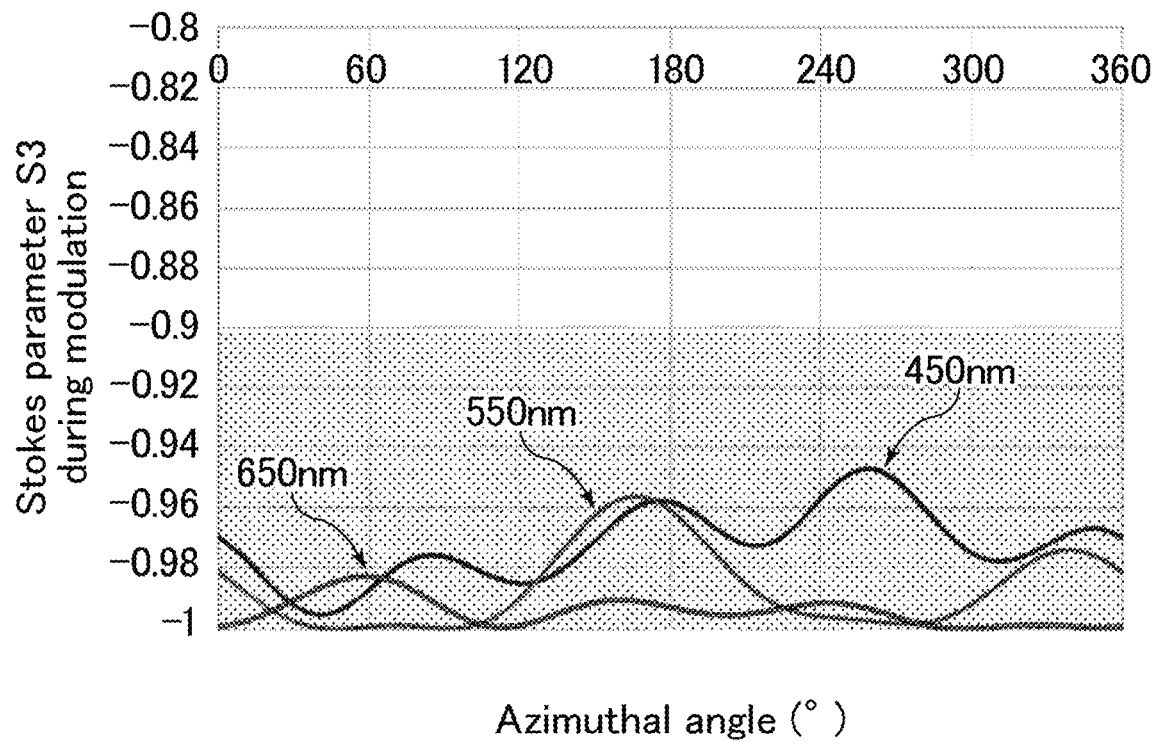
FIG. 64 is a graph showing the relationship between Stokes parameter S3 during modulation and the azimuthal angle in the optical element of Example 3 when the angle of incidence is set to 30°.

FIG. 63 is a graph showing the relationship between Stokes parameter S3 during no modulation and the azimuthal angle in the optical element of Example 3 when the angle of incidence is set to 30°. FIG. 64 is a graph showing the relationship between Stokes parameter S3 during modulation and the azimuthal angle in the optical element of Example 3 when the angle of incidence is set to 30°. FIG. 63 and FIG. 64 show modulation and no modulation of light at wavelengths of 450 nm, 550 nm, and 650 nm when the angle of incidence was set to 30°. As shown in FIG. 63 and FIG.

64, in Example 3, a state with |S3|≥0.9 was achieved at all the azimuths in a wavelength range of 450 nm to 650 nm both during modulation and during no modulation.

Example 4

An optical element 10 of Example 4 having the same configuration as in Embodiment 4 was produced. Specifically, the optical element 10 of Example 4 was produced by the same procedure as in Example 1, except that the second liquid crystal cell 11B in Example 3 was used as the second liquid crystal cell 11B.

In the first state, both the first liquid crystal layer 500 and the second liquid crystal layer 600 were driven by voltage application. The voltage applied in the first state to the first liquid crystal layer 500 and the second liquid crystal layer 600 is preferably as high as possible. In the present example, a voltage of 20 V was applied. Since the negative C plate 12 was designed to cancel the phase difference introduced by the driven first liquid crystal layer 500, only the driven second liquid crystal layer 600 was effective. Thus, a sHWP having a wide viewing angle range and a broad bandwidth was achieved.

In the second state, conversely to the first state, neither the first liquid crystal layer 500 nor the second liquid crystal layer 600 was driven by voltage application, so that the liquid crystal layer (first liquid crystal layer 500) was effective which had a 90-degree-rotated alignment direction from the liquid crystal layer (second liquid crystal layer 600) effective in the first state. Thus, light having passed through the two quarter-wave films (the first quarter-wave film 13 and the second quarter-wave film 14) was the opposite-handed circularly polarized light from the light incident on the optical element 10.

Figure 65:
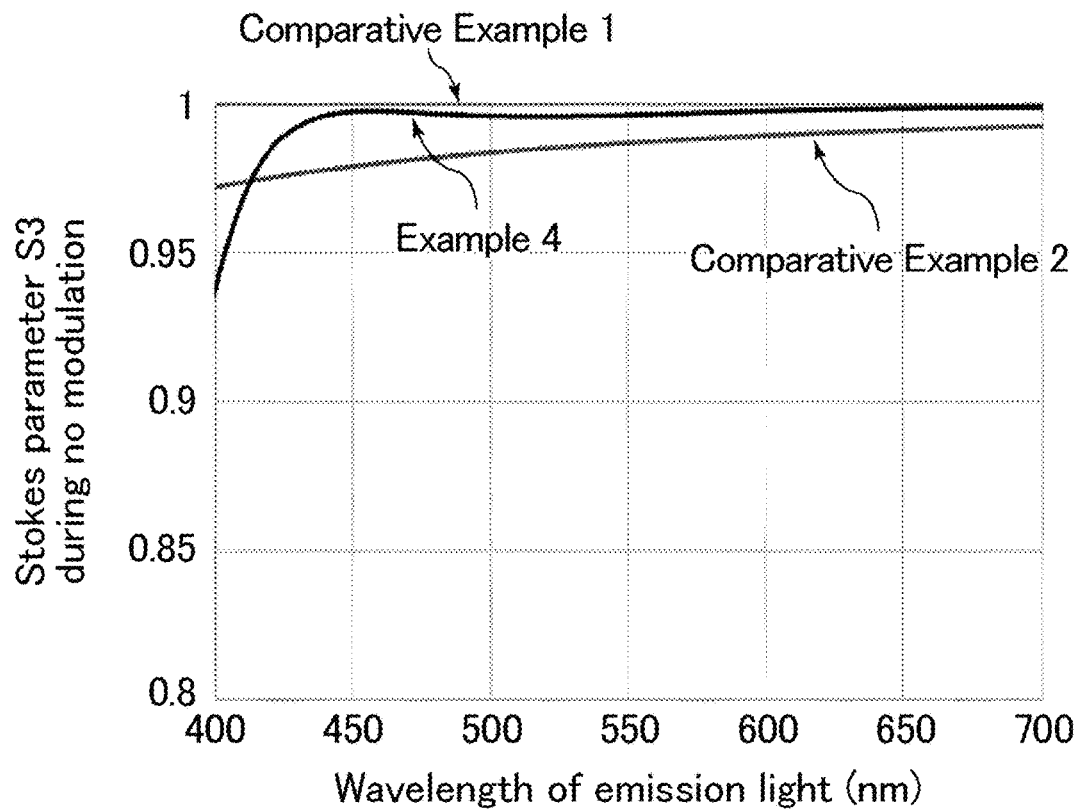
FIG. 65 is a graph showing the relationship between Stokes parameter S3 during no modulation and the wavelength of emission light in the optical elements of Example 4, Comparative Example 1, and Comparative Example 2 when the angle of incidence is set to 0°.
Figure 66:
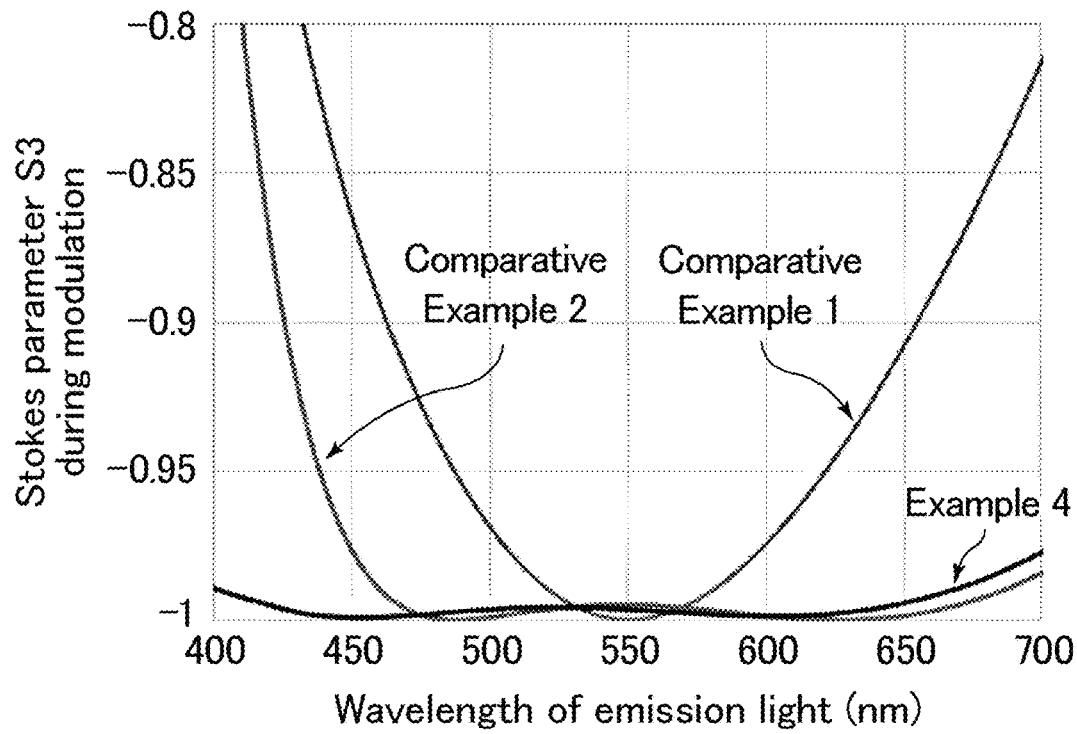
FIG. 66 is a graph showing the relationship between Stokes parameter S3 during modulation and the wavelength of emission light in the optical elements of Example 4, Comparative Example 1, and Comparative Example 2 when the angle of incidence is set to 0°.

The Stokes parameter S3 of the emission light resulting from right-handed circularly polarized light (S3=+1) incident on the optical element (sHWP) of Example 4 was evaluated. FIG. 65 is a graph showing the relationship between Stokes parameter S3 during no modulation and the wavelength of emission light in the optical elements of Example 4, Comparative Example 1, and Comparative Example 2 when the angle of incidence is set to 0°. FIG. 66 is a graph showing the relationship between Stokes parameter S3 during modulation and the wavelength of emission light in the optical elements of Example 4, Comparative Example 1, and Comparative Example 2 when the angle of incidence is set to 0°. FIG. 65 and FIG. 66 show modulation and no modulation of light in the visible light range when the angle of incidence was set to 0°. As shown in FIG. 65 and FIG. 66, in Example 4, a state with |S3|≥0.9 was achieved in a wavelength range of 450 nm to 650 nm both during modulation and during no modulation.

Figure 67:
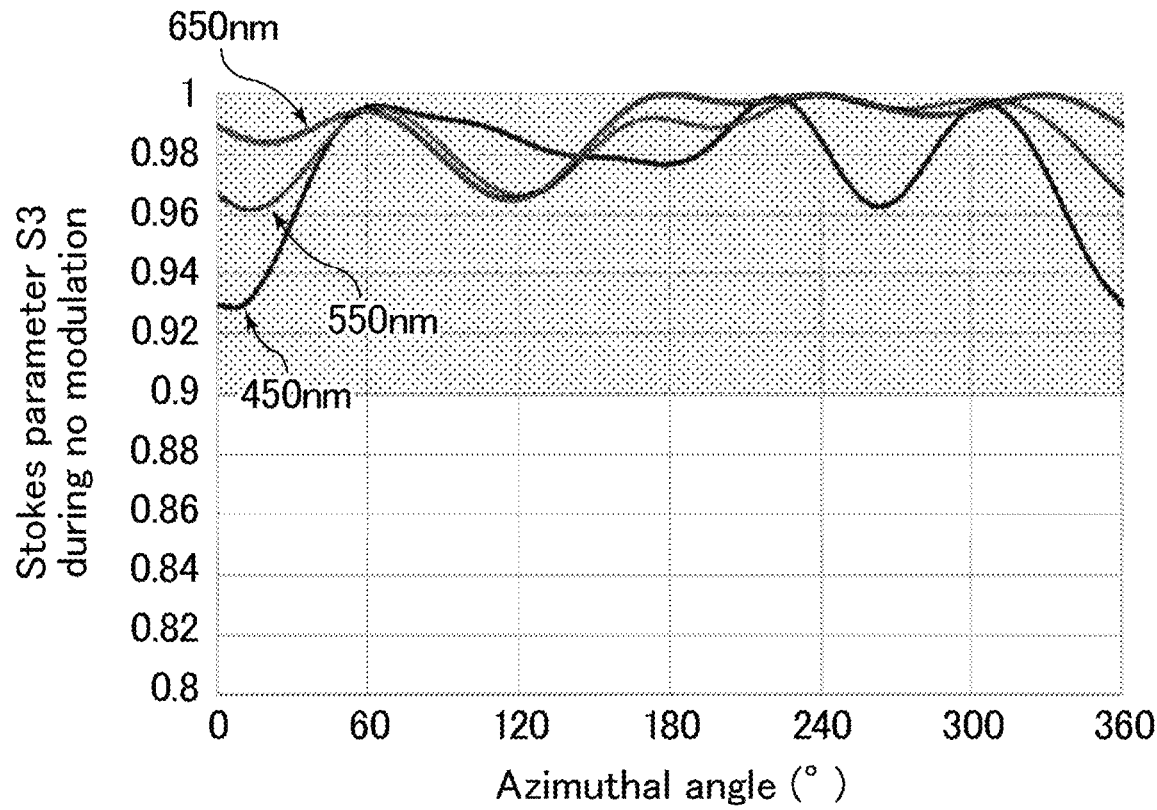
FIG. 67 is a graph showing the relationship between Stokes parameter S3 during no modulation and the azimuthal angle in the optical element of Example 4 when the angle of incidence is set to 30°.
Figure 68:
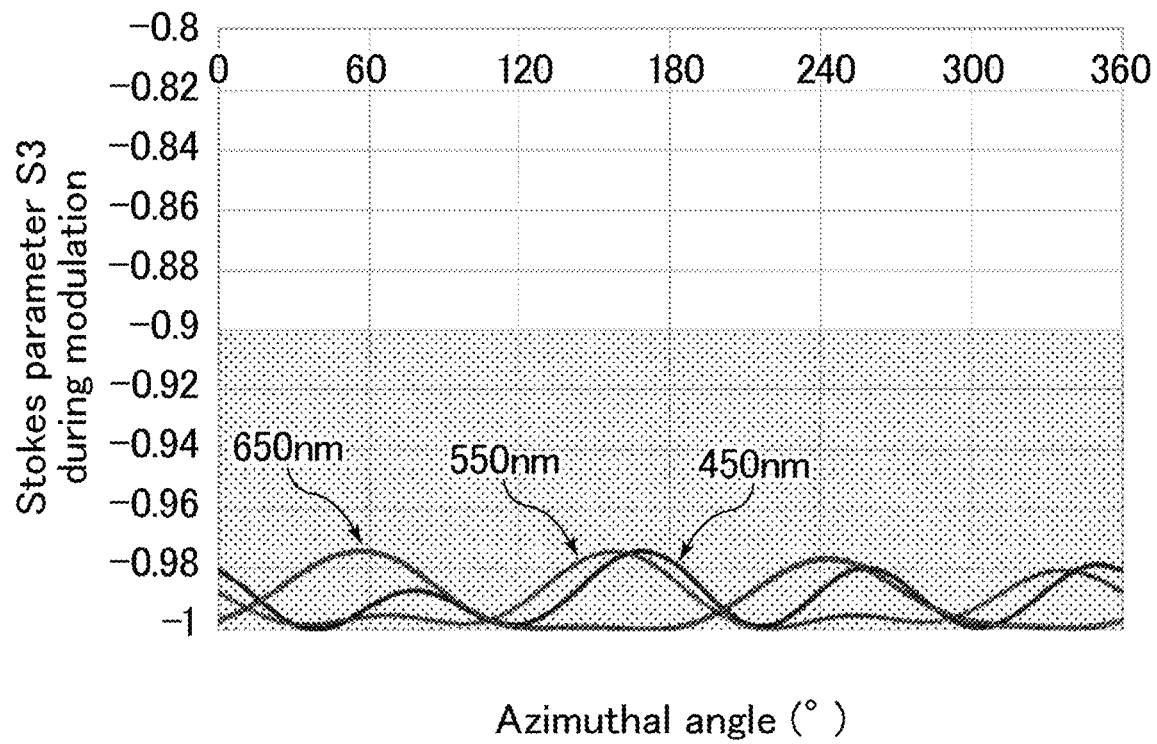
FIG. 68 is a graph showing the relationship between Stokes parameter S3 during modulation and the azimuthal angle in the optical element of Example 4 when the angle of incidence is set to 30°.

FIG. 67 is a graph showing the relationship between Stokes parameter S3 during no modulation and the azimuthal angle in the optical element of Example 4 when the angle of incidence is set to 30°. FIG. 68 is a graph showing the relationship between Stokes parameter S3 during modulation and the azimuthal angle in the optical element of Example 4 when the angle of incidence is set to 30°. FIG. 67 and FIG. 68 show modulation and no modulation of light at wavelengths of 450 nm, 550 nm, and 650 nm when the angle of incidence was set to 30°. As shown in FIG. 67 and FIG. 68, in Example 4, a state with |S3|≥0.9 was achieved at all the azimuths in a wavelength range of 450 nm to 650 nm both during modulation and during no modulation.

Example 5

A varifocal element 30 of Example 5 corresponding to that of Modified Example 1 of Embodiment 5 was produced.

The first liquid crystal molecules 510 and the second liquid crystal molecules 610 were positive liquid crystal molecules having a refractive index anisotropy Δn of 0.066. The first alignment film 41, the second alignment film 42, the third alignment film 43, and the fourth alignment film 44 were horizontal alignment films.

The alignment direction 512A of the first liquid crystal molecules 512 near the second substrate 200 in the second state was at an azimuthal angle of 0°, and the alignment direction 511A of the first liquid crystal molecules 511 near the first substrate 100 in the second state was at an azimuthal angle of 68°. The alignment direction 612A of the second liquid crystal molecules 612 near the fourth substrate 400 in the first state was at an azimuthal angle of 90°, and the alignment direction 611A of the second liquid crystal molecules 611 near the third substrate 300 in the first state was at an azimuthal angle of 158°.

The first quarter-wave film 13 exhibited reverse wavelength dispersion. The second quarter-wave film 14 exhibited flat wavelength dispersion. The slow axis 13A of the first quarter-wave film 13 was at an azimuthal angle of 57.2°. The slow axis 14A of the second quarter-wave film 14 was at an azimuthal angle of 12.2°.

The varifocal element 30 of Example 5 was specifically produced by the following procedure. An in-cell PB lens-forming photosensitive material containing a polymer represented by the general formula (PB-1) was applied to the fourth substrate 400 of the second liquid crystal cell 11B to form a PB lens-forming film.

FIG. 69 is a schematic view showing the first alignment treatment in production of the varifocal element of Example 5. FIG. 70 is a schematic view showing the second alignment treatment in the production of the varifocal element of Example 5. FIG. 71 is a schematic view showing the third alignment treatment in the production of the varifocal element of Example 5. FIG. 72 is a schematic view showing the fourth alignment treatment in the production of the varifocal element of Example 5.

Alignment treatment was performed on the PB lens-forming film on the fourth substrate 400. Specifically, as shown in FIG. 69, a first photomask 810 was used to perform alignment treatment on a PB lens-forming film 900 with light polarized at an azimuthal angle of 0°. Then, as shown in FIG. 70, a second photomask 820 was used to perform alignment treatment on the PB lens-forming film 900 with light polarized at an azimuthal angle of 45°. Subsequently, as shown in FIG. 71, a third photomask 830 was used to perform alignment treatment on the PB lens-forming film 900 with light polarized at an azimuthal angle of 90°. Lastly, as shown in FIG. 72, a fourth photomask 840 was used to perform alignment treatment on the PB lens-forming film 900 with light polarized at an azimuthal angle of 135°. Annealing was then performed to form the PB lens 20 on the fourth substrate 400.

The stack of the fourth substrate 400 and the PB lens 20 was used to produce the second liquid crystal cell 11B as in Example 2. The first liquid crystal cell 11A in the horizontal alignment and the second liquid crystal cell 11B in the horizontal alignment were stacked. A quarter-wave film exhibiting reverse wavelength dispersion as the first quarter-wave film 13 was attached to the surface of the first liquid crystal cell 11A remote from the second liquid crystal cell 11B and a quarter-wave film exhibiting flat wavelength dispersion as the second quarter-wave film 14 was attached to the surface of the first quarter-wave film 13 remote from the first liquid crystal cell 11A, whereby the varifocal element 30 of Example 5 was obtained.

The present example is designed to cause incident light to enter the sHWP through which right-handed circularly polarized light and left-handed circularly polarized light are switched, before the PB lens 20, so that the light converges or diverges through the PB lens 20 depending on its polarization state. Thus, the second quarter-wave film 14 and the first quarter-wave film 13 were arranged closer to the light incident side than the first liquid crystal layer 500 and the second liquid crystal layer 600 were. The arrangement and axis azimuths of each layer were thus different from those in Example 2.

The varifocal element 30 of Example 5 was capable of switching between polarization modulation and no polarization modulation over a broad bandwidth and a wide viewing angle range.

Example 6

An optical element 10 of Example 6 having the same configuration as in Modified Example 1 of Embodiment 1 was produced. Specifically, the optical element 10 of Example 6 was produced by the same procedure as in Example 1, except that the first positive C plate 19A introducing a thickness direction retardation Rth of 70 nm was disposed to face the second liquid crystal cell 11B across the first liquid crystal cell 11A, the second positive C plate 19B introducing a thickness direction retardation Rth of 70 nm was disposed between the second liquid crystal cell 11B and the first quarter-wave film 13, and the thickness direction retardation Rth introduced by the negative C plate 12 was changed to −140 nm. The driving method of the optical element 10 was the same as in Example 1.

Figure 73:
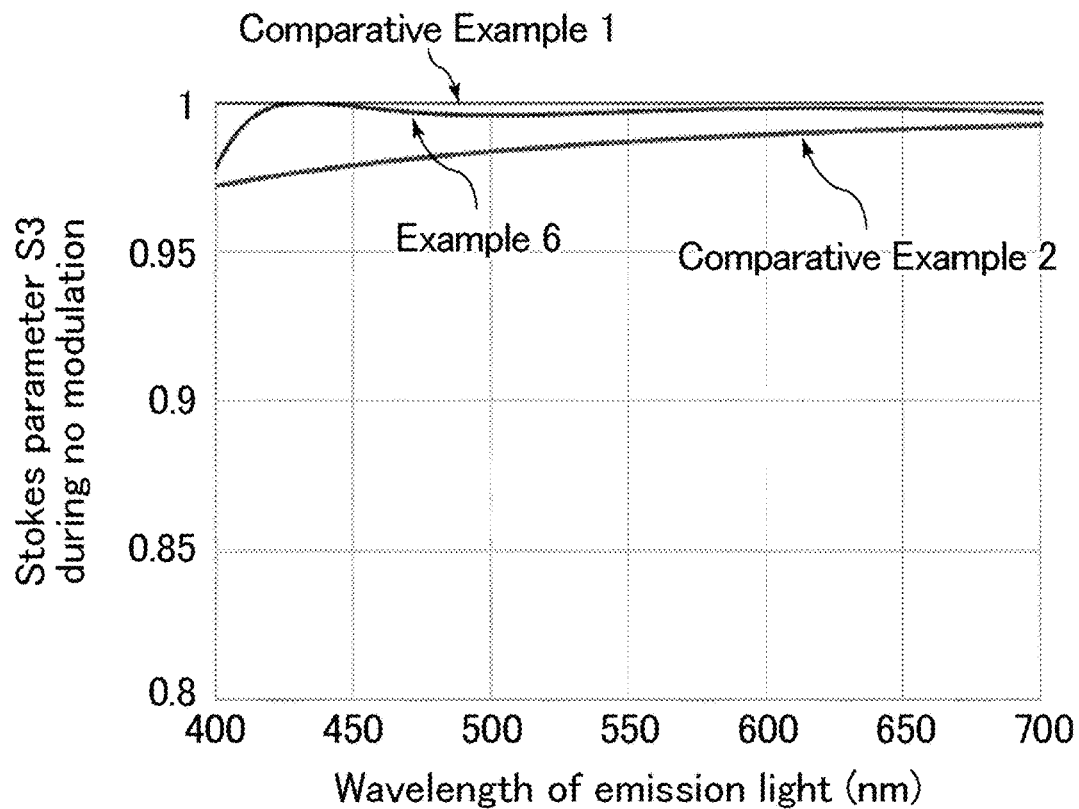
FIG. 73 is a graph showing the relationship between Stokes parameter S3 during no modulation and the wavelength of emission light in the optical elements of Example 6, Comparative Example 1, and Comparative Example 2 when the angle of incidence is set to 0°.
Figure 74:
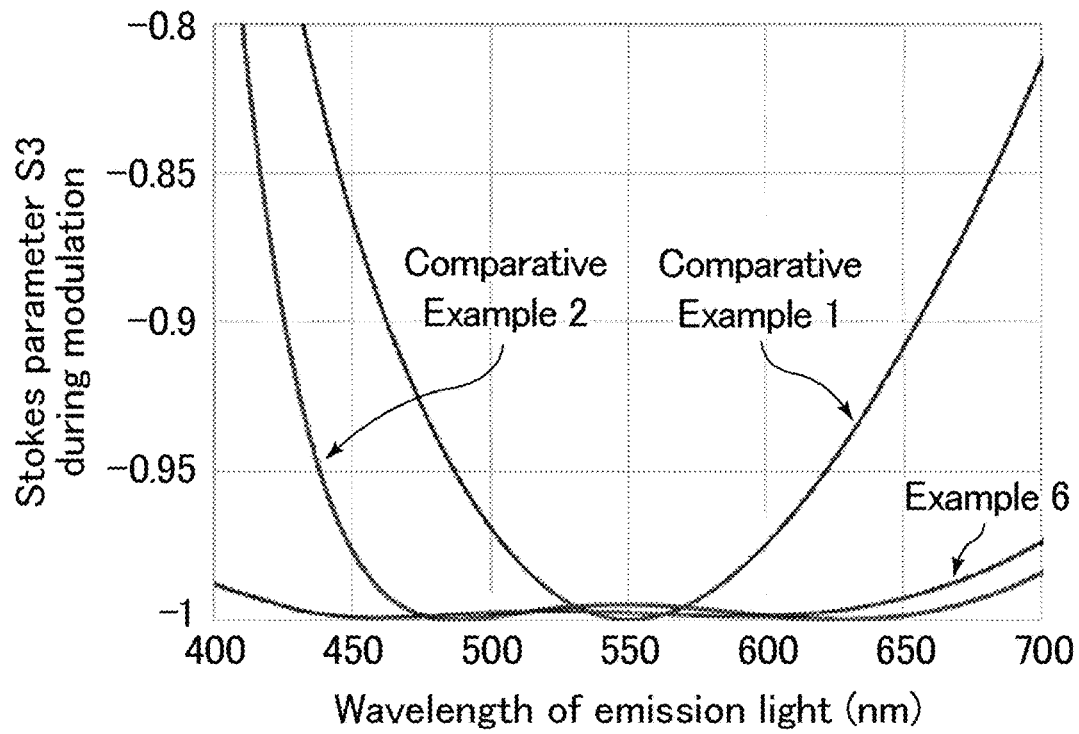
FIG. 74 is a graph showing the relationship between Stokes parameter S3 during modulation and the wavelength of emission light in the optical elements of Example 6, Comparative Example 1, and Comparative Example 2 when the angle of incidence is set to 0°.

The Stokes parameter S3 of the emission light resulting from right-handed circularly polarized light (S3=+1) incident on the optical element (sHWP) of Example 6 was evaluated. FIG. 73 is a graph showing the relationship between Stokes parameter S3 during no modulation and the wavelength of emission light in the optical elements of Example 6, Comparative Example 1, and Comparative Example 2 when the angle of incidence is set to 0°. FIG. 74 is a graph showing the relationship between Stokes parameter S3 during modulation and the wavelength of emission light in the optical elements of Example 6, Comparative Example 1, and Comparative Example 2 when the angle of incidence is set to 0°. FIG. 73 and FIG. 74 show modulation and no modulation of light in the visible light range when the angle of incidence was set to 0°. As shown in FIG. 73 and FIG. 74, in Example 6, a state with |S3|≥0.9 was achieved in a wavelength range of 450 nm to 650 nm both during modulation and during no modulation.

Figure 75:
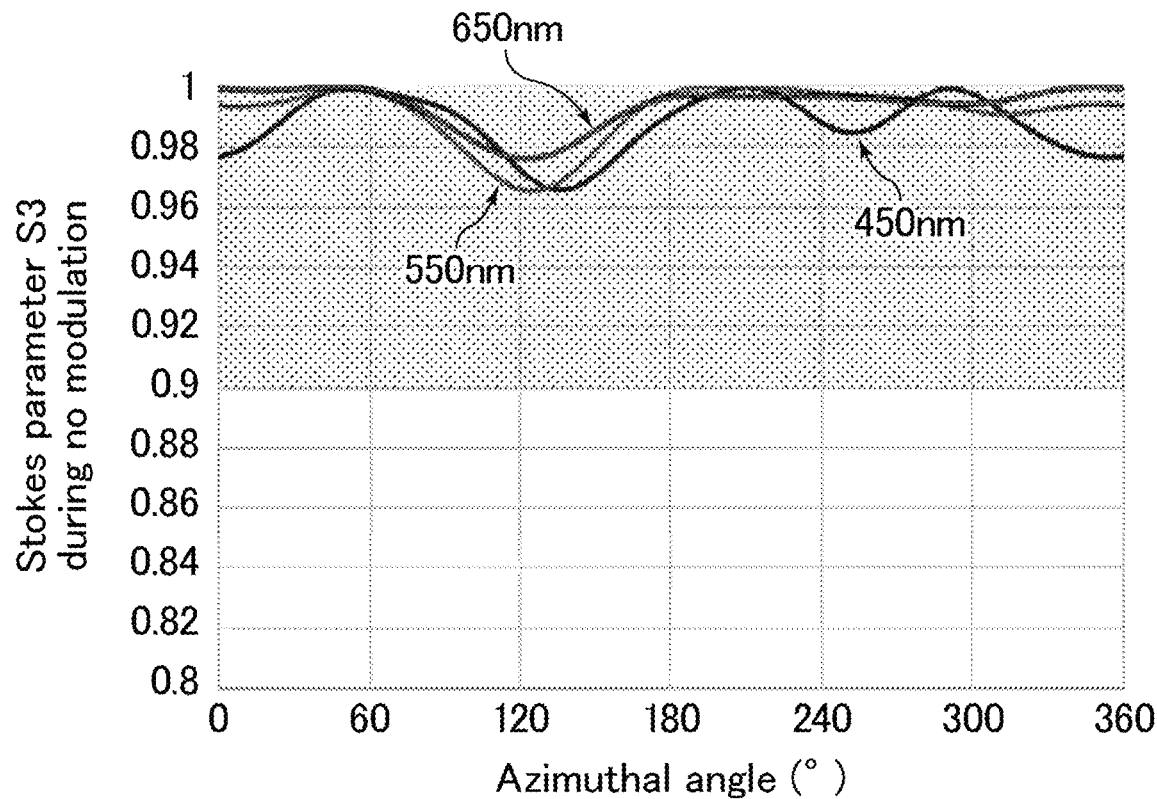
FIG. 75 is a graph showing the relationship between Stokes parameter S3 during no modulation and the azimuthal angle in the optical element of Example 6 when the angle of incidence is set to 30°.
Figure 76:
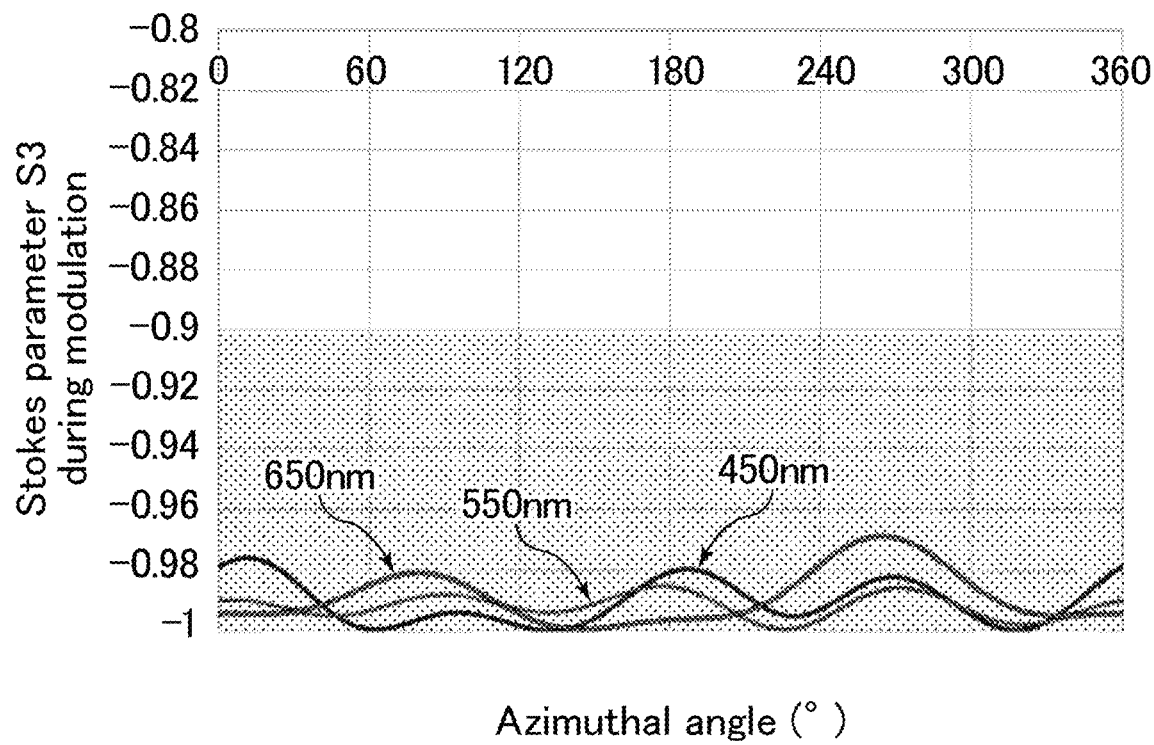
FIG. 76 is a graph showing the relationship between Stokes parameter S3 during modulation and the azimuthal angle in the optical element of Example 6 when the angle of incidence is set to 30°.

FIG. 75 is a graph showing the relationship between Stokes parameter S3 during no modulation and the azimuthal angle in the optical element of Example 6 when the angle of incidence is set to 30°. FIG. 76 is a graph showing the relationship between Stokes parameter S3 during modulation and the azimuthal angle in the optical element of Example 6 when the angle of incidence is set to 30°. FIG. 75 and FIG. 76 show modulation and no modulation of light at wavelengths of 450 nm, 550 nm, and 650 nm when the angle of incidence was set to 30°. As shown in FIG. 75 and FIG. 76, in Example 6, a state with |S3|≥0.9 was achieved at all the azimuths in a wavelength range of 450 nm to 650 nm both during modulation and during no modulation. The performance in Example 6 was better than in Example 1.

For determination of the suitable range of thickness direction retardations Rth introduced by each of the first positive C plate 19A and the second positive C plate 19B, the LCD-MASTER 1D available from Shintech, Inc. was used to perform optical calculations for the optical element 10 of Example 6. Hereinafter, based on the simulation results, the range in which 90% or higher modulation and no modulation were achieved at an angle of incidence of 30° and in a wavelength range of 450 nm to 650 nm was regarded as the suitable range. The graphs mentioned below only show the data on the worst azimuths at an angle of incidence of 30° at wavelengths of 450 nm, 550 nm, and 650 nm for simplification.

Figure 77:
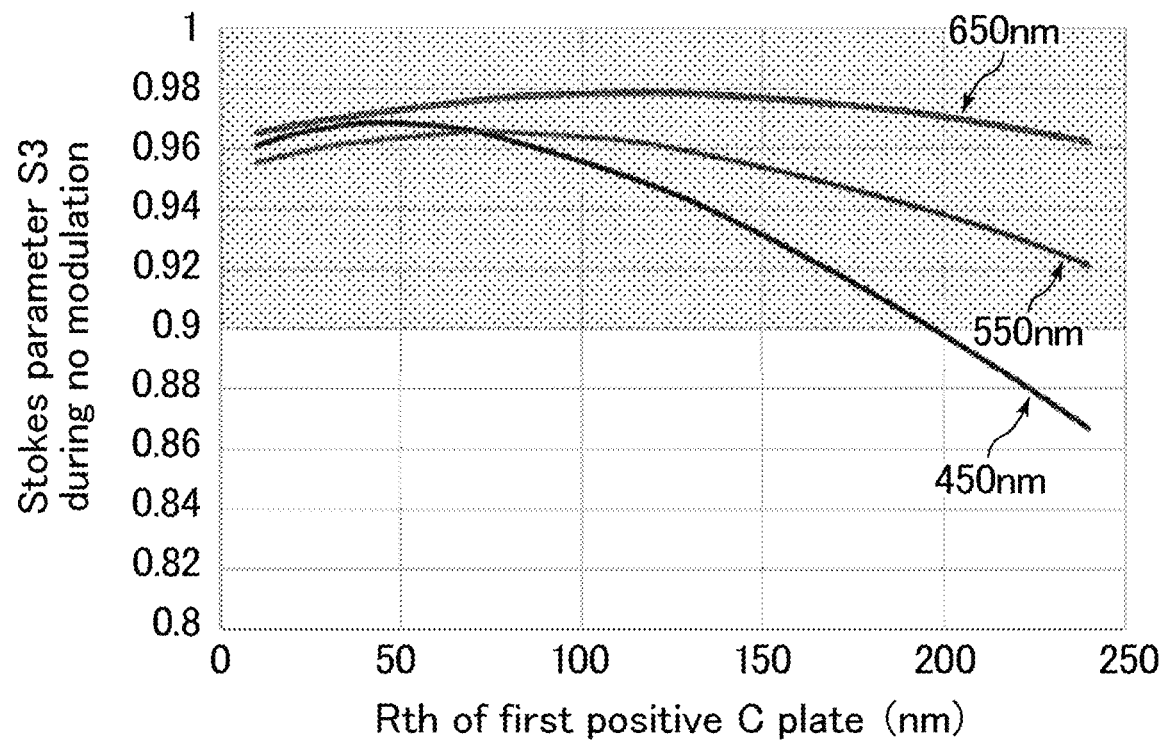
FIG. 77 is a graph of Stokes parameter S3 during no modulation versus thickness direction retardation Rth introduced by a first positive C plate in the optical element of Example 6.
Figure 78:
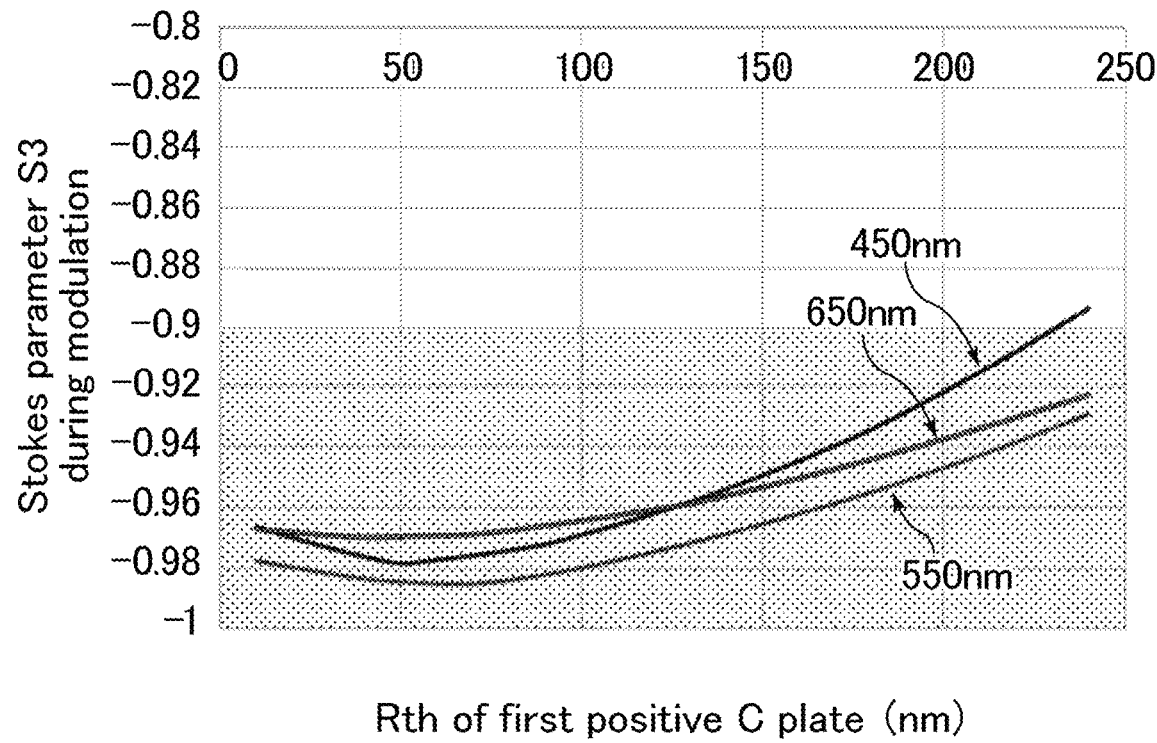
FIG. 78 is a graph of Stokes parameter S3 during modulation versus thickness direction retardation Rth introduced by the first positive C plate in the optical element of Example 6.

FIG. 77 is a graph of Stokes parameter S3 during no modulation versus thickness direction retardation Rth introduced by a first positive C plate in the optical element of Example 6. FIG. 78 is a graph of Stokes parameter S3 during modulation versus thickness direction retardation Rth introduced by the first positive C plate in the optical element of Example 6. FIG. 77 and FIG. 78 show that the suitable range of thickness direction retardations Rth introduced by the first positive C plate 19A was not less than 0 nm and not more than 190 nm.

Figure 79:
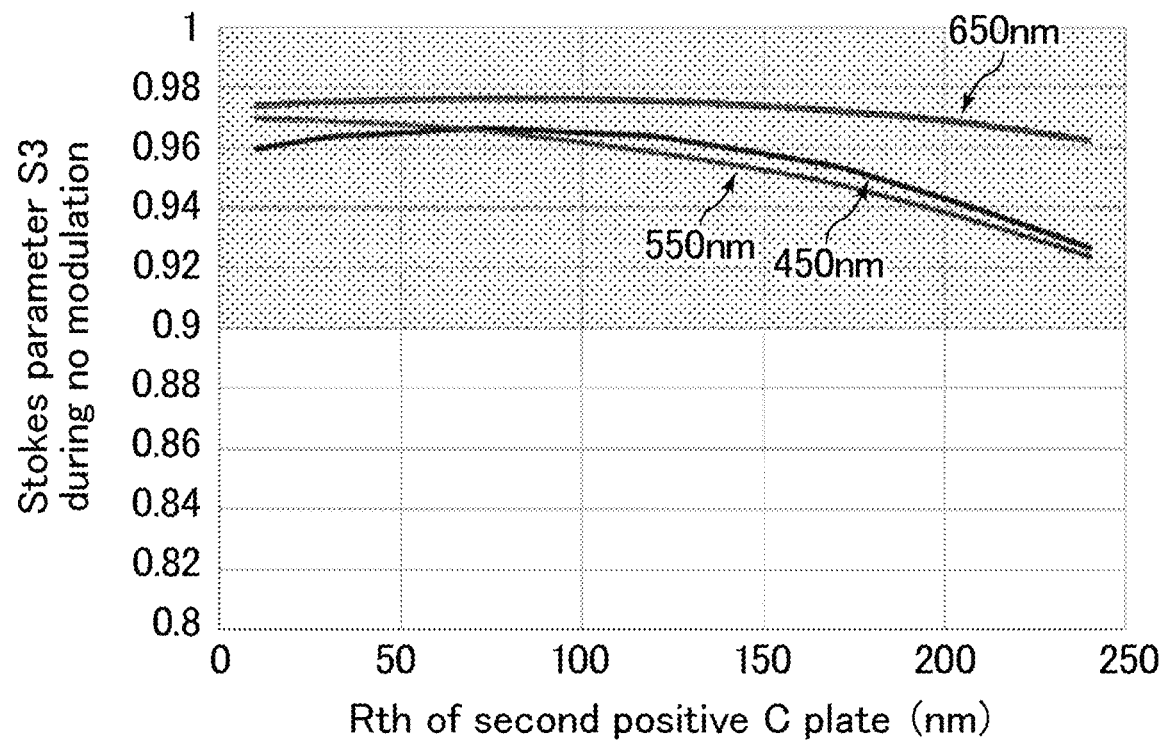
FIG. 79 is a graph of Stokes parameter S3 during no modulation versus thickness direction retardation Rth introduced by a second positive C plate in the optical element of Example 6.
Figure 80:
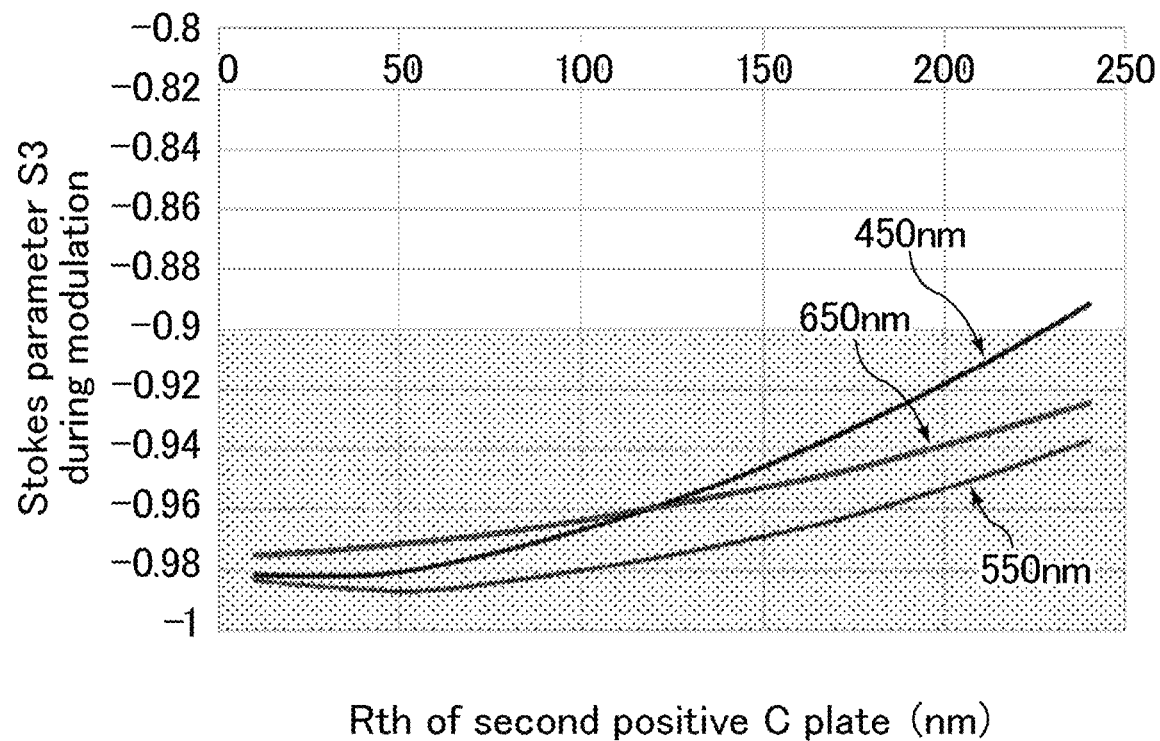
FIG. 80 is a graph of Stokes parameter S3 during modulation versus thickness direction retardation Rth introduced by the second positive C plate in the optical element of Example 6.

FIG. 79 is a graph of Stokes parameter S3 during no modulation versus thickness direction retardation Rth introduced by a second positive C plate in the optical element of Example 6. FIG. 80 is a graph of Stokes parameter S3 during modulation versus thickness direction retardation Rth introduced by the second positive C plate in the optical element of Example 6. FIG. 79 and FIG. 80 show that the suitable range of thickness direction retardations Rth introduced by the second positive C plate 19B was not less than 0 nm and not more than 220 nm.

Example 7

FIG. 178 includes schematic views showing the alignments of liquid crystal molecules in the first state and the second state in the optical element of Example 7. An optical element was produced which corresponds to one in FIG. 104 among the optical elements 10 having the seventh structure of Modified Example 2 of Embodiment 1. In the optical element of the present example, the slow axis 51A of the first A plate 51 (positive A plate) shown in FIG. 178 was at an azimuthal angle of 52.7°, and the slow axis 52A of the second A plate 52 (negative A plate) was at an azimuthal angle of 10.2°

The Re introduced by the first A plate 51 at a wavelength of 550 nm was 140 nm. The Re at a wavelength of 450 nm was 1.01 times the Re at a wavelength of 550 nm. The Re at a wavelength of 650 nm was 0.99 times the Re at a wavelength of 550 nm. The Re here means the in-plane phase difference (Rp).

The Re introduced by the second A plate 52 at a wavelength of 550 nm was 120 nm. The Re at a wavelength of 450 nm was 1.08 times the Re at a wavelength of 550 nm. The Re at a wavelength of 650 nm was 0.96 times the Re at a wavelength of 550 nm.

The Rth introduced by the first C plate 61 (positive C plate) at a wavelength of 550 nm was 75 nm. The Re at a wavelength of 450 nm was 1.07 times the Re at a wavelength of 550 nm. The Re at a wavelength of 650 nm was 0.97 times the Re at a wavelength of 550 nm.

The Rth introduced by the second C plate 62 (negative C plate) at a wavelength of 550 nm was −12.5 nm. The Re at a wavelength of 450 nm was 1.01 times the Re at a wavelength of 550 nm. The Re at a wavelength of 650 nm was 0.99 times the Re at a wavelength of 550 nm.

The Rth introduced by the negative C plate 12 at a wavelength of 550 nm was 160 nm. The Re at a wavelength of 450 nm was 1.01 times the Re at a wavelength of 550 nm. The Re at a wavelength of 650 nm was 0.99 times the Re at a wavelength of 550 nm.

The first liquid crystal cell 11A and the second liquid crystal cell 11B were produced as follows. The first solid electrode 120, the second solid electrode 220, the third solid electrode 320, and the fourth solid electrode 420 were respectively formed in the first substrate 100, the second substrate 200, the third substrate 300, and the fourth substrate 400. Horizontal alignment films were then formed on the respective first substrate 100, second substrate 200, third substrate 300, and fourth substrate 400 each including the corresponding solid electrode. The horizontal alignment films may be subjected to rubbing or other treatment to provide a pre-tilt angle.

The first liquid crystal layer 500 was disposed between the first substrate 100 and the second substrate 200, each of which had the corresponding solid electrode and horizontal alignment film, so that the first liquid crystal cell 11A was produced. The second liquid crystal layer 600 was disposed between the third substrate 300 and the fourth substrate 400, each of which had the corresponding solid electrode and horizontal alignment film, so that the second liquid crystal cell 11B was produced. The first liquid crystal molecules 510 in the first liquid crystal layer 500 and the second liquid crystal molecules 610 in the second liquid crystal layer 600 were both positive liquid crystal molecules (Δn=0.070). The thickness of each of the first liquid crystal layer 500 and the second liquid crystal layer 600 was 3.4 μm.

In the second state, the alignment direction 511A of the first liquid crystal molecules 511 near the first substrate 100 was at an azimuthal angle of 0°, and the alignment direction 512A of the first liquid crystal molecules 512 near the second substrate 200 was at an azimuthal angle of 68°. In the first state, the alignment direction 611A of the second liquid crystal molecules 611 near the third substrate 300 was at an azimuthal angle of 90°, and the alignment direction 612A of the second liquid crystal molecules 612 near the fourth substrate 400 was at an azimuthal angle of 158°.

The Stokes parameter S3 of the emission light resulting from right-handed circularly polarized light (S3=+1) incident on the optical element (sHWP) of Example 7 was evaluated. FIG. 179 is a graph showing the relationship between Stokes parameter S3 during no modulation and the wavelength of emission light in the optical elements of Example 1 and Example 7. FIG. 180 is a graph showing the relationship between Stokes parameter S3 during modulation and the wavelength of emission light in the optical elements of Example 1 and Example 7. FIG. 179 and FIG. 180 show modulation and no modulation of light in the visible light range when the angle of incidence was set to 0°. As shown in FIG. 179 and FIG. 180, also in Example 7, a state with |S3|≥0.9 was achieved in a wavelength range of 450 nm to 650 nm both during modulation and during no modulation as in Example 1.

FIG. 181 is a graph showing the relationship between Stokes parameter S3 during no modulation and the azimuthal angle in the optical element of Example 1 when the angle of incidence is set to 30°. FIG. 182 is a graph showing the relationship between Stokes parameter S3 during modulation and the azimuthal angle in the optical element of Example 1 when the angle of incidence is set to 30°. FIG. 183 is a graph showing the relationship between Stokes parameter S3 during no modulation and the azimuthal angle in the optical element of Example 7 when the angle of incidence is set to 30°. FIG. 184 is a graph showing the relationship between Stokes parameter S3 during modulation and the azimuthal angle in the optical element of Example 7 when the angle of incidence is set to 30°. FIG. 181 to FIG. 184 show the evaluation results at wavelengths of 450 nm, 550 nm, and 650 nm. The portion with gray hatching in the drawings corresponds to the suitable range where a state with |S3|≥0.9 was achieved.

As shown in FIG. 181 to FIG. 184, also in Example 7, a state with |S3|≥0.9 was achieved at all the azimuths in a range of 450 nm to 650 nm both during modulation and during no modulation. The performance in Example 7 was better than in Example 1.

For determination of suitable designs of the liquid crystal cells, the LCD-MASTER 1D available from Shintech, Inc. was used to perform optical calculations for the optical element 10 of Example 7. Hereinafter, based on the simulation results, the range in which 90% or higher modulation and no modulation were achieved at an angle of incidence of 30° and in a wavelength range of 450 nm to 650 nm was regarded as the suitable range. The graphs mentioned below only show the data on the worst azimuths at an angle of incidence of 30° at wavelengths of 450 nm, 550 nm, and 650 nm for simplification.

First, for determination of the suitable range of thickness direction retardations Rth introduced by the second C plate 62 (negative C plate), Stokes parameter S3 during no modulation versus thickness direction retardation Rth introduced by the second C plate 62 in the optical element 10 of Example 7 and Stokes parameter S3 during modulation versus thickness direction retardation Rth introduced by the second C plate 62 in the optical element 10 of Example 7 were simulated. FIG. 185 is a graph of Stokes parameter S3 during no modulation versus thickness direction retardation Rth introduced by a second C plate in the optical element of Example 7. FIG. 186 is a graph of Stokes parameter S3 during modulation versus thickness direction retardation Rth introduced by the second C plate in the optical element of Example 7. As shown in FIG. 185 and FIG. 186, the suitable range of thickness direction retardations Rth introduced by the second C plate 62 was not less than −170 nm and not more than 0 nm.

For determination of the suitable range of thickness direction retardations Rth introduced by the first C plate 61 (positive C plate), Stokes parameter S3 during no modulation versus thickness direction retardation Rth introduced by the first C plate 61 in the optical element 10 of Example 7 and Stokes parameter S3 during modulation versus thickness direction retardation Rth introduced by the first C plate 61 in the optical element 10 of Example 7 were simulated. FIG. 187 is a graph of Stokes parameter S3 during no modulation versus thickness direction retardation Rth introduced by a first C plate in the optical element of Example 7. FIG. 188 is a graph of Stokes parameter S3 during modulation versus thickness direction retardation Rth introduced by the first C plate in the optical element of Example 7. As shown in FIG. 187 and FIG. 188, the suitable range of thickness direction retardations Rth introduced by the first C plate 61 was not less than 0 nm and not more than 230 nm.

For determination of the suitable range of thickness direction retardations Rth introduced by the negative C plate 12, Stokes parameter S3 during no modulation versus thickness direction retardation Rth introduced by the negative C plate 12 in the optical element 10 of Example 7 and Stokes parameter S3 during modulation versus thickness direction retardation Rth introduced by the negative C plate 12 in the optical element 10 of Example 7 were simulated. FIG. 189 is a graph of Stokes parameter S3 during no modulation versus thickness direction retardation Rth introduced by a negative C plate in the optical element of Example 7. FIG. 190 is a graph of Stokes parameter S3 during modulation versus thickness direction retardation Rth introduced by the negative C plate in the optical element of Example 7. As shown in FIG. 189 and FIG. 190, the suitable range of thickness direction retardations Rth introduced by the negative C plate 12 is not less than −350 nm and not more than 0 nm.

For determination of the suitable range of in-plane phase differences Re introduced by the second A plate 52 (negative A plate), Stokes parameter S3 during no modulation versus in-plane phase difference Re introduced by the second A plate 52 in the optical element 10 of Example 7 and Stokes parameter S3 during modulation versus in-plane phase difference Re introduced by the second A plate 52 in the optical element 10 of Example 7 were simulated. FIG. 191 is a graph of Stokes parameter S3 during no modulation versus in-plane phase difference Re introduced by a second A plate in the optical element of Example 7. FIG. 192 is a graph of Stokes parameter S3 during modulation versus in-plane phase difference Re introduced by the second A plate in the optical element of Example 7. As shown in FIG. 191 and FIG. 192, the suitable range of in-plane phase differences Re introduced by the second A plate 52 was not less than 92 nm and not more than 140 nm.

For determination of the suitable range of azimuthal angles of the slow axis 52A of the second A plate 52, Stokes parameter S3 during no modulation versus azimuthal angle of the slow axis 52A of the second A plate 52 in the optical element 10 of Example 7 and Stokes parameter S3 during modulation versus azimuthal angle of the slow axis 52A of the second A plate 52 in the optical element 10 of Example 7 were simulated. FIG. 193 is a graph of Stokes parameter S3 during no modulation versus azimuthal angle of the slow axis of the second A plate in the optical element of Example 7. FIG. 194 is a graph of Stokes parameter S3 during modulation versus azimuthal angle of the slow axis of the second A plate in the optical element of Example 7. As shown in FIG. 193 and FIG. 194, the suitable range of azimuthal angles of the slow axis 52A of the second A plate 52 was not smaller than 4° and not greater than 17°.

For determination of the suitable range of in-plane phase differences Re introduced by the first A plate 51 (positive A plate), Stokes parameter S3 during no modulation versus in-plane phase difference Re introduced by the first A plate 51 in the optical element 10 of Example 7 and Stokes parameter S3 during modulation versus in-plane phase difference Re introduced by the first A plate 51 in the optical element 10 of Example 7 were simulated. FIG. 195 is a graph of Stokes parameter S3 during no modulation versus in-plane phase difference Re introduced by a first A plate in the optical element of Example 7. FIG. 196 is a graph of Stokes parameter S3 during modulation versus in-plane phase difference Re introduced by the first A plate in the optical element of Example 7. As shown in FIG. 195 and FIG. 196, the suitable range of in-plane phase differences Re introduced by the first A plate 51 was not less than 70 nm and not more than 220 nm.

For determination of the suitable range of azimuthal angles of the slow axis 51A of the first A plate 51, Stokes parameter S3 during no modulation versus azimuthal angle of the slow axis 51A of the first A plate 51 in the optical element 10 of Example 7 and Stokes parameter S3 during modulation versus azimuthal angle of the slow axis 51A of the first A plate 51 in the optical element 10 of Example 7 were simulated. FIG. 197 is a graph of Stokes parameter S3 during no modulation versus azimuthal angle of the slow axis of the first A plate in the optical element of Example 7. FIG. 198 is a graph of Stokes parameter S3 during modulation versus azimuthal angle of the slow axis of the first A plate in the optical element of Example 7. As shown in FIG. 197 and FIG. 198, the suitable range of azimuthal angles of the slow axis 51A of the first A plate 51 was not less than 47° and not more than 52°.

FIG. 199 is a view showing the polarization states. The horizontal axis in graphs in drawings including FIG. 185 represents phase difference or angle, while the vertical axis represents the "S3" value among the Stokes parameters which describe the polarization state. As shown in the Poincare sphere in FIG. 199, the state with S3=+1 appears at the North pole on the Poincare sphere describing the polarization state, suggesting that the light is right-handed circularly polarized light. The state with S3=−1 appears at the South pole on the Poincare sphere, suggesting that the light is left-handed circularly polarized light. In other words, an S3 value closer to ±1 herein means better properties.

Also, the optical elements 10 described herein are configured to switch between right-handed circularly polarized light and left-handed circularly polarized light. Thus, when right-handed circularly polarized light with S3=+1 is incident on any of the optical elements 10, there are two cases, namely the case where the incident light is emitted while remaining as right-handed circularly polarized light with S3=+1 and the case where the incident light is emitted after being converted to left-handed circularly polarized light with S3=−1. This is why the suitable ranges are determined using two graphs of during no modulation and during modulation herein.

The present disclosure aims for an optical element exhibiting a broad bandwidth and a wide viewing angle range. Thus, for determination of whether all the incident RGB (red, green, and blue) circularly polarized lights (herein, right-handed circularly polarized lights) in an oblique direction can be modulated as well, S3 values of lights at wavelengths of 450 nm, 550 nm, and 650 nm when the angle of incidence was set to 30° were plotted.

Example 8

An optical element of Example 8 having the same configuration as in Modified Example 3 of Embodiment 1 was produced. The first phase difference film 71 and the second phase difference film 72 were formed using the same film.

In the optical element of the present example, the slow axis 71A of the first phase difference film 71 (biaxial film) shown in FIG. 201 was at an azimuthal angle of 57.7 degrees, and the slow axis 72A of the second phase difference film 72 (biaxial film) was at an azimuthal angle of 15.8 degrees.

The in-plane phase difference Re introduced by the first phase difference film 71 at a wavelength of 550 nm and the in-plane phase difference Re introduced by the second phase difference film 72 at a wavelength of 550 nm were both 140 nm. The in-plane phase difference introduced by the first phase difference film 71 at a wavelength of 450 nm was 1.01 times the in-plane phase difference introduced by the first phase difference film 71 at a wavelength of 550 nm. The in-plane phase difference introduced by the second phase difference film 72 at a wavelength of 450 nm was 1.01 times the in-plane phase difference introduced by the second phase difference film 72 at a wavelength of 550 nm. The in-plane phase difference introduced by the first phase difference film 71 at a wavelength of 650 nm was 0.99 times the in-plane phase difference introduced by the first phase difference film 71 at a wavelength of 550 nm. The in-plane phase difference introduced by the second phase difference film 72 at a wavelength of 650 nm was 0.99 times the in-plane phase difference introduced by the second phase difference film 72 at a wavelength of 550 nm.

The first phase difference film 71 and the second phase difference film 72 satisfied Formula N5 and Formula N6.

The first liquid crystal cell 11A and the second liquid crystal cell 11B were produced as follows. The first solid electrode 120, the second solid electrode 220, the third solid electrode 320, and the fourth solid electrode 420 were respectively formed in the first substrate 100, the second substrate 200, the third substrate 300, and the fourth substrate 400. Horizontal alignment films were then formed on the respective first substrate 100, second substrate 200, third substrate 300, and fourth substrate 400 each including the corresponding solid electrode. The horizontal alignment films may be subjected to rubbing or other treatment to provide a pre-tilt angle.

The first liquid crystal layer 500 was disposed between the first substrate 100 and the second substrate 200, each of which had the corresponding solid electrode and horizontal alignment film, so that the first liquid crystal cell 11A was produced. The second liquid crystal layer 600 was disposed between the third substrate 300 and the fourth substrate 400, each of which had the corresponding solid electrode and horizontal alignment film, so that the second liquid crystal cell 11B was produced. The first liquid crystal molecules 510 in the first liquid crystal layer 500 and the second liquid crystal molecules 610 in the second liquid crystal layer 600 were both positive liquid crystal molecules (Δn=0.070). The thickness of each of the first liquid crystal layer 500 and the second liquid crystal layer 600 was 3.4 μm.

In the second state, the alignment direction 511A of the first liquid crystal molecules 511 near the first substrate 100 was at an azimuthal angle of 0°, and the alignment direction 512A of the first liquid crystal molecules 512 near the second substrate 200 was at an azimuthal angle of 68°. In the first state, the alignment direction 611A of the second liquid crystal molecules 611 near the third substrate 300 was at an azimuthal angle of 90°, and the alignment direction 612A of the second liquid crystal molecules 612 near the fourth substrate 400 was at an azimuthal angle of 158°.

The Stokes parameter S3 of the emission light resulting from right-handed circularly polarized light (S3=+1) incident on the optical element (sHWP) of Example 8 was evaluated. FIG. 202 is a graph showing the relationship between Stokes parameter S3 during no modulation and the wavelength of emission light in the optical elements of Example 8, Comparative Example 1, and Comparative Example 2. FIG. 203 is a graph showing the relationship between Stokes parameter S3 during modulation and the wavelength of emission light in the optical elements of Example 8, Comparative Example 1, and Comparative Example 2. FIG. 202 and FIG. 203 show modulation and no modulation of light in the visible light range when the angle of incidence was set to 0°. As shown in FIG. 202 and FIG. 203, also in Example 8, a state with |S3|≥0.9 was achieved in a wavelength range of 450 nm to 650 nm both during modulation and during no modulation.

FIG. 204 is a graph showing the relationship between Stokes parameter S3 during no modulation and the azimuthal angle in the optical element of Example 8 when the angle of incidence is set to 30°. FIG. 205 is a graph showing the relationship between Stokes parameter S3 during modulation and the azimuthal angle in the optical element of Example 8 when the angle of incidence is set to 30°. FIG. 204 and FIG. 205 show the evaluation results at wavelengths of 450 nm, 550 nm, and 650 nm. The portion with gray hatching in the drawings corresponds to the suitable range where a state with |S3|≥0.9 was achieved.

As shown in FIG. 204 and FIG. 205, also in Example 8, a state with |S3|≥0.9 was achieved at all the azimuths in a range of 450 nm to 650 nm both during modulation and during no modulation.

The optical element 10 of Example 8 achieved a wider viewing angle range using the same biaxial film for the first phase difference film 71 and the second phase difference film 72. Such an optical element can be produced at low cost. The optical element is also considered advantageous in reduction in thickness because the number of films can be reduced.

REFERENCE SIGNS LIST

1: head mounted display
1P: display panel
10R1, 10R2: optical element
11A, 11B, 11R1: liquid crystal cell
12, 61NC, 62NC, 63NC, 64NC: negative C plate
13, 14, 15R, 18R: quarter-wave film
13A, 14A, 51A, 52A, 71A, 72A: slow axis
16R, 17R: half-wave film
19A, 19B, 61PC, 62PC, 63PC, 64PC: positive C plate
20A1, 20A2, 20A3: Pancharatnam-Berry (PB) lens
30A, 30B: varifocal element
40: phase difference plate
41, 42, 43, 44: alignment film
51, 52: A plate
51NA, 52NA: negative A plate
51PA, 52PA: positive A plate
61, 62, 63, 64: C plate
71, 72: phase difference film
100, 200, 300, 400: substrate
110, 210, 310, 410: support substrate
120, 220, 320, 420: solid electrode
500, 600: liquid crystal layer
500R1, 500R2, 500R3: TN liquid crystal layer
510, 511, 512, 610, 611, 612, 710: liquid crystal molecule
511A, 512A, 611A, 612A: alignment direction
700: optically anisotropic layer
810, 820, 830, 840: photomask
900: PB lens-forming film
LC0, LC1, LC2: left-handed circularly polarized light
R0, R1, R2: region
U: user

What is claimed is:

1. An optical element sequentially comprising:
    a first substrate;
    a first liquid crystal layer containing first liquid crystal molecules;
    a second substrate;
    a third substrate;
    a second liquid crystal layer containing second liquid crystal molecules; and
    a fourth substrate,
    the first substrate, the first liquid crystal layer, and the second substrate defining a first liquid crystal cell,
    the third substrate, the second liquid crystal layer, and the fourth substrate defining a second liquid crystal cell,
    the first liquid crystal cell including, as a first electrode for voltage application to the first liquid crystal layer, at least one of an electrode in the first substrate or an electrode in the second substrate, the second liquid crystal cell including, as a second electrode for voltage application to the second liquid crystal layer, at least one of an electrode in the third substrate or an electrode in the fourth substrate, the first electrode and the second electrode disposed to enable switching between a first state and a second state, the first state twist-aligning the second liquid crystal molecules and vertically aligning the first liquid crystal molecules, the second state twist-aligning the first liquid crystal molecules and vertically aligning the second liquid crystal molecules, an alignment direction of second liquid crystal molecules near the third substrate in the first state and an alignment direction of second liquid crystal molecules near the fourth substrate in the first state being respectively at azimuthal angles resulting from a ¼ turn in the same direction of an azimuthal angle of an alignment direction of first liquid crystal molecules near the first substrate in the second state and an azimuthal angle of an alignment direction of first liquid crystal molecules near the second substrate in the second state.

2. The optical element according to claim 1, further comprising a negative C plate between the first liquid crystal cell and the second liquid crystal cell.

3. The optical element according to claim 2,
wherein a thickness direction retardation Rth introduced by the negative C plate is not less than −220 nm and not more than 0 nm.

4. The optical element according to claim 1,
wherein a retardation introduced by the first liquid crystal layer at a wavelength of 550 nm in the second state is not less than 200 nm and not more than 260 nm, and
a retardation introduced by the second liquid crystal layer at a wavelength of 550 nm in the first state is not less than 210 nm and not more than 260 nm.

5. The optical element according to claim 1,
wherein the first liquid crystal cell does not have the same configuration as the second liquid crystal cell.

6. The optical element according to claim 1,
wherein the first liquid crystal molecules in the second state are twist-aligned with a twist angle of not smaller than 61° and not greater than 75°, and
the second liquid crystal molecules in the first state are twist-aligned with a twist angle of not smaller than 64° and not greater than 74°.

7. The optical element according to claim 1,
wherein the alignment direction of the first liquid crystal molecules near the first substrate in the second state is at an azimuthal angle of not smaller than −9° and not greater than 7°, and
the alignment direction of the second liquid crystal molecules near the third substrate in the first state is at an azimuthal angle of not smaller than 85° and not greater than 96°.

8. The optical element according to claim 1, further comprising a quarter-wave film facing the second liquid crystal cell across the first liquid crystal cell or facing the first liquid crystal cell across the second liquid crystal cell.

9. The optical element according to claim 8,
wherein the quarter-wave film exhibits reverse wavelength dispersion.

10. The optical element according to claim 8,
wherein an in-plane phase difference introduced by the quarter-wave film at a wavelength of 450 nm is not less than times and not more than 1 times the in-plane phase difference introduced by the quarter-wave film at a wavelength of 550 nm.

11. The optical element according to claim 8,
wherein an in-plane phase difference introduced by the quarter-wave film at a wavelength of 650 nm is not less than 1 times and not more than 1.3 times the in-plane phase difference introduced by the quarter-wave film at a wavelength of 550 nm.

12. The optical element according to claim 8,
wherein a slow axis of the quarter-wave film is at an azimuthal angle of not smaller than 52° and not greater than 60°.

13. The optical element according to claim 8,
wherein an in-plane phase difference introduced by the quarter-wave film at a wavelength of 550 nm is not less than 90 nm and not more than 170 nm.

14. The optical element according to claim 8,
wherein the quarter-wave film is a first quarter-wave film, and
the optical element further comprises a second quarter-wave film facing the first liquid crystal cell and the second liquid crystal cell across the first quarter-wave film.

15. The optical element according to claim 14,
wherein the second quarter-wave film exhibits flat wavelength dispersion.

16. The optical element according to claim 14,
wherein a slow axis of the second quarter-wave film is at an azimuthal angle of not smaller than 8° and not greater than 18°.

17. The optical element according to claim 14,
wherein an in-plane phase difference introduced by the second quarter-wave film at a wavelength of 550 nm is not less than 120 nm and not more than 150 nm.

18. A varifocal element comprising:
the optical element according to claim 1; and
a Pancharatnam-Berry lens.

19. The varifocal element according to claim 18,
wherein the Pancharatnam-Berry lens is disposed in the optical element.

20. A head mounted display comprising
the varifocal element according to claim 18.

* * * * *